US010981458B2

(12) United States Patent
Xu

(10) Patent No.: US 10,981,458 B2
(45) Date of Patent: Apr. 20, 2021

(54) HOMOPOLAR DC ELECTROMAGNETIC TRANSMISSION AND APPLICATION SYSTEM THEREOF

(71) Applicant: Limin Xu, Heilongjiang (CN)

(72) Inventor: Limin Xu, Heilongjiang (CN)

( * ) Notice: Subject to any disclaimer, the term of this patent is extended or adjusted under 35 U.S.C. 154(b) by 400 days.

(21) Appl. No.: 15/992,276

(22) Filed: May 30, 2018

(65) Prior Publication Data
US 2018/0273016 A1    Sep. 27, 2018

Related U.S. Application Data

(63) Continuation of application No. PCT/CN2015/000837, filed on Nov. 30, 2015.

(51) Int. Cl.
*H02K 16/02* (2006.01)
*B60L 53/00* (2019.01)
(Continued)

(52) U.S. Cl.
CPC .............. *B60L 53/00* (2019.02); *B60K 6/10* (2013.01); *B60K 17/12* (2013.01); *B60L 53/56* (2019.02); *B60W 10/02* (2013.01); *B60W 10/06* (2013.01); *B60W 10/105* (2013.01); *B60W 10/107* (2013.01); *B60W 10/108* (2013.01); *B60W 30/1819* (2013.01); *F03D 15/00* (2016.05); *F16H 61/66259* (2013.01); *H02J 3/30* (2013.01); *H02K 7/102* (2013.01); *H02K 16/02* (2013.01); *H02K 31/00* (2013.01); *H02K 49/12* (2013.01); *H02K 51/00* (2013.01); *Y02E 10/72* (2013.01); *Y02E 60/16* (2013.01);
(Continued)

(58) Field of Classification Search
CPC ................... H02K 16/02; H02K 7/02
See application file for complete search history.

(56) References Cited

U.S. PATENT DOCUMENTS 4,959,578 A *  9/1990  Varga .................. H02K 1/12
                                                310/114
8,749,083 B2 *  6/2014  Nomoto ............... H02K 7/1838
                                                290/44
(Continued)

FOREIGN PATENT DOCUMENTS

CN         1195918 A      10/1998
CN       105140943 A      12/2015
(Continued)

*Primary Examiner* — Dang D Le

(57) ABSTRACT

A homopolar DC electromagnetic transmission (HET) and an application system thereof are provided. The HET includes two rotors, a stator, an external auxiliary system and an adjustment control system. Each of the rotors has one or more axisymmetric rotor magnetic conductors, and the stator has one or more direct current magnet exciting coils wound around an axis of a rotation shaft. A main magnetic circuit is guided to be a closed ring. The HET includes at least two main magnetic circuits. The HET includes a closed main current loop. The loop is connected with all the rotor magnetic conductors, a rotor electric conductor, a dynamic/static circuit connecting medium, stator conductors and stator magnetic conductors in series or in series and parallel. A direction of main current on the rotor magnetic conductors is perpendicular to a direction of magnetic flux (φ) on meridian plane.

8 Claims, 81 Drawing Sheets

(51) Int. Cl.
*B60K 17/12* (2006.01)
*F03D 15/00* (2016.01)
*B60K 6/10* (2006.01)
*H02K 7/102* (2006.01)
*H02J 3/30* (2006.01)
*H02K 49/12* (2006.01)
*H02K 31/00* (2006.01)
*B60L 53/56* (2019.01)
*B60W 10/02* (2006.01)
*B60W 10/06* (2006.01)
*B60W 10/105* (2012.01)
*B60W 10/107* (2012.01)
*B60W 10/108* (2012.01)
*B60W 30/18* (2012.01)
*F16H 61/662* (2006.01)
*H02K 51/00* (2006.01)

(52) U.S. Cl.
CPC ............... *Y02T 10/62* (2013.01); *Y02T 10/64* (2013.01); *Y02T 10/70* (2013.01)

(56) References Cited

U.S. PATENT DOCUMENTS

| 9,718,343 B2 * | 8/2017 | Atkins | H02K 7/025 |
| 2007/0164628 A1 * | 7/2007 | Fonseca | H02K 51/00 |
| | | | 310/112 |

FOREIGN PATENT DOCUMENTS

| CN | 105150835 A | 12/2015 |
| CN | 105216640 A | 1/2016 |
| CN | 105221355 A | 1/2016 |
| CN | 105226873 A | 1/2016 |
| CN | 105270154 A | 1/2016 |
| JP | 2007037357 A | 2/2007 |
| JP | 2010136508 A | 6/2010 |

* cited by examiner

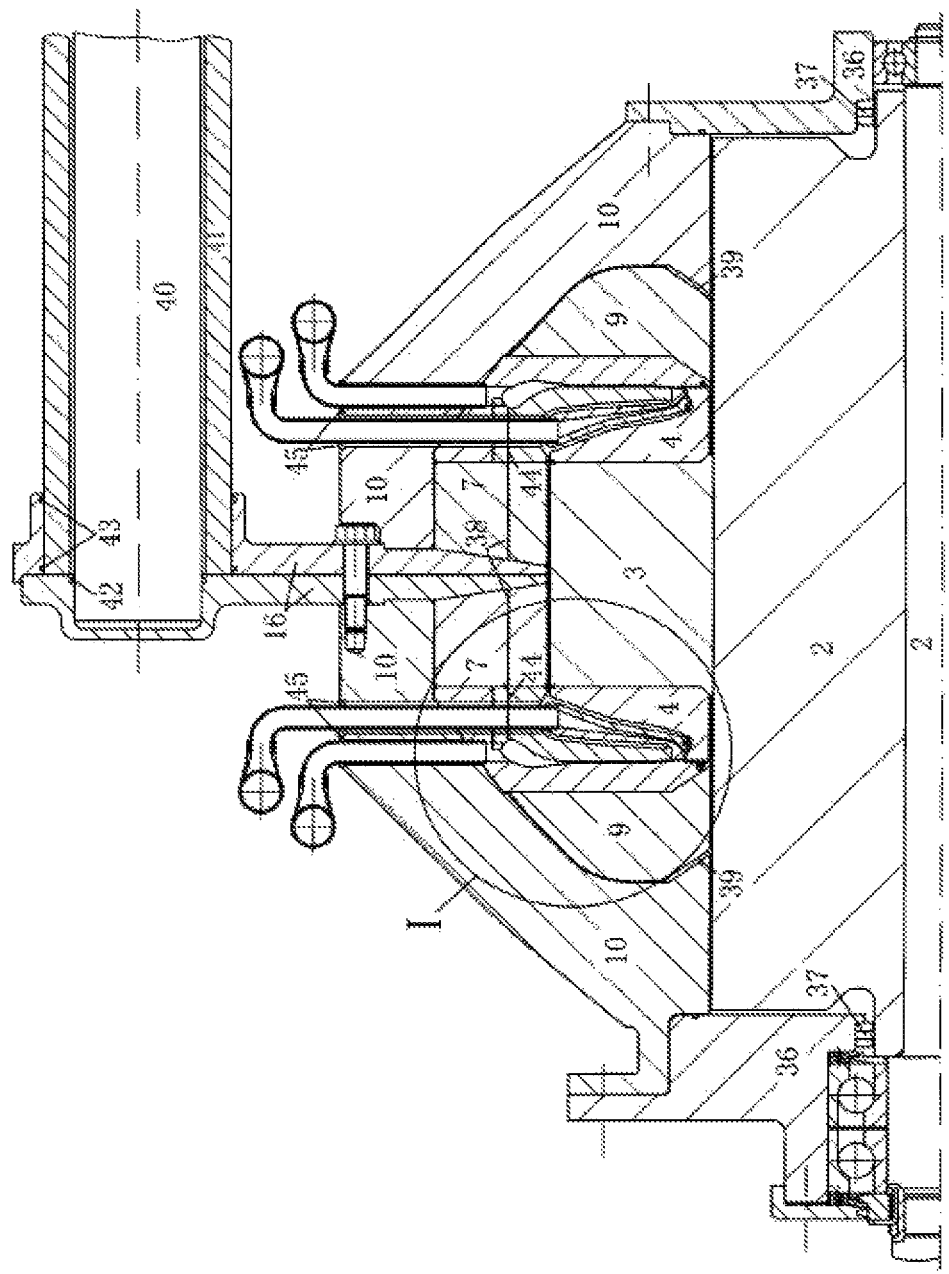
FIG. 19 (1)

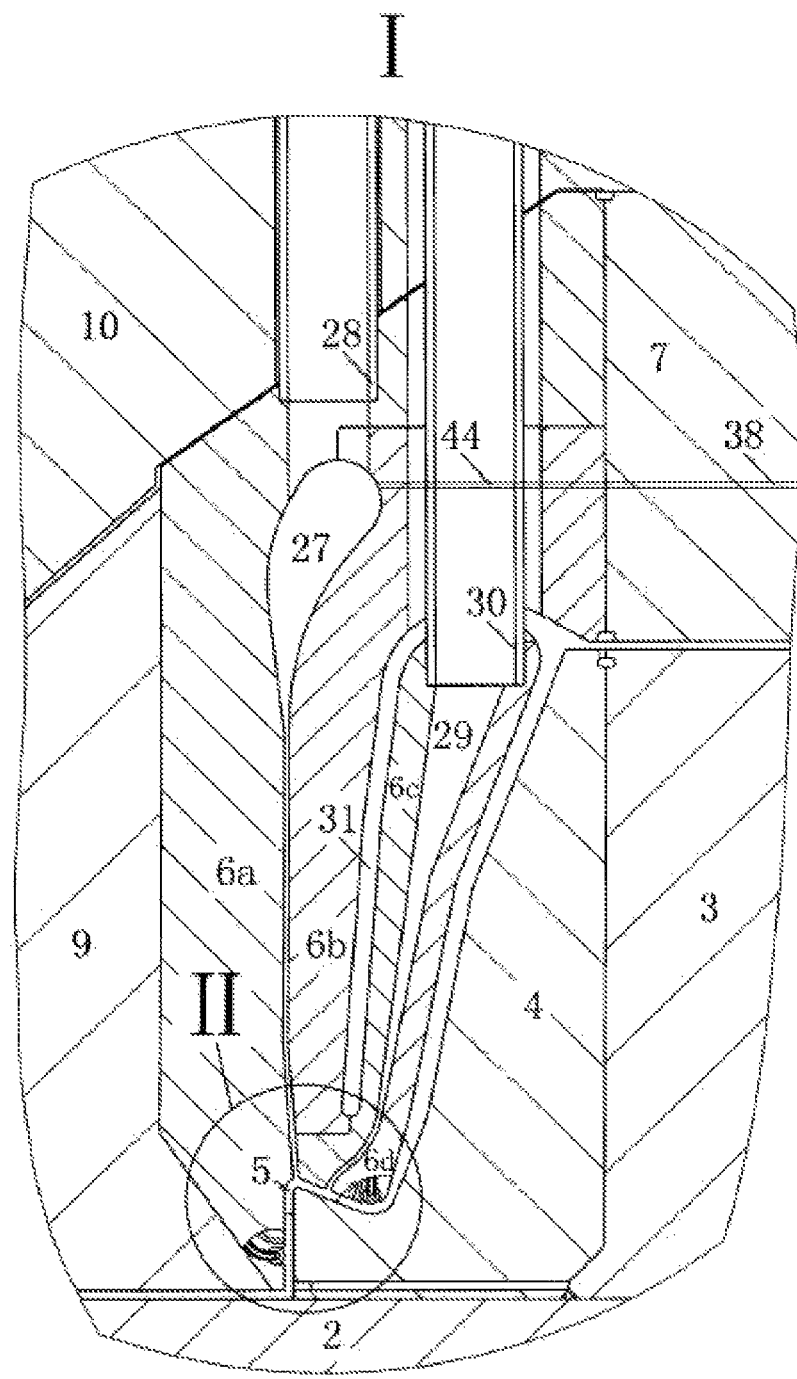
FIG. 19 (2)

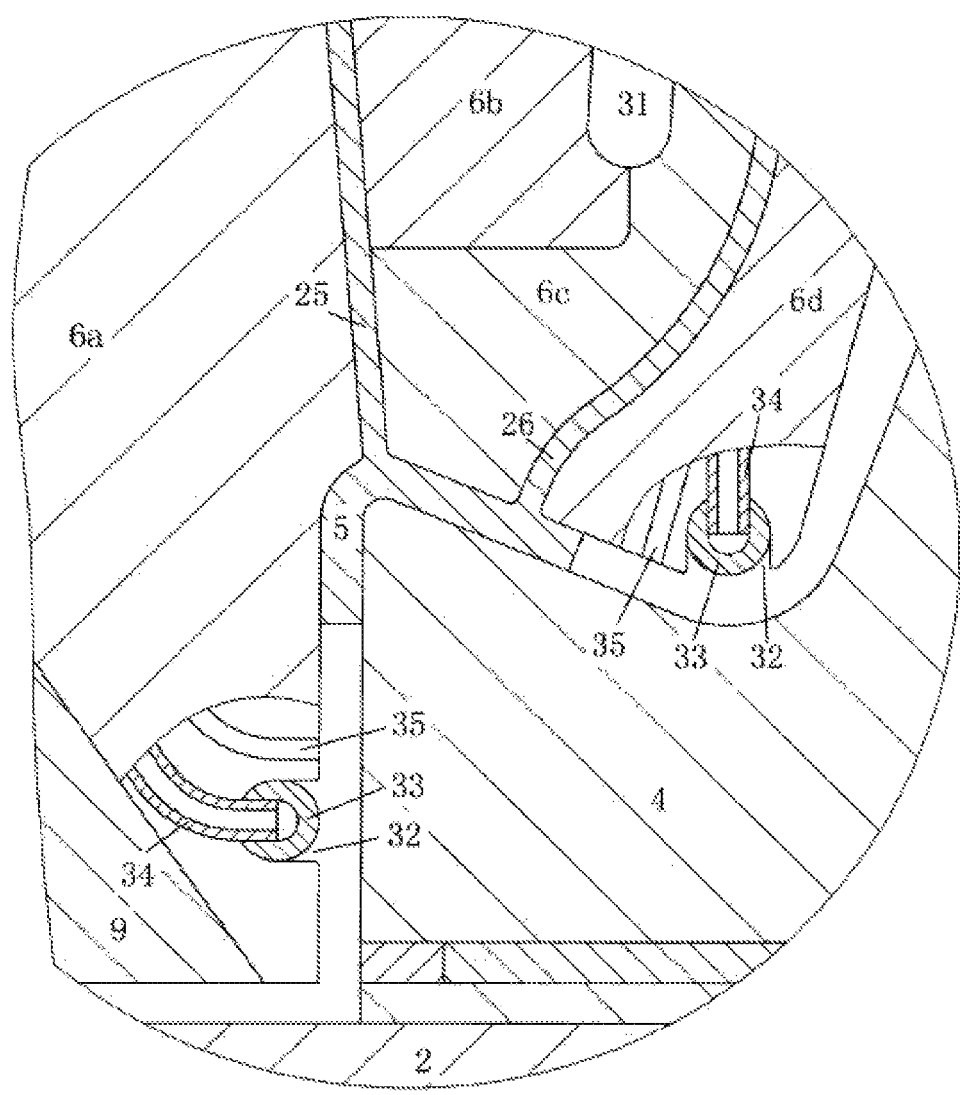
FIG. 19 (3)

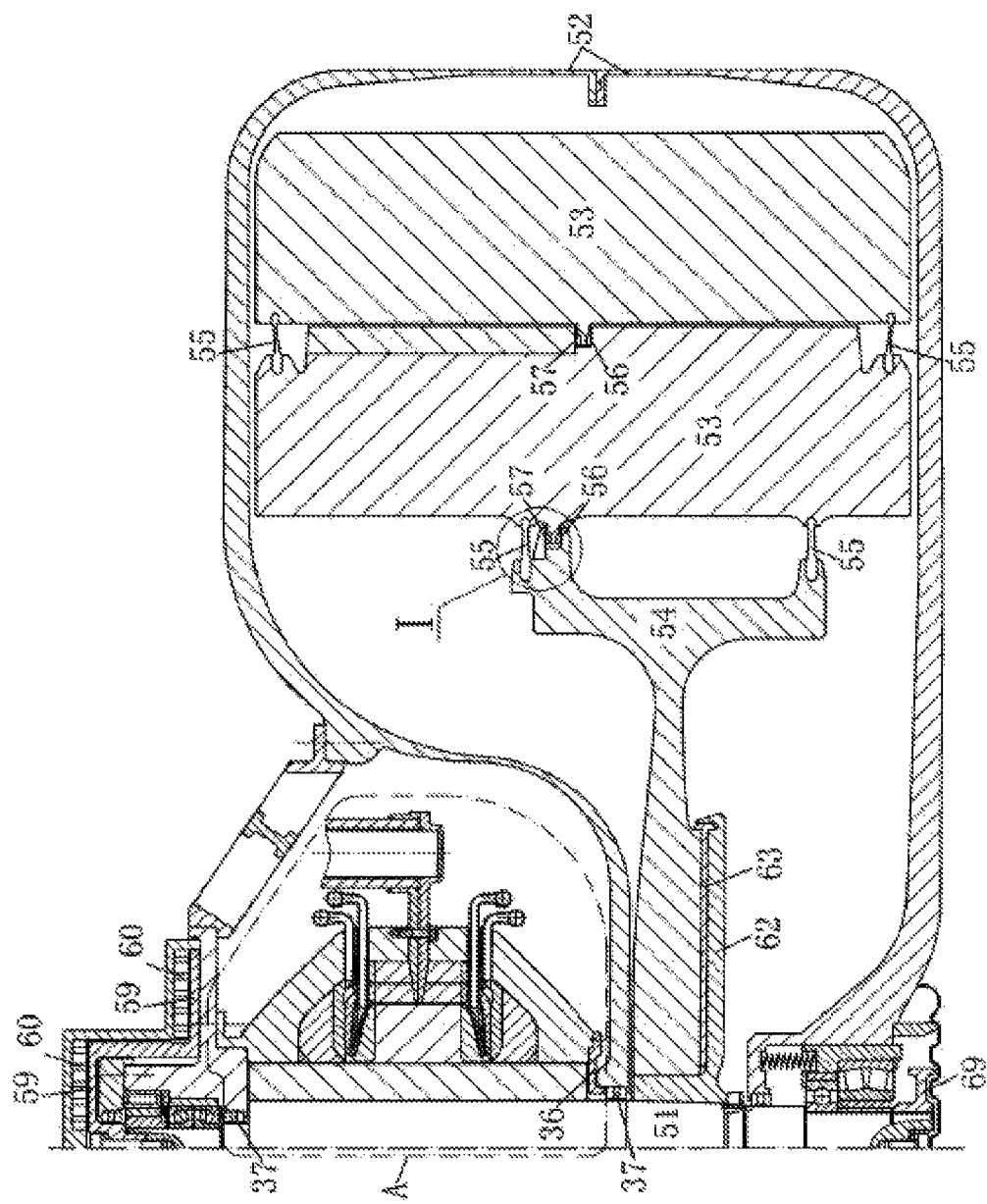
FIG. 23 (1)

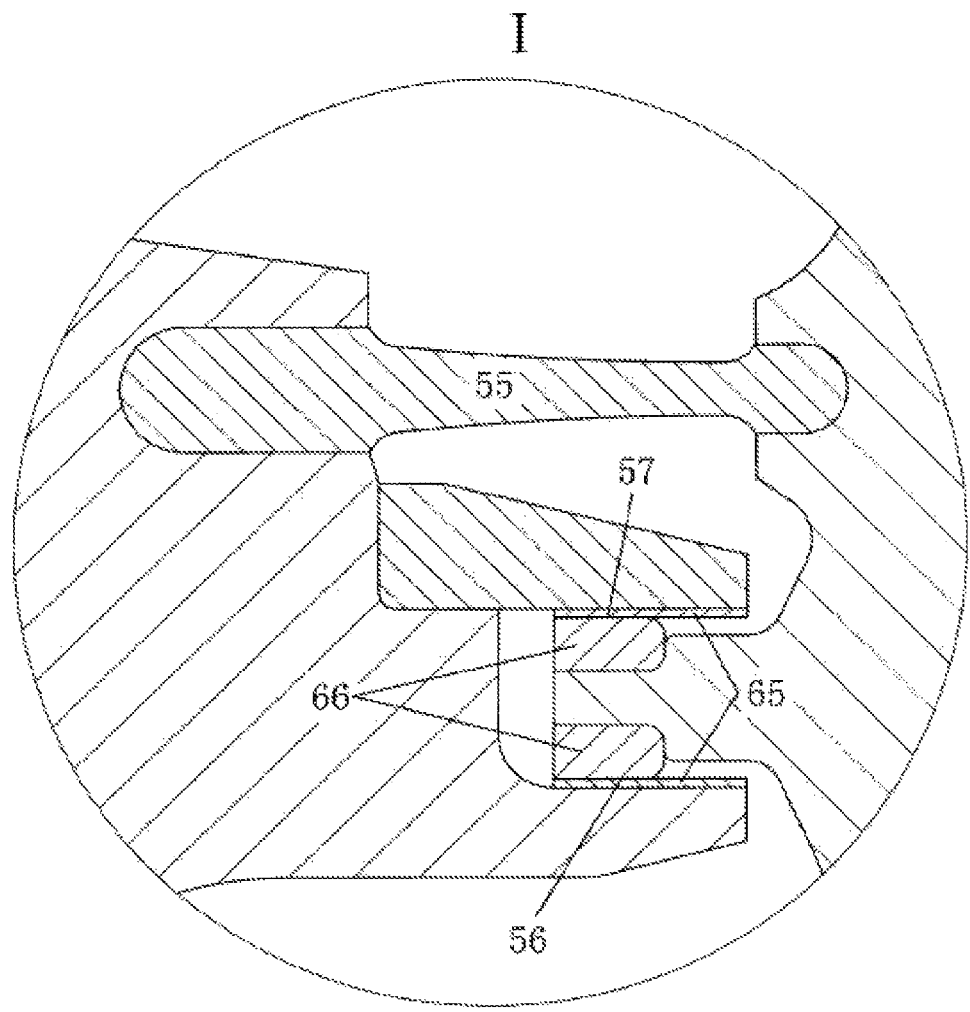
FIG. 23 (2)

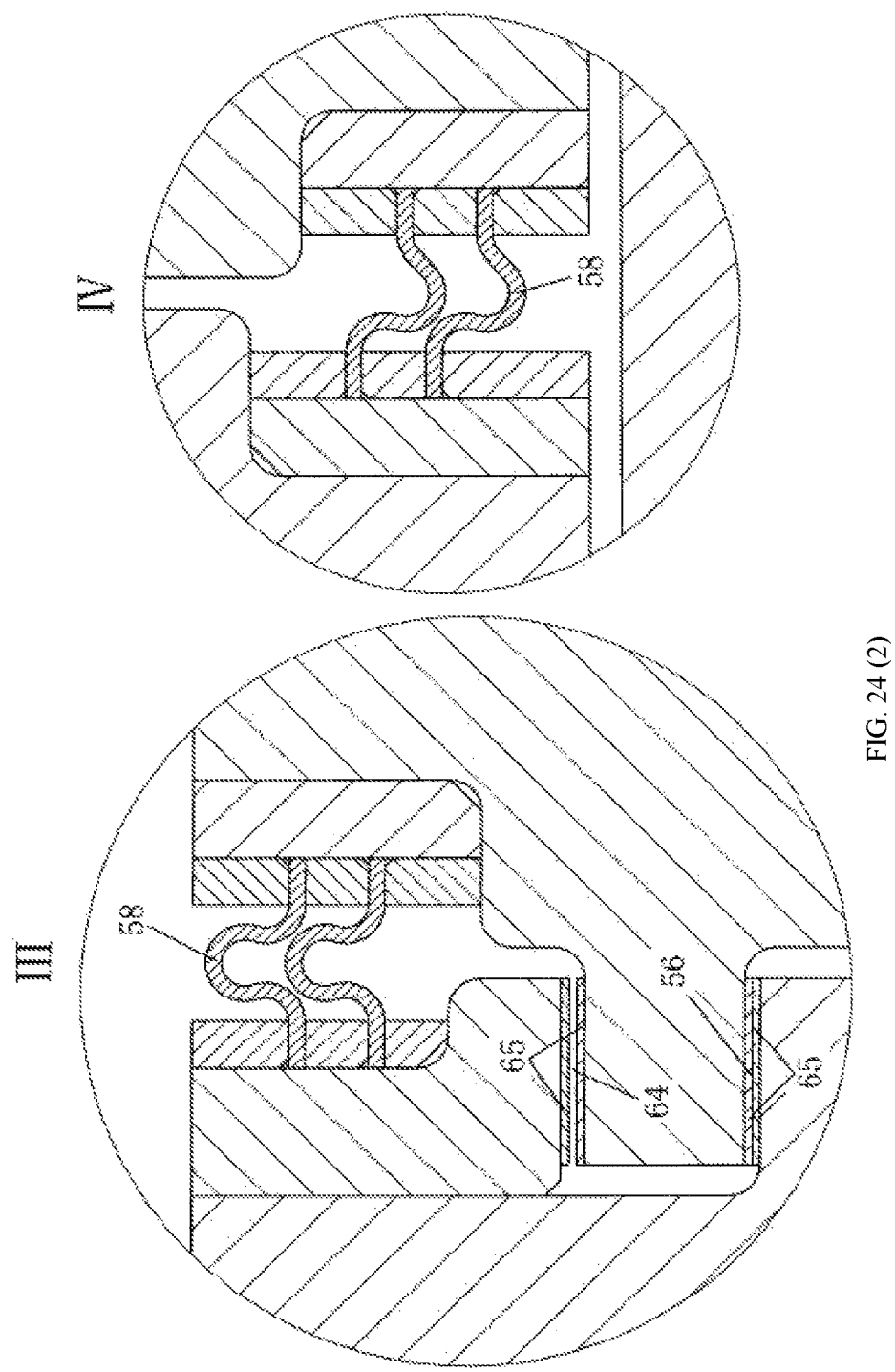
FIG. 24 (2)

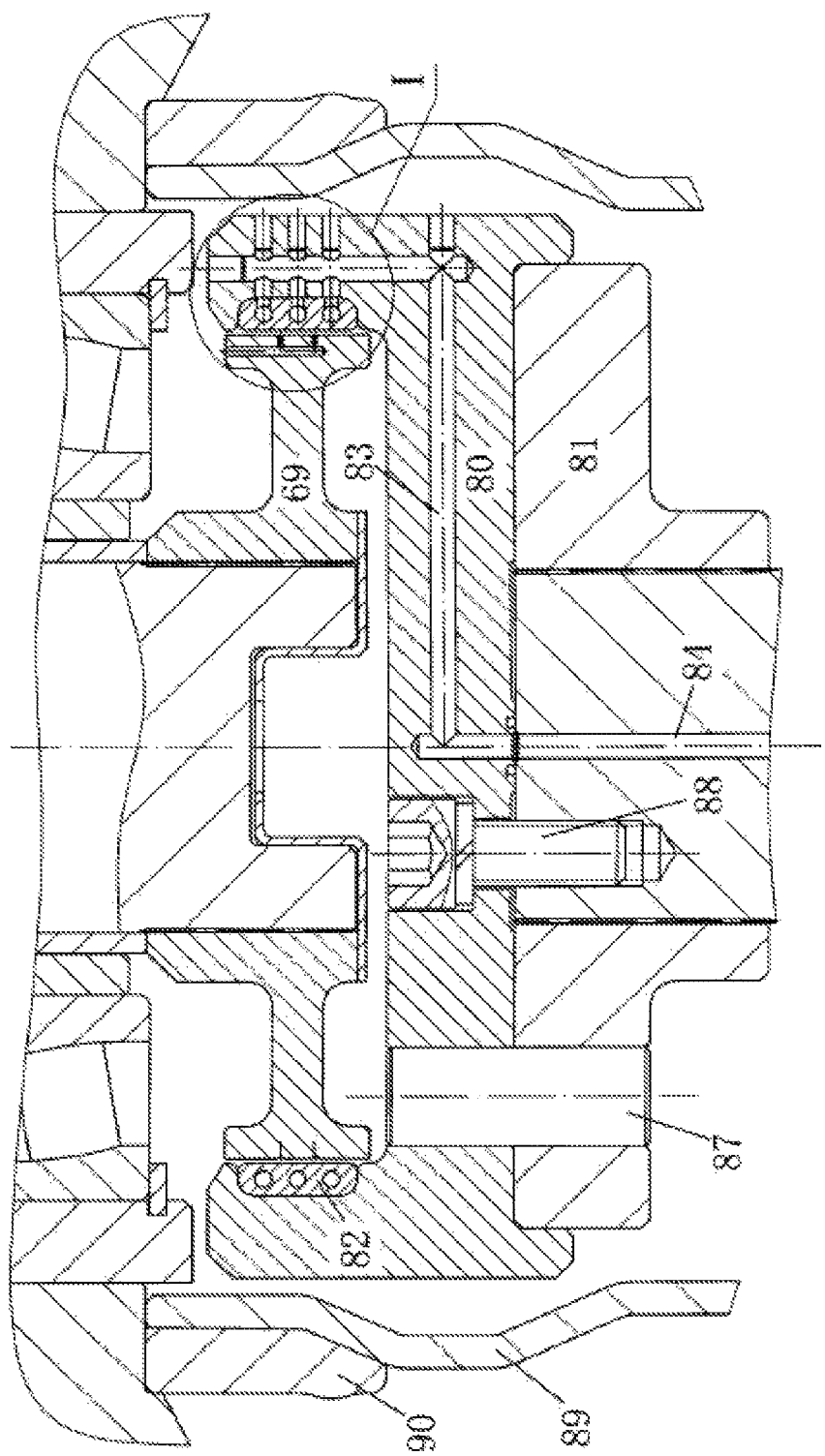
FIG. 33 (1)

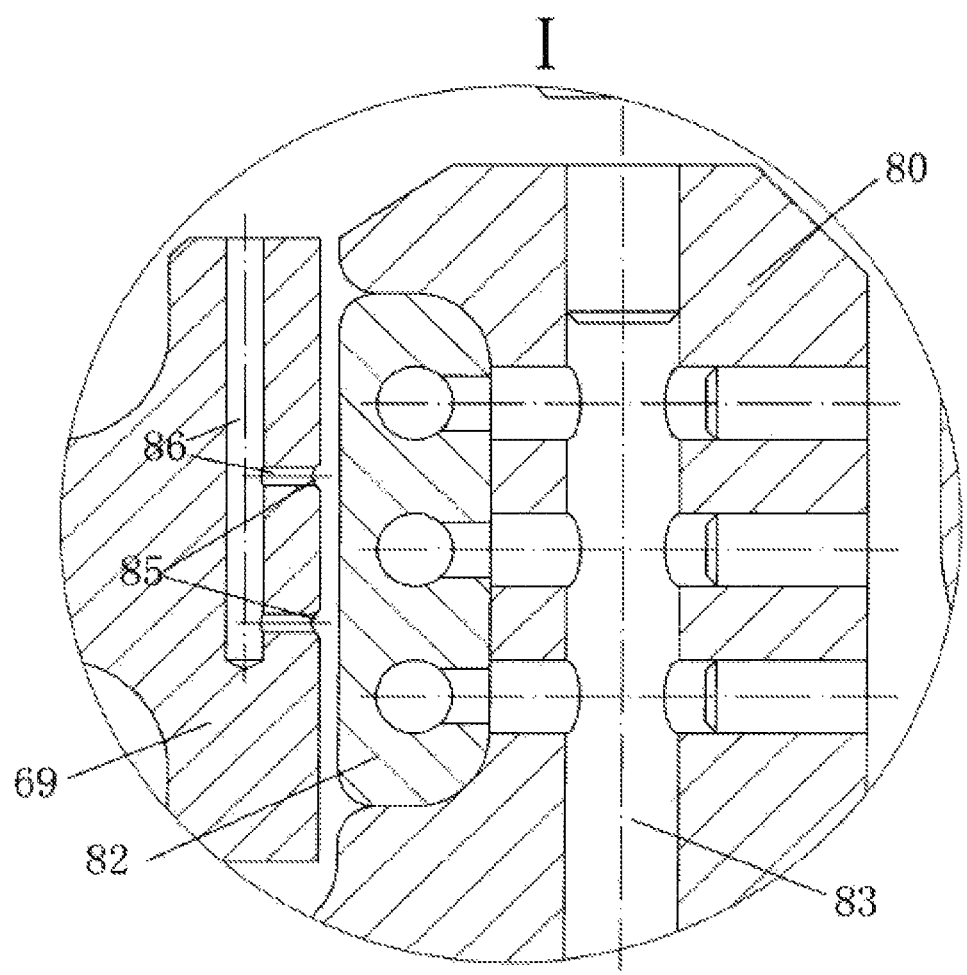
FIG. 33 (2)

HOMOPOLAR DC ELECTROMAGNETIC TRANSMISSION AND APPLICATION SYSTEM THEREOF

TECHNICAL FIELD (a) Homopolar DC Electromagnetic Transmission (HET)

It relates to a device which transmits power in a mode of stepless speed change and torque change between two rotation shafts.

(b) Fuel Engine Power System for Vehicles Including HET

It relates to a vehicle power system, and particularly relates to a vehicle power system with fuel burning engine and continuously variable transmission.

(c) Flywheel Power System for Vehicles Including HET

It relates to a vehicle power system, and particularly relates to a vehicle power system which does not carry fuel, is charged with a power grid and has zero emission.

(d) Fuel Engine and Flywheel Hybrid Power System for Vehicles Including HET

It relates to a vehicle power system, and particularly relates to a vehicle hybrid power system of a fuel engine and an energy storage device.

(e) Mechanical Connection and Load Charging System for Energy Storage Flywheel of Vehicle Including HET It relates to a charging device for a vehicle power system, and particularly relates to a charging device for an energy storage flywheel.

(f) Wind Power Generation System Including HET

It relates to a wind power generation system, and particularly relates to a wind power generation system with continuously variable transmission.

(g) Wind Power Generation System Including HET and Flywheels

It relates to a wind power generation system, and particularly relates to a wind power generation system with an energy storage device.

(h) Flywheel Energy Storage and Conversion System Including HET

It relates to an energy storage and conversion system, and particularly relates to a system for storing energy with a flywheel in a fixed place and converting input and output of energy with a power grid.

BACKGROUND (a) Homopolar DC Electromagnetic Transmission (HET)

Stepless variable speed and variable torque transmission devices applied currently mainly include mechanical continuously variable transmissions and hydraulic torque converters.

The mechanical continuously variable transmissions are basically frictional, conduct transmission by means of frictional force between transmission elements or shear stress of an oil film, and include a rigid fixed shaft type mechanical continuously variable transmission, a rigid movable shaft type (planetary) mechanical continuously variable transmission, a flexible belt type mechanical continuously variable transmission and a flexible chain type mechanical continuously variable transmission. The fixed shaft type mechanical continuously variable transmission also includes a mechanical continuously variable transmission without middle rolling body and a mechanical continuously variable transmission with middle rolling body. The mechanical continuously variable transmission without middle rolling body also includes a mechanical continuously variable transmission for changing working diameter and regulating speed of a driving wheel (I type) and a mechanical continuously variable transmission for changing working diameter and regulating speed of a driven wheel (II type). The mechanical continuously variable transmission with middle rolling body also includes a mechanical continuously variable transmission for simultaneously changing working diameter and regulating speed of a driving wheel and a driven wheel (III type) and a mechanical continuously variable transmission for changing working diameter and regulating speed of a middle rolling body (IV type). The fixed shaft type mechanical continuously variable transmission has a frictional sliding rate of 3%-5%; I type, III type and IV type have power less than 40 kW; and I type has a transmission efficiency of only 50%, II type has a transmission efficiency of about 85%, III type has a transmission efficiency of 75%-95%, and IV type has a transmission efficiency of 80%-93%. I type has a transmission gear ratio (a ratio of a maximum value to a minimum value of rotating speed of an output shaft when rotating speed of an input shaft is constant) of 3-5, II type has a transmission gear ratio less than 3, III type has a transmission gear ratio less than 16 or 25, IV type has a transmission gear ratio less than 17 or 20 and III type and IV type cannot rotate reversely. The planetary mechanical continuously variable transmission has the same basic principle as the fixed shaft type mechanical continuously variable transmission, and uses a planetary transmission principle to increase the range of the transmission power and variable speed. But the planetary mechanical continuously variable transmission has a power less than 75 kW, a transmission gear ratio less than 40, poor mechanical property near zero rotating speed, large sliding rate (7%-10%) and a transmission efficiency of 60%-80%, and can only decrease and regulate the speed. The belt type continuously variable transmission and the chain type continuously variable transmission have basically the same principle as the fixed shaft type continuously variable transmission, but adopts a middle flexible member (belt or chain). A single-variable diameter wheel belt type continuously variable transmission has a transmission efficiency not greater than 92%, a transmission gear ratio not greater than 2.5, and a power not greater than 25 kW, and is only used for decreasing the speed; and a dual-variable diameter wheel belt type continuously variable transmission has a transmission efficiency of 80%-90%. An ordinary V belt type continuously variable transmission has a transmission gear ratio of 1.6-2.5, and a power not greater than 40 kW. A wide V belt type continuously variable transmission has a transmission gear ratio of 3-6, and a power not greater than 55 kW. A block belt type continuously variable transmission has a transmission gear ratio of 2-16, and a power not greater than 44 kW. The chain type continuously variable transmission has a transmission power greater than that of the belt type continuously variable transmission, but has a more complicated structure. A toothed chain type continuously variable transmission has a power of 0.75-22 kW, a transmission gear ratio of 3-6 and a transmission efficiency of 90%-95%. A smooth wheel chain type continuously variable transmission has a maximum power of 175 kW, a transmission gear ratio of 2-10 and a transmission efficiency not greater than 93%. The mechanical continuously variable transmissions are only suitable for medium and small-power transmission, and have limited transmission gear ratios, sliding friction, low transmission efficiency, high requirements for material, heat treatment, processing accuracy and lubricating oil, large axial and bearing loads, poor capability of bearing overload and impact and short life. Most of the mechanical continuously variable transmissions cannot change the speed during parking. Some of them can only decrease and regulate the speed, and some cannot rotate reversely (the above data herein is from the transmission design volume of Mechanical Engineering Manual (Version 2)). The mechanical continuously variable transmissions are rarely applied at present, but V type push block metal belt continuously variable transmissions are already applied in the automotive filed.

The hydraulic torque converter has a pump wheel, a turbine and a guide wheel in which operating liquid successively flows circularly. The pump wheel is installed on the input shaft, and the turbine is installed on the output shaft. The guide wheel is connected with a stator, thereby generating a torque change effect. The pump wheel is centrifugal. The turbine includes centripetal, axial-flow type and centrifugal turbines. The guide wheel is generally axial-flow type or centripetal guide wheel, and is widely applied to centripetal turbine and axial-flow type guide wheel structures. The axial-flow type or centrifugal turbine type hydraulic torque converter has excellent reverse rotation braking performance. When the rotating speed of the pump wheel is constant, the pump wheel torque, the turbine torque and the transmission efficiency are one-variable functions of the rotating speed of the turbine, wherein the pump wheel torque is changed slightly; the turbine torque is almost decreased linearly to zero with the increase of the rotating speed of the turbine; and the transmission efficiency reaches a maximum value at a certain middle rotating speed (the turbine is designed near the rotating speed, and generally at the right side), has a maximum value of about 85%-90%, and is decreased rapidly at a low rotating speed region and a high rotating speed region down to zero. When the pump wheel torque is constant, the rotating speed of the pump wheel, the turbine torque and the transmission efficiency are also one-variable functions of the rotating speed of the turbine. Due to the constraints of the above associations, the hydraulic torque converter only has a torque changing effect, and the rotating speed is limited to only follow the change. To solve the problem, adjustable-speed hydraulic torque converters with auxiliary structures or measures can realize stepless speed change, with a speed change range of 3-5 and an efficiency of 40%-85% (the above data herein is from the transmission design volume of Mechanical Engineering Manual (Version 2)). The main problem of the hydraulic torque converter is low efficiency. To increase the efficiency, the structure shall be simplified and the transmission gear ratio (a ratio of the turbine torque to the pump wheel torque) shall be decreased; and the efficiency can be close to about 90% only when the transmission gear ratio KO (the transmission gear ratio reaches a maximum value when the rotating speed of the turbine is zero) under the starting condition is decreased to about 2.

The combined use of multiple devices is a common way of the current stepless variable speed and variable torque transmission devices, which is designed to compensate for defects and add functions. The V type push block metal belt continuously variable transmissions applied on automobiles are combined with a starting device part and a forward/backward reversing mechanism part to form a transmission system. There are three forms of starting devices: an electromagnetic clutch, an electronic control type wet friction clutch and a hydraulic torque converter. At present, the hydraulic torque converter is preferred as the starting device. The mainstream applied to automatic transmissions of the automobiles currently is a hydraulic mechanical torque converter which is composed of a hydraulic torque converter and an electronic control type power shift mechanical transmission. The structure of the electronic control type power shift mechanical transmission is generally a planetary gear drive mechanism which has 6-7 shifts of transmission gear ratio at most. A symmetrical three-element single-stage two-phase form with simple structure is mostly adopted in the hydraulic torque converter, and KO is generally about 2. The torque converter works mainly at starting acceleration and shifting.

A DC or AC electrical transmission system can also be adopted to indirectly realize continuously variable transmission between two shafts. At present, AC speed regulation transmission has replaced DC speed regulation transmission, while AC frequency-conversion speed regulation transmission is an applied mainstream. An AC frequency-conversion speed regulation transmission system for realizing continuously variable transmission between two shafts is mainly composed of the following devices: an AC generator connected with an input shaft, a rectifier, a frequency converter, and an AC motor which is connected with an output shaft. The system has the disadvantages of multiple devices, large volume, high cost, multiple links and low efficiency. The efficiency of an international advanced standard high-efficiency low-voltage three-phase cage induction motor is not greater than 95% (for models with 160 kW or below), and the efficiency of a frequency converter is about 94%-96%. Based on the efficiency of 95% for each device, system efficiency of two motors and one frequency converter is only 86%.

In the application fields of automobiles, wind power generation, power grid peak adjustment, ship propulsion, industrial and mining mechanical drive and the like, there are a wide range of demands for stepless variable torque transmission, such as hundreds of, thousands of, and tens of thousands of kilowatts of transmission efficiency, reverse power transmitting function, a large range of continuously variable transmission (e.g., rotating speed from 0 to a maximum value, and infinite transmission gear ratio), continuously variable transmission reversing function, a large range of continuously variable transmission (e.g., from 0 to maximum torque, and from negative torque to maximum positive torque), independent full-range torque regulation independent of rotating speed, independent and free change of rotating speeds of two shafts without relevance (the change of the rotating speed of rotor systems on both ends is determined by aerodynamic laws) (e.g., between an energy storing flywheel shaft and a rotation shaft for connecting a wheel), large rotating speed ratio of two shafts (e.g., an input shaft in a wind power generation occasion has a rated rotating speed of dozens of revolutions per minute, and an output shaft has a rotating speed of 1500 or 3000 revolutions per minute), higher transmission efficiency (e.g., 95%-98%), high power density, simple structure, low cost, high reliability, long service life, isolation of transfer of mechanical vibration and impact between two shafts, low noise, and small vibration. The existing stepless variable speed and variable torque transmission devices or systems are difficult to meet the above demands. Some of them only meet local individual demands. So far, no device has fully met the above demands. The current strategy is to combine a plurality of devices with different types and characteristics to try to meet more functional demands, but the effect is unsatisfactory.

The present invention applies the electromagnetic action principle of a homopolar DC motor. The homopolar DC motor is a motor in which magnetic flux that passes through the full area of an air gap presents the same polarity, and a magnet exciting coil of the motor encircles an axis and is wound into an axisymmetric shape. When direct current is led into the motor, the generated magnetic flux penetrates through an axisymmetric conductor on a rotor; a rotating rotor conductor cuts the magnetic flux, and induces a direct current electromotive force with the same polarity; and the direct current electromotive force is connected to an external circuit through electric brushes on both ends of the rotor conductor to form direct current. Because only one conductor induces the electromotive force, the voltage is low, while the current is high, so the motor can be used as a low-voltage high-current DC generator for use in electrochemical industry and the like. The motor almost has no eddy current and hysteresis loss, which is favorable for increasing the efficiency. The rotor has no winding, and does not need commutator, thereby saving copper and realizing simple structure. The current density can be very high, and the motor is a high power density model. Liquid metal is used for afflux and replaces the electric brushes, thereby greatly reducing voltage drop and loss during afflux, but air shall be isolated. The motor has the disadvantages of high external current, thick wire, many consumables and high loss, and can only be used in special application occasions that need low voltage and high current.

(b) Fuel Engine Power System for Vehicles Including HET

It is a vehicle power system which uses a fuel burning engine and has continuously variable transmission. It mainly adopts a mechanical continuously variable transmission and a hydraulic torque converter currently. For application situations and technical limitations of the mechanical continuously variable transmission and the hydraulic torque converter, see Background part of "(a) Homopolar DC Electromagnetic Transmission (HET)".

In the application fields of cars, passenger cars, trucks, engineering vehicles, working vehicles, tracked vehicles, rail vehicles and the like, there are higher requirements and more functional demands for stepless variable speed and variable torque transmission, such as hundreds of and thousands of kilowatts of transmission efficiency, a large range of continuously variable transmission (e.g., rotating speed from 0 to a maximum value, and infinite transmission gear ratio), continuously variable transmission reversing function, a large range of continuously variable transmission (e.g., from 0 to maximum torque), independent full-range torque regulation independent of rotating speed, independent and free change of rotating speeds of two shafts without relevance (the change of the rotating speed of rotor systems on both ends is determined by aerodynamic laws), higher transmission efficiency (e.g., 95%-98%), high power density, simple structure, low cost, high reliability, long service life, isolation of transfer of mechanical vibration and impact between two shafts, low noise, and small vibration. The existing stepless variable speed and variable torque transmission devices are difficult to meet the above demands. Some of them only meet local individual demands. So far, no device has fully met the above demands. The current strategy is to combine a plurality of devices with different types and characteristics to try to meet more functional demands, but the effect is unsatisfactory.

In addition, for the existing vehicles which use the fuel burning engines, including the vehicles with continuously variable transmissions, the overall fuel efficiency of the engine during running is low; the running ratio of high-efficiency region is small; and a control means for efficient operation is deficient or absent.

(c) Flywheel Power System for Vehicles Including HET

It is a vehicle power system which does not carry fuel, is charged with a power grid and has zero emission. At present, it mainly includes two types: a chemical battery power system and a flywheel power system.

The existing chemical battery power system for vehicles includes a chemical battery, a motor/generator, a convertor device, a control system and other major parts. After alternating current of the power grid is rectified into direct current, the direct current charges energy to the chemical battery; and the direct current of the chemical battery is converted into alternating current with proper frequency and voltage through the convertor device and is inputted into the motor for driving the vehicle. When a kinetic energy recovery function is used in vehicle braking, the generator is used, instead of the motor; a related system enables the energy to flow reversely; and the kinetic energy of the vehicle is converted into chemical energy of the battery. So far, the chemical battery power system for vehicles also has many problems and disadvantages including:

(1) Charging time of the chemical battery is too long; a used fast charge solution also takes a long time; and fast charge greatly damages the battery;

(2) Power performance of the vehicle is insufficient; due to the constraints of power capacities of the motor and the convertor device and the limitation of high current discharge of the chemical battery, the maximum speed of the vehicle per hour is slightly low; acceleration, especially at high speed, is not enough; and gradeability is not enough;

(3) The kinetic energy recovery function is limited during vehicle braking; similarly, due to the limitations of device power and high current charging of the chemical battery, kinetic energy recovery braking power is slightly low, while vehicle braking is often in a case of high energy conversion rate;

(4) Vehicle miles traveled are not long enough; this problem is related to battery cost and weight and other problems, and is also related to the problem of too long charging time of the battery; the charging problem cannot solve the problem of the miles traveled, and even rises to the most important problem, while internal driving force actively constructed for supported facilities in charging places and the like shall come from the practical competitiveness and market prospect of the power vehicle; and in addition, the occupation area of the place with very long charging time is unacceptable, and each time efficiency is extremely low;

(5) The chemical battery is very high in unit cost; and the vehicle cost is very high and does not have market competitiveness;

(6) The life of the chemical battery is limited; the service life is quite different from the service life of a general automobile, while the cost occupies the largest part of the vehicle; and repeated maintenance and replacement of the battery need high cost;

(7) Energy conversion efficiency is low; charging efficiency of the chemical battery (efficiency of converting electric energy into chemical energy) is about 70%; the efficiency of the motor and the convertor device is about 80% at constant speed, and about 60% at acceleration; the total comprehensive efficiency is only 56% at constant speed, and about 42% at acceleration; (data is from Practical Manual For Motor Technology (Japanese) Edited by Tree Ebihara Hideto, Translated by Wang yiquan et al. Science Press, 2005, Page 844)

(8) Safety and environmental protection problems exist; a lithium ion battery with high energy density is easy to cause overheat, spontaneous combustion and even explosion; a lead acid battery with low energy density has heavier weight and seriously pollutes the environment; and the chemical battery always has a great problem which is not favorable for environmental protection in the full life cycle from protection to treatment after use.

The existing flywheel power system for vehicles is not applied as an individual main power in the vehicle, and is mainly used in hybrid vehicles. The system or subsystem is typically composed of: a vacuum environment, flywheels supported by magnetic suspension, a high-speed variable-frequency motor/generator coaxial with the flywheels, a power semiconductor convertor device, and a variable-frequency motor/generator which is finally connected to wheels. When the flywheels are driven, kinetic energy of the flywheels drives the vehicle through the following energy transfer paths: a flywheel-side generator, a convertor device and a wheel-side motor; when the kinetic energy is recovered for braking, the kinetic energy of the vehicle is transferred to the flywheels through the following paths: a wheel-side generator, the convertor device and a flywheel-side motor; and an external power grid or a fuel engine in the vehicle charges the flywheels through the following transfer paths: electric energy, the convertor device, and the wheel-side motor. The flywheel power system has disadvantages including:

(1) The efficiency of the energy transfer process is low; the power grid charges the flywheels through the convertor device and the flywheel-side high-frequency motor; in this process, the maximum efficiency is not greater than 90% and average efficiency is about 80%; the flywheels drive the vehicle through the flywheel-side high-frequency generator, the convertor device and the wheel-side motor; in this process, the maximum efficiency is not greater than 86% and average efficiency is about 72%; and in the entire process of energy transfer from the electric energy of the power grid to the mechanical energy for driving the vehicle, the maximum efficiency is not greater than 77% and average efficiency is about 58%;

(2) Two sets of motors/generators and a complete set of convertor device have higher cost, heavier weight and more occupied space;

(3) The high-speed variable-frequency motor/generator coaxial with the flywheels is located in a vacuum container; and the high-frequency high-speed motor has serious problems of large heat and poor heat radiation;

(4) It is very difficult to correct dynamic balance of large-mass flywheels; flywheel bodies are greatly deformed during high-speed rotation; great creep deformation is generated after long-term use; and these factors make it difficult to control to decrease dynamic unbalance force and moment for the existing flywheel bodies with rigid structural design, thereby generating harmful vibration;

(5) Problems caused by that magnetic bearings are adopted as radial load bearings and axial load bearings of the flywheels: an active control system of a magnetic suspension bearing, which must have high reliability, is added; in movable application occasions such as vehicles and the like, frequent and random large impact load is encountered, and especially, the impact load, from gyrostatic moment of the flywheels, supported by the radial bearings is very serious; compared with uncontrolled mechanical bearings or permanent magnet bearings, magnetic suspension bearings and control systems thereof are complex systems, and are probable to generate problems; once fault and failure occur, because inertial rotation of the flywheels cannot be stopped within short time, heat and abrasion of protecting bearings are very serious, cause damage to the bearings and finally seriously damage the rotor system of the flywheels; the magnetic suspension bearing system is maintained by means of a power supply, and the power supply shall not be interrupted when the flywheels are not operated for long but keep rotating;

(6) The existing flywheel power system is not individually applied on the vehicle, does not include large power and large energy storing capacity design types, and includes small capacity and small size design types which are applied on trial in individual hybrid vehicles; and this indicates that the power system has an unacceptable defect and has the disadvantages that the power system cannot be individually applied and cannot be designed according to conventional capacity.

(d) Fuel Engine and Flywheel Hybrid Power System for Vehicles Including HET

It is a vehicle hybrid power system which combines a fuel engine and an energy storage device, and currently includes two types: a hybrid power system of a fuel engine and a chemical battery, and a hybrid power system of a fuel engine and flywheels.

The existing hybrid power system of the fuel engine for vehicles and the chemical battery comprises a fuel engine, a chemical battery, a generator, a motor, a convertor device, a control system and other major parts. During electrifying and charging, after alternating current of the power grid is rectified into direct current, the direct current charges energy to the chemical battery. When the fuel engine charges energy to the chemical battery, mechanical energy is converted into chemical energy of the battery through the generator and the convertor device. The direct current of the battery is converted into alternating current with proper frequency and voltage through the convertor device and the vehicle is driven through the motor. When a kinetic energy recovery function is used in vehicle braking, the generator is used, instead of the motor; a related system enables the energy to flow reversely; and the kinetic energy of the vehicle is converted into chemical energy of the battery. In some design solutions, the fuel engine can individually drive or jointly drive the vehicle through a mechanical transmission structure. So far, the hybrid power system of the fuel engine for vehicles and the chemical battery also has many problems and disadvantages including:

(1) The chemical battery, the generator, the motor and the convertor device have low efficiency, and the total energy conversion efficiency is low;

(2) Due to the limitations of power capacities of the chemical battery, the motor and the convertor device, power performance of the vehicle during pure-electric running is insufficient;

(3) The kinetic energy recovery function is limited during vehicle braking; due to the limitations of device power and high current charging of the chemical battery, kinetic energy recovery braking power is slightly low, while vehicle braking is often in a case of high energy conversion rate;

(4) Charging time of the chemical battery is long; a used fast charge solution also takes a long time; and fast charge greatly damages the battery;

(5) The chemical battery is very high in unit cost;

(6) The life of the chemical battery is limited; and the service life is quite different from the service life of a general automobile;

(7) Safety and environmental protection problems exist in the chemical battery; a lithium ion battery with high energy density is easy to cause overheat, spontaneous combustion and even explosion; a lead acid battery with low energy density has heavier weight and seriously pollutes the environment; and the chemical battery always has a great problem which is not favorable for environmental protection in the full life cycle from protection to treatment after use.

The existing hybrid power system of a fuel engine and flywheels is typically composed of: a fuel engine, a generator connected with the engine, a vacuum environment, flywheels supported by magnetic suspension, a high-speed variable-frequency motor/generator coaxial with the flywheels, a power semiconductor convertor device, and a variable-frequency motor/generator which is connected to wheels. An external power grid charges energy to the flywheels through the following transfer paths: electric energy, the convertor device, and a flywheel-side motor; the fuel engine charges energy to the flywheels through the following transfer paths: an engine-side generator, the convertor device and the flywheel-side motor; when the flywheels are driven, kinetic energy of the flywheels drives the vehicle through the following energy transfer paths: a flywheel-side generator, a convertor device and a wheel-side motor; and when the kinetic energy is recovered for braking, the kinetic energy of the vehicle is transferred to the flywheels through the following paths: a wheel-side generator, the convertor device and a flywheel-side motor. The hybrid power system of flywheels has disadvantages including:

(1) The efficiency of the energy transfer process is low; the process that the fuel engine charges energy to the flywheels and the process that the flywheels drive the vehicle need energy conversion of two motors and a set of convertor device; in each process, the maximum efficiency is not greater than 86% and average efficiency is about 72%; and the maximum efficiency of the overall process is not greater than 74% and average efficiency is about 52%;

(2) Three motors and a complete set of convertor device have higher cost, heavier weight and more occupied space;

(3) The high-speed variable-frequency motor/generator coaxial with the flywheels is located in a vacuum container; and the high-frequency high-speed motor has serious problems of large heat and poor heat radiation;

(4) It is very difficult to correct dynamic balance of flywheels; flywheel bodies are greatly deformed during high-speed rotation; great creep deformation is generated after long-term use; and theses factors make it difficult to control to decrease dynamic unbalance force and moment for the existing flywheel bodies with rigid structural design, thereby generating harmful vibration;

(5) Problems caused by that magnetic bearings are adopted as radial load bearings and axial load bearings of the flywheels: an active control system of a magnetic suspension bearing, which must have high reliability, is added; in movable application occasions such as vehicles and the like, frequent and random large impact load is encountered, and especially, the impact load, from gyrostatic moment of the flywheels, supported by the radial bearings is very serious; compared with uncontrolled mechanical bearings or permanent magnet bearings, magnetic suspension bearings and control systems thereof are complex systems, and are probable to generate problems; once fault and failure occur, because inertial rotation of the flywheels cannot be stopped within short time, heat and abrasion of protecting bearings are very serious, cause damage to the bearings and finally seriously damage the rotor system of the flywheels; the magnetic suspension bearing system is maintained by means of a power supply, and the power supply shall not be interrupted when the flywheels are not operated for long but keep rotating;

(e) Mechanical Connection and Load Charging System for Energy Storage Flywheel of Vehicle Including HET The existing charging method for energy storage flywheel is operated using a motor which is installed coaxially with the flywheel. There is no charging method for directly driving a flywheel shaft through an external rotation shaft. Due to the limitations of a motor carried by the vehicle and the capacity of a convertor device, the charging power of the motor is limited.

(f) Wind Power Generation System Including HET

The source of the wind power generation system is a wind wheel which absorbs wind energy. The rear end of the wind wheel has a generator, and the rotating speed of the wind wheel is very low. The wind wheel and the generator are generally connected through a speed-up gear box, and a so-called "direct drive" solution of directly connecting the wind wheel and the generator is also present (size and weight of the generator are large). The wind wheel includes a horizontal axis type wind wheel and a vertical axis type wind wheel. The horizontal axis type wind wheel is generally applied, and oftens adopts three blades and airfoils. A blade which has a structure, on a root, which rotates by using a radial centerline of a blade body as a central axis is called as a "variable pitch (angle)" blade, and a blade without this rotating structure is called as "fixed pitch (angle)" blade. Both of the two blades are applied.

Wind energy (kinetic energy) that flows through unit windward area at unit time is equal to half of the product of third power of air density and wind speed. The wind energy which can be captured by the wind wheel is only part of the full wind energy, i.e., the captured wind energy shall be multiplied by a wind-power utilization coefficient Cp. A theoretical limit value of Cp is 16/27 (Betz limit, about 0.593). Cp value in the practical situation is lower than the Betz limit; a maximum value of Cp of a typical modern three-blade horizontal axis type wind wheel is about 0.47; and the maximum value of Cp is only a peak value which occurs under a corresponding optimal tip speed ratio (the tip speed ratio is a ratio of rotating linear speed at the top of the blade to the wind speed); and the Cp value is decreased if the maximum value is greater than or smaller than the optimal tip speed ratio. From the viewpoint of capturing the wind energy to the maximum degree, within the wind speed below designed wind speed of corresponding design (rated) power, the horizontal axis type wind wheel shall be always operated in the optimal tip speed ratio state, i.e., the rotating speed of the wind wheel shall be linearly changed in direct proportional with the wind speed to maintain the tip speed ratio to be the optimal value. The variable speed operation of the wind wheel has the following advantages: conditions are provided for constantly keeping the optimal tip speed ratio and maximum efficiency; the wind wheel is operated at low rotating speed when the wind speed is low, and the blades do not generate too high aerodynamic noise relative to environmental noise; and the wind wheel with relatively free rotating speed as a large inertia flywheel can temporarily absorb energy pulsing caused by gust and torque pulsing formed when the blades cross a tower body, thereby avoiding generating excessive moment impact on the transmission system and the generator at the rear end.

The current operation of the horizontal axis type wind wheel includes three solutions: constant speed, dual speeds and variable speed. The constant speed (or approximate constant speed) operation solution of the wind wheel is favorable for the generator to generate electricity at fixed frequency, adopts an asynchronous generator generally and has simple structure, but has low efficiency of capturing the wind energy. The dual speeds solution adopts a dual-speed asynchronous generator, and improves the efficiency of capturing the wind energy in the constant speed solution. The variable speed solution actually applies a frequency conversion principle, and a frequency converter is added between the generator and the power grid. The generator and the wind wheel can be operated at variable speed. Variable frequency alternating current outputted by the generator is rectified and inverted into power frequency alternating current, and delivered to the power grid. There are two methods for the variable frequency and variable speed: "broadband" variable speed and "narrowband" variable speed. The "broadband" variable speed situation is as follows: a generator stator is connected to the power grid through the frequency converter; and the generator (together with the wind wheel) is allowed to change from zero to rated rotating speed under load, but all powers must be outputted via the frequency converter. The "narrowband" variable speed situation is as follows: a generator stator and a generator rotor are connected to the power grid; the stator is directly connected with the power grid; the rotor is connected to the power grid through a slip and a frequency converter; and the required frequency converter has small capacity, but has narrow variable speed range which is generally from about 50% rotating speed to rated rotating speed. This generator is called as a "double-fed asynchronous generator" which is a widely-used mainstream technology. The variable speed solution also researches other ways such as mechanical continuously variable transmissions, but these ways are not practically applied mainly because they have serious disadvantages in many aspects.

Within a range from the wind speed above the designed wind speed to cut-out wind speed, a power limit adjustment measure is taken for the wind wheel, and the wind speed is generally controlled to be not greater than the rated power. Control methods mainly include: a stall regulation method is used for the "fixed pitch" blade; the structure is simple, but the power is lower than the rated power within the range of the wind speed; and stall of the air flow on the back arc of the blade causes instable operation, energy pulsing, poor performance regularity and large aerodynamic thrust load for the wind wheel and a tower; a variable pitch angle adjustment method is used for the "variable pitch" blade; a blade installing angle is correspondingly changed when the wind speed is changed, so that the power is equal to the rated power within the full range. While the value of the wind-power utilization coefficient Cp is decreased in time, the blade keeps steady flow without stall and aerodynamic thrust is also small. This method has the disadvantages that a complex variable pitch angle regulation mechanism is added and the response to the gust should be fast enough. Other power limit methods include: an "active stall control" method for increasing stall trend orientation used for the "variable pitch" blade, and a "yaw control" method which is conducted through a windward yaw driving mechanism. A "passive variable pitch control" method for power limit is also researched.

The current wind power generation system has the following disadvantages: the constant speed operation solution and the dual speeds operation solution of the wind wheel have great gaps with efficient wind energy capture; the widely-used "narrowband" variable speed cannot satisfy optimal variable speed requirements within the low wind speed range, and this wind speed range basically includes a part below average annual wind speed and belongs to a region with highest wind frequency; the slip of the double-fed asynchronous generator is not favorable for maintenance and utilization; the frequency converter generates electromagnetic noise and harmonic waves, and causes high electromagnetic interference; the frequency converter is high in price, and energy loss in the current conversion process is also large; and due to the limitations of the regulation means and the like, the values of the wind-power utilization coefficient Cp of many actually applied wind wheels are much lower than reachable maximum values, including design point operating condition and variable speed operating condition.

(g) Wind Power Generation System Including HET and Flywheels

Wind power generation is recognized green energy and has a broad prospect. At present, the technology has been successfully applied for a long time. The economic competitiveness of the wind power generation system is constantly improving. However, from the global perspective of the power grid, in the aspect of aggregative index, there are some problems as follows: the wind speed is highly instable and random; thus, wind energy power obtained by the wind wheel is always changed within a large range, the power generation power of a wind power generation system without an energy storage device is very instable, the installed capacity of a wind turbine is not regarded as stable and reliable power generation capacity in the power grid generally, and the increase of the installed capacity of the wind turbine basically does not decrease the installed capacity of conventional power generation equipment; on the contrary, due to instability and randomness of wind power generation, wind power generation of the power grid is very difficult and enough supporting facilities for peaking (including peaking emergency generator sets, pumped storage power stations and the like) shall be added correspondingly; instability of wind power also reduces the quality of electric energy and increases instability of the power grid; and in addition, in order to sufficiently absorb wind energy under all wind conditions, the rated capacity of the wind power system is designed to be quite high; the design/rated wind speed corresponding to the rated power is much higher than annual average wind speed; the annual average power only occupies about 19% of the rated power; and the effective utilization ratio of the device capacity is very low.

If an effective energy storage device is added to the wind power generation system, the above problems can be solved well. Firstly, a relatively stable and reliable generation source can be formed; secondly, the added power grid peaking measure can be cancelled, and meanwhile, peaking capability can also be provided for the power grid; thirdly, electric energy of standard quality can be provided; and fourthly, rated capacities of the generator and equipment connected with the power grid can be greatly reduced.

It is more necessary to configure the energy storage device for an off-grid (isolated grid) wind power generation system. Because input wind energy and electrical load greatly fluctuate and wind power is the only power supply, it is a necessary way to configure the energy storage device which can stably supply power for long term for ensuring a stable power supply.

A broad variety of methods about storage of wind energy include: chemical batteries, pumped energy storage, flywheel energy storage, compressed air energy storage, phase change energy storage, hydrogen production energy storage and the like. Practical methods which can be applied in the wind power generation system include the chemical batteries and flywheel energy storage. The chemical batteries are usually used for a small off-grid wind power generation system. The chemical batteries have lower total energy efficiency (about 50% on the average), are limited in high-power fast charge and discharge, but maintain electrical energy for a longer time. A grid-connected wind power generation system with the energy storage device has not been applied and reported.

A flywheel energy storage technique covers two major parts: a flywheel device and an energy conversion system. At present, typical flywheel energy storage and conversion systems have the following structure and features:

flywheel kinetic energy carrier: flywheel kinetic energy comes from rotation of a flywheel body with large mass at high linear speed; mass blocks of the flywheel body are formed through winding of unidirectional continuous fiber reinforced plastic composite material to obtain maximum energy storage density through the characteristic of high strength of the fiber reinforced plastic. This material structure has highest circumferential (material longitudinal) strength, but very low radial and axial (material transverse) strength, so that the mass blocks of the flywheel body can only be made into cylinder rings with thin radial thickness. This brings the disadvantage that occupied spatial mass blocks cannot be fully used and practical energy storage volume density is slightly small. In addition, it is difficult to control dynamic unbalanced force and moment of the composite flywheel body with large mass and high linear speed. First of all, correction difficulty of dynamic balance is high. Firstly, a large-load dynamic balancing machine shall be supported; secondly, a combination of the flywheel body and a rotation shaft generally forms a simple flexible rotor, and high-speed dynamic balance with high correction difficulty and vacuum dynamic balance condition are needed; and thirdly, the fiber reinforced plastic under high-speed rotation may be greatly displaced and deformed, and deformation is changed with the rotating speed, which is unfavorable for high-speed dynamic balance correction. Even worse, dynamic unbalance is grown during operation. Firstly, great displacement and deformation are generated, and size and material differences cause symmetrical uneven deformation; and secondly, an incremental creep deformation behavior is generated after long-term use. Glassfiber reinforced plastics may generate great elastic deformation and creep, and carbon fiber reinforced plastics may generate small elastic deformation and creep. However, carbon fiber material with high elasticity modulus has high cost, thereby impeding large-scale economical application, while glassfiber is suitable for practical application but shall solve the problems of great deformation and creep;

Flyweel vacuum container: the rotating flywheel body is placed in the vacuum container so as to reduce blasting friction loss to the largest degree. All the rotation shafts are located in the vacuum container without axial seal (i.e., isolation of vacuum and atmosphere). Bearings and the motor are also located in the vacuum container;

Flywheel bearing: a magnetic bearing is adopted to support radial load and axial load (the flywheel is of a vertical structure generally) so as to reduce bearing friction loss to the largest degree and to avoid the problems of lubricant evaporation and sharp life decrease of a mechanical bearing in a vacuum environment. Meanwhile, a mechanical protecting bearing is adopted to play a role of temporary supporting and positioning under the condition that the magnetic bearing is not used, unused, failed and overloaded; and Energy conversion system: a high-speed variable frequency motor/generator and a bidirectional frequency converter are adopted; the motor has the same rotating speed as the flywheel. When the power grid inputs the energy into the flywheel, power frequency alternating current of the power grid is rectified and converted to drive the motor so that the flywheel speeds up; and when the flywheel outputs the energy into the power grid, the kinetic energy of the flywheel drives the generator and the generated electric energy is rectified and converted, and then outputted to the power frequency power grid. The motor is located in the vacuum container, and the high-frequency high-speed motor has serious problems of large heat and limited heat conduction.

In conclusion, the existing flywheel energy storage and conversion system has the following disadvantages or aspects to be improved:

(1) Because a single mass block of the flywheel body can only be made into the cylinder ring with thin radial thickness, the practical energy storage volume density is slightly small.

(2) The existing energy storage flywheel has serious problem of rotation imbalance, is difficult to solve the problem, is easy to cause great unbalanced vibration, and aggravates imbalance with use time. Furthermore, most of flywheels cannot avoid resonance speed within the range of operating speed, bringing the problem of a resonance point. The larger the flywheel mass is, the more serious the problems of imbalance and resonance are. Most of energy storage flywheels applied in fixed places have large mass. For example, the energy storage flywheels used in power grid peaking and stable load for wind power generation have large mass. The problems of imbalance and resonance of such flywheels are especially obvious.

(3) Problems caused by that magnetic bearings are adopted as radial load bearings and axial load bearings: an active control system of a magnetic suspension bearing, which must have high reliability, is added; compared with uncontrolled mechanical bearings or permanent magnet bearings, magnetic suspension bearings and control systems thereof are complex systems, and are probable to generate problems; once fault and failure occur, because inertial rotation of the flywheels cannot be stopped within short time, heat and abrasion of protecting bearings are very serious, cause damage to the bearings and finally seriously damage the rotor system of the flywheels; the magnetic suspension bearing system is maintained by means of a power supply, and the power supply shall not be interrupted when the flywheels are not operated for long but keep rotating (4) The high-frequency high-speed motor has serious problems of large heat and limited heat conduction, thereby limiting the increase of the motor power. A variable frequency motor also needs a frequency converter with high configuration cost. The total efficiency of the variable frequency motor and the frequency converter is also low, i.e., this energy transfer mode has low efficiency.

(h) Flywheel Energy Storage and Conversion System including HET

The flywheel energy storage and conversion system is mainly composed of two major parts: a flywheel energy storage device and an energy conversion system. At present, the structure and features as well as defects or aspects to be improved of the typical flywheel energy storage and conversion system are described above, and are omitted herein.

SUMMARY (a) Homopolar DC Electromagnetic Transmission (HET)

The existing stepless variable speed and variable torque transmission devices or systems have many defects. For mechanical continuously variable transmissions and hydraulic torque converters, in terms of function, some of them cannot reversely transmit power, cannot rotate in a backward direction, cannot regulate speed to zero, cannot freely regulate a torque to zero, cannot generate a negative torque, cannot freely regulate the torque within a full range independent of rotating speed, and cannot satisfy a large transmission ratio required by wind power generation with respect to a two-shaft speed ratio; in terms of power, the power of the mechanical continuously variable transmissions is limited by the structure; the applied power of the hydraulic torque converters is low; and they cannot satisfy the demands of hundreds of, thousands of, and tens of thousands of power; in terms of efficiency, the efficiency of various mechanical continuously variable transmissions is within a range of 50%-95%; the peak efficiency of the hydraulic torque converters during operation is about 85%-90%; and the efficiency of regions on both ends is rapidly reduced to zero and cannot satisfy the requirement of high efficiency and energy saving (for example, efficiency of 95%-98%); in terms of structure, reliability and life, the mechanical continuously variable transmissions have complex structures, high processing requirements, serious sliding friction, no impact resistance, poor reliability and short life, and the most frequently used hydraulic torque converters have quite complex structures and many dense parts, and become the most complex and harsh devices in automobiles; and in terms of cost, due to above factors, they have very high manufacturing cost and high maintenance cost. An AC frequency variable and speed variable transmission system between two rotation shafts includes an AC generator on an input end, a rectifier and a frequency converter in an intermediate process, and an AC motor on an output end, has many devices, large occupation space, high cost and low transmission efficiency. The efficiency of the system computed based on power frequency is smaller than 86%, and loss and heating problems of a high-frequency motor are more serious.

The present invention adopts a new technical solution, and can avoid the above defects and problems. The product in the present invention is called as HET (Homopolar DC Electromagnetic Transmission) which applies an electromagnetic action principle of a homopolar DC motor. The HET can be abstracted as a combination of two homopolar DC motors. One motor is used to generate electricity, and the other motor is an electric motor. The flow direction of the power can be changed by exchanging the two motors. Large current between two rotors is transmitted with a shortest conductor path, thereby avoiding the problem of external large current loss of the homopolar DC motor. Meanwhile, required target functions and performance are achieved by fully using the technical advantages of the homopolar DC motor. More further, because transmission torque, power, the flow direction of the power and the rotation direction can be regulated and controlled by the HET, the limit of "passive" power transmission in a conventional speed variable transmission device is transcended. The system has the capability of controlling "active" power transmission according to will, and is changed from a "dead" machine into a "living" machine. For example, for a vehicle using energy storage flywheels as power sources and connecting the flywheels with wheels through the HET, the control of vehicle running power is completely executed by an HET control system, and the HET is in a "central" command position; and for a set of wind power generation system that connects flywheels and a generator through the HET, the HET is in a core "central" command position and the control of other subsystems is auxiliary.

The technical solution and principle of the present invention are described below in detail.

The electromagnetic action principle of the homopolar DC motor is as follows:

An axisymmetric annular DC magnet exciting coil generates a homopolar axisymmetric magnetic field. Magnetic flux density B has no circumferential component Bt, and only has a meridian component Bm which is synthesized by a radial component Br and an axial component Bz. The rotor has a section of axisymmetric conductor, and magnetic induction lines of the magnetic field of the magnetic flux density B penetrate through the conductor. The conductor has rotating linear speed Vt. The magnetic induction lines are cut to generate homopolar induced electromotive force E=V×B·L, wherein bold letters represent vectors (similarly hereinafter). E also has no circumferential component, and only has a meridian component Em, and the direction of Em is perpendicular to the direction of Bm. Em=Vt·Bm·L, wherein L is the length of the rotor conductor in the direction of Em. Electric brushes are arranged on the rotor conductors on both ends of the length, and two poles are led out to connect with an external circuit. Then, DC I0 passes through the rotor conductors. When the generator generates power, the direction of I0 is the same as the direction of the electromotive force Em; and when the generator is used as the motor, the direction of I0 is opposite to the direction of Em.

Electromagnetic force (ampere force) that acts on the rotor conductors is F=I0×B·L. Because the direction of I0 and the direction of Em are identical or opposite, while the direction of Em is perpendicular to the direction of Bm, it can be known that F only has a circumferential component Ft and Ft=I0·Bm·L.

After derivation, the following formula can be obtained:
The electromotive force of the rotor conductor:

$E=Em=\omega\cdot\Phi m/(2\pi)$

ω is the angular velocity of the rotor; and Φm is a magnetic flux that penetrates through the rotor conductor, i.e., the magnetic flux of magnetic flux density Bm of the meridian component. Due to flux leakage, for the rotor conduction with certain thickness, the injected magnetic flux and the ejected magnetic flux of the conductor surface at a current boundary are different, and an average value of the fluxes is taken as Φm.

An electromagnetic torque of the rotor conductor is:

$Me=-I0\cdot\Phi m/(2\pi)$

A positive direction of the torque vector Me is the same as a positive direction of the angular velocity vector ω, and a positive direction of I0 is the same as a positive direction of E.

Electromagnetic power received or outputted by the rotor conductor is:

$Pe=Me\cdot\omega=-E\cdot I0=-\omega\cdot I0\cdot\Phi m/(2\pi)$

When the scalar Pe is a positive value or negative value, it indicates that the rotor conductor receives or outputs the electromagnetic power.

When a vector direction of the electromagnetic torque Me is the same as a vector direction of the angular velocity ω, under an electric condition, it indicates that the rotor receives the electromagnetic power Pe and transmits mechanical power Pm outwards through the rotation shaft. When the vector direction of Me is opposite to the vector direction of ω, under an electricity generation condition, it indicates that the mechanical power Pm is inputted from the rotation shaft end and the electromagnetic power is outputted outwards by the rotor conductor.

In a transmission process between the electromagnetic power Pe and the mechanical power Pm on the shaft end, mechanical loss exists, including: friction power of the electric brushes, blast friction power of the rotor, friction power of the bearings, and dynamic seal friction power of the rotor.

The product of the present invention is a combination of two homopolar DC motors in principle, and has two rotors and rotation shafts thereof. The above homopolar DC electromagnetic action is present between each rotor and stator. Each rotor has at least one axisymmetric rotor magnetic conductor (3) with good magnetic conductivity and electrical conductivity. The material of the axisymmetric rotor magnetic conductor (3) can be selected from electromagnetic pure iron, low carbon steel, steel No. 20, steel No. 45 and the like, and preferably high magnetic conductivity material with enough strength. The rotor magnetic conductor (3) passes through most of the magnetic flux Φm, while the non-magnetic rotor electric conductor (4) connected with the rotor magnetic conductor (3) also passes through a small number of leakage magnetic flux. The two parts of magnetic flux jointly form the magnetic flux Φm. The material of the rotor electric conductor (4) can be selected from copper, aluminum, copper alloy, aluminum alloy and the like. The copper alloy can be selected from chromium copper (Cu-0.5Cr), cadmium copper (Cu-1Cd), zirconium copper (Cu-0.2Zr), chromium zirconium copper (Cu-0.5Cr-0.15Zr), iron copper (Cu-0.1Fe-0.03P) and silver copper, and preferably high electrical conductivity material with enough strength. The magnetic flux Φm and the angular velocity w of the rotor jointly act to generate an electromotive force E on the rotor conductors (3, 4). The direction of the main current I0 (or parallel branch current I0_1, I0_2) through which the rotor conductors (3, 4) of one rotor pass is the same as the direction of the electromotive force E, so this rotor functions as an active rotor; and the direction of I0 of the other rotor is just opposite to the direction of E, so this rotor functions as a passive rotor. For a main current circuit (i.e., a single circuit structure) connected in series, the value of the main current I0 obeys Ohm's law and is equal to a ratio of a difference between the sum of the electromotive forces E of the conductors of the active rotor and the sum of the electromotive forces E of the conductors of the passive rotor to the resistance R0 of the main current circuit. For a main current circuit including a parallel circuit (i.e., a structure including dual circuits), the values of the main current I0 and the parallel branch current I0_1, I0_2 are determined by Ohm's law of series and parallel circuits. The magnetic flux Φm and the main current I0 jointly act to generate an electromagnetic torque Me on the rotor conductors (3, 4). The direction of the torque vector is opposite to the direction of the vector ω on the active rotor, and is the same as the direction of the vector ω on the passive rotor. As a result, the electromagnetic power Pe is transmitted from the active rotor to the passive rotor. The electromagnetic power of the active rotor is greater than the electromagnetic power of the passive rotor, and the difference between the electromagnetic powers is equal to Ohmic thermal loss power of the main current circuit, i.e., a product of the square of I0 and R0. The active rotor and the passive rotor can switch roles, so that the flow direction of the power can be switched.

The stator has at least one DC magnet exciting coil (9) which is wound around an axis (1) of the rotation shaft, and the limit on the quantity is to ensure that the stator has a usable magnet exciting regulation function. A magnet exciting source is not limited to the magnet exciting coil, can also adopt a permanent magnet (13) and has the advantages that no magnet exciting current is consumed, and the material of the magnet exciting source can select neodymium, iron, boron and the like. The magnet exciting source of one main magnetic circuit (22) can share the permanent magnet (13) and the magnet exciting coil, can also independently use the permanent magnet and can also independently use the magnet exciting coil. At least two main magnetic circuits are provided for the purpose of effective regulation. So-called "main magnetic circuit" refers to a closed magnetic circuit with the minimum magnetic resistance arranged around the magnet exciting coil (or on an installation path of the permanent magnet), and differs from a secondary branch magnetic circuit which has multiple parallel paths in a magnetic conductive material structure.

The main magnetic circuit is guided to be a closed loop by axisymmetric structural members on the rotor and the stator, and in the loop, the other structural members are all made of magnetic conductive material except a narrow slit air gap between the rotor and stator. In the structural members, the rotation shafts (2) and the rotor magnetic conductor (14) can be selected from electromagnetic pure iron, low carbon steel, steel No. 20, steel No. 45 and the like; stator magnetic and electric conductors (7, 17, 18) and stator magnetic conductors (10, 12, 20, 21) can be selected from the electromagnetic pure iron, low carbon steel and the like, and preferably high magnetic conductivity material with enough strength; and the electric conductivity of the high magnetic conductivity material is also higher.

The main magnetic circuits (22) pass through the rotor magnetic and electric conductors (3) and the stator magnetic and electric conductors (7). When the two rotors share one path of magnet exciting source, one main magnetic circuit (22) simultaneously passes through the rotor magnetic and electric conductors (3) of the two rotors (FIG. 2 to FIG. 5). At this moment, adjacent surfaces of the two rotors that penetrate through the shared main magnetic flux can be vertical end surfaces, can be conical surfaces (FIG. 2) and can be cylindrical surfaces (FIG. 3 to FIG. 5). The axial magnetic attraction forces of the two rotors generated by the three structures are different. The axial magnetic attraction force of a vertical end surface structure is maximal, the axial magnetic attraction force of a cylindrical surface structure is minimal, and the axial magnetic attraction force of a conical surface structure is between the axial magnetic attraction force of the vertical end surface structure and the axial magnetic attraction force of the cylindrical surface structure. The axial magnetic attraction forces can be regulated by changing a conical angle.

A closed main current circuit (23) is constructed on the two rotors and a stator and has three modes: ① if the closed main current circuit is connected with all the rotor magnetic and electric conductors in series, this circuit is called a single-circuit structure; ② if all the rotor magnetic and electric conductors are located on two parallel branch circuits (FIG. 18), this circuit is called a double-circuit structure; and ③ if some rotor magnetic and electric conductors are located on the main current (main current I0) circuit, and some rotor magnetic and electric conductors are located on the two parallel branch circuits, this circuit is called a series-parallel hybrid structure. The single-circuit structure has larger electromotive force, smaller current and slender outline dimension. The double-circuit structure has smaller electromotive force, larger total current and stubby outline dimension and corresponds to the following situations: one path of main magnetic flux penetrates through two adjacent rotor magnetic and electric conductors on one rotor at the same time; the directions of the electromotive forces of the two rotor magnetic and electric conductors are opposite, and the two rotor magnetic and electric conductors can only be connected in parallel and cannot be connected in series.

The closed main current circuit (23) is formed by three circuit connection members with different properties: solid structural members, a conductive connection medium (5) between the rotor and the stator, and a conductive connection medium between the solid structural members without relative speed (on one rotor or stator).

The rotor solid structural members on the main current circuit include a rotor magnetic and electric conductor (3) and rotor electric conductors (4, 19). The rotation shaft (2), adjacent to the former two, can participate in electric conduction, and at this moment, contact surfaces of the rotation shaft (2) and the former two are conductive, and even the rotation shaft (2) and the rotor magnetic and electric conductor (3) are designed into a whole. Participation of electric conduction of the rotation shaft (2) has both advantage and disadvantage. The advantage is that the electric resistance is reduced, and the disadvantages are as follows: the rotation shaft is electrified, and the magnetic resistance of magnet excitation is increased.

The stator solid structural members on the main current circuit include stator electric conductors (6, 11) which are directly conductively connected with the rotor, stator magnetic and electric conductors (7, 17, 18), a stator intermediate electric conductor (8), a stator outer electric conductor (16) and an external circuit conductor. The electric conductors (6, 8, 11, 16) and the external circuit conductor can be selected from highly conductive materials such as copper, aluminum and the like.

Conductive connection between the solid structural members without the relative speed can use adhesion with a conductive adhesive, can use joint filling with a solid soft metal material, can adopt filling of liquid metal and can also adopt direct contact conduction. A solution of filling of the liquid metal has the advantages on the aspects of electrical conductivity and tolerance of seam dislocation and deformation.

A dynamic-static circuit connecting medium (5) between the rotor and stator can adopt a solid sliding contact structure, can adopt a solid sliding contact structure with liquid lubrication and can adopt the liquid metal as a conductive medium. The latter is called metal liquid circuit connection, and optional liquid metals include sodium-potassium alloy (for example, with a ratio of sodium to potassium of 22 to 78, a solidifying point of −11° C. and an evaporative point of 784° C.), gallium (with a solidifying point of 29.9° C.), gallium-indium alloy (for example, with a ratio of gallium to indium of 75 to 25 and a solidifying point of 15.7° C.), gallium-indium-tin alloy (for example, with a ratio of gallium, indium to tin of 62 to 25 to 13 and a solidifying point of 5° C.; a ratio of 62.5 to 21.5 to 16 and a solidifying point of 10.7° C.; and a ratio of 69.8 to 17.6 to 12.5 and a solidifying point of 10.8° C.), mercury (with a solidifying point of −39° C. and an evaporative point of 357° C.) and the like. In a metal liquid circuit connection solution, the contact resistance is small, the frictional loss is low, and the liquid metals can circularly flow to bring away heat.

The closed main current (IO) circuit (23) is connected in series with all the rotor magnetic and electric conductors (3), rotor electric conductors (4), rotor/stator circuit connecting medium (5), stator electric conductors (6, 11) and stator magnetic and electric conductors (7). The direction of the main current (IO) on each rotor magnetic and electric conductor (3) is mutually perpendicular to the direction of a magnetic flux (Φ) in a meridian plane.

A main magnetic flux air gap surface between the rotor and the stator can be designed into an axisymmetric cylindrical surface (in an axial surface type) and can also be designed into an end surface vertical to the center line of the rotation shaft (in a disc surface type). The axial surface type main magnetic flux air gap surface does not generate axial magnetic attraction force, and the disc surface type main magnetic flux air gap surface generates the axial magnetic attraction force. The main magnetic flux air gap surface can adopt a symmetric double-disc surface structure to offset the axial magnetic attraction force.

Magnetic flux which passes through each rotor magnetic and electric conductor (3) adopts a single magnetic flux solution and a double-magnetic flux solution. The latter is excited by two paths of magnet excitation sources with the electromotive force doubled. In the axial surface type double-magnetic flux solution, a double-sided magnetic conductive channel is utilized, and the structure is slender.

Design with the structure tending to be slender also includes a design that the radius of the center line of the magnet exciting coil is reduced to enable the coil to approach the center line of the rotation shaft. The paraxial coil design solution can also reduce copper material or aluminum material consumed by the magnet exciting coil.

The rotation shaft (2) in the axial surface type solution can be designed into a solid shaft and a hollow shaft. Under the condition that the outside diameters of the rotation shafts are identical, the magnetic conductivity of the solid shaft is largest. Under the conditions of lower rotating speed and unlimited linear speed of liquid metal "electric brush", the outside diameter of the rotation shaft can be designed to be larger, and the rotation shaft can be designed into a hollow shaft. The structure in the solution is less in material consumption and lighter in weight.

In general application places, the rotor is located at an inner ring, and the stator is located at an outer ring, namely an inner rotor type structure. In special application places, an outer rotor type structure can also be designed, for example, in a place which is directly connected with a wind wheel of the wind power generator with lower rotating speed.

Contact surfaces of the rotor magnetic and electric conductors (3) and the rotor electric conductors (4) in the axial surface type solution and the inner rotor type solution can be overall height disc surfaces up to the outside diameters and can also be non-overall height disc surfaces and cylindrical surfaces, namely the rotor electric conductors belong to the non-overall height type (FIG. 15). When the rotating speed is higher, and the strength of the overall height type rotor electric conductor is insufficient, the non-overall height design is adopted.

According to the distance and orientation relationship of the two rotors, the two rotors have centralized structure and separated structure. The two centralized rotors have superposed axes, and are close to each other; and the main circuit is shorter. The two separated rotors are separated, have independent stators and have externally connected conductors for transmitting the main current. The centralized main circuit is small in resistance, less in material consumption and lighter in weight, but interference in magnetic excitation is larger, which is not beneficial for independently regulating magnetic excitation; and the rotor bearings are also difficult to arrange. The separated rotors are flexible in arrangement and are beneficial for independently regulating magnetic excitation, but the separated main circuit is large in resistance, higher in material consumption and heavier in weight. The centralized rotors have higher energy transmission efficiency, and the separated rotors have lower energy transmission efficiency, but can also reach about 98% (weight and efficiency indicators are comprehensively optimized, and more attention is paid to an efficiency optimization solution).

The centralized structure may have two rows of terminals (16) with externally connected power supplies. The inner sides of the terminals are connected with the main current circuit including the rotor magnetic and electric conductors, and the outer sides are connected with an external DC power supply. This structure also has a liquid metal transfer switch (15) which is located between the upper terminal and the lower terminal of the inner main current circuit. During normal operation, a gap space of the transfer switch (15) is filled with metal liquid; the inner main current circuit is in a closed state; and a circuit of the external DC power supply is set in an open state. When the external power supply needs to operate, the metal liquid in a gap of the transfer switch (15) is drained firstly so as to disconnect the inner main current circuit. The purposes of the operation of the external power supply are as follows: the external DC power supply is used to drive the rotors (one or two rotors) in the HET, e.g., to increase the kinetic energy of the flywheels on a rotor shaft system; or the energy flows reversely, and the mechanical energy of the rotors is used to charge the external power supply, e.g., to reduce the kinetic energy of the flywheels on a rotor shaft system.

The separated structure has two HET semi-coupled members. An externally connected conductor is arranged between the two HET semi-coupled members to form a closed main current circuit. The externally connected conductor is connected by an externally connected terminal (16, FIG. 8 to FIG. 14). The externally connected conductor may be multiple coaxial conductors which have coaxial spindles and sleeves. The spindles and the sleeves respectively transmit main currents with opposite directions and identical magnitude, and cooling media may be fed in the gaps between the spindles and the sleeves to dissipate heat. The externally connected conductor may also be multiple wires with small diameter. Two paths of wires with opposite current directions are insulated from each other and evenly mixed. The sleeves can be added outside the wires, and the inlet end and the outlet end of the wires are sealed. The cooling media are fed in the sleeves to dissipate heat. The wires with small diameter have the characteristics of softness and easy arrangement. The wires with small diameter can be connected through brazing with the terminals, and the connection between the wires with small diameter and the externally connected terminal (16) can adopt brazing or connection with an intermediate transition terminal.

A single separated rotor can be designed to have one rotor magnetic and electric conductor (3) or designed to have multiple rotor magnetic and electric conductors. The multiple rotor magnetic and electric conductors can be connected in series, called as a multilevel series type. The multilevel series type in which the multiple rotor magnetic and electric conductors are connected in series through the externally connected terminal (16) and the external conductor is called as a multilevel external series connection (FIG. 12 and FIG. 13). In this case, two adjacent magnetic and electric conductors connected in series share one main magnetic flux. The multilevel series type in which the multiple rotor magnetic and electric conductors are connected in series through the internal conductor which is close to the rotation shaft is called as a multilevel internal series connection (FIG. 14). In this case, each main magnetic flux only penetrates through one rotor magnetic and electric conductor.

The two separated HET semi-coupled members can be paired arbitrarily, and do not have to belong to the same type.

A metal liquid circuit connecting structure (5, FIG. 19) between the rotor and the stator is as follows: a convex-concave matched clearance (hereinafter referred to as "connecting region clearance") is designed between the rotor electric conductor (4) and the stator electric conductors (6, 11); the radius of the middle section of the clearance is greater than the radius of both sides; and in the position with the largest radius of the corresponding middle section, an axisymmetric branch clearance (25) communicated with the above clearance is formed in the stator electric conductors (6, 11). A narrow clearance is beneficial for reducing the resistance and structural flow. The convex-concave structure in which the radius of the middle section is greater than the radius of both sides is beneficial for tolerating dislocation of the metal liquid during rotation, whatever a rotating wall surface is at an inner ring or an outer ring. The branch clearance (25) in the position with the largest radius of the corresponding middle section is used for filling the metal liquid, recycling the metal liquid and circulating the metal liquid (a second branch clearance (26) needs to participate). When the friction heat of the metal liquid of the "connecting region clearance" is low and the metal liquid in this position does not need to assume conduction scattering of the current ohmic heat of the rotor conductor, an optional solution is that the metal liquid does not circularly flow. At this moment, it is allowed to only arrange the branch clearance (25).

The second branch clearance (26) is used as a liquid inlet channel for circularly flowing the metal liquid, and the branch clearance (25) is used as a liquid outlet channel. When a region near the liquid inlet channel (26, 29) has a higher temperature and a larger heat flux, to prevent the metal liquid in the liquid inlet channel from being heated too early before reaching the "connecting region clearance", a thermal insulating clearance (31) is arranged and is communicated with the clearance between the rotor and the stator. A thermal insulating measure for the entering liquid also includes a thermal insulating clearance of a pipeline (30) related to the entering liquid.

Uniform-delivery buffer region clearance channels (27, 29) communicated with the branch clearance (25) and the second branch clearance (26) are arranged. Narrow ends of the channels are connected with the clearances (25, 26), and wide ends are connected with a plurality of round pipes (28, 30) which are circumferentially distributed evenly and led to an external auxiliary system. This buffer region with wedge-shaped design is used to regulate circumferential uneven liquid inflow of the round pipe (30) into circumferential even liquid inflow on the clearance (26) as much as possible, so that circumferential uneven liquid outflow of the round pipe (30) does not influence the circumferential even liquid outflow of the clearance (25).

Axisymmetric grooves (32) are formed in the stator electric conductors (6, 11) on both ends of the "connecting region clearance" (5) of the metal liquid. An annular hose (33) for sealing is installed in the grooves. A ventilating pipe (34) is communicated with the hose. The ventilating pipe penetrates through the stator electric conductors (6, 11), and is communicated with the external auxiliary system. Gas pressure in the sealing hose (33) is regulated to control expansion and contraction of the hose, so as to control a contact state and a separation state between an outer wall of the hose and a wall surface of the otor and realize sealing of the "connecting region clearance". This seal is used to keep vacuum suction and maintain a liquid boundary when the metal liquid is filled, and can also be used as a special liquid retention measure in case of no rotating speed or low rotating speed.

A vent hole (35) is respectively formed in the stator electric conductors (6, 11), in both ends of the "connecting region clearance" (5) of the metal liquid, and near the hose (33), and is communicated to the external auxiliary system. When the metal liquid is filled at the beginning of machine assembly, all chambers and pipelines communicated with the "connecting region clearance" are vacuumized firstly; then the sealing hose (33) is pressurized so that the outer wall of the hose is in seal contact with the wall surface of the rotor; and two vent holes (35) are continuously vacuumized. Meanwhile, starting from injecting the liquid into the external pipeline, the metal liquid is injected into vacuum chambers communicated with the "connecting region clearance" in a serial line order. The space sealed by the hose (33) is full of the metal liquid through the vacuum pumping action. The continuous vacuumizing operation of two vent holes (35) keeps vacuum degree in the process of injecting the metal liquid and ensures that the metal liquid reaches both ends of the "connecting region clearance". The metal liquid is injected in the serial line order starting from injecting the metal liquid into the external pipeline, aiming at discharging all the gas and eliminating any closed gas dead zone. The two vent holes shall be final destinations of the metal liquid. When the metal liquid occurs on the external pipeline of a certain vent hole, it can clearly judge that the metal liquid has reached the end of the "connecting region clearance".

The external auxiliary system in the circuit connection solution of the metal liquid includes a plurality of liquid metal loops. Each loop corresponds to one "connecting region clearance" of the metal liquid. Each loop includes a liquid metal circulating pump, a liquid metal volume regulating valve, a set of solid impurity filter and aggregated bubble drainer. Fluid of the loops passes through a radiator.

The circulating pump for driving the metal liquid to flow in the loops may be a centrifugal pump, an axial flow pump, a mixed-flow pump, a gear pump, a screw pump, an electromagnetic pump and the like. The pump flow can be regulated. Circulating flow primarily aims to take away the carried heat to play a role of cooling, to filter solid impurities and carried bubbles in the metal liquid, to reduce abrasion of the solid wall surface of the "connecting region clearance", and to eliminate an adverse effect that the bubbles are involved in the flow (e.g., increase of total volume, decrease of conductivity of heat and electricity, and easiness of instability in the flow). The circulating flow of the metal liquid in the "connecting region clearance", especially liquid inflow in the second branch clearance (26), is very beneficial for stably organizing the flow in the "connecting region clearance". Namely, it can keep stable contact and connection of the liquid and the rotating wall surface, can keep stable and stationary boundary of the liquid region, and can bring about certain self-defense capability for resisting external action force.

An adjustable volume chamber of the liquid metal volume regulating valve is communicated with the loops, namely indirectly communicated with the "connecting region clearance". When the metal liquid capacity of the "connecting region clearance" needs to be changed, the liquid capacity of the "connecting region clearance" can be decreased if the volume of the valve is increased, and the liquid capacity of the "connecting region clearance" can be increased if the volume of the valve is decreased. Because there are few other liquid free surfaces in a single loop, the volume change of the valve is the same as the liquid capacity change of the "connecting region clearance". The volume regulating valve can adopt a piston structure, a plunger structure and a membrane structure.

The solid impurity filter can be designed at level 1 or level 2. A strainer for level 2 filtration can adopt a stainless steel filter screen or a slit type filter. An ultrafilter can adopt powder metallurgy porous material, and can be made of nickel, bronze, stainless steel and the like.

A radiator for cooling the metal liquid that flows circularly adopts a surface heat transfer mode; and the metal liquid can be directly cooled by external air or water, and can also be firstly cooled by an intermediate medium (such as insulating oil and kerosene) and then circulated to an additional centralized heat exchanger by the intermediate medium and finally cooled by external air or water. Considering that the liquid metal needs to be strictly isolated from the external air, especially from the water, it is a better corresponding solution to adopt the chemically inert insulating oil (e.g., transformer cooling oil) and kerosene as the intermediate media and adopt an additional external secondary centralized heat exchanger, and this solution is also beneficial for playing a role of insulation between liquid metals of different loops (the liquid metals of different loops have different electric potentials, but from the aspect of resistance, an electric leakage circuit is relatively larger than the main circuit.)

For the "connecting region clearance" of the liquid metal, the liquid metal needs to be isolated from the external air. Therefore, a sealing structure for a related isolation chamber of the space is arranged, including a dynamic sealing structure; and the isolation chamber is vacuumized and filled with inert gas. The inert gas may be nitrogen or helium. The nitrogen is low in price and slow in leakage, but has larger gas frictional resistance with the rotor. The features of the helium are opposite to those of the nitrogen. Dynamic seal may adopt a magnetic fluid sealing structure. At this moment, the bearing that supports the rotor is arranged outside the isolation chamber, and contacts with the external air. Firstly, lubricating oil or grease of the bearing is prevented from evaporating in the isolation chamber; and secondly, the rolling bearing can be operated in an air atmosphere (the abrasion of the rolling bearing is aggravated at a vacuum environment, a non-air environment and a non-oxidizing environment).

Wearproof and conductive surface layers can be processed on the rotor wall surface and the stator wall surface of the "connecting region clearance" of the liquid metal. The surface layers may be hard chrome plating, hard silver plating, hard gold plating, silver-plated antimony alloy, gold-plated cobalt alloy, gold-plated nickel alloy, gold-plated antimonial alloy, gold-tungsten carbide composite coating, gold-boron nitride composite coating, chemical nickel-phospherous alloy coating, chemical nickel-boron alloy coating, chemical nickel-phospherous alloy-silicon carbide composite coating, chemical nickel-phospherous alloy-diamond composite coating, and chemical nickel-boron alloy-diamond composite coating.

A sensing element for detecting a level of the metal liquid can be arranged in the "connecting region clearance" of the liquid metal. Namely, long and thin elements of resistance material are inlaid on the wall surfaces of the stator electric conductors (6, 11) at both ends of the channel of the "connecting region clearance" (5). The long axis of the elements is in the meridian plane. One primary surface of the element is flush with the wall surface of the channel, and is not insulated; and the other primary surface and four sides are in the groove and are coated with insulating material.

Wires are connected to both ends of the element, and are led out to the external auxiliary system. The resistance material of the sensing element shall have high resistivity, and may be resistance alloy, electric brush and electric carbon material. The electric brush and electric carbon material can be selected from resin graphite, electrographite, metal graphite and natural graphite.

For objects or materials that contact the metal liquid, polytetrafluoroethylene plastic shall be carefully used (caution: the polytetrafluoroethylene plastic will burn strongly if contacting sodium-potassium alloy liquid! Even in normal temperature and inert gas (e.g., nitrogen) environment). When rubber material is applied, fluororubber and silicone rubber are recommended. Objects that can select the fluororubber and the silicone rubber include: the sealing hose (33), an end seal of a liquid metal seam between adjacent conductors on the main current circuit, an end seal of a liquid metal transfer switch (15), and a sectional sealant in a structure that contacts the metal liquid.

For the convenience of understanding and describing a regulation and control method below, the following term explanation and related illustration are given firstly.

N magnet exciting coils are provided; a sum of direct currents of all turns of each coil is denoted as $Ii$, $i=1, 2, \ldots, n$; and n has a minimum value of 1. Currents of the magnet exciting coils circumferentially flow. The turn quantity of each coil is denoted as $Zi$, resistance of each coil is denoted as $Ri$, and the Ohm thermal power of each coil is $Poi=(Ii/Zi)\cdot(Ii/Zi)\cdot Ri$.

Only one main current circuit is provided. The main current circuit without a parallel circuit does not have a branch circuit, and the direct current of the main current circuit is denoted as $I0$. The main current flows in a meridian plane without a circumferential component. The meridian plane refers to any plane including an axis line.

One rotor has k rotor magnetic and electric conductors (3) with serial numbers denoted as j, $j=1, 2, \ldots, k$, and k has a minimum value of 1. Both ends of each rotor magnetic and electric conductor are generally connected with rotor electric conductors (4). One rotor magnetic and electric conductor and the electric conductors at both ends form a section of independent main circuit on the rotor, and magnetic flux which penetrates through a rotation surface of the circuit is denoted as $\Phi mj$ which means the magnetic flux $\Phi m$, penetrating through the rotor conductors, described in the section "Electromagnetic Effect Principle of Homopolar DC Motor". The total magnetic flux, penetrating through the rotation surface of the main current circuit of the rotor, on one rotor is equal to a sum of k $\Phi mj$ and is denoted as $\Sigma\Phi r$, and $r=1$ or 2 (corresponding to rotor 1 or 2). All corresponding $\Phi mj$ of a serial main circuit on one rotor should have a same direction generally, except particular cases. At this moment, subtraction calculation should be performed on $\Phi mj$ of the opposite direction.

The magnetic flux $\Phi mj$ is generated by excitation of the magnet excitation sources (magnet exciting coils and permanent magnets). The excitation effect of the permanent magnets and nearby main magnet exciting coils on one main magnetic circuit (22) on the $\Phi mj$ is maximal; other magnet excitation sources have influences on the $\Phi mj$ to different degrees; other magnet excitation sources, belonging to one rotor, have larger influence due to similar and communicated structures; the influences of the magnet excitation sources of two rotors sharing the magnetic flux are also larger; different rotor magnet excitation sources of a centralized structure without sharing the magnetic flux also have the flux leakage influence; and the influences of different rotor magnet excitation sources of a separated structure can be ignored.

The main current in the main current circuit generates circumferential magnetic flux density Bt, and a magnetic field is located in an axisymmetric annular pipe encircled by the outer surfaces of the conductors of the main current circuit. The circumferential magnetic field necessarily penetrates through a certain or some magnetic conductors on the main magnetic circuit and is combined with the magnetic flux density Bm excited by the magnet excitation sources in the direction of the meridian plane herein to form a larger total magnetic flux density B. Because a magnetization curve of the magnetic conductor (a relation curve of the magnetic flux density B and the magnetic field strength H) made of the soft magnetic material is nonlinear, through the addition of the circumferential magnetic flux density Bt, the magnetic field strength Hm which generates the same magnetic flux density Bm is increased compared with Bt which is zero. It can be seen that the circumferential magnetic field generated by the main current weakens and lowers the magnetic conduction performance of the magnetic circuit, and thus each $\Phi mj$ value is indirectly influenced.

When the main current circuit is operated and used, the permanent magnet is nonadjustable, and variable factors which have influence on the $\Phi mj$ values are relevant currents of the magnet exciting coils and relevant main current (total current $I0$ and branch currents $I0\_1$ and $I0\_2$). In addition, temperature changes of the magnetic conductors of the magnetic circuit have influence on the magnetoconductivity, and changes of the air gaps of the magnetic circuit have influence on reluctance, but the degrees of the influences are very small.

Electromagnetic law formulas of the serial main current circuit described below include:

Electromotive force of the rotor 1:

$$E1 = \omega1 \cdot \Sigma\Phi1/(2\pi) \tag{a1}$$

Electromotive force of the rotor 2:

$$E2 = \omega2 \cdot \Sigma\Phi2/(2\pi) \tag{a2}$$

Sum of the electromotive forces of the main current circuit:

$$\Sigma E = E1 + E2 \tag{a3}$$

Main current:

$$I0 = \Sigma E/R0 \tag{a4}$$

Electromagnetic torque applied to the rotor 1:

$$Me1 = -I0 \cdot \Sigma\Phi1/(2\pi) \tag{a5}$$

Electromagnetic torque applied to the rotor 2:

$$Me2 = -I0 \cdot \Sigma\Phi2/(2\pi) \tag{a6}$$

$R0$ is total resistance of the main current circuit and includes a circuit solid resistance, a contact resistance and a connection medium resistance between solids and an electric brush resistance. When the electric brush uses the liquid metal, the state of the metal liquid in a "connecting region clearance" (5) has an influence on a $R0$ value. The temperature has an influence on the resistivity of the material. The state of the metal liquid of the "connecting region clearance" is denoted as MLS and is described by left and right boundary location parameters of the liquid or described by liquid volume and center location parameters.

All vectors, except $R0$, have the directivity and have positive values or negative values. Direction reference is selected as follows: when a point is designed, a vector direction of an angular velocity $\omega1$ of a driving rotor 1 is selected as ω vector positive direction, a direction of the magnetic flux ΣΦ1 is selected as ΣΦ direction, and a direction of E1 is selected as E positive direction. The positive direction of I0 is identical with the E positive direction, and a vector positive direction of Me is identical with the ω vector positive direction. E1 has the positive direction and a positive value on the designed point but may be a negative value on other working points. The directions of E2 and E1 are always opposite, thereby forming a relationship of a driving shaft and a driven shaft. When ΣE>0, the direction of I0 is positive; and when ΣE<0, the direction of I0 is negative. When the vector direction of the electromagnetic torque Me of one rotor is identical with the vector direction of the angular velocity ω (i.e., the two parameters are positive values or negative values), it indicates that the rotor receives electromagnetic power (Pe value is positive), and the rotation shaft is represented as the driven shaft. When the vector direction of the electromagnetic torque Me of one rotor is opposite to the vector direction of the angular velocity ω, it indicates that the rotor outputs the electromagnetic power (Pe value is negative), and the rotation shaft is represented as the driving shaft.

Neglecting the influences of secondary factors such as temperature, ΣΦ1 and ΣΦ2 of the serial main circuit can be represented as an absolute value |I0| of the main current I0 and a function of a relevant magnet exciting coil current when the serial main circuit is operated and used.

$$\Sigma\Phi1 = Ff1(|I0|, Ir11, Ir12, \ldots, Ir1n) \tag{a7}$$

$$\Sigma\Phi2 = Ff2(|I0|, Ir21, Ir22, \ldots, Ir2n) \tag{a8}$$

{Ir11, Ir12, . . . , Ir1n} is a subset, a universal set or a null set of {I1, I2, . . . , In}, and {Ir21, Ir22, . . . , Ir2n} is also a subset, a universal set or a null set of {I1, I2, . . . , In}, and {Ir11, Ir12, . . . , Ir1n} and {Ir21, Ir22, . . . , Ir2n} shall not be the null set simultaneously.

Neglecting the influences of secondary factors such as temperature, I0, Me1 and Me2 of the serial main circuit can be represented as the following variable functions when the serial main circuit is operated and used.

$$I0 = Fi0(\omega1, \omega2, MLS, Ii01, Ii02, \ldots, Ii0n) \tag{a9}$$

$$Me1 = Fm1(\omega1, \omega2, MLS, Ii01, Ii02, \ldots, Ii0n) \tag{a10}$$

$$Me2 = Fm2(\omega1, \omega2, MLS, Ii01, Ii02, \ldots, Ii0n) \tag{a11}$$

{Ii01, Ii02, . . . , Ii0n} is a collection of {Ir11, Ir12, . . . , Ir1n} and {Ir21, Ir22, . . . , Ir2n}.

The serial main current circuit can adopt the following two kinds of regulation methods used for controlling the output torque. The first kind only regulates the current of one magnet exciting coil, and the second kind adopts a minimal total loss principle to regulate the currents of all the magnet exciting coils.

A first regulation and control method of the first kind is as follows:

One magnet exciting coil as a regulated object (with the current of Is) is selected; fixed current values of other magnet exciting coils (generally rated values or maximum values) are selected; and an upper limit value I0max and a lower limit value I0min of the main current in a regulation range are selected.

The fixed currents are conducted in other magnet exciting coils, and relation curves that the total magnetic fluxes, penetrating through the rotation surfaces of the main current circuits of the rotors, on the two rotors vary along with regulated magnet exciting current Is are acquired through calculations or tests respectively when the main current is under the upper limit and under the lower limit, namely, $$\Sigma\Phi1 = Ff1(|I0max|, Is) \tag{a12}$$

$$\Sigma\Phi2 = Ff1(|I0min|, Is) \tag{a13}$$

$$\Sigma\Phi2max = Ff2(|I0max|, Is) \tag{a14}$$

$$\Sigma\Phi2min = Ff2(|I0min|, Is) \tag{a15}$$

When regulation is executed, the rotating speeds (ω1 and ω2) of the two rotors are collected immediately, and the upper limit value Ismax and the lower limit value Ismin of the regulated magnet exciting current, corresponding to the upper limit value and the lower limit value of the main current, at the current rotating speed are calculated at any time by utilizing the electromagnetic law formulas ((a1)-(a4), wherein Ro is given as a constant value) and the above relation curves ((a12)-(a15)), namely, $$Ismax = F(I0max, \omega1, \omega2) \tag{a16}$$

$$Ismin = F(I0min, \omega1, \omega2) \tag{a17}$$

Meanwhile, the design enables the upper limit values (Ismax, I0max) and the lower limit values (Ismin, I0min) of the current to correspond to the upper limit values (Me1max, Me2max) and the lower limit values (Me1min, Me2min) of the electromagnetic torque at the current rotating speed, and in addition, such corresponding relationship monotonically changes.

When regulation is executed, an action stroke of an actuator can correspond to the linearity of the regulated magnet exciting current Is in a range between the upper limit value Ismax and the lower limit value Ismin; both ends of the action stroke correspond to the upper limit value and the lower limit value of the electromagnetic torque, but a relationship of a middle value of the electromagnetic torque and the action stroke is not a linear relationship generally; and a nonlinear correspondence rule can also be adopted between the action stroke and the regulated magnet exciting current Is, so that the electromagnetic torque tends to be in approximate linear correspondence to the action stroke.

A second regulation and control method of the first kind is as follows:

One magnet exciting coil as a regulated object (with the current of Is) is selected; fixed current values of other magnet exciting coils (generally rated values or maximum values) are selected; and a selected torque command is about Me1 or Me2.

Under the condition that the fixed currents are conducted in other magnet exciting coils, and relation curves that the total magnetic fluxes, penetrating through the rotation surfaces of the main current circuits of the rotors, on the two rotors vary along with regulated magnet exciting current Is and the main current I0 are acquired through calculations or tests respectively, namely, $$\Sigma\Phi1 = Ff1(|I0|, Is) \tag{a18}$$

$$\Sigma\Phi2 = Ff2(|I0|, Is) \tag{a19}$$

When regulation is executed, the rotating speeds (ω1 and ω2) of the two rotors are collected immediately, and the required regulated magnet exciting current value Is is calculated at any time for an execution link by utilizing the electromagnetic law formulas ((a1)-(a4), (a5) or (a6), wherein Ro is a constant value) and the above relation curves ((a18), (a19)) and taking the current rotating speed value and the given torque command (Me1 value or Me2 value, and an application range of the Me1 value or the Me2 value which satisfies various factor limitation conditions is calculated and determined in advance) as input conditions. Is value is a solving result of seven simultaneous equations ((a1)-(a4), (a5) or (a6), (a18), (a19)), and a functional form of the Is value is as follows:

$$Is = F(Me1 \text{ or } Me2, \omega 1, \omega 2) \tag{a20}$$

A third regulation and control method of the first kind is as follows:

One magnet exciting coil as a regulated object (with the current of Is) is selected; fixed current values of other magnet exciting coils (generally rated values or maximum values) are selected; and a torque command is selected about Me1 or Me2.

Under the condition that the fixed currents are conducted in other magnet exciting coils, relation curves that the total magnetic fluxes, penetrating through the rotation surfaces of the main current circuits of the rotors, on the two rotors vary along with the regulation magnet exciting current Is and the main current I0 are acquired through calculations or tests respectively, namely, $$\Sigma \Phi 1 = Ff1(|I0|, Is) \tag{a18}$$

$$\Sigma \Phi 2 = Ff2(|I0|, Is) \tag{a19}$$

An application range of the rotating speeds of two shafts and an application range of the electromagnetic torque (Me1 or Me2) of one shaft are given; a matrix of the regulated magnet exciting current values Is (the functional form is an equation (a20)) which covers different rotating speed conditions and torque demands in a full range is calculated by utilizing the electromagnetic law formulas ((a1)-(a4), (a5) or (a6), wherein Ro is a constant value) and the above relation curves ((a18), (a19)), and all the data are stored in a control system.

When regulation is executed, the rotating speeds ($\omega 1$ and $\omega 2$) of the two rotors are collected immediately; relevant stored data is invoked from the control system by taking the current rotating speed value and the given torque command (Me1 value or Me2 value) as the input condition; and a corresponding regulated magnet exciting current value Is is calculated for an execution link by adopting a spline interpolation function formula.

The magnet exciting coil, as the regulated object, of the first kind of the regulation and control method generally selects the magnet exciting coil with a large magnet exciting current adjustable range and wide working condition application range. This selection is related to an HET structure as well as two rotating speed conditions of the working condition. When different regulated magnet exciting coils need to be selected in a partitioning manner in a whole running working condition range, preparatory work of each partitioning regulation and control should be done in advance, and switching and invoking are performed according to the needs when regulation is executed.

A first regulation and control method of the second kind is as follows:

The total loss takes a sum of main current Ohm heat (I0·I0·R0) and magnet exciting current Ohm heat ($\Sigma$Poi), wherein R0 and Ri are constant values. A selected torque command is about Me1 or Me2. Application limit ranges of the main current and each magnet exciting current are selected. In the ranges, the corresponding relationships that total magnetic fluxes, penetrating through the rotation surfaces of the main current circuits of the rotors, on the two rotors vary along with multidimensional variables of the main current I0 and each magnet exciting current Ii are acquired through calculations or tests respectively, namely, $$\Sigma \Phi 1 = Ff1(|I0|, Ir11, Ir12, \ldots, Ir1n) \tag{a7}$$

$$\Sigma \Phi 2 = Ff2(|I0|, Ir21, Ir22, \ldots, Ir2n) \tag{a8}$$

The application range of the given rotating speeds of two shafts and the application range of the electromagnetic torque (Me1 or Me2) of one shaft are given; a matrix of optimal values Iiopt of all magnet exciting currents, which covers different rotating speed conditions and torque demands in a full range and satisfies the minimal target of the total loss, is calculated by utilizing the electromagnetic law formulas ((a1)-(a4), (a5) or (a6), wherein R0 is a constant value) and the multidimensional variable function relationships ((a7), (a8)), and all the data are stored in the control system.

When regulation is executed, the rotating speeds ($\omega 1$ and $\omega 2$) of the two rotors are collected immediately as the input condition; the torque command (Me1 value or Me2 value) is also given as the input condition; relevant stored data is invoked from the control system; and corresponding optimal value Iiopt of each magnet exciting current is calculated for an execution link by adopting a spline interpolation function formula.

A second regulation and control method of the second kind is as follows:

The total loss takes a sum of the main current Ohm heat (I0·I0·R0), the magnet exciting current Ohm heat ($\Sigma$Poi) and "connecting region clearance" liquid metal frictional heat, wherein R0 is a function of liquid metal state parameter MLS, and Ri is a constant value. A selected torque command is about Me1 or Me2. Application limit ranges of the main current and each magnet exciting current are selected. In the ranges, the correspondence relationships that total magnetic fluxes, penetrating through the rotation surfaces of the main current circuits of the rotors, on the two rotors vary along with multidimensional variables of the main current I0 and each magnet exciting current Ii are acquired through calculations or tests respectively, namely, $$\Sigma \Phi 1 = Ff1(|I0|, Ir11, Ir12, \ldots, Ir1n) \tag{a7}$$

$$\Sigma \Phi 2 = Ff2(|I0|, Ir21, Ir22, \ldots, Ir2n) \tag{a8}$$

The application range of the rotating speeds of two shafts, the application range of the electromagnetic torque (Me1 or Me2) of one shaft and the application range of the liquid metal state parameter MLS are given; a matrix of optimal values Iiopt of all magnet exciting currents and a matrix of optimal value MLSopt of the liquid metal state parameter, which cover different rotating speed conditions and torque demands in a full range and satisfy the minimal target of the total loss, are calculated by utilizing the electromagnetic law formulas ((a1)-(a4), (a5) or (a6), wherein R0 is a function of the liquid metal state parameter MLS) and the above multidimensional variable function relationships ((a7), (a8)); and all the data are stored in the control system.

When regulation is executed, the rotating speeds ($\omega 1$ and $\omega 2$) of the two rotors are collected immediately as the input condition; the torque command (Me1 value or Me2 value) is also given as the input condition; relevant stored data is invoked from the control system; and corresponding optimal value Iiopt of each magnet exciting current and the corresponding optimal value MLSopt of the liquid metal state parameter are calculated for the execution link by adopting a spline interpolation function formula.

Metal liquid of the "connecting region clearance" should be a continuous axisymmetric liquid ring without holes1. A boundary of both end sides is a gas-liquid interface, and a middle liquid-solid interface should be continuous and does not contain gas. Not only the own resistance of the metal liquid "connecting region clearance" influences the total resistance R0, but also movement of distribution positions of the metal liquid influences the current paths and the resistances of adjacent conductors. The left and right boundary location parameters (i.e., gas-liquid interface center point position parameters) of the metal liquid and the shape of the gas-liquid interface can completely describe the metal liquid state (MLS) related to R0, but in actual application, the shape factor of the gas-liquid interface can be ignored. The left and right boundary position parameters of the metal liquid can also be replaced with liquid volume and the center position parameter, and such replacement is equivalent. The MLS parameter is also a main parameter that influences the frictional heat of the metal liquid.

The metal liquid of the "connecting region clearance" are affected in the following aspects: liquid surface tension, liquid rotation centrifugal force, liquid meridian plane backflow driven by rotation of a moving wall surface, circulation flow (containing an incoming flow and an outgoing flow) driven by a circulation pump, gas pressures on both sides and electromagnetic force applied to conductive metal liquid. In the electromagnetic force, meridian plane Lorentz force Flm generated by the circumferential magnetic flux density Bt and the main current is the only remarkable part which plays an important role, and the direction of the Flm is perpendicular to that of the main current and always points to the outer side of a main current loop. At the aspect of maintaining the metal liquid to be not dislocated, circulation flow is a favorable factor, and the higher the flow rate is, the stronger the stability maintenance ability is; a channel with large radius of the middle part and small radii of the both sides enables the liquid rotation centrifugal forces on both sides to be mutually constrained, which is favorable for stability maintenance; and the Lorentz force Flm always faces outside, which is an unfavorable factor and can be counteracted by designing the liquid rotation centrifugal force. As for the gas pressures at both sides, a means of regulating the pressure difference between both sides can be adopted to maintain the stability of the position of the metal liquid. Therefore, two solutions of stability maintenance of the position of the metal liquid are generated. The first solution: the gas pressures on both sides are not regulated, the pressure difference between both sides is zero (in a free state), longer channels on both sides are designed, more liquid volume is adopted, and the effect of the liquid rotation centrifugal force is mainly utilized to ensure that the metal liquid is not dislocated in the entire running and use range, i.e. the metal liquid is not out of the positions corresponding to an inlet and an outlet of the circulation flow. The second solution: the gas pressures on both sides are regulated, longer channels on both sides do not need to be designed, more liquid volume do not need to be adopted, and the effect of the gas pressure difference between both sides is mainly utilized to ensure that the metal liquid is not dislocated in the entire running and use range and is in a better preset position. A volume stretching method can be adopted to regulate the gas pressure difference between both sides: a volume regulation valve of a piston structure, a plunger structure or a diaphragm structure is arranged, an adjustable volume cavity of the volume regulation valve is communicated with a gas cavity with the pressure intensity to be regulated, and the pressure intensity is changed by utilizing change of a volume. This method is feasible in HET slit small volume cavity and has the advantage of rapidness in operation during regulation.

When the first solution of maintaining the stability of the position of the metal liquid is adopted, the center position of the liquid cannot be actively regulated and controlled, and therefore, the metal liquid state MLS parameter used by the second regulation and control method of the second kind only contains controllable-quantity metal liquid volume parameters, while the liquid center position parameter is fixed as an average value for approximate treatment. When the second solution is adopted, a means of pressure difference regulation of both-side gas is added, and the liquid center position can be thus actively regulated and controlled; when the center position is required to be controlled at a fixed position, the MLS parameter only contains the metal liquid volume parameter; during center position change control, the MLS parameter can include the liquid center position parameter and the liquid volume parameter, and the center position is controlled at the optimal position that satisfies a target of the minimal total loss; during center position change control, the MLS parameter can also include the metal liquid volume parameter to simplify the workload, while the center position parameter is fixed as an average value for approximate treatment. At this moment, center position control is unrelated to the target of the total minimal loss and is executed according to other requirements.

For control of the current of the DC magnet exciting coil, a voltage regulation method is adopted, and a DC chopper or a resistance potentiometer may be adopted.

(b) Fuel Engine Power System for Vehicles Including HET

The present invention adopts homopolar DC electromagnetic transmission (HET) as core equipment of a continuously variable speed and variable torque transmission system, so that the disadvantages and deficiencies of use of the existing continuously variable speed and variable torque transmission are avoided, and the demands on the aspects of function, performance and the like can be met.

Due to the addition of the HET and utilization of unique functions of the HET, operation use of vehicle power is different from the traditional operation use in some aspects. One important change is to change an engine into "follow-up" regulation. Power required for supply only needs to be satisfied, no matter how the rotating speed and a torque path of the engine are changed, thereby providing a precondition for selecting an optimal fuel efficiency operating path and making it possible for efficient operation of the engine.

The technical solution and principle of the present invention are explained in detail below.

The fuel engine power system for vehicles including HET includes an engine for burning fuel to output shaft power, a transmission system which includes one HET and transmits engine power to a drive bridge main reducer, and a control system of the engine and the transmission system.

The engine for burning the fuel to output the shaft power refers to that a heat engine which burns liquid or gas fuel, converts the latent heat energy into mechanical energy and outputs a torque and the shaft power.

In such vehicle power transmission system, a clutch does not need to be arranged for a two-wheel drive structure, and a clutch does not need to be arranged between the engine and a transfer case or an interaxle differential for a four-wheel drive structure at least.

An input shaft of the HET and an output shaft of the engine can be directly connected with each other, and a fixed-speed-ratio mechanical transmission device can also be arranged between the input shaft of the HET and the output shaft of the engine so as to adapt to a difference of designed values or maximal values of the rotating speeds of the two shafts. The fixed-speed-ratio mechanical transmission device includes forms such as a gear, a belt, a chain, worm transmission and the like. A single-stage gear transmission device is used generally herein.

In the two-wheel drive structure, an output shaft of the HET can be directly connected with the drive bridge main reducer, a fixed-speed-ratio mechanical transmission device can also be arranged between the output shaft of the HET and the drive bridge main reducer, a stepped speed change mechanical transmission device can also be arranged between the output shaft of the HET and the drive bridge main reducer, or a universal transmission shaft can also be arranged between the output shaft of the HET and the drive bridge main reducer. According to typical design parameters of a car, a first-stage reducer should be added between the output shaft of the HET and the main reducer generally. The stepped transmission is arranged to increase a low-speed drive torque.

In the four-wheel drive structure, the output shaft of the HET is connected with the transfer case or the interaxle differential for distributing the drive forces to the front shaft and the back shaft, is connected with the transfer case or the interaxle differential through one fixed-speed-ratio mechanical transmission device or is connected with the transfer case or the interaxle differential through a stepped speed change ratio mechanical transmission device, and the transfer case or the interaxle differential is then connected with a front drive bridge main reducer and a back drive bridge main reducer, or the universal transmission shaft is also arranged between the transfer case or the interaxle differential and the front and back drive bridge main reducers.

The above-mentioned "input shaft" and "output shaft" refer to definition names when the vehicle is driven to move, and the functions of various shafts are exchanged when directions of power flows are opposite.

The engine has a speed regulator, and between an idling condition and a maximal power condition, the engine is regulated by the speed regulator and is always operated on a line of a set torque-rotating speed drawing and in a regulation buffer belt region near the line. When the regulation line is selected, there are following main principles: the powers of various points on the whole line are monotonically increased from beginning to end; throttle openings (or corresponding fuel supply apertures such as fuel gas valve openings) of various points on the whole circuit are monotonically increased from beginning to end; and in the premise of satisfying the previous two conditions, a preferred line passes through a high fuel efficiency region. For example, a series of best or better efficiency points with an equipower line are selected to form a preferred regulation line.

The regulation line can be formed by a curve that the torque is monotonically increased along with the rotating speed, or formed by a curve that an equal rotating speed line and the torque are monotonically increased along with the rotating speed, or formed by the equal rotating speed line and an equal torque line, or formed by a curve that the equal torque line and the torque are monotonically increased along with the rotating speed, or formed by a curve that the equal rotating speed line, the equal torque line and the torque are monotonically increased along with the rotating speed, and can also be formed by curves of other types as long as the curves satisfy the condition that the throttle openings and the powers are monotonically increased.

The regulation line is changed into the curve on the throttle opening-rotating speed drawing. When regulation is performed, if the detected rotating speed and throttle opening state points are located on the right side (a side of higher rotating speed) of the line, then the throttle opening is reduced, otherwise, the throttle opening is increased.

An HET regulation control system leads to execute control of aheading and reversing drive torques of the vehicle. An aheading or reversing intention is set before starting; a driver gives a drive torque relative value command within a range from zero to the maximum (for example, a throttle pedal travel); and the HET regulation control system commands the HET to output a required forward aheading or backward reversing drive torque. While the engine speed regulator only needs to control the engine to perform follow-up running on one regulation line to supply the required power. When the HET output power is reduced, before the throttle opening is regulated, a torque applied to an HET input shaft rotor which is connected with the engine is larger than the output torque, and the rotating speed of the HET input shaft rotor rises and the HET input shaft rotor deviates from the engine regulation line, so that a regulator reduces the throttle opening to enable the engine state to return to a working condition that the power is correspondingly reduced on the regulation line, thereby achieving rebalance of the rotor torque of the shaft system. When the HET output power is increased, before the throttle opening is regulated, the torque applied to the HET input shaft rotor which is connected with the engine is smaller than the output torque, and the rotating speed of the HET input shaft rotor is lowered and the HET input shaft rotor deviates from the engine regulation line, so that the regulator increases the throttle opening to enable the engine state to return to a working condition that the power is correspondingly increased on the regulation line, thereby achieving rebalance of the rotor torque of the shaft system.

A vehicle starting program: the current of each magnet exciting coil of the HET is in a zero value state; the liquid metal of the "connecting region clearance" (5) is in a retracting open circuit state; the engine is started to an idling condition (without this case that the engine is in the idling condition); aheading or reversing is set; a drive torque command is given; the liquid metal of the "connecting region clearance" is in place; the HET regulation control system controls the output drive torque; and the vehicle is started to drive. As for the vehicle equipped with the stepped speed change ratio mechanical transmission device, before the drive torque command is given, an initial speed ratio gear of the vehicle should also be set.

The set initial speed ratio gear can be any gear of the stepped speed change ratio mechanical transmission device and includes a minimal transmission speed ratio gear. In a range from zero to the maximal speed of the vehicle driving speed, control is conducted to decrease the transmission speed ratio value sequentially from an initial gear value to a minimal transmission speed ratio gear value. When the initial speed ratio gear selects the minimal transmission speed ratio gear, the speed ratio gear is not changed, which is equivalent to the use of fixed speed ratio transmission.

Gear shifting operation in driving is automatically controlled by the HET regulation control system. If a preset gear shifting speed is reached, control is conducted to decrease the HET output torque to zero (i.e., the magnet exciting current is decreased to zero); an original gear is disengaged; two parts which are required to be joined by using friction synchronization of a synchronizer is engaged with a new gear; and then the HET outputs the required torque according to the current drive torque command.

A vehicle sliding program: the drive torque command returns to zero; the current of each magnet exciting coil of the HET returns to zero; the liquid metal of the "connecting region clearance" (5) is in a retracting open circuit; and the engine follows up to return to the idling condition or until the engine flames out.

A vehicle parking program: the drive torque command returns to zero; the current of each magnet exciting coil of the HET returns to zero; the liquid metal of the "connecting region clearance" (5) is in a retracting open circuit; the engine follows up to return to the idling condition or until the engine flames out; and when brake is required, a brake command is sent out after the torque command until the vehicle stops.

Under the condition that the vehicle slides, and the engine poops out or is not ignited, the kinetic energy of the vehicle can be utilized, and through HET reverse power transmission, the engine is driven to be ignited and started to the idling condition.

(c) Flywheel Power System for Vehicles Including HET

The vehicle power system of the present invention mainly consists of a flywheel and the homopolar DC electromagnetic transmission (HET). The flywheel is used as an energy carrier; and the HET is used for transferring the energy in a mode of stepless speed change and torque change and is a control center for operating the direction and the size of an energy flow.

Compared with the existing flywheel power system, the solution of the present invention is unique in the following aspects and makes great progress in performance or functions:

(1) Energy transfer for a drive vehicle and a kinetic energy recovery brake vehicle adopts HET. Small-power slow energy charge to the flywheel adopts external AC rectification and loading of HET rotor which is coaxial with the flywheel; large-power rapid energy charge to the flywheel adopts a mechanical direct connection loading mode, and the loading uses a special HET and a constant-speed synchronous motor in a charging station. The efficiency of HET energy transfer is very high and can be designed to reach 96%-98%;

(2) The power density of the HET is very high, the cost is economic, and the HET has great advantages in weight, volume and cost of the vehicle power transmission system with an equal power;

(3) Heating equipment is not arranged in a vacuum container of the flywheel. Main electromagnetic equipment (the HET and an axial permanent magnetic bearing) does not have AC and a pulsating magnetic field, and high-frequency eddy current loss and hysteresis loss are not generated;

(4) The flywheel body is designed into a multi-body structure in a flexible connection mode, so that the difficulty of vibration of a wheel body of a rigid structure is avoided, and meanwhile, the space effective utilization ratio is also increased, i.e., a wheel body mass block is added;

(5) The flywheel is designed into a vertical shaft type structure. The downward weight of the flywheel is supported by a permanent magnetic axial bearing; the very small radial load of the flywheel is supported by a mechanical rolling bearing; and a mechanical protecting bearing for emergency can be selected if larger gyroscopic moment impact load occurs. By adopting this solution, the problem brought by fully adopting a magnetic suspension bearing is avoided, and bearing friction loss is also maintained at an acceptable lower level;

(6) The flywheel power system for vehicles in the solution of the present invention can be designed according to the conventional energy storage capacity and super-high power specification. A vehicle endurance mileage can reach 300-400 kilometers, and HET rated power is typically designed to be 2×240 kW with a total of 480 kW.

Compared with the existing chemical battery power system for vehicles, besides description in the above comparison, the solution of the present invention also has the following remarkable advantages:

(1) By adopting the mechanical direct connection loading mode, large-power rapid energy charge to the flywheel is very rapid, the loading power of each flywheel can reach 2000 kW, the whole-course loading time is within 2 mins, and meanwhile, plug-in slow charge can also be selected;

(2) As the HET power density is very high, and the flywheel is hardly limited to power, larger transmission power can be designed to obtain very strong vehicle power performance; and the capability of kinetic energy recovery brake also becomes very strong, and the energy saving effect is greatly improved;

(3) Compared with a typically applied lithium ion battery, a flexible flywheel fiberglass reinforced wheel body in the solution of the present invention is obvious in the advantage of unit cost and has the competitiveness in market popularization and application;

(4) The service lives of the flywheel and the HET are very long.

The technical solution and the principle of the present invention are described in detail below.

A flywheel power system capable of being used for cars, buses, freight cars and other vehicles consists of an energy storage flywheel device, a transmission system from the flywheel device to the drive bridge main reducer, a control system of the energy storage flywheel device and the transmission system and the like, wherein the core equipment of the transmission system is homopolar DC electromagnetic transmission (HET).

Two vertical shaft type flexible flywheel devices which are arranged on the vehicle chassis are arranged. The specification sizes of the two flywheels are identical, and only the rotation directions of the two flywheels are opposite. The moment directions of a pair of the flywheels with opposite rotation directions are also opposite when the gyroscopic moments are generated. When the rotation speeds of the two flywheels are identical, the gyroscopic moments can be completely counteracted mutually, i.e., the effect on the vehicle is wholly zero, and only a pair of the gyroscopic moments act on the vehicle chassis. The vertical shaft type flywheel has four remarkable advantages: firstly, it is beneficial to adopt optimized bearing combination solution; secondly, it is beneficial to adopt the wheel body flexible connection structure; thirdly, it is beneficial for optimal arrangement of a large-diameter flywheel in the vehicle; and fourthly, it is beneficial to reduce the opportunity and the size of the flywheel gyroscopic moment generated in vehicle driving, so that the impact loads of the gyroscopic moment to the flywheel structure, the bearing and the vehicle chassis are lowered. The size of the flywheel gyroscopic moment is equal to a product of the following parameters: flywheel rotational inertia J, flywheel rotational angular speed $\omega$, a vehicle movement angular speed $\Omega$ and a sine value $\sin\theta$ of an included angle $\theta$ between a $\omega$ vector and a $\Omega$ vector. The direction of a flywheel gyroscopic moment vector is equal to the direction of a cross product of the $\omega$ vector and the $\Omega$ vector and is perpendicular to the $\omega$ vector direction and the $\Omega$ vector direction at the same time. The direction of the vehicle movement angular speed Ω vector has three main directions: the first is a vertical shaft direction, corresponding to a left and right turning driving state of the vehicle; the vertical shaft direction frequently occurs, is longer in duration and larger in angular speed value; the second is a transverse shaft direction, corresponding to a state that the vehicle is in pitching rotation, for example, at a connection segment of ascending and descending slopes, and passing through a convex hull or a pit; and the third is a longitudinal shaft direction, corresponding to a state that the vehicle side tumbling rotation, for example, when going in or out of a heeling slope and when the road condition is rough to cause lateral rotation of the vehicle. The vertical shaft type flywheel does not generate the gyroscopic moment during left and right turning driving of the vehicle.

Each vertical shaft type flexible flywheel device includes a rotating wheel body, a rotation shaft (51), a bearing on the rotation shaft and a vacuum container shell (52). The center line of the rotation shaft is perpendicular to the ground, and the wheel body is of a multi-body axisymmetric structure and includes one or more mass block bodies (53) and at least one support body (54). The structural bodies are sequentially arranged in a mode that large rings cover small rings; the mass block bodies are located at the rotating outermost ring and a secondary outer ring; the support body is located at an inner ring of the mass block bodies; the mass block bodies are formed by fiber reinforced polymers which are circumferentially wound; two groups of axisymmetric flexible membrane rings (55, 58) are adopted to connect with adjacent inner ring and outer ring structural bodies; one downward end surface of the outer ring structural body is arranged on one upward end surface of the inner ring structural body, and the two end surfaces form a load bearing end surface pair (56); one upward end surface of the outer ring structural body is placed below one downward end surface of the inner ring structural body, and the two end surfaces are end surface pairs (57, 64) which limit upward displacement; and the end surface pairs and the load bearing end surface pair are designed to be combined together in a concentrated mode to form a structure that a lug boss is matched with a groove.

As for the fiber reinforced polymer used for forming the mass block body (53) by winding, fibers are unidirectional continuous fibers; the types of the fibers can be selected from carbon fibers, aramid fibers, glass fibers and the like; the glass fibers can be selected from high strength glass fibers, E glass fibers and the like; and twistless roving formed by winding is adopted. The polymer can be selected from thermosetting resin and thermoplastic resin, and the thermosetting resin can be selected from epoxy resin, unsaturated polyester resin, phenolic resin, bismaleimide resin, polyimide resin, cyanate ester resin and the like. Compared with the glass fiber reinforced polymer, the carbon fiber reinforced polymer has the following advantages that the circumferential (ring) tensile elastic modulus is higher, and deformation is smaller during rotation; and for a composite, the density is smaller and specific strength is higher, and the energy storage density per unit weight is higher. The carbon fiber reinforced polymer has the following disadvantages that the carbon fibers are expensive, and the cost of a product is very high; and as the density is lower, the advantage of the strength is not obvious or is just the same as that of the glass fiber reinforced polymer (relative to the high strength glass fibers), and the energy storage density per unit weight is lower. Therefore, the adopted glass fiber reinforced polymer has more comprehensive advantages, and is suitable for large-scale economic application, especially after the problems of large deformation and creep deformation are solved.

The amount of the mass block bodies (53) can be one, two, three and the like and is selected by weighing the respective advantages and disadvantages. The advantage of selecting a single mass block body is to fully utilize a high linear speed region, to obtain higher energy storage density per unit weight, but the space occupied by an inner hole of the single mass block body cannot be effectively utilized, causing that the energy storage density per unit weight calculated by the whole equipment volume is lower. The advantage of selecting two mass block bodies is as follows: the effective space is properly utilized, and the mass block bodies located at the inner ring can adopt the fibers and the resin which are lower in strength and cost, and the disadvantage is that the energy storage density per unit weight is lower than that of the solution of the single mass block body.

The main effect of the support body (54) of the wheel body is connection between the mass block body and the rotation shaft, and the amount of the support body depends on a connection radial seize ratio and the material variety of the support body. The material of the support body can be selected from the circumferentially wound fiber reinforced polymer or a metal material. The former must be adopted at a higher linear speed position incompetent by the strength of the metal material. Similarly, because of very low radial strength, multiple fiber reinforced polymer support bodies may also be adopted generally. Since the linear speed is lower than that of the mass block body, the support body fiber reinforced polymer can be selected from the fibers and the resin which are lower in strength and cost. The support body at the innermost ring selects the metal material, which is beneficial for connection with the rotation shaft. The metal material of the support body can be selected from steel, aluminum alloy, titanium alloy and the like. The aluminum alloy and the titanium alloy have higher specific strengths, the outside diameters of the made support bodies are larger, and the amount of the fiber reinforced polymer support bodies can be reduced; the aluminum alloy also has the characteristics of lower cost and lighter weight; and the steel support body can also be used as a rotation disc of a permanent magnet suction force axial bearing, and at this moment, steel No. 45 or 40 Cr are better.

Because the fiber reinforced polymer which is formed by winding is easily crushed into cotton-wool fragments when failing to rotate at high speed and destroyed and has better safety, the wheel body which is closer to the outer ring and is larger in energy storage capability has obvious safety advantage by adopting the fiber reinforced polymer.

The axial positions of the load bearing end surface pair (56) and the end surface pairs (57, 64) which limits upward displacement shall be close to the gravity center of a loading body as much as possible. Margins are reserved on two opposite end surfaces of the end surface pairs (56, 57, 64) in radial height so as to compensate for radial displacement dislocation generated during rotation, and the end surface pairs always keep an effective action area in a range from a stationary state to a maximal rotating speed. No gap exists between the two opposite end surfaces of the end surface pair (57); the end surface pair (57) is combined with the weigh bearing end surface pair (56) to play a role of axial positioning; and angle misalignment change is forcedly limited and tightly participates in transfer of force and moment. A gap exists between the two opposite end surfaces of the end surface pair (64) to play a limiting role of limiting upward displacement of the outer ring structural body, and angle misalignment change is limited to a certain degree and participates in transfer of the force and the moment sometimes or partly. For the purposes of improving the wear resistance of the contact surfaces of the end surface pairs, increasing the effective contact area, protecting the surface of fiber reinforced plastic, realizing reliability, durability, vibration absorption and the like, the materials of the two opposite end surfaces of the end surface pairs (56, 57, 64) can adopt a rubber elastic material such as polyurethane rubber. A rubber end surface thin plate (65) or a rubber end surface thick block (66) is adhered to a matrix together. The rubber end surface thick block (66) has larger elasticity and deformation suitability, should be mounted on the outer ring matrix due to larger centrifugal load and adopts a matrix inner hole surface to bear the centrifugal load. Because the load of the load bearing end surface pair (56) is larger, the attached matrix is selected to form an integral structure with the wheel body structure main body to ensure that a load transfer path has sufficient strength reservation, while the matrix at one end of non-load bearing end surface pairs (57, 64) adopts a fitting structure. The fitting can be connected and fixed with the main matrix through an adhesive, and a material of the fitting is the same as the material of the main matrix.

The double-group design of the flexible membrane rings (55, 58) for connecting the adjacent inner ring and outer ring structural bodies is relatively suitable for moving type places such as the vehicle, and preferably, the axial span between the two groups is relatively large. Each group of the flexible membrane rings is formed by single or multiple flexible membrane rings, and the quantity of the flexible membrane rings depends on consideration of factors such as the strength, the rigidity and the like. Each flexible membrane ring is adhered to an inner ring matrix and an outer ring matrix; some flexible membrane rings are directly adhered to the main matrix; some flexible membrane rings are adhered to a fitting structure; and the fitting structure is then adhered to the main matrix, and the material of the fitting is the same as the material of the main matrix. The flexible membrane ring (55) which is not curved and deformed in advance can be adopted, and is composed of roots at the both ends and a middle body. The root with a semi-circular head is adhered to the matrix, and the thickness of the body is designed to be gradually reduced in a radial direction so as to reduce the maximal stress. The flexible membrane ring (58) which is curved and deformed in advance can also be adopted. The free state of a film ring part before mounting is in an equal-thickness flat gasket shape. The film ring is forcedly deformed into a shape of curving toward one side surface when being mounted. The curving degree of the film ring which has greater distance from the rotation shaft is larger, and the film ring is basically straightened when the rotation shaft rotates to the maximal rotating speed. The flexible membrane rings (55, 58) are made of elastic materials which include rubber material such as polyurethane rubber. The flexible membrane ring (58) can also adopt the composite material of the elastic material and radial reinforced fibers, and the fibers which are arranged in a radius direction are concentrated on the film center surface, so that the radial strength of the film ring is greatly improved, curve of the film is not influenced at the same time, and the circumferential elasticity is not lowered. The flexible membrane ring (58) is circumferentially stretched when being mounted; an inside hole diameter of the film ring is increased to a fit dimension; and the outside diameter of the film ring keeps invariable. As for the double groups of the flexible membrane rings (58) between the mass blocks, the flexible membrane rings (58) which has a certain axial distance with the positioning end surface pair is optionally mounted in an offset manner (FIG. 24, enlarged view IV); and an offset quantity compensates for an axial shrinkage difference between the outer ring and the inner ring during rotation for the purpose that the film rings are in a radial straightened state at the maximal rotating speed. As for the double groups of the flexible membrane rings (55) between the mass blocks, the flexible membrane rings which has a certain axial distance with the positioning end surface pair is optionally obliquely designed for the purpose that the film rings are in a radial straightened state at the maximal rotating speed.

The "flexible" connection mode in the solution of the present invention can compensate for imbalance of each block body, can greatly lower the requirement for dynamic balance correction, can be automatically suitable for large displacement deformation and creep deformation during operation, can greatly lower the dynamic unbalance force and the moment of the rotating wheel body acted on the rotation shaft and finally can reduce the exciting force and vibration to the bearing.

The flywheel rotation shaft (51) can be directly connected with the support body (54) at the innermost ring, for example, in a mode of interference fitting of a conical surface; a support disc (62) can also be mounted between the flywheel rotation shaft (51) and the support body (54). A center inner hole of the support disc is connected with the rotation shaft, for example, in the mode of interference fitting of the conical surface. A body of the support disc is arranged below the support body at the innermost ring. An elastic material ring (63) is mounted between the body of the support disc and the support body at the innermost ring, and the latter is connected with the body of the support disc and the support body at the innermost ring through an adhesive. A same type of the material, such as steel, as the rotation shaft is preferably taken for an object which is in interference fitting to the rotation shaft, so that the parameters such as elasticity moduli, linear expansion coefficients and the like of the body of the support disc and the support body at the innermost ring have little difference, and reduction in stress and guarantee of interference fitting during mounting and use are facilitated. The support body at the innermost ring which is directly connected with the rotation shaft is generally made of the steel, the outside diameter of the support body is smaller, and the rotational inertia of the support body is generally very small. When the support body at the innermost ring is made of aluminum alloy or titanium alloy, the outside diameter of the support body is larger, the rotational inertia of the support body is also larger, flexible connection is more needed, and meanwhile, the problem of interference fitting of the light alloy and the steel rotation shaft is also larger. Therefore, adaptation of a structure of the steel support disc and the elastic material ring with middle transition is a preferred solution, wherein the elastic material ring also plays the roles of flexible connection, load bearing and axial positioning, and can be selected from rubber material, such as polyurethane rubber.

The vacuum container shell (52) is designed into a structure sectioned into two halves by a vertical axis. A circle of flanges (67) is located at the middle part of the excircle surface of the shell, and the flange edges can be located on the outer side or the inner side of the container. The design of inner side of each flange edge is intended to reduce the practical external dimension, and each flange edge on the inner side is not provided with a holding bolt and is compressed by means of the pressure produced by vacuum of the container. When the design is adopted, four sections of ear flanges (74) and holding bolts thereof are also added at four corners of the outer side of the container. The positions of the four corners select the places which do not influence the overall dimension, for example, the 45-degree angular orientations which do not influence the arrangement width and length. A rubber sealing ring is arranged at the edge of the whole circle of the flanges; vacuum sealing grease can also be added on the outer side of the rubber sealing ring; a soft metal sealing ring can also be added on the inner side of the rubber sealing ring; and vacuum sealing grease can also be added on the outer side of the rubber sealing ring, and the soft metal sealing ring can also be added on the inner side of the rubber sealing ring. A mounting and supporting part of the shell utilizes the exposed flange edge and is also a mounting and supporting part of the whole flywheel device and a connection structure thereof.

As an added safety protection measure, a protective sleeve (68) which has strong containment capability can be added between the mass block body at the outmost ring and the shell on the outer side of the mass block body. The protective sleeve is abutted to and mutually support the shell, and rotation of the sleeve is not limited. The quantity of the protective sleeve can be one or more; free rotation is allowed among multiple sleeves; and one side of each of two sleeves has end part skirts (68) respectively.

The vacuum container shell (52) can adopt a three-layer composite structure (FIG. 25 and FIG. 26), the middle layer is fiber reinforced plastic; two outer surface layers are light metal materials; and the middle layer is connected with the outer surface layers through adhering. The reinforced fibers can be selected from glass fibers, carbon fibers and the like and use non-unidirectional fabrics, short-cut fibers, felts and the like. Resin can be selected from epoxy resin, unsaturated polyester resin, phenolic resin and the like. The middle layer can adopt sheet molding compounds (SMC) to perform formation processing. The light metal of each outer surface layer is preferably aluminum or aluminum alloy. The three-layer composite structure has the advantages of large vibration damping, high strength, good toughness and light weight.

Radial support bearings of the flywheel rotation shaft (51) may be two groups of rolling bearings and may also be two radial support magnetic bearings. Axial support bearings of the flywheel rotation shaft (51) may be a group of axial support magnetic bearings.

One group of axial support magnetic bearings consists of one or more bearings, and for the situation that the weight of the wheel body is very large, multiple bearings are properly adopted. The axial support magnetic bearings adopt permanent repulsive force type axial support magnetic bearings or permanent suction force type axial support magnetic bearings.

One permanent repulsive force type axial support magnetic bearing has a turning disc and a static disc; the turning disc is located above the static disc; an air gap is formed between the adjacent side end surfaces of the two discs; the turning disc is of an axisymmetric permanent magnet structure, or a mixed structure of an axisymmetric soft magnet and an axisymmetric permanent magnet or a mixed structure of an axisymmetric non-magnetic conductor, the axisymmetric soft magnet and the axisymmetric permanent magnet; the static disc is of the axisymmetric permanent magnet structure, or the mixed structure of the axisymmetric soft magnet and the axisymmetric permanent magnet or the mixed structure of the axisymmetric non-magnetic conductor, the axisymmetric soft magnet and the axisymmetric permanent magnet; magnetizing magnetic circuits of all the above permanent magnets are also of an axisymmetric structure; opposite magnetic poles at the positions with the same radius on the adjacent side end surfaces of the two discs are opposite; and the upward magnetic repulsive force acts on the turning disc and is designed to counteract the gravity of the rotor.

One permanent suction force type axial support magnetic bearing has a rotary disc (59, 54) and a static disc (60, 61); the turning disc is located below the static disc; an air gap is formed between the adjacent side end surfaces of the two discs; the turning disc is of an axisymmetric soft magnet; the static disc is of the axisymmetric permanent magnet structure, or the mixed structure of the axisymmetric soft magnet and the axisymmetric permanent magnet or the mixed structure of the axisymmetric non-magnetic conductor, the axisymmetric soft magnet and the axisymmetric permanent magnet; magnetizing magnetic circuits of all the above permanent magnets are also of an axisymmetric structure; and the upward magnetic suction force acts on the turning disc and is designed to counteract the gravity of the rotor.

The above permanent magnet type axial support magnetic bearings do not have magnetic hysteresis losses and eddy current losses. Compared with the permanent repulsive force type axial support magnetic bearings, the permanent suction force type axial support magnetic bearings have two advantages that: firstly, the turning disc does not need to be provided with a permanent magnet, while the strength of the permanent magnet is very low; and secondly, the magnetic flux density of the magnetic suction end surface can be designed to be larger, and larger bearing suction force is acquired with smaller outside diameter dimension of the bearing.

For two groups of rolling bearings of a radial support of the flywheel rotation shaft (51), one group of rolling bearings bears radial load, and the other group of rolling bearings bears the radial load and a bidirectional axial load and is an axial positioning end. Each group of rolling bearings consists of one rolling bearing or more rolling bearings to meet the requirement for the size and the direction of the load. The axial positioning end is generally located at the upper end. When the gyroscopic moment of the flywheel is larger, two groups of radial protective rolling bearings can be added to bear an overload radial force for a short time.

For the arrangement position of an axial support magnetic bearing, firstly, the static disc (60) can be close to the rolling bearing at the axial positioning end and is fixedly connected with the bearing seat directly or indirectly; and secondly, the static disc (61) can be fixed to the shell (52), and at this moment, one support body (54) can function as the rotating disc of the axial support magnetic bearing.

When the flywheel radial support adopts the rolling bearings, a magnetic fluid sealing component is arranged between the vacuum container shell (52) and the rotation shaft (51). The magnetic fluid sealing component and a lower bearing seat (FIG. 23) can also be arranged between the low-half shell and the rotation shaft; the sealing component is arranged between the rotation shaft and the lower bearing seat; an inner center hole of the low-half shell is in contact connection with the outer cylinder surface of the lower bearing seat and can perform axial displacement sliding; and the rubber sealing ring and the vacuum sealing grease are arranged between the two surfaces.

A loading disc (69) is mounted at each of the lower ends of the two flywheel rotation shafts; and when rapid load charging is performed on each flywheel, the loading disc is used for connecting a loading joint of an external loading system and the rotation shaft, and large-power rapid load charging is performed by transmitting mechanical torques to the flywheel rotation shafts. The loading power to each flywheel in such loading mode can reach 2000 kW, and the charging time can be basically equivalent to oil charging of the vehicle.

Each flywheel is correspondingly equipped with an HET, and each flywheel and one rotor (HET input end rotor) of the corresponding HET share one rotation shaft.

An external power supply which is used for performing plug-in charging or unloading on each flywheel is pressure-adjustable DC power supply equipment which is connected with the alternating current of a power grid, and the equipment can be arranged in the vehicle or at a plug-in place.

For a concentrated type HET, each HET can be provided with two columns of external DC power supply terminals (16) (FIG. 2, FIG. 3, and FIG. 22) to connect with a main current circuit which includes the rotor magnetic and electric conductors and is provided with a liquid metal transfer switch (15) to evacuate liquid and disconnect the original main current circuit before the power supply is connected, so as to realize (respectively) plug-in charging or unloading to each flywheel. When plug-in charging is performed, braking is performed by a hand brake of the vehicle to disconnect the liquid metal transfer switch (15) and connect the "connecting region clearance" (5) of each circuit; a related magnet exciting coil that enables the magnetic flux of the HET flywheel end rotor to reach a maximal value is connected and always maintains the maximal magnet exciting current. The DC power supply voltage is regulated to be equal to the electromotive force of the HET flywheel end rotor, and the direction of the direct-current power supply voltage is opposite to that of the electromotive force; the main current circuit is connected with the DC power supply, and the DC power supply voltage is increased to reach a rating limit of the plug-in main current and a rating limit of the plug-in power; in the flywheel charging and speed raising process, the DC power supply voltage is continuously increased; the plug-in main current and/or the plug-in power with the rating limits are kept; current limit is at front, and power limit is at rear; and the power limit is provided only if the starting point of the rotating speed of the flywheel is higher; when charging is finished, the DC power supply voltage is decreased firstly until zero current is obtained; the main current circuit is disconnected from the DC power supply; and HET magnet excitation is cancelled. When plug-in unloading is performed, the prepared programs are the same as above. The current directions are opposite, and the operation programs are opposite, i.e., the DC power supply voltage is decreased until the rating limit of the plug-in unloading power or the rating limit of the plug-in unloading main current is reached. Such plug-in charging or unloading is suitable for the small-power application situation, for example home power supplies, community power supplies, slow charging and slow discharging.

A concentrated type HET four-wheel drive structure can be adopted: the upper end of the rotation shaft of the rotor (HET output end rotor), which does not share one rotation shaft with the flywheel, of each HET is provided with a pair of bevel gears; one bevel gear is directly connected with the rotation shaft, and the rotation shaft of the other bevel gear is connected with a drive bridge main reducer, or is connected through a fixed speed ratio reducer or is connected through a stepped speed change ratio reducer; or a universal transmission shaft is also arranged.

A concentrated type HET two-wheel drive structure can be adopted: for the upper ends of the rotation shafts of the output end rotors of the two HETs, one HET is provided with a pair of bevel gears, and the other HET is provided with a driving bevel gear and two driven bevel gears which are oppositely arranged; the driving bevel gear is directly connected with the rotation shafts of the output end rotor; rotation shafts of two driven bevel gears of different HETs are connected to each other through a universal transmission shaft; and a rotation shaft of the third driven bevel gear is connected with the drive bridge main reducer, or is connected through a fixed speed ratio reducer or is connected through a stepped speed change ratio reducer; or a universal transmission shaft is also arranged.

A four-wheel drive structure of a concentrated type HET with transfer can be adopted: for the upper ends of the rotation shafts of the output end rotors of the two HETs, one HET is provided with a pair of bevel gears, and the other HET is provided with a driving bevel gear and two driven bevel gears which are oppositely arranged; the driving bevel gear is directly connected with the rotation shafts of the output end rotor; rotation shafts of two driven bevel gears of different HETs are connected to each other through a universal transmission shaft; a rotation shaft of the third driven bevel gear is connected with a transfer case or an interaxle differential which is used for distributing the drive force of the front shaft and the back shaft, or is connected through a fixed speed ratio reducer or is connected through a stepped speed change ratio reducer, and then the transfer case or the interaxle differential is connected with the front and the back drive bridge main reducers; or a universal transmission shaft is also arranged.

A separated HET four-wheel drive structure can be adopted: the rotation shafts of the two HET output end rotors (i.e., two HET semi-coupled member rotation shafts) which do not share one rotation shaft with the flywheel are connected with the front and back drive bridge main reduces respectively, or are connected through a fixed speed ratio reducer or are connected through a stepped speed change ratio reducer, or a universal transmission shaft is also arranged. A wire which is connected with the external DC power supply can be connected in parallel to an external connection conductor of each flywheel shaft end HET semi-coupled member so as to realize (respective) plug-in charging or unloading of each flywheel. When plug-in charging is performed, a circuit "connecting region clearance" (5) of each non-flywheel shaft end HET semi-coupled member is disconnected, and a circuit "connecting region clearance" (5) of each flywheel shaft end semi-coupled member is connected; a related magnet exciting coil that enables the magnetic flux of the HET flywheel end rotor to reach a maximal value is connected and always maintains the maximal magnet exciting current; the DC power supply voltage is regulated to be equal to the electromotive force of the HET flywheel end rotor; and the direction of the DC power supply voltage is opposite to that of the electromotive force; the main current circuit is connected with the DC power supply, and the DC power supply voltage is increased to reach a rating limit of the plug-in main current or a rating limit of the plug-in power; in the flywheel charging and speed raising process, the DC power supply voltage is continuously increased; the plug-in main current and/or the plug-in power with the rating limits are kept; the current limit is at front, and the power limit is at rear; and the power limit is provided only if the starting point of the rotating speed of the flywheel is higher; and when charging is finished, the DC power supply voltage is decreased firstly until zero current is obtained; the main current circuit is disconnected from the DC power supply; and HET magnet excitation is cancelled. When plug-in unloading is performed, the prepared programs are the same as above, the current directions are opposite, and the operation programs are opposite, i.e., the DC power supply voltage is decreased until the rating limit of the plug-in unloading power or the rating limit of the plug-in unloading main current is reached. Such plug-in charging or unloading is suitable for the small-power application situation.

A separated HET two-wheel drive structure can be adopted: two HET semi-coupled members which do not share one rotation shaft with the flywheel are combined to form one semi-coupled member. The rated electromotive force of the semi-coupled member after combination is a sum of the rated electromotive forces of the two semi-coupled members before combination; main circuits of the two flywheel shaft end semi-coupled members and one combined semi-coupled member are connected in series with one another by the external connection conductors; the rotation shaft of the combined semi-coupled member is connected with a drive bridge main reducer, or is connected through a fixed speed ratio reducer or is connected through a stepped speed change ratio reducer, or a universal transmission shaft is also arranged.

A four-wheel drive structure of a separated HET with transfer can be adopted: two HET semi-coupled members which do not share one rotation shaft with the flywheel are combined to form a semi-coupled member; the rated electromotive force of the semi-coupled member after combination is a sum of the rated electromotive forces of the two semi-coupled members before combination; main circuits of the two flywheel shaft end semi-coupled members and one combined semi-coupled member are connected in series with one another by the external connection conductors; the rotation shaft of the combined semi-coupled member is connected with a transfer case or an interaxle differential which is used for distributing the drive force to the front shaft and the back shaft, or is connected through a fixed speed ratio reducer or is connected through a stepped speed change ratio reducer, or a universal transmission shaft is also arranged.

A wire which is connected with the external DC power supply can be connected in parallel to the external connection conductor of the combined semi-coupled member, so as to realize plug-in charging or unloading to the two flywheels. When plug-in charging is performed, a circuit "connecting region clearance" (5) of the combined semi-coupled member is disconnected, and circuit "connecting region clearances" (5) of the semi-coupled members of two flywheel shaft ends are connected; a related magnet exciting coil that enables the magnetic flux of two HET flywheel end rotors to reach a maximal value is connected and always maintains the maximal magnet exciting current (for the purpose that the rotating speeds of the two flywheels tend to be consistent when the charging is finished, and the magnet exciting currents of two rotors are properly regulated to enable the flywheel with the lower rotating speed to obtain larger electromotive force and electric power); the DC power supply voltage is regulated to be equal to a sum of the electromotive forces of the two HET flywheel end rotors, and the direction of the direct-current power supply voltage is opposite to that of the electromotive forces; the main current circuit is connected with the DC power supply, and the DC power supply voltage is increased to reach a rating limit of the plug-in main current or a rating limit of the plug-in power; in the flywheel charging and speed raising process, the DC power supply voltage is continuously increased; the plug-in main current and/or the plug-in power with the rated limits are kept; the current limit is at front, and the power limit is at rear; and the power limit is provided only if the starting point of the rotating speed of the flywheel is higher; and when charging is finished, the DC power supply voltage is decreased firstly until zero current is obtained; the main current circuit is disconnected from the DC power supply, and HET magnet excitation is cancelled. When plug-in unloading is performed, the prepared programs are the same as above, the current directions are opposite, and the operation programs are opposite, i.e., the DC power supply voltage is decreased until the rating limit of the plug-in unloading power or the rating limit of the plug-in unloading main current is reached. Such plug-in charging or unloading is suitable for the small-power application situation.

The fixed speed ratio reducer includes a gear transmission device, a belt transmission device, a chain transmission device, a worm transmission device and other forms. The gear transmission device is generally used herein.

The above-mentioned "input shaft" and "output shaft" refer to defined names when the vehicle is driven to move, and the functions of all the shafts can be exchanged when power flows are in opposite directions.

The second kind of regulation and control method for the HETs above can be adopted for each HET in various drive structures of the concentrated type HET and the separated HET four-wheel drive structure.

Electromagnetic law formulas of serial main current circuits formed by the two flywheel shaft end semi-coupled members and one combined semi-coupled member in each of the separated HET two-wheel drive structure and the four-wheel drive with transfer structure have the following forms:

Electromotive force of a shaft end semi-coupled member rotor of a flywheel a:

$$E1a = \omega 1a \cdot \Sigma \Phi 1a/(2\pi) \tag{c1}$$

Electromotive force of a shaft end semi-coupled member rotor of a flywheel b:

$$E1b = \omega 1b \cdot 1b/(2\pi) \tag{c2}$$

Electromotive force of the combined semi-coupled member rotor:

$$E2ab = \omega 2ab \cdot \Sigma \Phi 2ab/(2\pi) \tag{c3}$$

A sum of electromotive forces of main current circuits:

$$\Sigma Eab = E1a + E1b + E2ab \tag{c4}$$

Main current:

$$I0ab = \Sigma Eab/R0ab \tag{c5}$$

Electromagnetic torque applied to the shaft end semi-coupled member rotor of the flywheel a:

$$Me1a = -I0ab \cdot \Sigma \Phi 1a/(2\pi) \tag{c6}$$

Electromagnetic torque applied to the shaft end semi-coupled member rotor of the flywheel b:

$$Me1b = -I0ab \cdot \Sigma \Phi 1b/(2\pi) \tag{c7}$$

Electromagnetic torque applied to the combined semi-coupled member rotor:

$$Me2ab = -I0ab \cdot \Sigma \Phi 2ab/(2\pi) \tag{c8}$$

Neglecting the influences of secondary factors such as temperature and the like, $\Sigma \Phi 1a$, $\Sigma \Phi 1b$ and $\Sigma \Phi 2ab$ can be represented as an absolute value $|I0ab|$ of the main current I0ab and functions which correspond to the semi-coupled member magnet exciting coil during operation and use:

$$\Sigma \Phi 1a = Ff1a(|I0ab|, Ia11, Ia12, \ldots, Ia1m) \tag{c9}$$

$$\Sigma \Phi 1b = Ff1b(|I0ab|, Ib11, Ib12, \ldots, Ib1m) \tag{c10}$$

$$\Sigma \Phi 2ab = Ff2ab(|I0ab|, Iab21, Iab22, \ldots, Iab2m) \tag{c11}$$

Neglecting the influences of secondary factors such as temperature and the like, I0$ab$, Me1$a$, Me1$b$ and Me2$ab$ can be represented as the functions of the following variables during operation and use:

$$I0ab=Fi0ab(\omega 1a,\omega 1b,\omega 2ab,MLS,Ii01,Ii02,\ldots,Ii0m) \quad (c12)$$

$$Me1a=Fm1a(\omega 1a,\omega 1b,\omega 2ab,MLS,Ii01,Ii02,\ldots,Ii0m) \quad (c13)$$

$$Me1b=Fm1b(\omega 1a,\theta 1b,\omega 2ab,MLS,Ii01,Ii02,\ldots,Ii0m) \quad (c14)$$

$$Me2ab=Fm2ab(\omega 1a,\omega 1b,\omega 2ab,MLS,Ii01,Ii02,\ldots,Ii0m) \quad (c15)$$

wherein {Ii01, Ii02, . . . , Ii0$m$} is a collection of {Ia11, Ia12, . . . , Ia1$m$}, {Ib11, Ib12, . . . , Ib1$m$} and {Iab21, Iab22, . . . , Iab2$m$}.

A regulation and control method, with the principle that a sum of the two losses is minimal, for a system formed by the two flywheel shaft end semi-coupled members and one combined semi-coupled member in each of the separated HET two-wheel drive structure and the four-wheel drive structure with transfer is as follows.

The total loss is a sum of a main current Ohm heat (I0$ab$·I0$ab$·R0$ab$) and each magnet exciting current Ohm heat (ΣPoi), wherein R0$ab$ and Ri are constant values. Application limit ranges of the main current and each magnet exciting current are selected. In the ranges, the correspondence relationships that total magnetic fluxes, penetrating through the rotation surfaces of the main current circuits of the rotors, on the three rotors vary along with multidimensional variables of the main current and related magnet exciting current are acquired through calculations or tests respectively, namely:

$$\Sigma\Phi 1a=Ff1a(|I0ab|,Ia11,Ia12,\ldots,Ia1m) \quad (c9)$$

$$\Sigma\Phi 1b=Ff1b(|I0ab|,Ib11,Ib12,\ldots,Ib1m) \quad (c10)$$

$$\Sigma\Phi 2ab=Ff2ab(|I0ab|,Iab21,Iab22,\ldots,Iab2m) \quad (c11)$$

An application range of rotating speeds of three shafts, an application range of an electromagnetic torque (Me2$ab$) of the combined semi-coupled member rotation shaft and an application range of an electromagnetic torque ratio (Me1$a$/Me1$b$) of the two flywheel shaft end semi-coupled member rotation shafts are given; a matrix of optimal values Iiopt of all magnet exciting currents, which covers different rotating speed conditions and torque demands in a full range and satisfies the minimal target of the total loss, is calculated by utilizing the electromagnetic law formulas ((c1)-(c8), wherein R0$ab$ is a constant value) and the multidimensional variable function relationships ((c9)-(c11)); and all the data are stored in the control system.

When regulation is executed, the rotating speeds ($\omega 1a$, $\omega 1b$, $\omega 2ab$) of the three rotors are collected immediately as an input condition; a torque command of the combined semi-coupled member rotation shaft (Me2$ab$ value) and electromagnetic torque ratio value commands (Me1$a$/Me1$b$ values) of the two flywheel shaft end semi-coupled member rotation shafts are given as the input condition; the relevant stored data is invoked from the control system; and the optimal value Iiopt of each corresponding magnet exciting current is calculated for an execution link by adopting a spline interpolation function formula.

Three regulation and control methods, with the principle that a sum of three losses is minimal, adopted to a system formed by the two flywheel shaft end semi-coupled members and one combined semi-coupled member in each of the separated HET two-wheel drive structure and a four-wheel drive structure with transfer os as follows.

The total loss is a sum of main current Ohm heat (I0$ab$·I0$ab$·R0$ab$), each magnet exciting current Ohm heat (ΣPoi) and liquid metal frictional heat of the "connecting region clearance" of the circuit, wherein R0$ab$ is a function of the liquid metal state parameter MLS, and Ri is a constant value. Application limit ranges of the main current and each magnet exciting current are selected. In the ranges, the correspondence relationships that total magnetic fluxes, penetrating through the rotation surfaces of the main current circuits of the rotors, on the three rotors vary along with multidimensional variables of the main current and related magnet exciting current are acquired through calculations or tests, namely:

$$\Sigma\Phi 1a=Ff1a(|I0ab|,Ia11,Ia12,\ldots,Ia1m) \quad (c9)$$

$$\Sigma\Phi 1b=Ff1b(|I0ab|,Ib11,Ib12,\ldots,Ib1m) \quad (c10)$$

$$\Sigma\Phi 2ab=Ff2ab(|I0ab|,Iab21,Iab22,\ldots,Iab2m) \quad (c11)$$

An application range of rotating speeds of three shafts, an application range of an electromagnetic torque (Me2$ab$) of the combined semi-coupled member rotation shaft, an application range of an electromagnetic torque ratio (Me1$a$/Me1$b$) of the two flywheel shaft end semi-coupled member rotation shafts and an application range of the liquid metal state parameter MLS of the "connecting region clearance" of the circuit are given; a matrix of the optimal value Iiopt of all magnet exciting currents and a matrix of the optimal value MLSopt of the liquid metal state parameter, which cover different rotating speed conditions and torque demands in a full range and satisfy the minimal target of the total loss, are calculated by utilizing the electromagnetic law formulas ((c1)-(c8), wherein R0$ab$ is a function of the liquid metal state parameter MLS) and the multidimensional variable function relationships ((c9)-(c11)); and all the data are stored in the control system.

When regulation is executed, the rotating speeds ($\omega 1a$, $\omega 1b$, $\omega 2ab$) of the three rotors are collected immediately as an input condition; a torque command of the combined semi-coupled member rotation shaft (Me2$ab$ value) and electromagnetic torque ratio value commands (Me1$a$/Me1$b$ values) of the semi-coupled member rotation shafts of two flywheel shaft ends are given as the input condition; the relevant stored data is invoked from the control system; and the optimal value Iiopt of each corresponding magnet exciting current and the optimal value MLSopt of the liquid metal state parameter are calculated for an execution link by adopting a spline interpolation function formula.

A vehicle driving seat is provided with a power control unit which includes: a vehicle advancing aheading or reversing setting unit, a drive torque relative value (from zero to maximal value) command control output unit and a vehicle brake command control output unit. A vehicle which has the stepped speed change ratio mechanical transmission device also includes an initial speed ratio gear setting unit and can also include a ratio value setting unit of two HET electromagnetic torques. The ratio value is a distribution ratio of the powers transferred by the two flywheels and HETs thereof. A system which is formed by the two flywheel shaft end semi-coupled members and one combined semi-coupled member refers to an electromagnetic torque ratio value of the two flywheel shaft end semi-coupled member rotation shafts. A system which is formed by two independent HETs refers to a rotation shaft electromagnetic torque ratio value of the two HET output end rotors.

A method for setting the electromagnetic torque ratio value of the two HETs can be executed by a driving seat setting unit in a mode of hand operation, i.e., the electromagnetic torque ratio value of the two HETs is set by a driver control setting unit before vehicle starting or during vehicle sliding; the method can also be automatically executed by the control system, i.e., the control system automatically performs setting before vehicle starting, during vehicle sliding or in non-sliding driving; and the two measures can be simultaneously configured, and setting can be executed by individually using one measure or using the two measures jointly.

Kinetic energy recovery brake and friction brake share one control device of the vehicle brake command control output unit; a brake operation stroke is divided into a front section and a rear section; the front stroke section corresponds to a kinetic energy recovery brake torque relative value from zero to the maximal value; and the back stroke section corresponds to a friction brake torque relative value from zero to the maximal value, and the kinetic energy recovery brake torque with the maximal value is kept at the back stroke section. Kinetic energy recovery brake is that the vehicle kinetic energy is recovered toward the flywheels through HET reverse power flow transfer; and friction brake is that a wheel friction breaking element is adopted to convert the vehicle kinetic energy to heat energy.

An HET regulation control system leads to execute control on a vehicle aheading or reversing drive torque. An aheading or reversing intention is set before starting; a driver controls the drive torque relative value command control output unit to give a drive torque relative value command with a range from zero to the maximal value; and the HET regulation control system commands the HET to output the required aheading forward or reversing backward drive torque according to an electromagnetic torque ratio set value of the two HETs.

The HET regulation control system leads to execute control on a kinetic energy recovery brake torque during vehicle aheading or reversing. An aheading or reversing intention is set before starting; the driver controls the drive brake command control output unit to give a kinetic energy recovery brake torque relative value command with a range from zero to the maximal value; and the HET regulation control system commands the HET to output the required aheading forward or reversing backward drive torque according to the electromagnetic torque ratio set value of the two HETs.

An HET system which is formed by two flywheel shaft end semi-coupled members and one combined semi-coupled member has an HET regulation control system. A system which is formed by two independent HETs has two HET regulation control systems which are logically independent and can share one hardware system.

A vehicle starting program is as follows: the current of each magnet exciting coil of the HET is in a zero value state; the liquid metal of the "connecting region clearance" (5) is in a retracted open circuit state; aheading or reversing and a ratio value of the electromagnetic torques of the two HETs are set; a drive torque command is given; the liquid metal of the "connecting region clearance" is in place; the HET regulation control system controls the output drive torque; and the vehicle is started to drive. For the vehicle equipped with the stepped speed change ratio mechanical transmission device, before the drive torque command is given, an initial speed ratio gear of the vehicle should also be set.

The set initial speed ratio gear can be arbitrary one gear of the stepped speed change ratio mechanical transmission device and includes a minimal transmission speed ratio gear. In a range from zero to the maximal speed of the vehicle driving speed, control is conducted to lower the transmission speed ratio value sequentially from an initial gear value to a minimal transmission speed ratio gear value. When the initial speed ratio gear selects the minimal transmission speed ratio gear, the speed ratio gear is not changed and is equivalent to use of fixed speed ratio transmission.

Gear shifting operation in driving is automatically controlled by the HET regulation control system. If a preset gear shifting speed is reached, control is conducted to reduce the HET output torque to zero (i.e., the magnet exciting current is reduced to zero); an original gear is disengaged; two parts which will be joined by using friction synchronization of a synchronizer engage a new gear; and then the HET outputs the required torque according to the current drive torque command.

(d) Fuel Engine and Flywheel Hybrid Power System for Vehicles Including HET

Except a fuel engine, a vehicle hybrid power system of the present invention mainly consists of a flywheel and a homopolar DC electromagnetic transmission (HET). The flywheel is used as an energy carrier; and the HET is used for transferring the energy in a mode of stepless speed change and torque change and is a control center for operating the direction and the size of an energy flow.

Compared with the existing flywheel hybrid power system, the solution of the present invention is unique in the following ways and makes great progress in performance or functions:

(1) Energy transfer for a drive vehicle and a kinetic energy recovery brake vehicle adopts HET; energy transfer that the fuel engine charges the energy to the flywheel adopts the HET; external small-power slow energy charging to the flywheel adopts external AC rectification and loading of HET rotor which is coaxial with the flywheel; external large-power rapid energy charging to the flywheel adopts a mechanical direct connection loading mode; the loading uses the special HET and a constant-speed synchronous motor in a charging station; and the efficiency of HET energy transfer is very high and can be designed to 96%-98%;

(2) The power density of the HET is very high; the cost is economic; and the HET has great advantages in the aspects of weight, volume and cost compared with the vehicle power transmission system with an equal power;

(3) Heating equipment is not arranged in a vacuum container of the flywheel; main electromagnetic equipment (the HET and an axial permanent magnetic bearing) does not have AC and a pulsating magnetic field; and high-frequency eddy current loss and magnetic hysteresis loss are not generated;

(4) the flywheel body is designed into a multi-body structure in a flexible connection mode, so that the difficulty of vibration of a wheel body of a rigid structure is avoided, and meanwhile, the space effective utilization ratio is also increased, i.e., a wheel body mass block is added;

(5) The flywheel is designed into a vertical shaft type structure; the downward weight of the flywheel is supported by adopting a permanent magnetic bearing; the very small radial load of the flywheel is supported by adopting a mechanical rolling bearing; and a mechanical protective bearing for emergency can be selected if larger gyroscopic moment impact load occurs; and by adopting the solution, the problem brought by fully adopting magnetic suspension bearings is avoided, and bearing friction loss is also maintained at an acceptable lower level.

Compared with the existing chemical battery hybrid power system for vehicles, expect description in the above comparison, the solution of the present invention also has the following remarkable advantages:

(1) During external charging, by adopting the mechanical direct connection loading mode, large-power rapid energy charging to the flywheel is very rapid; the loading power of each flywheel can be greater than 1000 kW; the whole-course loading time can be controlled within 2 mins; and meanwhile, plug-in slow charge can also be selected;

(2) As the HET power density is very high, and each flywheel is hardly limited to power, larger transmission power can be designed to obtain very strong vehicle power performance; and the capability of kinetic energy recovery brake also becomes very strong, and the energy saving effect is greatly improved;

(3) Compared with a typically applied lithium ion battery, a flexible flywheel fiberglass reinforced wheel body is obvious in unit cost advantage and has the competitiveness in market popularization and application;

(4) The service lives of the flywheel and the HET are very long.

The technical solution and the principle of the present invention are described in detail below.

A fuel engine and flywheel hybrid power system capable of being used for cars, buses, freight cars and other vehicles includes an engine used for burning fuel to output shaft work, one or two energy storage flywheel devices, a transmission system which is connected with the engine, the flywheel devices and a drive bridge main reducer, a control system of the engine, the energy storage flywheel devices and the transmission system and the like, wherein core equipment of the transmission system is the homopolar DC electromagnetic transmission (HET).

Each energy storage flywheel device is a vertical shaft type flywheel device which is arranged on a vehicle chassis, and one or two flywheel devices can be adopted. A single-flywheel solution is relatively simple and can be selected under the condition that the flywheel energy storage capacity is smaller and the gyroscopic moment is not large. A double-flywheel solution is relatively complex, can counteract the gyroscopic moment and can be selected under the condition of pursing high stability and high energy storage capacity.

Two flywheels of the double-flywheel solution have identical specification sizes and opposite the rotation directions. The moment directions of a pair of the flywheels with opposite rotation directions are also opposite when the gyroscopic moments are generated; and the gyroscopic moments can be completely counteracted mutually when the rotating speeds of the two flywheels are the same, i.e., the effect on the vehicle is zero on the whole, which only presents that a pair of gyroscopic moments acts on the vehicle chassis.

The vertical shaft type flywheel has four remarkable advantages: firstly, it is beneficial to adopt optimized bearing combination solution; secondly, it is beneficial to adopt the wheel body flexible connection structure; thirdly, it is beneficial for optimal arrangement of a large-diameter flywheel in the vehicle; and fourthly, it is beneficial to reduce the opportunity and the size of the flywheel gyroscopic moment generated in vehicle driving, so that the impact loads of the gyroscopic moment to the flywheel structure, the bearing and the vehicle chassis are lowered.

A loading disc (69) can be mounted at the lower end of a rotation shaft of each flywheel; and when rapid load charging is performed on each flywheel, the loading disc is used for connecting a loading joint of an external loading system and the rotation shaft, and large-power rapid load charging is performed by transmitting mechanical torques to each flywheel rotation shaft. The loading power for each flywheel in such loading mode can reach 1000 kW, and the charging time can be basically equivalent to oil charging of vehicle.

For other explanations of the solution of the vertical shaft type flywheel device structure, see the explanations in the section of "(c) Flywheel Power System for Vehicles Including HET" in the summary of the present invention.

According to a difference between a single flywheel and double flywheels, a difference between a concentrated type HET and a separated HET, a difference between two-wheel drive and four-wheel drive and a difference between direct four-wheel drive and transfer four-wheel drive, the solution of the present invention gives the following 12 subdivided power system compositions:

The general description part of a single flywheel and concentrated type HET structure: one energy storage flywheel device and two concentrated type HETs are adopted; one HET (denoted as HET1) is located at the flywheel end, and an input end rotor of the HET and the flywheel share one rotation shaft; and the other HET (denoted as HET3) is located at the engine end, an input end rotor of the HET is connected with an output shaft of the engine or is connected through a fixed speed ratio mechanical transmission device, and an output end rotor of the HET is connected with an output transmission shaft (denoted as a transmission shaft 3) through a clutch (denoted as a clutch 3);

(1) Single flywheel, concentrated type HET and two-wheel drive structure: description after the "general description part of the single flywheel and the concentrated type HET structure": the upper end of the rotation shaft of the output end rotor of the HET1 is provided with a pair of bevel gears; one bevel gear is directly connected with the rotation shaft, and the other bevel gear is connected with a drive bridge main reducer sequentially through a transmission shaft (denoted as a transmission shaft 1) and a clutch (denoted as a clutch 1); or a fixed speed ratio reducer or stepped speed change ratio reducer is also connected in series between the clutch 1 and the main reducer; or a universal transmission shaft is also added between the clutch 1 and the main reducer; and the transmission shaft 1 is connected with the transmission shaft 3 through a group of gears;

(2) Single flywheel, concentrated type HET and four-wheel drive structure with transfer: description after the "general description part of the single flywheel and the concentrated type HET structure": the upper end of the rotation shaft of the output end rotor of the HET1 is provided with a pair of bevel gears; one bevel gear is directly connected with the rotation shaft, and the other bevel gear is connected with a transfer case or an interaxle differential which is used for distributing the drive force of the front shaft and the back shaft sequentially through a transmission shaft (denoted as a transmission shaft 1) and a clutch (denoted as a clutch 1); or a fixed speed ratio reducer or stepped speed change ratio reducer is also connected in series between the clutch 1 and the transfer case or the interaxle differential, and the transfer case or the interaxle differential is then connected with a front drive bridge main reducer and a back drive bridge main reducer; or a universal transmission shaft is also added between the clutch 1 and the transfer case or the interaxle differential; and the transmission shaft 1 is connected with the transmission shaft 3 through a group of gears;

(3) Single flywheel, concentrated type HET and direct four-wheel drive structure: description after the "general description part of the single flywheel and the concentrated type HET structure": the upper end of the rotation shaft of the output end rotor of the HET1 is provided with a trifurcate bevel gear set which includes one vertical shaft driving bevel gear and two driven bevel gears; the driving bevel gear is directly connected with the rotation shaft; one driven bevel gear is connected with one drive bridge main reducer sequentially through a transmission shaft (denoted as a transmission shaft 1) and a clutch (denoted as a clutch 1), or a fixed speed ratio reducer or stepped speed change ratio reducer is also connected in series between the clutch 1 and the main reducer, or a universal transmission shaft is also added between the clutch 1 and the main reducer; the other driven bevel gear is connected with another drive bridge main reducer sequentially through a transmission shaft (denoted as a transmission shaft 2) and a clutch (denoted as a clutch 2), or a fixed speed ratio reducer or stepped speed change ratio reducer is also connected in series between the clutch 2 and the main reducer, or a universal transmission shaft is also added between the clutch 1 and the main reducer; and the transmission shaft 1 is connected with the transmission shaft 3 through a group of gears;

The general description part of the double flywheel and concentrated type HET structure: two energy storage flywheel devices with opposite rotation directions and three concentrated type HETs are adopted; one HET (denoted as HET1) is located at one flywheel end, the second HET (denoted as HET2) is located at the other flywheel end, and each of input end rotors of the HET1 and HET2 shares one rotation shaft with the corresponding flywheel; and the third HET (denoted as HET3) is located at the engine end, an input end rotor of the HET is connected with an output shaft of the engine or is connected through a fixed speed ratio mechanical transmission device; and an output end rotor is connected with an output transmission shaft (denoted as a transmission shaft 3) through a clutch (denoted as a clutch 3);

(4) Double flywheels, concentrated type HET and two-wheel drive structure: description after the "general description part of the double flywheels and concentrated type HET structure": the upper end of the rotation shaft of the output end rotor of the HET1 is provided with a trifurcate bevel gear set (including one vertical shaft driving bevel gear and two driven bevel gears), wherein the driving bevel gear is directly connected with the rotation shaft; the upper end of the rotation shaft of the output end rotor of the HET2 is provided with a pair of bevel gears; one bevel gear is directly connected with the rotation shaft, and the other bevel gear is connected with one driven bevel gear of the trifurcate bevel gear set through a universal transmission shaft; the other driven bevel gear of the trifurcate bevel gear set is connected with a drive bridge main reducer sequentially through a transmission shaft (denoted as a transmission shaft 1) and a clutch (denoted as a clutch 1), or a fixed speed ratio reducer or stepped speed change ratio reducer is also connected in series between the clutch 1 and the main reducer, or a universal transmission shaft is also added between the clutch 1 and the main reducer; and the transmission shaft 1 is connected with the transmission shaft 3 through a group of gears;

(5) Double flywheels, concentrated type HET and four-wheel drive structure with transfer: description after the "general description part of the double flywheels and concentrated type HET structure": the upper end of the rotation shaft of the output end rotor of the HET1 is provided with a trifurcate bevel gear set (including one vertical shaft driving bevel gear and two driven bevel gears), wherein the driving bevel gear is directly connected with the rotation shaft; the upper end of the rotation shaft of the output end rotor of the HET2 is provided with a pair of bevel gears; one bevel gear is directly connected with the rotation shaft, and the other bevel gear is connected with a driven bevel gear of the trifurcate bevel gear set through a universal transmission shaft; the other driven bevel gear of the trifurcate bevel gear set is connected with a transfer case or an interaxle differential which is used for distributing the drive force of the front shaft and the back shaft sequentially through a transmission shaft (denoted as a transmission shaft 1) and a clutch (denoted as a clutch 1); or a fixed speed ratio reducer or stepped speed change ratio reducer is also connected in series between the clutch 1 and the transfer case or the interaxle differential, and the transfer case or the interaxle differential is then connected with a front drive bridge main reducer and a back drive bridge main reducer; or a universal transmission shaft is also added between the clutch 1 and the transfer case or the interaxle differential; and the transmission shaft 1 is connected with the transmission shaft 3 through a group of gears;

(6) Double flywheels, concentrated type HET and direct four-wheel drive structure: description after the "general description part of the double flywheels and concentrated type HET structure": each of the upper ends of the rotation shafts of the output end rotors of the HET1 and the HET2 is provided with a trifurcate bevel gear set (including one vertical shaft driving bevel gear and two driven bevel gears); the two driving bevel gears are directly connected with the two rotation shafts respectively; one of the driven bevel gears of the HET1 and the HET2 is connected with each other through a universal transmission shaft; the other driven bevel gear on the HET1 is connected with one drive bridge main reducer sequentially through a transmission shaft (denoted as a transmission shaft 1) and a clutch (denoted as a clutch 1), or a fixed speed ratio reducer or stepped speed change ratio reducer is also connected in series between the clutch 1 and the main reducer, or a universal transmission shaft is also added between the clutch 1 and the main reducer; the other driven bevel gear on the HET2 is connected with another drive bridge main reducer sequentially through a transmission shaft (denoted as a transmission shaft 2), an interaxle differential and a clutch (denoted as a clutch 2), or a fixed speed ratio reducer or stepped speed change ratio reducer is also connected in series between the clutch 2 and the main reducer, or a universal transmission shaft is also added between the clutch 1 and the main reducer; and the transmission shaft 1 is connected with the transmission shaft 3 through a group of gears;

(7) Single flywheel, separated HET and two-wheel drive structure: one energy storage flywheel device and one semi-separated HET (including three HET semi-coupled members) are adopted; the first semi-coupled member (denoted as a HETh11) shares one rotation shaft with the flywheel; a rotation shaft of the second semi-coupled member (denoted as a HETh12) is connected with a drive bridge main reducer or is connected with the drive bridge main reducer through a fixed speed ratio reducer or stepped speed change ratio reducer, or a universal transmission shaft is also added; a rotation shaft of the third semi-coupled member (denoted as a HETh13) is connected with an output shaft of an engine or is connected with the output shaft of the engine through a fixed speed ratio mechanical transmission device; main circuits of the three HET semi-coupled members are connected in series with an external connection conductor through external terminals (16) respectively to form a main current closed circuit; and during design, designed maximal electromotive forces of the HETh11 and HETh12 can be selected to be mutually counteracted;

(8) Single flywheel, separated HET and four-wheel drive with transfer structure: one energy storage flywheel device and one semi-separated HET (including three HET semi-coupled members) are adopted; the first semi-coupled member (denoted as a HETh11) shares one rotation shaft with the flywheel; a rotation shaft of the second semi-coupled member (denoted as a HETh12) is connected with a transfer case or an interaxle differential which is used for distributing the drive force of the front shaft and the back shaft or is connected with the transfer case or the interaxle differential through a fixed speed ratio reducer or stepped speed change ratio reducer, and the transfer case or the interaxle differential is then connected with a front drive bridge main reducer and a back drive bridge main reducer; or a universal transmission shaft is also added; a rotation shaft of the third semi-coupled member (denoted as a HETh13) is connected with an output shaft of an engine or is connected with the output shaft of the engine through a fixed speed ratio mechanical transmission device; main circuits of the three HET semi-coupled members are connected in series with an external connection conductor through external terminals (16) respectively to form a main current closed circuit; and during design, designed maximal electromotive forces of the HETh11 and HETh12 can be selected to be mutually counteracted;

(9) Single flywheel, separated HET and direct four-wheel drive structure: one energy storage flywheel device and two separated HETs (including four HET semi-coupled members) are adopted; the first semi-coupled member (denoted as a HETh11) shares one rotation shaft with the flywheel; a rotation shaft of the second semi-coupled member (denoted as a HETh12) is connected with a drive bridge main reducer or is connected with the drive bridge main reducer through a fixed speed ratio reducer or stepped speed change ratio reducer, or a universal transmission shaft is also added; a rotation shaft of the third semi-coupled member (denoted as a HETh22) is connected with another drive bridge main reducer or is connected with the drive bridge main reducer through a fixed speed ratio reducer or stepped speed change ratio reducer, or a universal transmission shaft is also added; a rotation shaft of the fourth semi-coupled member (denoted as a HETh3) is connected with an output shaft of an engine or is connected with the output shaft of the engine through a fixed speed ratio mechanical transmission device; and main circuits of the four HET semi-coupled members are connected in series with an external connection conductor through external terminals (16) respectively to form a main current closed circuit. During design, designed maximal electromotive force of the HETh11 on the flywheel side can be selected to counteract a sum of the designed maximal electromotive forces of the HETh12 and HETh22 on two wheel sides; and generally, the designed maximal electromotive forces of the HETh12 and HETh22 on the two wheel sides are identical, and the designed maximal rotating speeds are also identical;

(10) Double flywheels, separated HET and two-wheel drive structure: two energy storage flywheel devices with opposite rotation directions and two separated HETs (including four HET semi-coupled members) are adopted; the first semi-coupled member (denoted as a HETh11) shares one rotation shaft with the flywheel; the second semi-coupled member (denoted as a HETh21) shares one rotation shaft with the other flywheel; a rotation shaft of the third semi-coupled member (denoted as a HETh12) is connected with a drive bridge main reducer or is connected with the drive bridge main reducer through a fixed speed ratio reducer or stepped speed change ratio reducer, or a universal transmission shaft is also added; a rotation shaft of the fourth semi-coupled member (denoted as a HETh3) is connected with an output shaft of an engine or is connected with the output shaft of the engine through a fixed speed ratio mechanical transmission device; and main circuits of the four HET semi-coupled members are connected in series with an external connection conductor through external terminals (16) respectively to form a main current closed circuit. During design, designed maximal electromotive force of the HETh12 on the flywheel side can be selected to counteract a sum of the design maximal electromotive forces of the HETh11 and HETh21 on the two wheel sides; and generally, the designed maximal electromotive forces of the HETh11 and HETh21 on the two wheel sides are identical, and the designed maximal rotating speeds are also identical;

(11) Double flywheels, separated HET and four-wheel drive structure with transfer: two energy storage flywheel devices with opposite rotation directions and two separated HETs (including four HET semi-coupled members) are adopted; the first semi-coupled member (denoted as a HETh11) shares one rotation shaft with the flywheel; the second semi-coupled member (denoted as a HETh21) shares one rotation shaft with the other flywheel; a rotation shaft of the third semi-coupled member (denoted as a HETh12) is connected with a transfer case or an interaxle differential which is used for distributing the drive force of the front shaft and the back shaft or is connected with the transfer case or the interaxle differential through a fixed speed ratio reducer or stepped speed change ratio reducer, the transfer case or the interaxle differential is then connected with a front drive bridge main reducer and a back drive bridge main reducer, or a universal transmission shaft is also added; a rotation shaft of the fourth semi-coupled member (denoted as a HETh3) is connected with an output shaft of an engine or is connected with the output shaft of the engine through a fixed speed ratio mechanical transmission device; and main circuits of the four HET semi-coupled members are connected in series with an external connection conductor through external terminals (16) respectively to form a main current closed circuit. During design, the designed maximal electromotive force of the HETh12 on the flywheel side can be selected to counteract a sum of the design maximal electromotive forces of the HETh11 and HETh21 on the two wheel sides; and generally, the design maximal electromotive forces of the HETh11 and HETh21 on the two wheel sides are identical, and the designed maximal rotating speeds are also identical;

(12) Double flywheels, separated HET and direct four-wheel drive structure: two energy storage flywheel devices with opposite rotation directions and two semi-separated HETs (including five HET semi-coupled members) are adopted; the first semi-coupled member (denoted as a HETh11) shares one rotation shaft with the flywheel; the second semi-coupled member (denoted as a HETh21) shares one rotation shaft with the other flywheel; a rotation shaft of the third semi-coupled member (denoted as a HETh12) is connected with a drive bridge main reducer or is connected with the drive bridge main reducer through a fixed speed ratio reducer or stepped speed change ratio reducer, or a universal transmission shaft is also added; a rotation shaft of the fourth semi-coupled member (denoted as a HETh22) is connected with another drive bridge main reducer or is connected with the drive bridge main reducer through a fixed speed ratio reducer or stepped speed change ratio reducer, or a universal transmission shaft is also added; a rotation shaft of the fifth semi-coupled member (denoted as a HETh3) is connected with an output shaft of an engine or is connected with the output shaft of the engine through a fixed speed ratio mechanical transmission device; and main circuits of the five HET semi-coupled members are connected in series with an external connection conductor through external terminals (16) respectively to form a main current closed circuit. During design, a sum of the designed maximal electromotive forces of the HETh12 and the HETh22 on the two flywheel sides can be selected to counteract a sum of the designed maximal electromotive forces of the HETh11 and HETh21 on the two wheel sides; generally, the designed maximal electromotive forces of the HETh12 and HETh22 on the two wheel sides are identical, and the designed maximal rotating speeds are also identical; and generally, the designed maximal electromotive forces of the HETh11 and HETh21 on the two wheel sides are identical, and the designed maximal rotating speeds are also identical.

A fixed-speed-ratio reducer or mechanical transmission device includes forms of a gear transmission device, a belt transmission device, a chain transmission device, a worm transmission device and the like. The gear transmission device is generally used herein.

The above-mentioned "input shaft" and "output shaft" refer to defined names when the vehicle is driven to move, and the functions of the shafts are exchanged when power flows are in opposite directions.

When the vehicle is not driven, the external power supply can be used for performing plug-in charging or unloading on each flywheel, and the engine can be used for charging each flywheel.

When the vehicle is driven, each flywheel and the engine have the following five power flow state combinations: each flywheel drives the vehicle (advancing or reversing); the engine drives vehicle (advancing or reversing) and charges each flywheel at the same time; the engine and each flywheel drive the vehicle at the same time (advancing or reversing); each flywheel brakes the vehicle (advancing or reversing); and each flywheel brakes the vehicle (advancing or reversing), and meanwhile, the engine charges each flywheel.

For the subdivision structures described in (1), (2), (4) and (5), during drive or kinetic energy recovery brake of the vehicle, the clutch 1 is engaged; when the engine is operated, the clutch 3 is engaged; when the engine is not operated, the clutch 3 is disengaged; when plug-in charging or unloading is performed on each flywheel, the vehicle is braked by a hand brake, the clutch 1 is engaged, and the clutch 3 is disengaged; and when the engine loads each flywheel in a state of parking, the vehicle is braked by the hand brake, the clutch 1 is disengaged, and the clutch 3 is engaged.

For the subdivision structures described in (3) and (6), during drive or kinetic energy recovery brake of the vehicle, the clutch 1 and the clutch 2 are engaged; when the engine is operated, the clutch 3 is engaged; when the engine is not operated, the clutch 3 is disengaged; when plug-in charging or unloading is performed on each flywheel, the vehicle is braked by the hand brake, the clutch 1 and the clutch 2 are engaged, and the clutch 3 is disengaged; and when the engine loads each flywheel in a state of parking, the vehicle is braked by the hand brake, the clutch 1 and the clutch 2 are disengaged, and the clutch 3 is engaged.

For the subdivision structures described from (7) to (12), when plug-in charging or unloading is performed on each flywheel, a circuit "connecting region clearance" (5) of a semi-coupled member at the flywheel end is connected, circuit "connecting region clearances" (5) of other semi-coupled members and magnet exciting current circuits are disconnected, and the external power supply is connected; and when the engine loads each flywheel in the state of parking, the vehicle is braked by the hand brake, the external power supply is disconnected, the circuit "connecting region clearances" (5) of all the semi-coupled members are connected, and the magnet exciting current circuits of other semi-coupled members, except the semi-coupled member at the flywheel end and the semi-coupled member on the engine side, are disconnected.

The external power supply which is used for plug-in charging or unloading on each flywheel is pressure-adjustable DC power supply equipment which is connected with the alternating current of a power grid, and the equipment can be arranged in the vehicle or at a plug-in place.

For the concentrated type HET, each HET can be provided with two columns of external DC power supply terminals (16) (FIG. 2, FIG. 3, FIG. 22) connected with a main current circuit which includes the rotor magnetic and electric conductors and provided with a liquid metal transfer switch (15) used for evacuating liquid and disconnecting the original main current circuit before the external power supply is connected to realize (respectively) plug-in charging or unloading to each flywheel. When plug-in charging is performed, and the vehicle is braked by the hand brake, the liquid metal transfer switch (15) is disconnected, and the "connecting region clearance" (5) of each circuit is connected; a related magnet exciting coil which enables the magnetic flux of the rotor at the HET flywheel end to reach a maximal value is connected, and the maximal magnet exciting current is always maintained; the DC power supply voltage is regulated to be equal to the electromotive force of the HET flywheel end rotor, and the direction of the DC power supply voltage is opposite to that of the electromotive force; the main current circuit is connected with the DC power supply, and the DC power supply voltage is increased to reach a rated limit of the plug-in main current or a rated limit of the plug-in power; in the flywheel charging and accelerating process, the DC power supply voltage is continuously increased; the plug-in main current and/or the plug-in power with the rated limits are kept; current limit is at front, and power limit is at rear; and the power limit is provided only if the starting point of the rotating speed of the flywheel is higher; and when charging is finished, the DC power supply voltage is decreased firstly until zero current is obtained; the main current circuit is disconnected with the DC power supply; and HET magnet excitation is cancelled. When plug-in unloading is performed, the prepared programs are the same as above, the current directions are opposite, and the operation programs are opposite, i.e., the DC power supply voltage is decreased until the rated limit of the plug-in unloading power or the rated limit of the plug-in unloading main current is reached. Such plug-in charging or unloading is suitable for the small-power application situation, for example home power supplies, community power supplies, slow charging and slow discharging.

For a separated HET, a wire which is connected with the external DC power supply can be connected in parallel to an external connection conductor of an HET semi-coupled member at each flywheel shaft end for realizing (respectively) plug-in charging or unloading of each flywheel. When plug-in charging is performed, a circuit "connecting region clearance" (5) of an HET semi-coupled member at each non-flywheel shaft end is disconnected, and a circuit "connecting region clearance" (5) of the HET semi-coupled member at each flywheel shaft end is connected; a related magnet exciting coil which enables the magnetic flux of the rotor at the HET flywheel end to reach a maximal value is connected, and the maximal magnet exciting current is always maintained; the DC power supply voltage is regulated to be equal to the electromotive force of the HET flywheel end rotor, and the direction of the direct-current power supply voltage is opposite to that of the electromotive force; the main current circuit is connected with the DC power supply, and the DC power supply voltage is increased to reach a rated limit of the plug-in main current or a rated limit of the plug-in power; in the flywheel charging and accelerating process, the DC power supply voltage is continuously increased; the plug-in main current and/or the plug-in power with the rating limits are kept; current limit is at front, and power limit is at rear; and the power limit is provided only if the starting point of the rotating speed of the flywheel is higher; and when charging is finished, the DC power supply voltage is decreased firstly until zero current is obtained, the main current circuit is disconnected with the DC power supply, and HET magnet excitation is cancelled. When plug-in unloading is performed, the prepared programs are the same as above, the current directions are opposite, and the operation programs are opposite, i.e., the DC power supply voltage is decreased until the rated limit of the plug-in unloading power or the rated limit of the plug-in unloading main current is reached. Such plug-in charging or unloading is suitable for the small-power application situation.

A second kind of regulation and control method for the HET above can be adopted for each concentrated type HET in the subdivision structures from (1) to (6).

Electromagnetic law formulas of the main current circuit formed by serial connection of three, four or five HET semi-coupled members have the following forms (for three or four HET semi-coupled members, part of the formulas are suitable):

Electromotive force of a semi-coupled member rotor at the flywheel 1 end:

$$Eh11 = \omega h11 \cdot \Sigma \Phi h11/(2\pi) \tag{d1}$$

Electromotive force of a semi-coupled member rotor at the flywheel 2 end:

$$Eh21 = \omega h21 \cdot \Sigma \Phi h21/(2\pi) \tag{d2}$$

Electromotive force of a semi-coupled member rotor on the wheel 1 end:

$$Eh12 = \omega h12 \cdot \Sigma \Phi h12/(2\pi) \tag{d3}$$

Electromotive force of a semi-coupled member rotor on the wheel 2 end:

$$Eh22 = \omega h22 \cdot \Sigma \Phi h22/(2\pi) \tag{d4}$$

Electromotive force of a semi-coupled member rotor on the engine end:

$$Eh3 = \omega h3 \cdot \Sigma \Phi h3/(2\pi) \tag{d5}$$

A sum of electromotive forces of the main current circuits of the subdivision structures described in (7) and (8):

$$\Sigma E = Eh11 + Eh12 + Eh3 \tag{d6}$$

A sum of electromotive forces of the main current circuits of the subdivision structure described in (9):

$$\Sigma E = Eh11 + Eh12 + Eh22 + Eh3 \tag{d7}$$

A sum of electromotive forces of the main current circuits of the subdivision structures described in (10) and (11):

$$\Sigma E = Eh11 + Eh21 + Eh12 + Eh3 \tag{d8}$$

A sum of electromotive forces of the main current circuits of the subdivision structure described in (12):

$$\Sigma E = Eh11 + Eh21 + Eh12 + Eh22 + Eh3 \tag{d9}$$

Main current:

$$I0 = \Sigma E / R0 \tag{d10}$$

Electromagnetic torque applied to the semi-coupled member rotor at the flywheel 1 end:

$$Mhe11 = -I0 \cdot \Sigma \Phi h11/(2\pi) \tag{d11}$$

Electromagnetic torque applied to the semi-coupled member rotor at the flywheel 2 end:

$$Mhe21 = -I0 \cdot \Sigma \Phi h21/(2\pi) \tag{d12}$$

Electromagnetic torque applied to the semi-coupled member rotor on the wheel 1 side:

$$Mhe12 = -I0 \cdot \Sigma \Phi h12/(2\pi) \tag{d13}$$

Electromagnetic torque applied to the semi-coupled member rotor on the wheel 2 side:

$$Mhe22 = -I0 \cdot \Sigma \Phi h22/(2\pi) \tag{d14}$$

Electromagnetic torque applied to the semi-coupled member rotor on the engine side:

$$Mhe3 = -I0 \cdot \Sigma \Phi h3/(2\pi) \tag{d15}$$

Neglecting the influences of secondary factors such as temperature and the like, $\Sigma \Phi h11$, $\Sigma \Phi h21$, $\Sigma \Phi h12$, $\Sigma \Phi h22$ and $\Sigma \Phi h3$ can be represented by an absolute value $|I0|$ of the main current $I0$ and functions which correspond to the semi-coupled member magnet exciting coil during operation and use:

$$\Sigma \Phi h11 = Ffh11(|I0|, Ih111, Ih112, \ldots, Ih11m) \tag{d16}$$

$$\Sigma \Phi h21 = Ffh21(|I0|, Ih211, Ih212, \ldots, Ih21m) \tag{d17}$$

$$\Sigma \Phi h12 = Ffh12(|I0|, Ih121, Ih122, \ldots, Ih12m) \tag{d18}$$

$$\Sigma \Phi h22 = Ffh22(|I0|, Ih221, Ih222, \ldots, Ih22m) \tag{d19}$$

$$\Sigma \Phi h3 = Ffh3(|I0|, Ih31, Ih32, \ldots, Ih3m) \tag{d20}$$

A regulation and control method, with the principle that a sum of the two losses are minimal, adopted for a series system of three semi-coupled members of the subdivision structures described in (7) and (8) is as follows:

The total loss is a sum of a main current Ohm heat ($I0 \cdot I0 \cdot R0$) and each magnet exciting current Ohm heat ($\Sigma Poi$), wherein $R0$ and $Ri$ are constant values. Application limit ranges of the main current and each magnet exciting current are selected. In the ranges, the corresponding relationships that total magnetic fluxes, penetrating through the rotation surfaces of the main current circuits of the rotors, on the three rotors vary along with multidimensional variables of the main current and related magnet exciting current are calculated or tested respectively, namely:

$$\Sigma \Phi h11 = Ffh11(|I0|, Ih111, Ih112, \ldots, Ih11m) \tag{d16}$$

$$\Sigma \Phi h12 = Ffh12(|I0|, Ih121, Ih122, \ldots, Ih12m) \tag{d18}$$

$$\Sigma \Phi h3 = Ffh3(|I0|, Ih31, Ih32, \ldots, Ih3m) \tag{d20}$$

An application range of rotating speeds of three shafts, an application range of Mhe12 and an application range of Mhe3 or Mhe11 are given. A matrix of optimal values Iiopt of all magnet exciting currents, which covers different rotating speed conditions and torque demands in a full range and satisfies the minimal target of the total loss, is calculated by utilizing the electromagnetic law formulas ((d1), (d3), (d5), (d6), (d10), (d13), (d15) or (d11), wherein R0 is a constant value) and the multidimensional variable function relationships ((d16), (d18) and (d20)), and all the data are stored in the control system.

When regulation is executed, the rotating speeds ($\omega h1$, $\omega h12$, $\omega h3$) of the three rotors are collected immediately as input conditions, a required torque Mhe12, Mhe3 or Mhe11 command is given as the input condition, the relevant stored data is invoked from the control system, and each corresponding magnet exciting current optimal value Iiopt is calculated for an execution link by adopting a spline interpolation function formula.

Three regulation and control methods, with the principle of a minimal loss sum, adopted for a serial system of three HET semi-coupled members of the subdivision structures described in (7) and (8) are as follows:

The total loss is a sum of a main current Ohm heat (I0·I0·R0), each magnet exciting current Ohm heat ($\Sigma$Poi) and liquid metal frictional heat of the "connecting region clearance" of the circuit, wherein R0 is a function of the liquid metal state parameter MLS, and Ri is a constant value. Application limit ranges of the main current and each magnet exciting current are selected. In the ranges, the corresponding relationships that total magnetic fluxes, penetrating through the rotation surfaces of the main current circuits of the rotors, on the three rotors vary along with multidimensional variables of the main current and related magnet exciting current are calculated or tested respectively, namely:

$$\Sigma\Phi h11 = F f h11(|I0|, Ih111, Ih112, \ldots, Ih11m) \qquad (d16)$$

$$\Sigma\Phi h12 = F f h12(|I0|, Ih121, Ih122, \ldots, Ih12m) \qquad (d18)$$

$$\Sigma\Phi h3 = F f h3(|I0|, Ih31, Ih32, \ldots, Ih3m) \qquad (d20)$$

An application range of rotating speeds of three shafts, an application range of Mhe12, an application range of Mhe3 or Mhe11 and an application range of the liquid metal state parameter MLS of the "connecting region clearance" of the circuit are given; a matrix of optimal values Iiopt of all magnet exciting currents and optimal values MLSopt of the liquid metal state parameter, which covers different rotating speed conditions and torque demands in a full range and satisfies the minimal target of the total loss, is calculated by utilizing the electromagnetic law formulas ((d1), (d3), (d5), (d6), (d10), (d13), (d15) or (d11), wherein R0 is a function of the liquid metal state parameter MLS) and the multidimensional variable function relationships ((d16), (d18), (d20)), and all the data are stored in the control system.

When regulation is executed, the rotating speeds ($\omega h11$, $\omega h12$, $\omega h3$) of the three rotors are collected immediately as input conditions, a required torque Mhe12, Mhe3 or Mhe11 command is given as the input condition, the relevant stored data is invoked from the control system, and the optimal value Iiopt of each corresponding magnet exciting current and the optimal value MLSopt of the liquid metal state parameter are calculated for an execution link by adopting a spline interpolation function formula.

Two regulation and control methods, with the principle of a minimal loss sum, adopted for a serial system of four HET semi-coupled members of the subdivision structure described in (9) are as follows:

The total loss is a sum of a main current Ohm heat (I0·I0·R0) and each magnet exciting current Ohm heat ($\Sigma$Poi), wherein R0 and Ri are constant values. Application limit ranges of the main current and each magnet exciting current are selected. In the ranges, the corresponding relationships that total magnetic fluxes, penetrating through the rotation surfaces of the main current circuits of the rotors, on the four rotors vary along with multidimensional variables of the main current and related magnet exciting current are calculated or tested respectively, namely:

$$\Sigma\Phi h11 = F f h11(|I0|, Ih111, Ih112, \ldots, Ih11m) \qquad (d16)$$

$$\Sigma\Phi h12 = F f h12(|I0|, Ih121, Ih122, \ldots, Ih12m) \qquad (d18)$$

$$\Sigma\Phi h22 = F f h22(|I0|, Ih221, Ih222, \ldots, Ih22m) \qquad (d19)$$

$$\Sigma\Phi h3 = F f h3(|I0|, Ih31, Ih32, \ldots, Ih3m) \qquad (d20)$$

An application range of rotating speeds of four shafts, an application range of Mhe12 and Mhe22 and an application range of Mhe3 or Mhe11 are given; a matrix of optimal values Iiopt of all magnet exciting currents, which covers different rotating speed conditions and torque demands in a full range and satisfies the minimal target of the total loss, is calculated by utilizing the electromagnetic law formulas ((d1), (d3), (d4), (d5), (d7), (d10), (d13), (d14), (d15) or (d11), wherein R0 is a constant value) and the multidimensional variable function relationships ((d16), (d18), (d19), (d20)), and all the data are stored in the control system.

When regulation is executed, the rotating speeds ($\omega h11$, $\omega h12$, $\omega h22$, $\omega h3$) of the four rotors are collected immediately as input conditions, a required torque Mhe12, Mhe22, Mhe3 or Mhe11 command is given as the input condition, the relevant stored data is invoked from the control system, and the optimal value Iiopt of each corresponding magnet exciting current is calculated for an execution link by adopting a spline interpolation function formula.

Three regulation and control methods, with the principle of a minimal loss sum, adopted for a serial system of four HET semi-coupled members of the subdivision structure described in (9) are as follows:

The total loss is a sum of a main current Ohm heat (I0·I0·R0), each magnet exciting current Ohm heat ($\Sigma$Poi) and liquid metal frictional heat of the "connecting region clearance" of the circuit, wherein R0 is a function of the liquid metal state parameter MLS, and Ri is a constant value. Application limit ranges of the main current and each magnet exciting current are selected. In the ranges, the corresponding relationships that total magnetic fluxes, penetrating through the rotation surfaces of the main current circuits of the rotors, on the four rotors vary along with multidimensional variables of the main current and related magnet exciting current are calculated or tested respectively, namely:

$$\Sigma\Phi h11 = F f h11(|I0|, Ih111, Ih112, \ldots, Ih11m) \qquad (d16)$$

$$\Sigma\Phi h12 = F f h12(|I0|, Ih121, Ih122, \ldots, Ih12m) \qquad (d18)$$

$$\Sigma\Phi h22 = F f h22(|I0|, Ih221, Ih222, \ldots, Ih22m) \qquad (d19)$$

$$\Sigma\Phi h3 = F f h3(|I0|, Ih31, Ih32, \ldots, Ih3m) \qquad (d20)$$

An application range of rotating speeds of four shafts, an application range of Mhe12 and Mhe22, an application range of Mhe3 or Mhe11 and an application range of the liquid metal state parameter MLS of the "connecting region clearance" of the circuit are given; a matrix of optimal values Iiopt of all magnet exciting currents and optimal values MLSopt of the liquid metal state parameter, which covers different rotating speed conditions and torque demands in a full range and satisfies the minimal target of the total loss, is calculated by utilizing the electromagnetic law formulas ((d1), (d3), (d4), (d5), (d7), (d10), (d13), (d14), (d15) or (d11), wherein R0 is a function of the liquid metal state parameter MLS) and the multidimensional variable function relationships ((d16), (d18), (d19), (d20)), and all the data are stored in the control system.

When regulation is executed, the rotating speeds ($\omega h11$, $\omega h12$, $\omega h22$, $\omega h3$) of the four rotors are collected immediately as input conditions, a required torque Mhe12, Mhe22, Mhe3 or Mhe11 command is given as the input condition, the relevant stored data is invoked from the control system, and the optimal value Iiopt of each corresponding magnet exciting current and the optimal value MLSopt of the liquid metal state parameter are calculated for an execution link by adopting a spline interpolation function formula.

Two regulation and control methods, with the principle of a minimal loss sum, adopted for a serial system of four HET semi-coupled members of the subdivision structures in (10) and (11) are as follows:

The total loss is a sum of a main current Ohm heat (I0·I0·R0) and each magnet exciting current Ohm heat ($\Sigma$Poi), wherein R0 and Ri are constant values. Application limit ranges of the main current and each magnet exciting current are selected. In the ranges, the corresponding relationships that total magnetic fluxes, penetrating through the rotation surfaces of the main current circuits of the rotors, on the four rotors vary along with multidimensional variables of the main current and related magnet exciting current are calculated or tested respectively, namely:

$$\Sigma \Phi h11 = F f h11(|I0|, Ih111, Ih112, \ldots, Ih11m) \tag{d16}$$

$$\Sigma \Phi h21 = F f h21(|I0|, Ih211, Ih212, \ldots, Ih21m) \tag{d17}$$

$$\Sigma \Phi h12 = F f h12(|I0|, Ih121, Ih122, \ldots, Ih12m) \tag{d18}$$

$$\Sigma \Phi h3 = F f h3(|I0|, Ih31, Ih32, \ldots, Ih3m) \tag{d20}$$

An application range of rotating speeds of four shafts, an application range of Mhe12, an application range of Mhe3 or Mhe11 and an application range of Mhe11/Mhe21 are given; a matrix of optimal values Iiopt of all magnet exciting currents, which covers different rotating speed conditions and torque demands in a full range and satisfies the minimal target of the total loss, is calculated by utilizing the electromagnetic law formulas ((d1), (d2), (d3), (d5), (d8), (d10), (d12), (d13), (d15) or (d11), wherein R0 is a constant value) and the multidimensional variable function relationships ((d16), (d17), (d18), (d20)), and all the data are stored in the control system.

When regulation is executed, the rotating speeds ($\omega h11$, $\omega h21$, $\omega h12$, $\omega h3$) of the four rotors are collected immediately as input conditions, a required torque Mhe12, Mhe3 or Mhe11 and Mhe11/Mhe21 command is given as the input condition, the relevant stored data is invoked from the control system, and the optimal value Iiopt of each corresponding magnet exciting current is calculated for an execution link by adopting a spline interpolation function formula.

Three regulation and control methods, with the principle of a minimal loss sum, adopted for a serial system of four HET semi-coupled members of the subdivision structures described in (10) and (11) are as follows:

The total loss is a sum of a main current Ohm heat (I0·I0·R0), each magnet exciting current Ohm heat ($\Sigma$Poi) and liquid metal frictional heat of the "connecting region clearance" of the circuit, wherein R0 is a function of the liquid metal state parameter MLS, and Ri is a constant value. Application limit ranges of the main current and each magnet exciting current are selected. In the ranges, the corresponding relationships that total magnetic fluxes, penetrating through the rotation surfaces of the main current circuits of the rotors, on the four rotors vary along with multidimensional variables of the main current and related magnet exciting current are calculated or tested respectively, namely:

$$\Sigma \Phi h11 = F f h11(|I0|, Ih111, Ih112, \ldots, Ih11m) \tag{d16}$$

$$\Sigma \Phi h21 = F f h21(|I0|, Ih211, Ih212, \ldots, Ih21m) \tag{d17}$$

$$\Sigma \Phi h12 = F f h12(|I0|, Ih121, Ih122, \ldots, Ih12m) \tag{d18}$$

$$\Sigma \Phi h3 = F f h3(|I0|, Ih31, Ih32, \ldots, Ih3m) \tag{d20}$$

An application range of rotating speeds of four shafts, an application range of Mhe12, an application range of Mhe3 or Mhe11, an application range of Mhe11/Mhe21 and an application range of the liquid metal state parameter MLS of the "connecting region clearance" of the circuit are given; a matrix of optimal values Iiopt of all magnet exciting currents and optimal values MLSopt of the liquid metal state parameter, which covers different rotating speed conditions and torque demands in a full range and satisfies the minimal target of the total loss, is calculated by utilizing the electromagnetic law formulas ((d1), (d2), (d3), (d5), (d8), (d10), (d12), (d13), (d15) or (d11), wherein R0 is a function of the liquid metal state parameter MLS) and the multidimensional variable function relationships ((d16), (d17), (d18), (d20)), and all the data are stored in the control system.

When regulation is executed, the rotating speeds ($\omega h11$, $\omega h21$, $\omega h12$, $\omega h3$) of the four rotors are collected immediately as input conditions, a required torque Mhe12, Mhe3 or Mhe11 and Mhe11/Mhe21 command is given as the input condition, the relevant stored data is invoked from the control system, and the optimal value Iiopt of each corresponding magnet exciting current and the optimal value MLSopt of the liquid metal state parameter are calculated for an execution link by adopting a spline interpolation function formula.

Two regulation and control methods, with the principle of a minimal loss sum, which are adopted to a serial system of five HET semi-coupled members of the subdivision structure described in (12) are as follows:

The total loss is a sum of a main current Ohm heat (I0·I0·R0) and each magnet exciting current Ohm heat ($\Sigma$Poi), wherein R0 and Ri are constant values. Application limit ranges of the main current and each magnet exciting current are selected. In the ranges, the corresponding relationships that total magnetic fluxes, penetrating through the rotation surfaces of the main current circuits of the rotors, on the five rotors vary along with multidimensional variables of the main current and related magnet exciting current are calculated or tested respectively, namely:

$$\Sigma \Phi h11 = F f h11(|I0|, Ih111, Ih112, \ldots, Ih11m) \tag{d16}$$

$$\Sigma \Phi h21 = F f h21(|I0|, Ih211, Ih212, \ldots, Ih21m) \tag{d17}$$

$$\Sigma \Phi h12 = F f h12(|I0|, Ih121, Ih122, \ldots, Ih12m) \tag{d18}$$

$$\Sigma \Phi h22 = F f h22(|I0|, Ih221, Ih222, \ldots, Ih22m) \tag{d19}$$

$$\Sigma \Phi h3 = F f h3(|I0|, Ih31, Ih32, \ldots, Ih3m) \tag{d20}$$

An application range of rotating speeds of five shafts, an application range of Mhe12 and Mhe22, an application range of Mhe3 or Mhe11 and an application range of Mhe11/Mhe21 are given; a matrix of optimal values Iiopt of all magnet exciting currents, which covers different rotating speed conditions and torque demands in a full range and satisfies the minimal target of the total loss, is calculated by utilizing the electromagnetic law formulas ((d1)-(d5), (d9), (d10), (d12), (d13), (d14), (d15) or (d11), wherein R0 is given a constant value) and the multidimensional variable function relationships ((d16)-(d20)), and all the data are stored in the control system.

When regulation is executed, the rotating speeds ($\omega h11$, $\omega h21$, $\omega h12$, $\omega h22$, $\omega h3$) of the five rotors are collected immediately as input conditions, a required torque Mhe12, Mhe22, Mhe3 or Mhe11 and Mhe11/Mhe21 command is given as the input condition, the relevant stored data is invoked from the control system, and the optimal value Iiopt of each corresponding magnet exciting current is calculated for an execution link by adopting a spline interpolation function formula.

Three regulation and control methods, with the principle of a minimal loss sum, which are adopted to a serial system of five HET semi-coupled members of the subdivision structure described in (12) are as follows:

The total loss is a sum of a main current Ohm heat ($I0 \cdot I0 \cdot R0$), each magnet exciting current Ohm heat ($\Sigma Poi$) and liquid metal frictional heat of the "connecting region clearance" of the circuit, wherein R0 is a function of the liquid metal state parameter MLS, and Ri is a constant value. Application limit ranges of the main current and each magnet exciting current are selected. In the ranges, the corresponding relationships that total magnetic fluxes, penetrating through the rotation surfaces of the main current circuits of the rotors, on the five rotors vary along with multidimensional variables of the main current and related magnet exciting current are calculated or tested respectively, namely:

$$\Sigma\Phi h11 = Ffh11(|I0|, Ih111, Ih112, \ldots, Ih11m) \quad (d16)$$

$$\Sigma\Phi h21 = Ffh21(|I0|, Ih211, Ih212, \ldots, Ih21m) \quad (d17)$$

$$\Sigma\Phi h12 = Ffh12(|I0|, Ih121, Ih122, \ldots, Ih12m) \quad (d18)$$

$$\Sigma\Phi h22 = Ffh22(|I0|, Ih221, Ih222, \ldots, Ih22m) \quad (d19)$$

$$\Sigma\Phi h3 = Ffh3(|I0|, Ih31, Ih32, \ldots, Ih3m) \quad (d20)$$

An application range of rotating speeds of five shafts, an application range of Mhe12 and Mhe22, an application range of Mhe3 or Mhe11, an application range of Mhe11/Mhe21 and an application range of the liquid metal state parameter MLS of the "connecting region clearance" of the circuit are given; a matrix of optimal values Iiopt of all magnet exciting currents and optimal values MLSopt of the liquid metal state parameter, which covers different rotating speed conditions and torque demands in a full range and satisfies the minimal target of the total loss, is calculated by utilizing the electromagnetic law formulas ((d1)-(d5), (d9), (d10), (d12), (d13), (d14), (d15) or (d11), wherein R0 is a function of the liquid metal state parameter MLS) and the multidimensional variable function relationships ((d16)-(d20)), and all the data are stored in the control system.

When regulation is executed, the rotating speeds ($\omega h11$, $\omega h21$, $\omega h12$, $\omega h22$, $\omega h3$) of the five rotors are collected immediately as input conditions, a required torque Mhe12, Mhe22, Mhe3 or Mhe11 and Mhe11/Mhe21 command is given as the input condition, the relevant stored data is invoked from the control system, and the optimal value Iiopt of each corresponding magnet exciting current and the optimal value MLSopt of the liquid metal state parameter are calculated for an execution link by adopting a spline interpolation function formula.

The engine is equipped with a starter and a corresponding storage battery; but under the condition that each flywheel has usable energy or is recovering the kinetic energy, the flywheel energy or the recovery kinetic energy is preferably selected to start the engine, the engine is directly dragged to an idling speed, and then oil injection ignition (by a gasoline engine) or compression ignition (by a diesel engine) is preformed. In this way, the starter and the storage battery can be prevented from being frequently used, and the starting process has higher energy efficiency.

In the concentrated type HET solution, when the vehicle is parked, the flywheel energy is used to start the engine, and the control system performs the following work: the clutch 1 (and the clutch 2) is disengaged, the clutch 3 is engaged, the circuit "connecting region clearances" (5) of the HET1 on the flywheel side and the HET3 on the engine side are connected, and a set electromagnetic torque Me32 value command of reversely driving the engine to start and a flywheel driving electromagnetic torque Me12 value command which is matched with a Me32 value are simultaneously given. The concentrated type HET regulation control method is adopted to perform control operation on the HET1 and the HET3, and the flywheel (flywheel 1) energy is utilized to start the engine to reach the idling speed.

In the concentrated type HET solution, when the vehicle is driven, the flywheel energy or the recovery kinetic energy is used to start the engine, and the control system performs the following work: the clutch 3 is engaged, the circuit "connecting region clearance" (5) of the HET3 on the engine side are connected, a set electromagnetic torque Me32 value command of reversely driving the engine to start and a flywheel driving electromagnetic torque Me12 added value or a flywheel brake electromagnetic torque Me12 decreasing value which is matched with a Me32 value are simultaneously given, and the original torque command is modified. The concentrated type HET regulation control method is adopted to perform control operation on all HETs, and the flywheel (flywheel 1) energy or the energy less recovered by the flywheel (flywheel 1) is utilized to start the engine to reach the idling speed.

In the separated HET solution, when the vehicle is parked, the flywheel energy is used to start the engine, and the control system performs the following work: the circuit "connecting region clearances" (5) of all HET1 semi-coupled members are connected, and a set electromagnetic torque Mhe3 value command of reversely driving the engine to start is given, and other electromagnetic torques, except flywheel driving electromagnetic torque Mhe11, are set to be zero at the same time. The separated HET regulation control method is adopted to perform control operation on the HET serial system, and the flywheel (flywheel 1) energy is utilized to start the engine to reach the idling speed.

In the separated HET solution, when the vehicle is driven, the flywheel energy or recovery kinetic energy is used to start the engine, and the control system performs the following work: a set electromagnetic torque Mhe3 value command of reversely driving the engine to start is given, and other electromagnetic torque original commands, except flywheel driving electromagnetic torque Mhe11, are maintained at the same time. The corresponding separation type HET regulation control method is adopted to perform control operation on the HET serial system, and the flywheel (flywheel 1) energy or the energy less recovered by the flywheel (flywheel 1) is utilized to start the engine to reach the idling speed.

The engine has a speed regulator; and an operating condition is controlled on a working condition circuit which connects an idling working condition, a maximal efficiency working condition and a maximal power working condition and in a regulation buffer zone region nearby the circuit through the speed regulator. When the working condition circuit is selected, there are the following principles: on the whole circuit which is represented on the torque-rotating speed drawing (the vertical axis represents the torque, and the horizontal axis represents the rotating speed), the rotating speed, the torque, the power and the throttle opening (or a corresponding fuel supply aperture such as fuel gas valve opening) of each point are monotonically increased from beginning to end; and a working condition circuit which passes through a high fuel efficiency region is preferred, for example, a series of best or better efficiency points with an equipower line are selected to form a preferred regulation circuit. The regulation working condition circuit is changed into a curve on the throttle opening-rotating speed drawing. When regulation is performed, if the detected rotating speed and throttle opening state points are located on the right side (higher rotating speed side) of the circuit, the throttle opening is reduced; otherwise, the throttle opening is increased.

When the vehicle is parked, the engine which charges each flywheel preferably chooses to use the maximal efficiency working condition; and if shorter loading time is needed, the working condition with larger power can be selected to use, until the maximal power working condition is selected. Before the above selected engine loading condition is reached, a working condition raising transition process, starting from the idling speed working condition, is provided; if the rotating speed of each flywheel before loading is not lower than an index rotating speed, i.e., the loaded power capacity is not lower than the loading condition power of the engine, the working condition raising transition process can be very rapid; and if the rotating speed of each flywheel before loading is lower than an index rotating speed, the working condition raising transition process is synchronous with the process that the speed of each flywheel is increased to the index rotating speed, and at this moment, larger torque control on each flywheel can be selected so as to accelerate the transition process. For example, if the speed of each flywheel is increased from the zero rotating speed, constant maximal torque control is adopted, and if the speed of each flywheel is increased from lower non-zero rotating speed, the front section is controlled by adopting a torque rapid increasing curve, and the back section is controlled by adopting a constant maximal torque.

The following are special solutions that the engine charges each flywheel when the vehicle is parked under several typical conditions:

The condition of a single flywheel, a concentrated type HET and an initial zero rotating speed of the flywheel: the clutch 1 (and a clutch 2) is disengaged, the clutch 3 is engaged, and the circuit "connecting region clearances" (5) of the HET1 on the flywheel side and the HET3 on the engine side are connected. The concentrated type HET regulation control method is adopted to simultaneously perform control operation on the HET1 and the HET3: a Me11 value command is given to the HET1, and the front section Me11 command is always equal to the maximal torque Me11max; if the rotating speed $\omega 11$ of the flywheel reaches the index rotating speed $\omega 11p$, control is changed into constant power control, and the Me11 command is equal to a ratio Pload/$\omega 11$ of the engine loading condition to the flywheel rotating speed; and an Me32 value command is given to the HET3 and is a little larger than a product of the Me11 value command and $\omega 11/\omega 32$, and an actual value depends on that $\omega 32$ is regulated and controlled to be maintained at the maximal rotating speed $\omega 32$max.

The condition of a single flywheel, a separated HET and a non-zero flywheel initial rotating speed lower than the index rotating speed: the circuit "connecting region clearances" (5) of all HET semi-coupled members are connected. The corresponding separated HET regulation and control method is adopted to perform control operation on the HET serial system: a Mhe12 zero command (and a Mhe22 zero command) is given; an Mhe11 command is given in three sections, the front section Mhe11 command adopts a straight line or a curve which is rapidly increased from zero to the maximal torque Mhe11max, and the middle section Mhe11 command is always equal to the maximal torque Mhe11max; and if the rotating speed $\omega h11$ of the flywheel reaches the index rotating speed $\omega h11p$, control is changed into constant power control, and the Me11 command is equal to Pload/$\omega h11$.

The condition of a single flywheel, a concentrated type HET and a flywheel initial rotating speed higher than the index rotating speed: the clutch 1 (and a clutch 2) is disengaged, the clutch 3 is engaged, and the circuit "connecting region clearances" (5) of the HET1 on the flywheel side and the HET3 on the engine side are connected. The concentrated type HET regulation control method is adopted to simultaneously perform control operation on the HET1 and the HET3: an Me11 value command is given to the HET1, and the front section Me11 command adopts a straight line or a curve which is rapidly increased from zero to Pload/$\omega 11$, and the back section Me11 command is equal to Pload/$\omega 11$; and an Me32 value command is given to the HET3 and is a little larger than a product of the Me11 value command and $\omega 11/\omega 32$, and an actual value depends on that $\omega 32$ is regulated and controlled to be maintained at the maximal rotating speed $\omega 32$max.

A loading rotating speed upper limit is set for the flywheel, i.e., charging and loading on the flywheel are stopped if the rotating speed reaches the limit. The rotating speed upper limit can be a flywheel maximal rotating speed. In view of reserving a storage space for possible recovery of the vehicle speed kinetic energy and height potential energy, the rotating speed upper limit can also take a value which is lower than the flywheel maximal rotating speed, and a difference is reflection of a sum of the current vehicle speed kinetic energy and the available potential energy; and if the energy is recovered at that time, the rotating speed of the flywheel just reaches the maximal rotating speed.

A running rotating speed lower limit is set for the flywheel; if the rotating speed of the flywheel reaches the running rotating speed lower limit from a higher speed to a lower speed, the flywheel stops outputting the power, and loading and energy charging are started to the flywheel; and before the rotating speed of the flywheel is increased to a set middle limit rotating speed, the flywheel is not used again to drive the vehicle. A region range between the running rotating speed lower limit and the middle limit rotating speed should be as small as possible, the rotating speed in the transition process should be as rapid as possible, and the power capacity for driving the vehicle should be used as full as possible. Based on these considerations, a difference between the middle limit rotating speed and the running rotating speed lower limit is better to take a smaller value; the power of the engine which runs at the stage suitably selects the maximal power; and the running rotating speed lower limit of the flywheel should not impede the flywheel from having the loaded power capacity which is matched with the power of the engine. With higher running rotating speed lower limit of the flywheel, the flywheel also has larger drive power capacity and kinetic energy recovery brake power capacity.

When the vehicle is driven, the rotating speed of the flywheel is always switched between a flywheel total speed increasing stage (the speed is occasionally decreased) and a flywheel total speed decreasing stage (the speed is occasionally increased). During switching between the current stage and the next stage, uninterrupted continuity of vehicle drive or brake torque is kept, i.e., the torque on the wheel side keeps invariable, and the torques and the powers on the engine side and on the flywheel side are in smooth and balanced transition.

The flywheel total speed increasing stage: starting from the running rotating speed lower limit, and ending with the loading rotating speed upper limit; the engine always outputs the power even if the flywheel brakes the vehicle; in a region from the running rotating speed lower limit to the middle limit rotating speed, the running working condition of the engine is selected between the maximal efficiency working condition and the maximal power working condition, and preferably the maximal power working condition; in a range from the middle limit rotating speed to the loading rotating speed upper limit, the running working condition of the engine is preferably the maximal efficiency working condition and is used for loading the flywheel and driving the vehicle; if the power is still insufficient when the power Pmaxe of the maximal efficiency working condition of the engine is wholly used for driving the vehicle, the flywheel rotates to output the power to assist drive; and if the flywheel drive power is still insufficient when reaching the current maximal value, the power of the engine is increased, i.e., the power is transited to the maximal power Pmax from the power Pmaxe, until the flywheel drive maximal power and the engine maximal power are wholly used for driving the vehicle (of course, such limiting case rarely occurs).

The total speed decreasing stage of the flywheel: starting from the loading rotating speed upper limit, and ending with the running rotating speed lower limit; the engine occasionally outputs the power; if the flywheel brakes the vehicle, the engine is not operated; giving priority to driving the vehicle with the flywheel, if the flywheel drive power is still insufficient when reaching the current maximal value, the engine power Pmaxe is added, and the flywheel power is correspondingly reduced; and if a sum of the flywheel maximal power and the Pmaxe is still insufficient, the engine power is increased, i.e., the power Pmaxe is transited to the maximal power Pmax.

No matter whether the engine is operated or not, the change in power for vehicle drive or energy recovery brake is generally implemented from control of the flywheel power flow, and the engine basically is operated under the working condition that the power and the rotating speed are not changed.

The engine normally operates, preferably, under the maximal efficiency working condition; and if larger power is needed, short-time operation is performed on an efficiency optimal working condition line between the maximal efficiency working condition and the maximal power working condition.

The maximal fuel efficiency of the gasoline engine is usually about 30% or above, and generally, the average fuel efficiency when a gasoline car is driven is ten percent only. It is thus clear that compared with a general car, about half of fuel oil is saved when the engine works under the maximal efficiency working conditions. The efficiency of the diesel engine is higher than that of the gasoline engine, and the maximal fuel efficiency of the diesel engine is usually about 40% or above. Thus, adoption of the diesel engine by the fuel engine in the solution of the present invention would bring the outstanding advantages of high fuel heat value utilization ratio, low diesel cost per unit heat value (due to low unit price per litre of diesel, large density and high heat value), i.e., the fuel engine is more economic and more energy-saving.

The vehicle driving seat is provided with a power control unit which includes a vehicle driving torque command control output unit; the command is a relative value of a driving torque; the command range corresponds to a maximal value which is available from zero to a current value; and the current available vehicle driving torque maximal value is calculated by a power control system according to the current state measurement parameter. For the subdivision structures in (4), (5), (6), (10) and (11), the power control unit can also include a setting unit for a distribution ratio of two flywheel torques; for the subdivision structure in (9), the power control unit can also include a setting unit for a distribution ratio of a front drive shaft torque and a back drive shaft torque; and for the subdivision structure in (12), the power control unit can also include the setting unit for the distribution ratio of the two flywheel torques and the setting unit for the distribution ratio of the front drive shaft torque and the back drive shaft torque. The setting of the distribution ratio of the two flywheel torques or the two drive shaft torques can be executed by a driving seat setting unit in a mode of hand operation, i.e., the distribution ratio is set by a driver control setting unit before vehicle starting or during vehicle sliding; the setting can also be automatically executed by the power control system, i.e., the control system automatically performs setting before vehicle starting, during vehicle sliding or in non-sliding driving; and the two measures can be simultaneously configured, and setting is executed by individually using one measure or jointly using the two measures.

The power control unit includes a vehicle brake command control output unit; the unit includes kinetic energy recovery brake and friction brake; the two brakes share one control device; a brake operation stroke is divided into a front section and a back section; the command is correspondingly a kinetic energy recovery brake torque relative value from zero to the maximal value at the front stroke section, is a friction brake torque relative value from zero to the maximal value at the back stroke section and keeps the kinetic energy recovery brake torque with the maximal value at back stroke section at the same time. Kinetic energy recovery brake is to recover the vehicle kinetic energy to the flywheel through the HET reverse power flow transfer; and friction brake is to adopt a wheel friction brake element to convert the vehicle kinetic energy into the heat energy. The maximal value of the kinetic energy recovery brake torque is a current available maximal value and is calculated by the power control system according to the current state measurement parameter.

For the vehicle which has the stepped speed change ratio mechanical transmission device, the power control unit also includes an initial speed ratio gear setting unit. The set initial speed ratio gear can be any gear of the stepped speed change ratio mechanical transmission device and includes a minimal transmission speed ratio gear. In a range from zero to the maximal speed of the vehicle driving speed, through control, the transmission speed ratio value is sequentially lowered to a minimal transmission speed ratio gear value from an initial gear value. When the initial speed ratio gear selects the minimal transmission speed ratio gear, the speed ratio gear is not changed and is equivalent to using fixed speed ratio transmission. Gear shifting operation in driving is automatically controlled by the power control system. If a preset gear shifting speed is reached, the transfer torque is controlled to descend to zero, an original gear is disengaged and two parts to be joined are rubbed and synchronized using a synchronizer; a new gear is engaged, and then the required torque is transferred according to the current driving torque command.

The power control unit also includes a vehicle advancing aheading or reversing setting unit.

(e) Mechanical Connection and Load Charging System for Energy Storage Flywheel of Vehicle Including HET The charging system for an energy storage flywheel of vehicle in the present invention directly mechanically drives the flywheel shaft by utilizing external energy charging station equipment. The loading power can reach 2000 kW, and the loading time can be shortened to be within several minutes.

The system has three types of solutions as follows:

A first type of solutions:

The system includes: a loading joint and a load rotation shaft which are in mechanical connection with a loading disc at the lower end of the flywheel rotation shaft during operation, a motor connected with an AC power grid, and a transmission system between the load rotation shaft and the motor.

The transmission system includes a set of homopolar DC electromagnetic transmission (HET) which is divided into a separated HET solution and a centralized HET solution.

The HET in the separated HET solution has a loading end semi-coupled member HETho (output end) and an energy supply end semi-coupled member HEThi (input end). According to different types of the HETho, the separated HET solution is divided into a vertical HETho solution and a horizontal HETho solution.

The HETho in the vertical HETho solution is located on the upper side of the separated HET, and the upper end of the HETho rotation shaft may also be connected with a vertical universal transmission shaft. Paired HEThi may select a coaxial vertical structure or a horizontal structure. When the vertical HEThi is adopted, the rotation shaft of the vertical HEThi is connected with a lower vertical motor rotation shaft, or connected with the lower vertical motor rotation shaft through a speed-up gear box, or connected with a horizontal motor rotation shaft on the side lower part through a speed-up gear box with a bevel gear. When the horizontal HEThi is adopted, the rotation shaft of the horizontal HEThi is connected with a horizontal motor rotation shaft on the side surface, or connected with a horizontal motor rotation shaft on the side surface through a speed-up gear box.

The HETho rotation shaft in the horizontal HETho solution is connected with a vertical universal transmission shaft on the side upper part through a speed-up gear box with a bevel gear. The paired HEThi is of a horizontal structure, and the rotation shaft of the HEThi is connected with a horizontal motor rotation shaft on the side surface, or connected with the horizontal motor rotation shaft on the side surface through a speed-up gear box.

The centralized HET solution is divided into a vertical HET solution and a horizontal HET solution. When the vertical HET solution is adopted, an HET output end rotor is positioned on the upper side, and a rotation shaft of the HET output end rotor is connected with an upper vertical universal transmission shaft. An HET input end rotor is connected with a lower vertical motor rotation shaft, or connected with a lower vertical motor rotation shaft through a speed-up gear box, or connected with a horizontal motor rotation shaft on the side lower part through a speed-up gear box with a bevel gear. When the horizontal HET solution is adopted, the HET output end rotor rotation shaft is connected with a vertical universal transmission shaft on the side upper part through a speed-up gear box with a bevel gear, and the HET input end rotor rotation shaft is connected with a horizontal motor rotation shaft on the side surface, or connected with a horizontal motor rotation shaft on the side surface by virtue of a speed-up gear box.

The HET is applied to the mechanical connection and load charging system for the flywheel of the vehicle, and can fully achieve the following advantages: stepless variable speed and variable torque, uniaxial zero-rotation speed drive, reversible power flow, extremely high power density, low cost, long service life and high energy transfer efficiency.

A second type of solutions:

The system includes: a loading joint and a loading rotation shaft which are in mechanical connection with a loading disc at the lower end of the flywheel rotation shaft during operation, a motor connected with an AC power grid, a vertical shaft type flexible flywheel device for buffering, and transmission systems between the load rotation shaft and a buffering flywheel and between the buffering flywheel and the motor.

The transmission system includes two sets of homopolar DC electromagnetic transmissions (HET). One set of the HET (a loading HET) is positioned between the buffering flywheel and the loading rotation shaft, and the other set of the HET (an energy supply HET) is positioned between the buffering flywheel and the motor.

A part in front of the buffering flywheel (a part between the loading rotation shaft and the buffering flywheel): the loading HET may have a vertical separated type or a vertical centralized type, an input end rotor of the loading HET is positioned on the lower side and connected with an upward extended shaft of a vertical buffering flywheel, and an upper end of an output end rotor rotation shaft of the loading HET is connected with a vertical universal transmission shaft; and the universal transmission shaft is not added in the vertical separated type.

A part behind the buffering flywheel (a part between the buffering flywheel and the motor): the energy supply HET may have a vertical separated type or a vertical centralized type, an output end rotor of the energy supply HET is positioned on the upper side and connected with a downward extended shaft of the vertical buffering flywheel, a lower end of an input end rotor rotation shaft of the energy supply HET is connected with a lower vertical motor rotation shaft, or connected with the lower vertical motor rotation shaft by virtue of a speed-up gear box, or connected with a horizontal motor rotation shaft on the side lower part by virtue of a speed-up gear box with a bevel gear. The energy supply HET may be composed of an output end vertical HET half-coupled member and an input end horizontal HET half-coupled member. The output end vertical HET half-coupled member is positioned on the upper side and connected with a lower extended shaft of the vertical buffering flywheel. A rotation shaft of the input end horizontal HET half-coupled member is connected with a horizontal motor rotation shaft on the side surface, or connected with the horizontal motor rotation shaft on the side surface by virtue of a speed-up gear box.

The buffering flywheel is applied to the mechanical connection and load charging system for the flywheel of the vehicle and can achieve effects as follows: a large motor (with a typical power of 2000 kW) is prevented from being frequently started, a low-power motor may often serve as the buffering flywheel, the power grid is stabilized, equipment investment is decreased, and multi-point loading of the charging station can be met by using a high-capacity buffering flywheel.

The motor in the mechanical connection and load charging system may be a synchronous motor or an asynchronous motor, and the synchronous motor is favorable for the power grid. After started, the motor operates at a synchronous rotation speed or at a relatively stable rotation speed with a small slip ratio and does not need to operate at an adjustable speed. When the vehicle flywheel or the buffering flywheel needs to unload the power grid, the motor may reversely operate to serve as a generator.

In a solution that the universal transmission shaft is not arranged in the mechanical connection and load charging system, the (loading) HETs adopt the separated structure, and the output end half-coupled members are of a vertical structure and are movable. Then, an external connection conductor between the two separated half-coupled members of the (loading) HETs adopts a mixed flexible cable, or the middle part adopts the mixed flexible cable, thereby obtaining dislocation movement yieldability.

A third type of solutions:

The system includes: a load joint and a load rotation shaft which are in mechanical connection with a loading disc at the lower end of the flywheel rotation shaft during operation, a DC power supply connected with an AC power grid, and a transmission system and a circuit connecting line between the load rotation shaft and the DC power supply.

The transmission system includes an HET half-coupled member, and power of the HET half-coupled member is supplied by the DC power supply by virtue of a coaxial conductor or a mixed flexible cable. The HET half-coupled member is divided into a vertical HET half-coupled member solution and a horizontal HET half-coupled member solution. When the vertical HET half-coupled member is adopted, an upper end of a rotation shaft of the vertical HET half-coupled member may be connected with a vertical universal transmission shaft, or can be directly used without adding the universal transmission shaft, then the DC power supply adopts the mixed flexible cable or the middle part adopts the mixed flexible cable. When the horizontal HET half-coupled member is adopted, a rotation shaft of the horizontal HET half-coupled member is connected with a vertical universal transmission shaft on the side upper part by virtue of a speed-up gear box with a bevel gear.

A voltage designed value of the DC power supply may be 30V-50V. The higher the series stage of the HET half-coupled member is, the higher the rated voltage value is. The DC power supply is obtained by AC rectification and step-down of the power grid, an output voltage is adjustable, and the power supply operates at a maximum current limitation boundary and a maximum power limitation boundary and within a range thereof during flywheel loading. The DC power supply may be easily arranged at the charging station to perform multi-end loading on multiple vehicles and multiple flywheels. The DC power supply can increase an inverter or other equipment, and when the vehicle flywheel needs to be unloaded, energy reversely returns to the AC power grid.

The centralized HET in the mechanical connection and load charging system may adopt solutions represented in FIG. 5, FIG. 6, FIG. 16, FIG. 21, FIG. 34 and FIG. 37. The separated HET half-coupled member in the mechanical connection and load charging system may adopt solutions represented in FIG. 8-15, FIG. 17, FIG. 19, FIG. 29, FIG. 30 and FIG. 31.

According to the mechanical connection and load charging system for the flywheel of the vehicle, a vertical cylindrical gear speed increaser may be increased in the transmission system and positioned on a side close to the flywheel of the vehicle, that is, the speed increaser is connected with an upper end of an existing vertical universal transmission shaft when the universal transmission shaft is arranged; and the speed increaser is connected with an upper end of a rotation shaft of an existing load end vertical HET half-coupled member when the universal transmission shaft is not arranged. An effect of adding the speed increaser is to reasonably decrease the rotation speed of the universal transmission shaft positioned on the top of the transmission system and the load-end vertical HET half-coupled member. The speed increaser may be designed as single-stage or multi-stage; an output shaft and an input shaft may be staggered in parallel or be coaxial; and the coaxial line is favorable for operations.

The rotation shaft at the uppermost end of equipment positioned on the top of the transmission system also serves as the above load rotation shaft. When the vertical cylindrical gear speed increaser is equipped, the output shaft of the speed increaser serves as the load rotation shaft; when the speed increaser is not equipped and the vertical universal transmission shaft is equipped, an output shaft of the universal transmission shaft serves as the load rotation shaft; and when the speed increaser and the universal transmission shaft are not equipped and the load-end vertical HET half-coupled member is equipped, a rotation shaft at the upper end of the HET half-coupled member serves as the load rotation shaft.

The load joint is assembled at the upper end of the load rotation shaft, mechanically connected with a loading disc at the lower end of the vehicle flywheel rotation shaft and adopts an embedded structure or a friction structure. The connecting structures are selected base on the following factors: the connecting structures may be engaged, subjected to torque transfer and separated from one another in a range from zero rotation speed to a maximum rotation speed, torque transfer capacity and boundary dimension should be ensured, the structure is simple and easily engaged, engaging impact force, axial thrust and radial resulting force should be as small as possible, vibration and generated heat should be as less as possible, and air-blowing abrasion and noise brought by single daily rotation of the flywheel loading disc when unloaded should be low. The embedded structure has the advantages of high torque, small dimension and no heat, and has the disadvantages as follows: rotation speed tolerance is low, centering should be accurate, impact is caused, and air-blowing abrasion and noise caused by teeth or threads of the loading disc are high. Advantages and disadvantages of the friction structure are just exchanged with those of the embedded structure. The embedded structure is preferably a gear type structure or a tooth embedded structure with high torque transfer capacity, and is simple in structure and favorable for realizing long-stroke engagement of two separated members. The friction structure is preferably a cylindrical surface engagement form without generating the axial thrust, and a hydraulic type manipulating pressurization manner with large action load and simple structure, such as, an external rubber tube hydraulic structure. Hydraulic oil of the hydraulic structure is supplied by a hydraulic station of an auxiliary system and transported into a hydraulic working chamber of the load joint by virtue of a pipeline and an axial oil transportation hole in the load rotation shaft. A sealed joint of the pipeline and the load rotation shaft is preferably positioned at an exposed contactable lower shaft end of the load rotation shaft. When the lower shaft end of the rotation shaft cannot be contacted, the sealed joint is designed on a section of cylindrical surface of the load rotation shaft.

In the mechanical connection and load charging system for the flywheel of the vehicle, a set of manipulator system capable of moving a direction of the load rotation shaft and a detection system for a direction of a vertical flywheel rotation shaft of the vehicle may be added.

The manipulator system capable of moving the direction of the load rotation shaft and the detection system for the direction of the vertical flywheel rotation shaft of the vehicle are used for performing centered location and movement manipulation on the load rotation shaft and a supporting and fixing part thereof. The manipulator system is provided with three spherical hinge supports on an outer surface of the supporting and fixing part of the load rotation shaft. Space positions of the three supports are controlled by utilizing six linear precession actuating units, thereby manipulating adjustment and movement of a space position and a direction angle of the load rotation shaft. Working procedures performed before loading include: opening a protective shield at a flywheel shaft end, performing non-contact measurement on space positions and direction angles at the flywheel shaft end (three space coordinates and two direction angles), adjusting and moving the load rotation shaft and the supporting and fixing part thereof to ready positions and postures (the same as the direction angles of the flywheel) by utilizing the manipulator system, and linearly translating the load rotation shaft to a load working position.

The above vertical universal transmission shaft is composed of a pair of universal joints, an intermediate retractable spline transmission shaft, transmission shafts at both ends, bearings and supporting and fixing parts thereof. No matter whether the transmission shaft at the upper end is connected with the vertical cylindrical gear speed increaser, moving objects controlled and manipulated by the manipulator system or manually manipulated include the upper-end transmission shaft of the universal transmission shaft. A five-degree-of-freedom universal transmission shaft automatically adapts to the movement and rotation angle. Preferably, a constant velocity universal joint is selected, and when a universal joint at a load working position has a small intersection angle and vibration is in an allowed range, a cardan universal joint may be selected.

In the mechanical connection and load charging system for the flywheel of the vehicle, a fixing and supporting device for a vehicle frame may also be arranged and is used for supporting vehicle weight (the tire is overhead) and fixing the frame before the vehicle flywheel is loaded, thereby stabilizing a position of a flywheel located on the frame. The device adopts a three-point supporting structure, e.g., two front supporting points and one rear supporting points are arranged on the vehicle frame. The device may also adopt a four-point supporting structure.

(f) Wind Power Generation System Including HET

The wind power generation system in the present invention takes a homopolar DC electromagnetic transmission (HET) as a stepless variable speed and variable torque transmission device between a wind wheel (or a speed-up gear box) and a generator, so that the wind wheel always maintains an optimal tip speed ratio to run at a variable speed under total working conditions under a designed wind speed, while a synchronous generator or an asynchronous generator always runs at a synchronous constant speed or at an asynchronous approximate constant speed and provides a stable power frequency and high-quality electric energy for the power grid, thereby avoiding the above defects and disadvantages of the existing wind power generation system.

The technical solution and principle of the present invention are described below in detail.

A wind power generation system includes a wind wheel absorbing wind energy in a horizontal axis type or a vertical axis type, a synchronous generator or an asynchronous generator which directly outputs power-frequency alternating current and is connected with the power grid (or connected with an off-network user), a transmission system connected with the wind wheel and the generator, and a control system for these devices. The transmission system has two types of solutions.

A first type of solution:

It is called a "gear-box-free direct connection" solution. A homopolar DC electromagnetic transmission (HET) is directly connected with the wind wheel and the generator. The HET adopts a separated type. One HET half-coupled member is connected with a wind wheel shaft and runs at a variable speed with the wind wheel at the same rotating speed, and the other HET half-coupled member is connected with the generator shaft and runs at a constant speed or an approximate constant speed with the generator at the same rotating speed. The HET half-coupled member on the wind wheel side has an extremely low rotating speed and adopts a hollow shaft and inner rotor type structure, or adopts an outer rotor type structure (FIG. 11). The outer rotor type hollow structure is favorable for arrangement of a stator on an inner ring, thereby obtaining beneficial effects such as small weight, short cables and accessory pipelines and the like. The HET half-coupled member on the wind wheel side has extremely large size and weight, which is a major disadvantage of the HET half-coupled member. The HET half-coupled member has the advantages that a high speed ratio speed-up gear box is canceled, and maintenance and potential failure are decreased.

A second type of solution:

It is called a "speed-up connection" solution. A speed-up gear box and a homopolar DC electromagnetic transmission (HET) are adopted. An arrangement sequence is sequentially as follows: a wind wheel, a gear box, an HET and a generator. The HET adopts a centralized type or a separated type. One HET rotor is connected with an output shaft of the gear box and runs at a variable speed, and the other HET rotor is connected with a generator shaft and runs at a constant speed or an approximate constant speed with the generator at the same rotating speed. A speed-up ratio of the gear box is generally selected to be equal to a ratio of the rotating speed of the generator to a designed rotating speed of the wind wheel, so that the two rotors of the HET have the same designed rotating speed. A small speed-up ratio of the gear box may also be selected. Considering the factors of weight and cost, the "speed-up connection" solution is obviously better than the "gear-box-free direct connection" solution.

The generator adopts a general synchronous generator or asynchronous generator. The synchronous generator runs at a constant rotating speed. The asynchronous generator runs at an approximate constant rotating speed. Both the synchronous generator and the asynchronous generator directly output the power-frequency alternating current and supply power to the power grid by virtue of step-up or supply power to the off-network user.

The wind wheel may adopt a horizontal axis type or a vertical axis type. However, the widely applied wind wheel is of the horizontal axis type and is provided with three airfoil blades. The horizontal axis type wind wheel may adopt fixed pitch angle blades or variable pitch angle blades.

At a designed wind speed or below, the horizontal axis type wind wheel runs at a variable rotating speed at a designed pitch angle. By utilizing an adjustment function of the HET, the rotating speed of the wind wheel is controlled to change along with the wind speed and is always kept nearby an optimal tip speed ratio state.

In a range from a wind speed higher than the designed wind speed to a cut-out wind speed, the horizontal axis type wind wheel adopting the fixed pitch angle blades is subjected to power limitation control by using a stall method, and the wind wheel is controlled to keep the designed wind speed by utilizing the adjustment function of the HET, or the wind wheel runs at a variable speed (mainly speed down) to output and maintain a design power. The horizontal axis type wind wheel adopting the variable pitch angle blades is subjected to power limitation control by using a variable pitch angle method or an "active stall control" method, and the wind wheel is controlled to keep the designed wind speed by utilizing the adjustment function of the HET, or the wind wheel runs at a variable speed (mainly the speed down) to output and maintain the design power.

The transmission system is equipped with a set of mechanical brake apparatus. The mechanical brake apparatus in the "gear-box-free direct connection" solution is arranged on the wind wheel shaft, while the mechanical brake apparatus in the "speed-up connection" solution may be arranged on the wind wheel shaft and on an output shaft of the gear box. The wind wheel is simultaneously equipped with aerodynamic braking measures. The variable pitch blade wind wheel adopts a "feathering" braking method. The fixed pitch blade wind wheel adopts a "tip" feathering brake structure or a "spoiler" brake structure.

The horizontal axis type wind wheel adopts one of the following yawing devices: a yawing driven active yawing mechanism, a yawing tail vane and a yawing side wheel.

The solutions in the present invention may achieve beneficial effects as follows:

(1) the adopted HET realizes a stepless variable speed and variable pitch transmission function between the wind wheel and the generator, the rotating speeds and torques at both ends are allowed to range from zero to a maximum value, and a phenomenon that one end has the rotating speed and the other end has zero rotating speed can be realized, which is unattainable in a general mechanical stepless variable speed transmission device;

(2) direct mechanical connection does not exist between the two rotors of the HET, flexible connection between a rotor shaft system at one end of the wind wheel (and the gear box) and a shaft system at one end of the generator is formed, and direct rigid transfer of an impact load from one end to the other end is isolated, which is very favorable for decreasing a maximal design load of each device, increasing operating stability and reliability and preventing the generator from being split from the power grid;

(3) the wind wheel can be controlled to efficiently run at the variable rotating speed by utilizing the adjustment function of the HET, and at the designed wind speed or below, the rotating speed of the wind wheel is controlled to change along with the wind speed and is always kept in the optimal tip speed ratio state, thereby obtaining the maximum possible wind energy capture efficiency;

(4) when the wind wheel is subjected to power limitation control at a wind speed exceeding the designed wind speed, the wind wheel can be controlled to run at a variable speed by utilizing the adjustment function of the HET, so that the wind wheel outputs and maintains the design power even for a wind wheel with the fixed pitch blades; the adjustment capability is also a support base of implementing the item (3), an existing wind power system makes a weighed compromise between a power limitation area and a normal running area due to absence of an effective adjustment method, and an actually adopted wind energy utilization coefficient is greatly lower than an attainable maximum value;

(5) the HET is high in efficiency, low in cost and small in electromagnetic interference and does not generate electromagnetic noise or harmonic;

(6) use of a conventional synchronous generator with high power supply quality has no obstacle in each of the solutions, and a conventional asynchronous generator may also be used; and (7) when the fixed pitch blade wind wheel under a start-up wind speed has a low starting torque and is not enough to self-start, and the generator should serve as a motor to drive the wind wheel to be started, since the generator shaft does not have direct connection with the wind wheel and the gear box, and rotational inertia of the generator shaft system is relatively small, a no-load motor starting method is adopted (the wind wheel does not rotate temporarily at an HET zero torque load), and is very favorable for switch-on self-starting of the motor including self-starting of the asynchronous generator serving as an asynchronous motor and self-starting of the synchronous generator serving as a synchronous motor (with a starting winding); and after the motor is started to reach a rated rotating speed in a no-load state, the wind wheel is driven to start to rotate by virtue of the HET load until the wind wheel outputs a net power and the motor is turned into a generator operating state.

(g) Wind Power Generation System Including HET and Flywheels

In a solution of the present invention, flywheels and a homopolar DC electromagnetic transmission (HET) serve as energy storage devices and energy transfer equipment thereof to be applied to a wind power generation system. A basic goal is o realize a novel wind power generation system with an energy storage device, thereby realizing a stable power generation function and achieving advantages of the HET in flywheel energy transfer. A further goal is to solve large-mass flywheels and bearings and other problems by adopting a vertical flexible flywheel and a suspended flexible flywheel. By virtue of HET variable speed transmission applied between the wind wheel and the generator, the wind energy capture efficiency is greatly increased, thereby comprehensively improving the wind power generation system.

The technical solution and principle of the present invention are described below in detail.

A wind power generation system includes a horizontal axis type or vertical axis type wind wheel that absorbs wind energy, a generator connected with the power grid or an off-network user, an energy storage flywheel device, a set of energy transfer system including a homopolar DC electromagnetic transmission (HET), and a control system for these devices.

An energy storage flywheel is composed of a wheel body, a rotation shaft, a bearing, a vacuum chamber and the like. A large-mass part of the wheel body is made by circumferentially winding a unidirectional continuous fiber reinforced composite material, and the bearing adopts a mechanical rolling bearing or a magnetic bearing. A preferred solution of the energy storage flywheel is the vertical flexible flywheel or the suspended flexible flywheel. The latter is particularly applicable to a flywheel with extremely large mass.

For the description of a solution of the vertical flexible flywheel, see the description in Chapter I of summary of the invention of "(c) Flywheel Power System for Vehicles Including HET".

A solution of the suspended flexible flywheel is described below.

The suspended flexible flywheel and the vertical flexible flywheel have many common characteristics. Only differences or distinctions of the vertical flexible flywheel are described below:

A basic composition of the suspended flexible fly wheel includes: a set of rotating wheel or multiple sets of rotating wheels in series connection, a rotation shaft (101), a bearing on the rotation shaft, and a shell containing the wheels, wherein a cavity of the shell is in vacuum. A center line of the rotation shaft is perpendicular to the ground. Axial bearings on the rotation shaft adopt a group of axial supporting permanent magnetic bearings. The wheels are positioned at the lower end of the rotation shaft and connected with a center shaft (102). The center shaft and the lower shaft end of the rotation shaft are connected through a pulling torque transfer flexible transmission part, so that the wheels are suspended below the rotation shaft.

The pulling torque transfer flexible transmission part may adopt a set of universal transmission shaft including two universal joints, an intermediate transmission shaft and transmission shafts at both ends. The upper-end transmission shaft is connected with the rotation shaft (101), and the lower-end transmission shaft is connected with the center shaft (102). The lower-end transmission shaft is a free axis which is not restrained by a bearing block. This is different from a commonly used universal transmission shaft. The intermediate transmission shaft and the lower-end transmission shaft may rotate without surrounding an own axis. An actual condition is as follows: all the rotating members including the wheels and the rotation shaft rotate around a center line, that is, an axis of the rotation shaft (101). Each of the universal joints is composed of two yoke hole members (104 and 121) and an intermediate shaft so as to form two revolute pairs. Rotation shaft axes of the two revolute pairs are perpendicular to a center line (a symmetrical centerline, a vertical axis) of the intermediate shaft, and are perpendicular to each other, that is, rotation shafts of the two revolute pairs are mutually perpendicular horizontal axes. The rotation shafts of the two revolute pairs may be vertically intersected, and the intermediate shaft serves as a commonly used universal joint crossing shaft (103). The rotation shafts of the two revolute pairs may also be vertically staggered, and the intermediate shaft serves as a transform of the crossing shaft, that is, the two horizontal axes (119) translate and pull open by a certain distance along a vertical axis direction. In an aspect of a flexible suspended effect, the staggered crossing shaft and the intersected crossing shaft (103) plays the same effect. However, the staggered crossing shaft solution has greater advantages in an aspect of optimizing a universal joint structure, mainly optimizing structures and strength of the yoke hole members.

Full roller pins (105) may be adopted in a universal joint revolute pair. The roller pins are contacted with a cylindrical shaft surface of the intersected crossing shaft (103) or the staggered horizontal axes (119), or contacted with an added high-hardness bearing inner race (106). FIG. 42 shows a solution of an intersected cross shaft universal joint with the bearing inner race (106). Centrifugal force of the roller pins (105), a bearing steel bowl), a central top rubber ball), a snap ring (109), a sealing sleeve (110) and a sealing rubber ring acts on the yoke hole member (104). FIG. 43 shows a solution of an intersected cross shaft universal joint. Centrifugal force of the roller pins (105), a spherical inner ring (113), a spherical outer ring (112), a nut (111), a rubber ring (114) and inner and outer supporting rings thereof acts on the yoke hole member (104). In order to decrease stress of the yoke hole member, a solution that the centrifugal force of the revolute pair parts is borne by the intersected crossing shaft (103) or the staggered horizontal axes (119) may be adopted. FIG. 44 shows a solution of adopting a tapered rolling bearing (117). Centrifugal force of an aluminum bowl cover (116), an aluminum sheath (115) and a sealing ring, the tapered rolling bearing (117) and an oblique nut (118) acts on the rotation shaft. FIG. 45 shows a solution of adopting a combination of a radial bearing roller needle (105) and a thrust bearing roller needle (126). Centrifugal force of the full roller pins (105), a bearing bush (122) and a sealing ring, the roller needle (126) and a retainer, a shaft washer (125) of the thrust bearing and an oblique nut (124) acts on the rotation shaft. Only centrifugal force of a flat rubber ring (123) achieving axial limiting and sealing effects acts on the yoke hole member.

The yoke hole members of the universal joints may adopt a general cantilever structure under a condition that large stress and deformation do not appear. In order to decrease the stress and deformation, a non-cantilever whole circle structure may be adopted, and only two or four holes are formed to form the revolute pairs. With respect to the intersected crossing shaft universal joint, the two yoke hole members may adopt a solution that two whole-circle yoke rings with different diameters sleeve with each other. Only two holes may be formed in the larger-diameter yoke ring outside for assembling a long horizontal axis revolute pair, and four holes are formed in the smaller-diameter yoke ring inside, wherein two holes are for assembling a short horizontal axis revolute pair, and a long horizontal axis passes through a space of the other two holes. Meanwhile, each of the whole-circle yoke rings is of an axial split structure and is assembled by two whole-circle semi-yoke rings split along a center line of the two revolute pairs, thereby facilitating installation of the cross shaft. The staggered cross shaft structure provides favorable conditions for optimizing the yoke hole members. Since the two horizontal axes are staggered, a pin axis type staggered cross shaft shown in FIG. 45 may be adopted. The two horizontal axes (119) serve as the pins and are vertically inserted into pin holes of vertical axes (120). Therefore, whole-circle yoke rings (121) without halving may be adopted. The two yoke rings (121) are separated from each other and not overlapped. Only two holes are formed in each of the yoke rings to form a revolute pair.

The pulling torque transfer flexible transmission part may adopt ring chains (FIG. 49 and FIG. 50). A semi-ring (FIG. 46) is adopted at each of upper and lower ends of the ring chain, one or more rings are adopted in the middle, and each ring is composed of two upper and lower semi-rings and two lengthened straight segments in the middle (FIG. 47), or a reinforced horizontal connecting beam is arranged between the two straight segments (FIG. 48). "Hole shafts" formed by two buckled rings are in close fit, and a radius of each of the holes (being 201 mm in figures) is only slightly larger than a radius of each of the shafts (200 mm in figures) so as to decrease bearing stress. Each of the buckles has two rotational degrees of freedom. At least two buckles are needed (FIG. 49). More buckles and chain lengths are more favorable for decreasing unbalanced force acting on the rotation shaft (101). The ring chains (FIG. 49 and FIG. 50) form the buckles by a welding method or a casting method. The ring chains (FIG. 49 and FIG. 50) may be cast by nodular cast iron. A structure of a part, which is connected with the rotation shaft and the center shaft, at the end of each of semi-rings shown in FIG. 46, FIG. 49 and FIG. 50 is only a special case. Another special case of the end of the semi-ring is also shown in FIG. 57.

The pulling torque transfer flexible transmission part may adopt a single steel wire rope or multiple steel wire ropes when the flywheel weight and torque are small. The single steel wire rope may be individually used (the total gravity is borne by a single section) or used in a combined mode (the total gravity is shared by multiple sections). For the latter case, the steel wire rope is spirally wound between a lower shaft end of the rotation shaft (101) and an upper shaft end of the center shaft (102), loads are uniformly distributed by multiple sections, and a torque transfer arm of force is large. The multiple steel wire ropes may also be individually used (the total gravity is borne by individual sections of the multiple steel wire ropes together) or used in a combined mode (the loads are uniformly distributed by multiple sections of each of the steel wire ropes), and the latter is of a multi-end spiral structure. When a multiple-use solution is adopted, impact of centrifugal force of the steel wire ropes should be considered. When necessary, reinforcing discs (rings) may be uniformly arranged at intervals at one middle position or multiple middle positions of the rope so as to bear centrifugal force loads of the steel wire ropes.

Connection between the lower shaft end of the rotation shaft and the pulling torque transfer flexible transmission part may be realized through a spline, thread and flange connecting structure shown in FIG. 55, that is, an internal spline of a connecting piece (127) and an external spline of the lower shaft end of the rotation shaft (101) are in matched connection to transfer the torque. An external flange plate of the connecting piece (127) is matched with an external flange plate (129) at an upper end of the pulling torque transfer flexible transmission part through a seam allowance and fastened by a bolt. A nut (128) is fastened at a tail end of the rotation shaft and bears gravity transferred by the connecting piece (127). A ring groove structure of the nut (128) is favorable for thread load uniformity. A thread and flange connecting structure shown in FIG. 56 may also be adopted, that is, an external flange plate of a connecting piece (130) is matched with the external flange plate (129) at the upper end of the pulling torque transfer flexible transmission part through a seam allowance and fastened by a bolt. An internal thread of the connecting piece (130) is connected with an external thread at the lower shaft end of the rotation shaft (101). In addition to a function of bearing the gravity, the thread also has a function of transferring a bidirectional torque by virtue of self-locking friction force of the thread. A direct thread connecting structure shown in FIG. 57 may also be adopted, that is, an internal thread is processed at an upper-end structure (129) of the pulling torque transfer flexible transmission part and directly connected with the external thread at the lower shaft end of the rotation shaft (101). In addition to a function of bearing the gravity, the thread also has a function of transferring a bidirectional torque by virtue of self-locking friction force of the thread. A structure may be adopted as follows: an internal spline is processed at an upper-end part of the pulling torque transfer flexible transmission part and is in matched connection with the external thread at the lower shaft end of the rotation shaft so as to transfer the torque, and a nut is fastened at the tail end of the rotation shaft to bear the gravity. A pin shaft structure may also be adopted as follows: hole shaft cylindrical surface fit is formed between the upper-end part of the pulling torque transfer flexible transmission part and the lower shaft end of the rotation shaft, and a cylindrical pin is inserted into a pin hole penetrating through the two so as to bear the gravity and the torque.

When an upper shaft end of the center shaft has a solid shaft structure form or has a hollow shaft structure but has a small outer shaft diameter, a connecting structure form between the lower shaft end of the rotation shaft and the pulling torque transfer flexible transmission part may be adopted. The center shaft is connected with the lower end part of the pulling torque transfer flexible transmission part, and only upper and lower positions and orientations are opposite. When an energy storage scale of the flywheel is large, the center shaft should adopt a form of a cylinder with a larger outer diameter (FIG. 59), and connection between the end of the center shaft and other members should adopt a flange structure. FIG. 58 shows that an external flange plate (132) at the upper end of the center shaft and an external flange plate (131) at the lower end of the pulling torque transfer flexible transmission part are connected through a seam allowance and a bolt.

When the multiple sets of wheels in series connection are adopted, the center shaft may adopt a multi-section combined structural form. Each set of the wheels corresponds to a section of the center shaft, and every two sections of the center shaft are connected through a flange, as shown in FIG. 59. However, a structural form of a long center shaft may also be adopted, and each set of the wheels is in fastened connection with the center shaft by virtue of cylindrical surface interference fit or conical surface interference fit or a conical intermediate bushing structure.

Connection between the center shaft (102) and a supporting body (54) on an innermost ring may adopt the cylindrical surface interference fit or the conical surface interference fit or the conical intermediate bushing structure. A connecting structure of a flexible membrane ring (55 or 58) and an end surface pair (56, 57 or 64) may also be adopted, and is suitable for the multi-section combined center shaft condition (FIG. 59). A support disc (62) may be installed between the center shaft and the supporting body (54) on the innermost ring, a central inner hole of the support disc is in interference fit with the center shaft, a disc body of the support disc is positioned below the supporting body of the innermost ring, an elastic material ring (63) is installed between the two, the latter is in adhesive connection with the two, and the elastic material ring simultaneously achieves effects of flexible connection, load bearing and axial positioning and may be made of a rubber material, such as polyurethane rubber.

An axial supporting bearing of the rotation shaft (101) may adopt a group of axial supporting permanent magnetic bearings composed of one or more axial supporting permanent magnetic bearings in series connection. In case of a larger wheel weight, multiple bearings in series connection may be adopted. The axial supporting permanent magnetic bearings may adopt a permanent magnet repulsion type or a permanent magnet attraction type.

Radial supporting bearings of the rotation shaft (101) may adopt two groups of rolling bearings, or two groups of radial supporting magnetic bearings.

The axial supporting permanent magnetic bearings of the rotation shaft (101) are positioned in the middle of the rotation shaft, and the radial supporting bearings are positioned at both ends of the rotation shaft (FIG. 60, FIG. 61, FIG. 62 and FIG. 63).

With respect to the two groups of radial supporting rolling bearings, one group of the rolling bearings bears a radial load and is positioned at the lower end of the rotation shaft, and the other group of the rolling bearings can bear a radial load and a bidirectional axial load, is an axial positioning end and is positioned at the upper end of the rotation shaft. Each group of the rolling bearings is composed of one rolling bearing or multiple rolling bearings so as to meet requirements on load size and direction. Chambers of the rolling bearings are communicated with the atmosphere.

In order to enable the center line of the flywheel rotation shaft (101) to be positioned at a plumb position, a structure shown in FIG. 63 may be adopted. Installation levelness of a support plate (133) and a base (134) is adjusted, so that levelness of an installed reference plane (135) of the flywheel rotation shaft meets the requirement. A structure shown in FIG. 62 may also be adopted, wherein the support is composed of the support plate (133) and a spherical cone (137), and a contact surface (136) of the two is a spherical surface of which the center of sphere is positioned on the center line of the rotation shaft. During installation, by adjusting azimuth of the spherical cone, the installed reference plane (135) of the flywheel rotation shaft meets the levelness requirement or the center line of the rotation shaft reaches a plumb state.

A structure of transferring force from the rolling bearings at the lower end of the rotation shaft to a stationary member and the support may be a structure shown in FIG. 61. A bearing block (140) is directly in contact connection with an inner cylindrical hole of an outer steel bushing (139) accommodating a stationary disc (60) of the axial supporting permanent magnetic bearings. In order to ensure coaxiality of bearing block holes at the upper and lower ends, combination machining of upper and lower end seat holes is performed on related parts including the outer steel bushing. A structure of transferring force to a vacuum chamber shell as shown in FIG. 60 may also be adopted. The bearing block (140) is contacted with an inner cylindrical hole of an external spherical bushing (141), the latter is contacted with an inner spherical surface of a support disc (142), the center of sphere of the spherical surface is positioned on the center line of the rotation shaft, a spherical pair is used for automatically adjusting angles of bearing block holes, a support ring (143) of an outer ring is welded on an inner wall surface of the vacuum chamber shell (138), and connection between the support disc (142) and the support ring (143) has high center distance adjustment margin. After suspended installation of the flywheel rotation shaft and the wheels is completed, a bolt between the support disc and an end surface of the supporting ring is fastened, and a screw (144) is tightened, wherein a washer (145) is used for adjusting the height, and installation of an adjusting washer and a threaded fastener is operated by a person who enters from a manhole door in the vacuum chamber shell. Gravity of the bearing block (140) with an outer cylindrical surface (FIG. 60 and FIG. 61) and an attached stationary member inside the bearing block acts on an end surface of an outer ring of the bearing at the lower end so as to ensure a minimum load of the bearing. The outer cylindrical surface of the bearing block achieves an effect of allowing an axial free displacement on a supporting surface of a non-locating bearing.

Energy transfer among the wind wheel, the generator and the flywheel in the wind power system in the present invention has three types of solutions as follows: the first type of solution is that the HET does not exist between the wind wheel and the generator, equivalent to increase of an energy storage device and energy transfer equipment on an existing conventional wind power system, a second type of solution is that a set of independent HET exists between the wind wheel and the generator, and a third type of solution is that each of the wind wheel, the generator and the flywheel is connected with one HET half-coupled member.

In the first type of solution, the wind wheel may be directly connected with the generator (a direct drive solution), or connected with the generator by virtue of a speed-up gear box; a rotor at one end of one set of HET (recorded as HETf) for transferring flywheel energy is connected with a flywheel rotation shaft, and a rotor at the other end may be connected with the generator rotation shaft, or connected with the generator rotation shaft by virtue of a pair of bevel gears. The HETf may be a separated type or a centralized type. The generator rotation shaft end connected with the HETf may face the flywheel (except the direct drive solution) or deviate from the flywheel (that is, a connected shaft-extension end is positioned on one side connected with the flywheel or an opposite side, similarly hereinafter). The flywheel may be vertical or horizontal axis type, preferably the vertical flexible flywheel or the suspended flexible flywheel. When the horizontal axis type wind wheel, the horizontal generator (including a condition that a certain elevation exists between the wind wheel and the generator axis, similarly hereinafter) and the vertical flywheel are adopted, the HETf has three optional solutions as follows: a first solution is "one-horizontal one-vertical separated HETf", wherein a rotation shaft of a horizontal half-coupled member HETfhe is connected with a horizontal generator rotation shaft, and a rotation shaft of a vertical half-coupled member HETfhf is connected with the flywheel rotation shaft; a second solution is "two-vertical separated HETf", wherein a rotation shaft of a vertical half-coupled member HETfhe is connected with the horizontal generator rotation shaft through a pair of bevel gears, and a rotation shaft of a vertical half-coupled member HETfhf is connected with the flywheel rotation shaft; and a third solution is "vertical centralized HETf", wherein one rotor rotation shaft of the vertical centralized HETf is connected with the horizontal generator rotation shaft through a pair of bevel gears, and the other rotor rotation shaft of the vertical centralized HETf is connected with the flywheel rotation shaft.

In the second type of solution, a set of HET (recorded as HETw) is adopted between the wind wheel and the generator for transferring power. A rotor at one end of the HETw is connected with the generator rotation shaft, and a rotor at the other end of the HETw is directly connected with the flywheel rotation shaft, or connected with the flywheel rotation shaft by virtue of a speed-up gear box. The HETw may be separated or centralized. When the horizontal axis type wind wheel and the horizontal generator are adopted, the separated horizontal HETw is adopted in the solution without the speed-up gear box, then a rotation speed of the HET half-coupled member on the wind wheel side is very low, a hollow shaft and inner rotor type structure may be adopted, or an outer rotor type structure is adopted. The separated or centralized horizontal HETw is adopted in the solution with the speed-up gear box. A rotor at one end of one set of HET (recorded as HETf) for transferring flywheel energy is connected with a flywheel rotation shaft, and a rotor at the other end may be connected with the generator rotation shaft, or connected with the generator rotation shaft by virtue of a pair of bevel gears. The HETf may be a separated type or a centralized type. The generator rotation shaft end connected with the HETf may face the flywheel or deviate from the flywheel. The flywheel may be vertical or horizontal axis type, preferably the vertical flexible flywheel or the suspended flexible flywheel. When the horizontal axis type wind wheel, the horizontal generator and the vertical flywheel are adopted, the HETf has three optional solutions as follows: a first solution is "one-horizontal one-vertical separated HETf", wherein a rotation shaft of a horizontal half-coupled member HETfhe is connected with a horizontal generator rotation shaft, and a rotation shaft of a vertical half-coupled member HETfhf is connected with the flywheel rotation shaft; a second solution is "two-vertical separated HETf", wherein a rotation shaft of a vertical half-coupled member HETfhe is connected with the horizontal generator rotation shaft through a pair of bevel gears, and a rotation shaft of a vertical half-coupled member HETfhf is connected with the flywheel rotation shaft; and a third solution is "vertical centralized HETf", wherein one rotor rotation shaft of the vertical centralized HETf is connected with the horizontal generator rotation shaft through a pair of bevel gears, and the other rotor rotation shaft of the vertical centralized HETf is connected with the flywheel rotation shaft In the third type of solution, the wind wheel rotation shaft may be directly connected with one HET half-coupled member (recorded as HEThw, the rotation speed is very low, a hollow shaft and inner rotor type structure may be adopted, or an outer rotor type structure is adopted), or connected with one HET half-coupled member (recorded as HEThw). The generator rotation shaft is connected with one HET half-coupled member (recorded as HEThe). The flywheel rotation shaft is connected with one HET half-coupled member (recorded as HEThf). Main current circuits of the three HET half-coupled members are connected in series, which is equivalent to 1.5 separated HETs in principle. The flywheel may be vertical or horizontal axis type, preferably the vertical flexible flywheel and the suspended flexible flywheel.

Comparison between the second solution and the third solution is as follow: the second solution adopts two sets of HETs (HETw and HETf) independent of each other, is flexible in adjustment and control and wide in adjustable range and has the defect of having four rotors (or half-coupled members), while the third solution adopts 1.5 sets of HETs in series, has three HET half-coupled members (HEThw, HEThe and HEThf) and is small in structure quantity. However, due to a limitation that main currents of the three HET half-coupled members must be identical, adjustment and control are not flexible enough, and optimizing operation is limited.

When the horizontal axis wind wheel and the vertical flywheel are adopted, a flywheel rotation center line had better be coincided or parallel to a yaw rotation center line. When the two center lines are oincided or parallel, a gyroscoopic torque of the flywheel may be decreased to zero, and when the two center lines are oincided, a radial load on the structure and the bearing due to a movement of center of gravity may be eliminated.

When the second solution and the third solution are adopted, the generator may adopt a general synchronous or asynchronous power-frequency AC generator, and synchronously runs at a constant rotation speed under power frequency, or asynchronously runs at an approximate constant rotation speed. Both the synchronous generator and the asynchronous generator directly output power-frequency alternating current to supply power to the power grid by virtue of boost or supply power to an off-network user. Then, the horizontal axis type wind wheel is adopted, and blades of the wind wheel may be fixed pitch angle blades or variable pitch angle airfoil section blades.

Power capacity of the generator in the wind power system in the present invention and power capacity of related equipment (including an accessed boosting transformer and other power grid connecting equipment and cables) may be under reduced design, that is, the power capacity is designed at a capacity specification lower than rated power of the wind wheel. For example, rated electromagnetic power of the generator and rated power of the related equipment of the generator is half of the rated power of the wind wheel. Power capacity transferred by a flywheel structure in the wind power system in the present invention and power capacity of the HETf or HEThf for transferring the flywheel energy may be under nominal rating design, e.g., half of the rated power of the wind wheel. The nominal rating design at the generator end and the nominal rating design at the flywheel end may be adopted simultaneously, e.g., design capacity at both ends should be reduced by half.

A set of independent HET (HETf or HETw) may adopt a second adjustment and control method mentioned above for the HET.

An electromagnetic law formula of a series main current circuit of the 1.5 separated HETs with the three HET half-coupled members (HEThw, HEThe and HEThf) has forms as follows:

electromotive force of the HEThw half-coupled member rotor:

$$Ew = \omega w \cdot \Sigma \Phi w/(2\pi) \tag{g1}$$

electromotive force of the HEThe half-coupled member rotor:

$$Ee = \omega e \cdot \Sigma \Phi e/(2\pi) \tag{g2}$$

electromotive force of the HEThf half-coupled member rotor:

$$Ef = \omega f \cdot \Sigma \Phi f/(2\pi) \tag{g3}$$

a sum of electromotive force of the main current circuit:

$$\Sigma E = Ew + Ee + Ef \tag{g4}$$

main current:

$$I0 = \Sigma E/R0 \tag{g5}$$

electromagnetic torque applied to the HEThw half-coupled member rotor:

$$Mew = -I0 \cdot \Sigma \Phi w/(2\pi) \tag{g6}$$

electromagnetic torque applied to the HEThe half-coupled member rotor:

$$Mee = -I0 \cdot \Sigma \Phi e/(2\pi) \tag{g7}$$

electromagnetic torque applied to the HEThf half-coupled member rotor:

$$Mef = -I0 \cdot \Sigma \Phi f/(2\pi) \tag{g8}$$

Neglecting influences of temperature and other secondary factors, $\Sigma \Phi e$ and $\Sigma \Phi f$ may be represented as functions of an absolute value |I0| of main current I0 and corresponding half-coupled member magnet exciting coil current during running:

$$\Sigma\Phi w=F\!f\!w(|I0|,Iw1,Iw2,\ldots,Iwm) \quad (g9)$$

$$\Sigma\Phi e=F\!f\!e(|I0|,Ie1,Ie2,\ldots,Iem) \quad (g10)$$

$$\Sigma\Phi f=F\!f\!f(|I0|,If1,If2,\ldots,Ifm) \quad (g11)$$

Neglecting influences of temperature and other secondary factors, I0, Mew, Mee and Mef may be represented as functions of variables during running as follows:

$$I0=Fi0(\omega w,\omega e,\omega f,MLS,Ii01,Ii02,\ldots,Ii0m) \quad (g12)$$

$$Mew=Fmw(\omega w,\omega e,\omega f,MLS,Ii01,Ii02,\ldots,Ii0m) \quad (g13)$$

$$Mee=Fme(\omega w,\omega e,\omega f,MLS,Ii01,Ii02,\ldots,Ii0m) \quad (g14)$$

$$Mef=Fmf(\omega w,\omega e,\omega f,MLS,Ii01,Ii02,\ldots,Ii0m) \quad (g15)$$

wherein, {Ii01, Ii02, ..., Ii0m} is a set of {Iw1, Iw2, ..., Iwm}, {Ie1, Ie2, ..., Iem} and {If1, If2, ..., Ifm}.

An adjustment and control method based on a principle that a sum of two losses is minimal may be adopted by the 1.5 separated HETs with the three HET half-coupled members (HEThw, HEThe and HEThf) as follow:

The total loss is a sum of main current ohmic heat (I0·I0·R0) and each exciting current ohmic heat (ΣPoi), wherein R0 and Ri are constant values. An application limit range of the main current and each exciting current is selected. Within the range, corresponding relationships of total magnetic fluxes, penetrating through rotation surfaces of main current circuits of the rotors on the three rotors, along with multidimensional variable changes of the main current and related exciting current are respectively calculated or obtained by tests, i.e., $$\Sigma\Phi w=F\!f\!w(|I0|,Iw1,Iw2,\ldots,Iwm) \quad (g9)$$

$$\Sigma\Phi e=F\!f\!e(|I0|,Ie1,Ie2,\ldots,Iem) \quad (g10)$$

$$\Sigma\Phi f=F\!f\!f(|I0|,If1,If2,\ldots,Ifm) \quad (g11)$$

An application range of rotation speeds of three shafts and an application range of electromagnetic torque of two specified axes are given. By utilizing the electromagnetic law formulas (formulas (g1)-(g5) and two formulas in (g6)-(g8), and R0 is a constant value) and the above multidimensional variable function relationships (g9)-(g11)), a matrix of optimum values Iiopt of each exciting current, which fully covers different rotation speed conditions and torque demands and satisfies a total loss minimum target, is calculated, and all the data are stored in the control system.

When regulation is executed, rotation speeds (ωw, ωe and ωf) of the three rotors are acquired in real time as input conditions, an electromagnetic torque instruction of two specified axes is given as an input condition, related stored data is invoked from the control system, and a corresponding optimum value Iiopt of each exciting current is calculated by a spline interpolating function formula for an execution link.

An adjustment and control method with a minimal sum principle of three losses may be adopted by the 1.5 separated HETs with the three HET half-coupled members (HEThw, HEThe and HEThf) as follow:

The total loss is a sum of main current ohmic heat (I0·I0·R0), each exciting current ohmic heat (ΣPoi) and circuit "connecting region clearance" liquid metal friction heat, wherein R0 is a function of liquid metal state parameters MLS, and Ri is a constant value. An application limit range of the main current and each exciting current is selected. Within the range, corresponding relationships that the total magnetic fluxes, penetrating through rotation surfaces of main current circuits of the rotors on the three rotors, vary along with multidimensional variables of the main current and related exciting current are respectively calculated or obtained by tests, namely, $$\Sigma\Phi w=F\!f\!w(|I0|,Iw1,Iw2,\ldots,Iwm) \quad (g9)$$

$$\Sigma\Phi e=F\!f\!e(|I0|,Ie1,Ie2,\ldots,Iem) \quad (g10)$$

$$\Sigma\Phi f=F\!f\!f(|I0|,If1,If2,\ldots,Ifm) \quad (g11)$$

An application range of rotation speeds of three shafts, an application range of electromagnetic torque of two specified shafts and an application range of the circuit "connecting region clearance" liquid metal state parameter MLS are given. By utilizing the electromagnetic law formulas (formulas (g1)-(g5) and two formulas in (g6)-(g8), and R0 is a function of the liquid metal state parameter MLS) and the above multidimensional variable function relationships (g9)-(g11)), a matrix of optimum values Iiopt of each exciting current and a matrix of optimum values MLSopt of the liquid metal state parameter, which fully covered different rotation speed conditions and torque demands and satisfy a total loss minimum target, are calculated, and all the data are stored in the control system.

When regulation is executed, the rotation speeds (ωw, ωe and ωf) of the three rotors are acquired in real time as the input conditions, the electromagnetic torque instruction of the two specified shafts is also given as the input condition, the related stored data is invoked from the control system, and a corresponding optimum value Iiopt of each exciting current and an optimum value MLSopt of the liquid metal state parameter are calculated by the spline interpolating function formula for an execution link.

When the second solution and the third solution are adopted, the horizontal axis wind wheel runs at a designed pitch angle and variable rotation speed at the designed wind speed or below. By utilizing the adjustment function of the HET, the rotation speed of the wind wheel is controlled to change along the wind speed and is always kept to be close to an optimal tip speed ratio state. In a range from a wind speed higher than the designed wind speed to a cut-out wind speed, the horizontal axis type wind wheel adopting the fixed pitch angle blades is subjected to power limitation control by using a stall method, and the wind wheel is controlled to keep the designed wind speed by utilizing the adjustment function of the HET, or the wind wheel runs at a variable speed (mainly reduced speed) to output and maintain a designed power. The horizontal axis type wind wheel adopting the variable pitch angle blades is subjected to power limitation control by using a variable pitch angle method or an "active stall control" method, and the wind wheel is controlled to keep the designed wind speed by utilizing the adjustment function of the HET, or the wind wheel runs at a variable speed (mainly reduced speed) to output and maintain the designed power.

A set of mechanical brake apparatus is configured on the transmission shaft. The mechanical brake apparatus in the solution without the speed-up gear box is arranged on the wind wheel shaft, while the mechanical brake apparatus in the solution with the speed-up gear box may be arranged on the wind wheel shaft or on an output shaft of the gear box. The wind wheel is simultaneously equipped with aerodynamic braking measures. The variable pitch blade wind wheel adopts a "feathering" braking method. The fixed pitch blade wind wheel adopts a "tip" feathering brake structure or a "spoiler" brake structure.

The horizontal axis type wind wheel adopts one of yawing devices as follows: a yawing driven active yawing mechanism, a yawing tail vane and a yawing side wheel.

A stable power generation operating method is adopted during a normal operation of the wind power system in the present invention. The generator is operated according to planned average power generation power. When the output power of the wind wheel is higher than an average value under a strong wind condition or under gust of wind, a higher difference is absorbed by the flywheel. When the output power of the wind wheel is lower than the average value under a small wind condition, an insufficient difference is compensated and output by the flywheel.

The wind power system in the present invention may also realize a peak regulation function of the power grid. When the power grid needs to store energy and the wind speed is small, the generator serves as a motor, and electric energy from the power grid is absorbed by the flywheel. When the load of the power grid is increased and the wind speed is small, the stored energy is totally output by the flywheel.

The solutions in the present invention may achieve beneficial effects as follows.

(1) The flywheel and the HET serve as the energy storage device and energy transfer equipment thereof in the wind power system, so that a stable power generation function can be realized, and a stable and reliable power generation source is formed; when an extra power grid peak regulation measure is not needed, peak regulation capability may be provided for the power grid; electric energy at standard quality may be provided; and the rated capacity of the generator and equipment thereof connected with the power grid may be greatly decreased.

(2) The HET serves as energy transfer equipment of the energy storage flywheel. A high-frequency high-rotation speed motor located in a vacuum chamber is not used. A frequency converter is not used. Problems of high heating value and poor heat dissipation of the motor are solved. The transmission power is not limited. The power density of the equipment is high, the cost is low, and the energy conversion efficiency is high (the efficiency of the HET may reach 98%).

(3) The flexible suspended structure of the vertical wheels of the flywheel fundamentally solves imbalance and resonance problems of wheel and rotation shaft combined simply support rotors in conventional use. The wheels are located in a self-balancing rotation state. Unbalanced force on the rotation shaft at the upper end is very low, and a point of resonance is avoided. The axial supporting permanent magnetic bearings on the vertical rotation shaft of the flywheel solve the biggest support problems of the large-mass flywheels, that is, the gravity support problem. Frictional loss, eddy and hysteresis losses, current and other energy supply may be avoided. The flexibly connected multi-body wheels of the flywheel are favorable for manufacturing and increasing energy storage volume density.

(4) The HET is adopted between the wind wheel and the generator as the transmission equipment, and has beneficial effects as follows:

(i) A stepless variable speed and variable pitch transmission function is realized between the wind wheel and the generator, the rotating speeds and torques at both ends are allowed to range from zero to a maximum value, and a phenomenon that one end has the rotating speed and the other end has zero rotating speed can be realized, which is unattainable in a general mechanical stepless variable speed transmission device;

(ii) Direct mechanical connection does not exist between the two rotors of the HET; flexible connection between a rotor shaft system at one end of the wind wheel (and the gear box) and a shaft system at one end of the generator is formed; and direct rigid transfer of an impact load from one end to the other end is isolated, which is very favorable for decreasing a maximal designed load of each device, increasing operating stability and reliability and preventing the generator from being split from the power grid;

(iii) The wind wheel can be controlled to efficiently run at the variable rotating speed by utilizing the adjustment function of the HET, and at the designed wind speed or below, the rotating speed of the wind wheel is controlled to change along with the wind speed and is always kept in the optimal tip speed ratio state, thereby obtaining the maximum possible wind energy capture efficiency;

(iv) When the wind wheel is subjected to power limitation control at a wind speed exceeding the designed wind speed, the wind wheel can be controlled to run at a variable speed by utilizing the adjustment function of the HET, so that the wind wheel outputs and maintains the designed power even for a wind wheel with the fixed pitch blades; the adjustment capability is also a support base of implementing the item (iii), an existing wind power system makes a weighed compromise between a power limitation area and a normal running area due to absence of an effective adjustment method, and an actually adopted wind energy utilization coefficient is greatly lower than an attainable maximum value;

(v) The HET is high in efficiency, low in cost and small in electromagnetic interference and does not generate electromagnetic noise or harmonic;

(vi) Use of a conventional synchronous generator with high power supply quality has no obstacle in each of the solutions, and a conventional asynchronous generator may also be used;

(vii) When the fixed-pitch blade wind wheel under a start-up wind speed has a low starting torque and is not enough to self-start, and the generator should serve as a motor to drive the wind wheel to be started, since the generator shaft does not have direct connection with the wind wheel and the gear box, and rotational inertia of the generator shaft system is relatively small, a no-load motor starting method is adopted (the wind wheel does not rotate temporarily at an HET zero torque load), and is very favorable for switch-on self-starting of the motor including self-starting of the asynchronous generator as an asynchronous motor and self-starting of the synchronous generator as a synchronous motor (with a starting winding); and when the motor is started to reach a rated rotating speed in a no-load state, the wind wheel is driven to start to rotate by virtue of the HET load until the wind wheel outputs a net power and the motor is turned into a generator operating state.

(h) Flywheel Energy Storage and Conversion System Including HET

In the solution of the present invention, a homopolar DC electromagnetic transmission (HET) is used as energy transfer equipment of energy storage flywheels, so as to realize a novel strong-power, high-efficiency and low-cost energy storage and conversion system, and the problems of the large-mass wheels and bearings and the like are further solved by adopting the vertical flexible flywheel and the suspended flexible flywheel, so that the flywheel energy storage and conversion system is comprehensively improved.

The technical solution and principle of the present invention are described below in detail.

A flywheel energy storage and conversion system applicable to power grid peak regulation, wind power generation, an uninterruptible power supply and other fixed places includes: an energy storage flywheel device, a motor/generator, a set of homopolar DC electromagnetic transmission (HET) and a control system thereof.

The motor/generator adopts a synchronous motor or an asynchronous motor, is directly connected with a power-frequency power grid, runs at a synchronous rotation speed (the synchronous motor) or at a synchronous approximate rotation speed (the asynchronous motor) after started, is located in an atmospheric environment and adopts a horizontal or vertical structure. When energy is input into the flywheel by the power grid, the motor runs in a motor state, and when the energy is output from the flywheel to the power grid, the motor runs in a generator state. When the flywheel has the energy, the motor is started by preferably adopting a method for running the flywheel and the HET at a rated rotation speed.

The energy storage flywheel is composed of a wheel body, a rotation shaft, a bearing, a vacuum chamber and the like. A large-mass part of the wheel body is made by circumferentially winding a unidirectional continuous fiber reinforced composite material, and the bearing adopts a mechanical rolling bearing or a magnetic bearing. A preferred solution of the energy storage flywheel is the vertical flexible flywheel or the suspended flexible flywheel. The latter is particularly applicable to a flywheel with extremely large mass.

For the description of a solution of the vertical flexible flywheel, see the description in Chapter I of summary of the invention of "(c) Flywheel Power System for Vehicles Including HET".

For the description of a solution of the suspended flexible flywheel, see the description in Chapter I of summary of the invention of "(g) Wind Power Generation System Including HET and Flywheels".

The HET may adopt the vertical centralized solution as follows: the rotor at the lower end is connected with the upper shaft end of the flywheel rotation shaft by virtue of a coupling, or directly connected to the upper shaft end of the flywheel rotation shaft, or connected with the upper shaft end of the flywheel rotation shaft by virtue of a clutch (used for separating from the clutch when the HET does not work); and the rotor at the upper end is connected with the lower shaft end of the vertical motor rotation shaft by virtue of a coupling, or directly connected to the lower shaft end of the vertical motor rotation shaft.

The HET may adopt the separated HET solution as follows: the HET half-coupled member on the flywheel side is of a vertical structure; the rotor of the HET half-coupled member on the flywheel side is connected with the upper shaft end of the flywheel rotation shaft by virtue of a coupling, or directly connected to the upper shaft end of the flywheel rotation shaft, or connected with the upper shaft end of the flywheel rotation shaft by virtue of a clutch (used for separating from the clutch when the HET does not work); and the HET half-coupled member on the motor side is of a horizontal structure, and the rotor of the HET half-coupled member on the motor side is connected with the shaft end of the horizontal motor rotation shaft by virtue of a coupling, or directly connected to the shaft end of the horizontal motor rotation shaft.

The HET may adopt the second adjustment and control method mentioned above for the HET.

The solutions in the present invention may achieve beneficial effects as follows.

(1) The flexible suspended structure of the vertical wheels of the flywheel fundamentally solves imbalance and resonance problems of wheel and rotation shaft combined simply support rotors in conventional use. The wheels are located in a self-balancing rotation state. Unbalanced force on the rotation shaft at the upper end is very low, and a point of resonance is avoided.

(2) The axial supporting permanent magnetic bearings on the vertical rotation shaft solve the biggest support problem of the large-mass flywheels, that is, the gravity support problem. Frictional loss, eddy and hysteresis losses, current and other energy supply may be avoided.

(3) The multiple flexibly-connected wheel bodies of the flywheel are favorable for manufacturing and increasing energy storage volume density.

(4) An energy input and output conversion system adopts the homopolar DC electromagnetic transmission (HET) and the ordinary motor. The high-frequency high-rotation speed motor located in the vacuum chamber is not used. The frequency converter is not used. The problems of high heating value and poor heat dissipation of the motor are solved. The transmission power is not limited. The power density of the equipment is high, the cost is low, and the energy conversion efficiency is high. The efficiency of the HET may reach 98%.

DESCRIPTION OF DRAWINGS

In the following figures, half of a section view (or a schematic diagram) on one side of a central axis is drawn only based on an axisymmetric structure in some figures.

FIG. 19 is a meridian plane schematic diagram of a separated type, double magnetic flux, near-axis coil, solid shaft, axial plane type, HET half-coupled member;

FIG. 23 is a meridian plane diagram (I) of a flexible flywheel and separated HET half-coupled member (part A);

FIG. 33 shows a load joint and a flywheel loading disc (an intersection angle 135° is formed between left half section and right half section);

Figure 1:
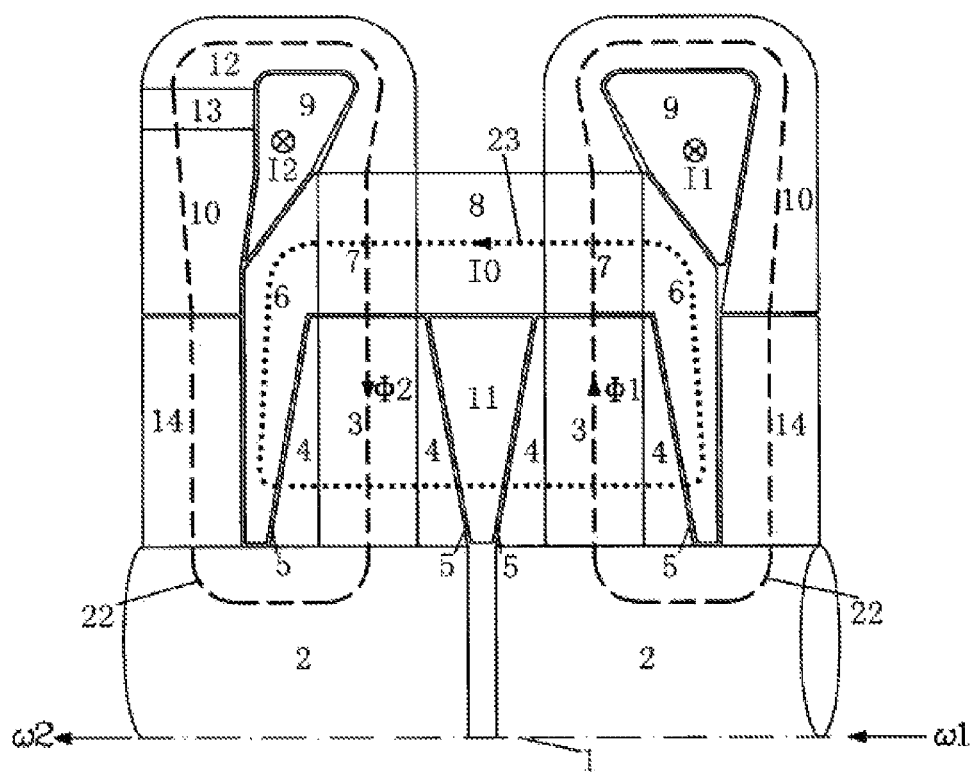
FIG. 1 is a meridian plane schematic diagram of a centralized type, two-axis single-magnetic flux (without two-axis sharing), far-axis coil, solid shaft, axial plane type, permanent magnet excited HET.
Figure 2:
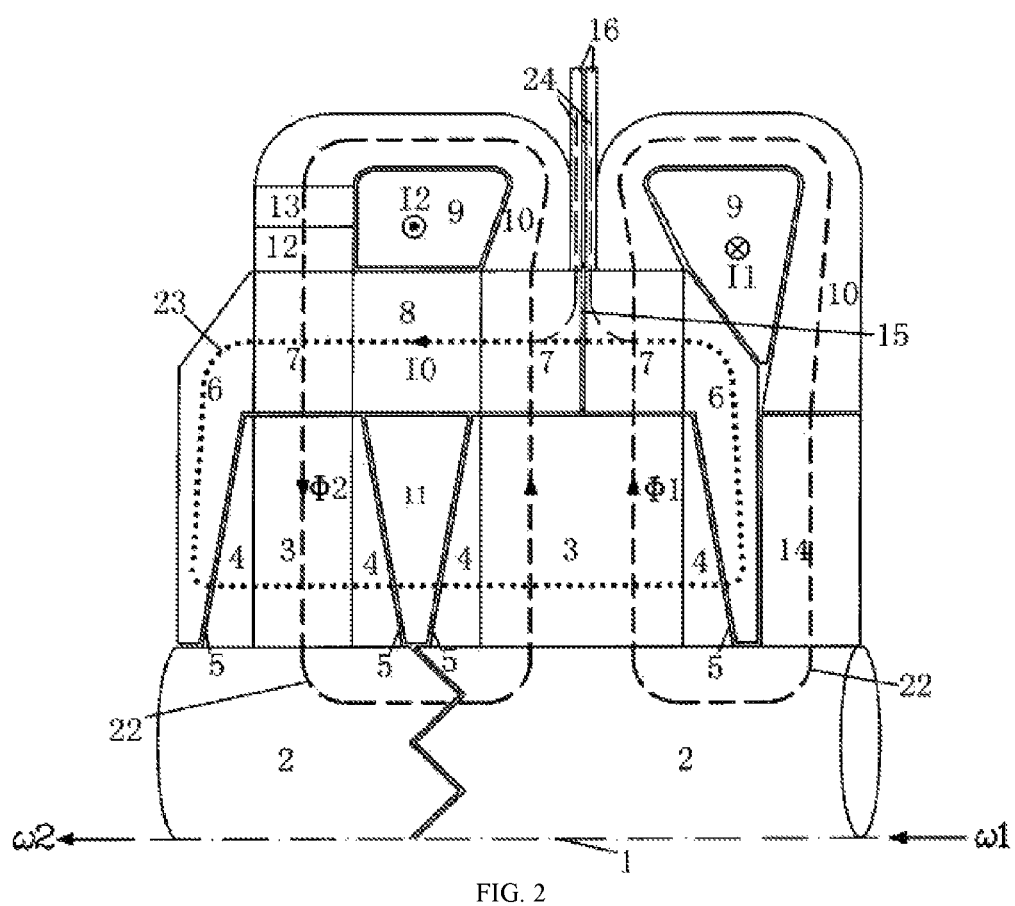
FIG. 2 is a meridian plane schematic diagram of a centralized type, two-axis (one-single one-double magnetic flux) (two-axis sharing), far-axis coil, solid shaft, axial plane type, permanent magnet excited, intermediate external terminal led-out, HET.
Figure 3:
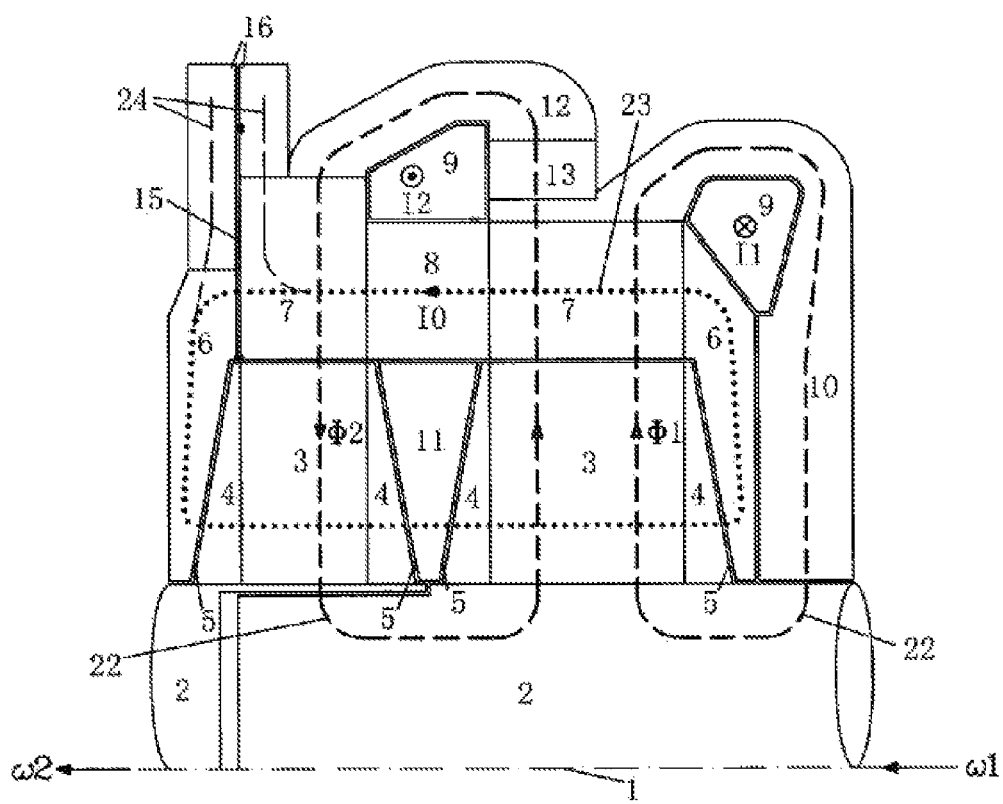
FIG. 3 is a meridian plane schematic diagram of a centralized type, two-axis (one-single one-double magnetic flux) (two-axis sharing), far-axis coil, solid shaft, axial plane type, permanent magnet excited, external terminal led-out on one side of single magnetic flux, HET.
Figure 4:
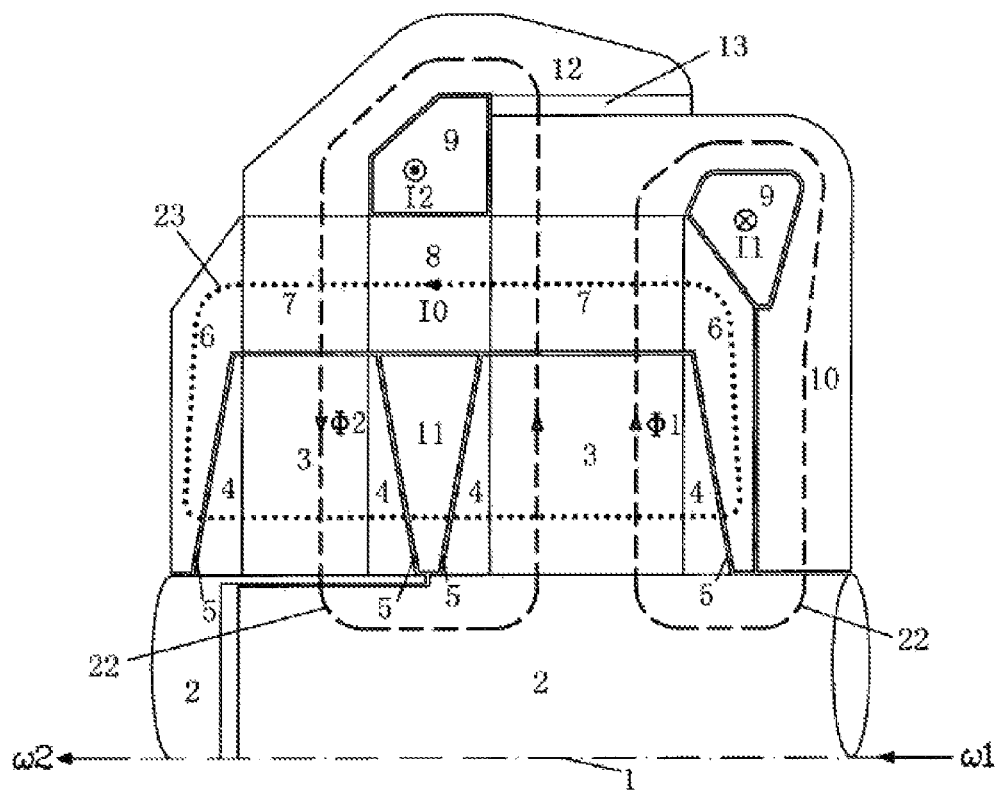
FIG. 4 is a meridian plane schematic diagram of a centralized type, two-axis (one-single one-double magnetic flux) (two-axis sharing), far-axis coil, solid shaft, axial plane type, permanent magnet excited, HET.
Figure 5:
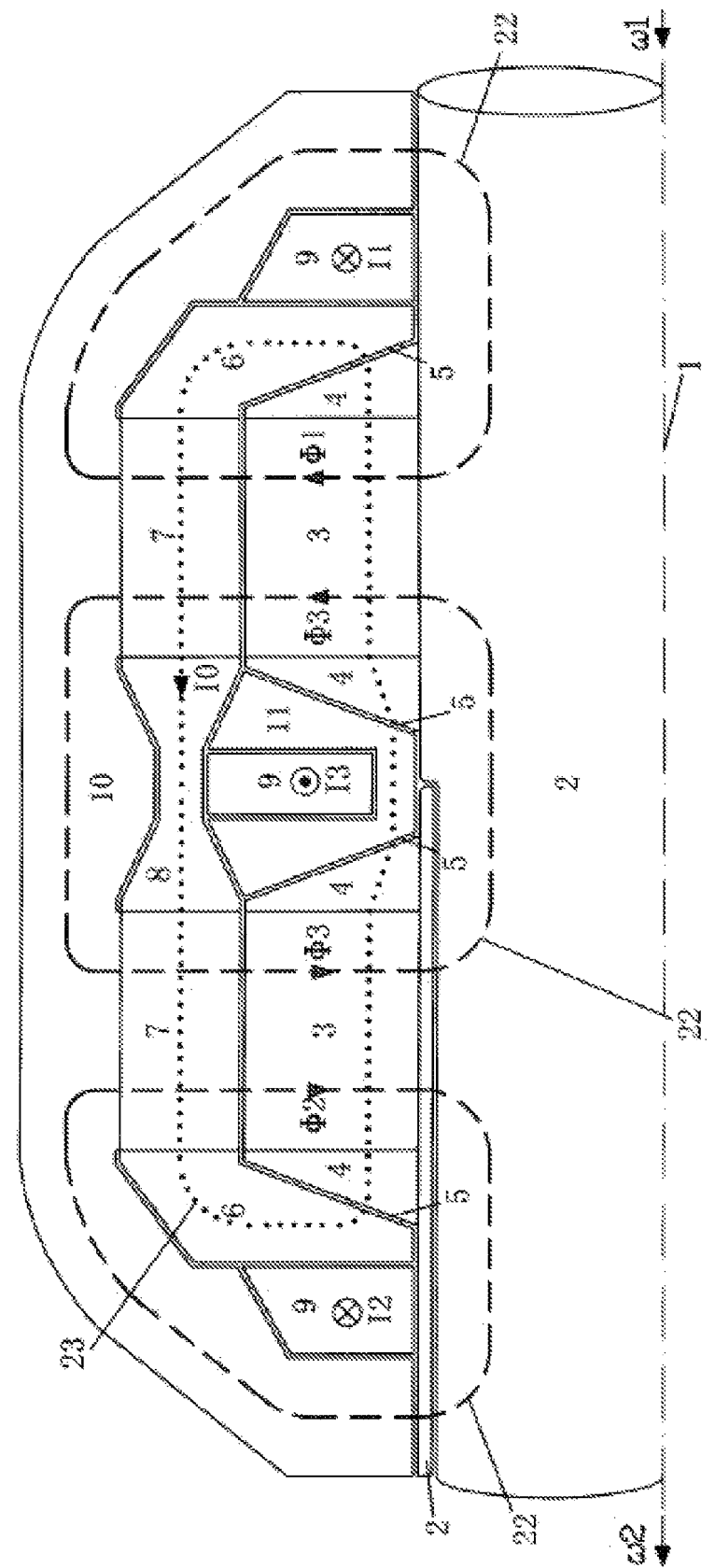
FIG. 5 is a meridian plane schematic diagram of a centralized type, two-axis two-double magnetic flux (two-axis shared), far-axis coil, solid shaft, axial plane type, HET.
Figure 6:
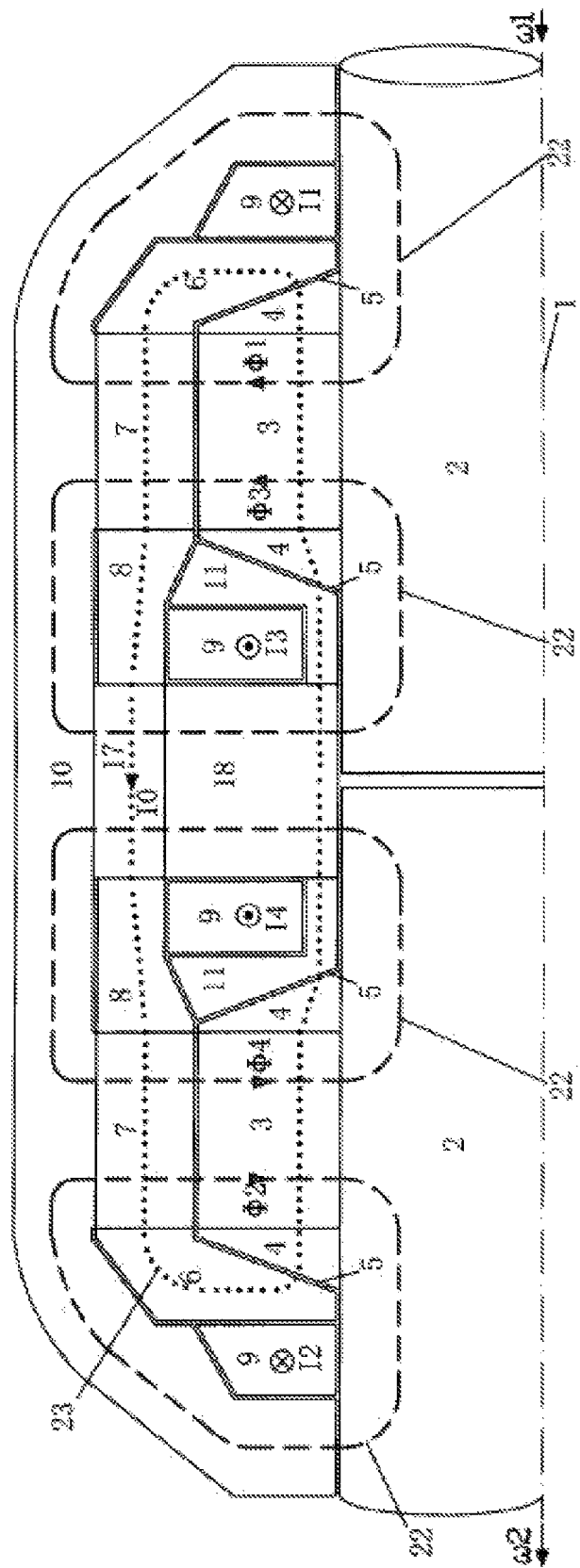
FIG. 6 is a meridian plane schematic diagram of a centralized type, two-axis two-double magnetic flux (without two-axis sharing in form), far-axis coil, solid shaft, axial plane type, same two-axis rotation direction, HET.
Figure 7:
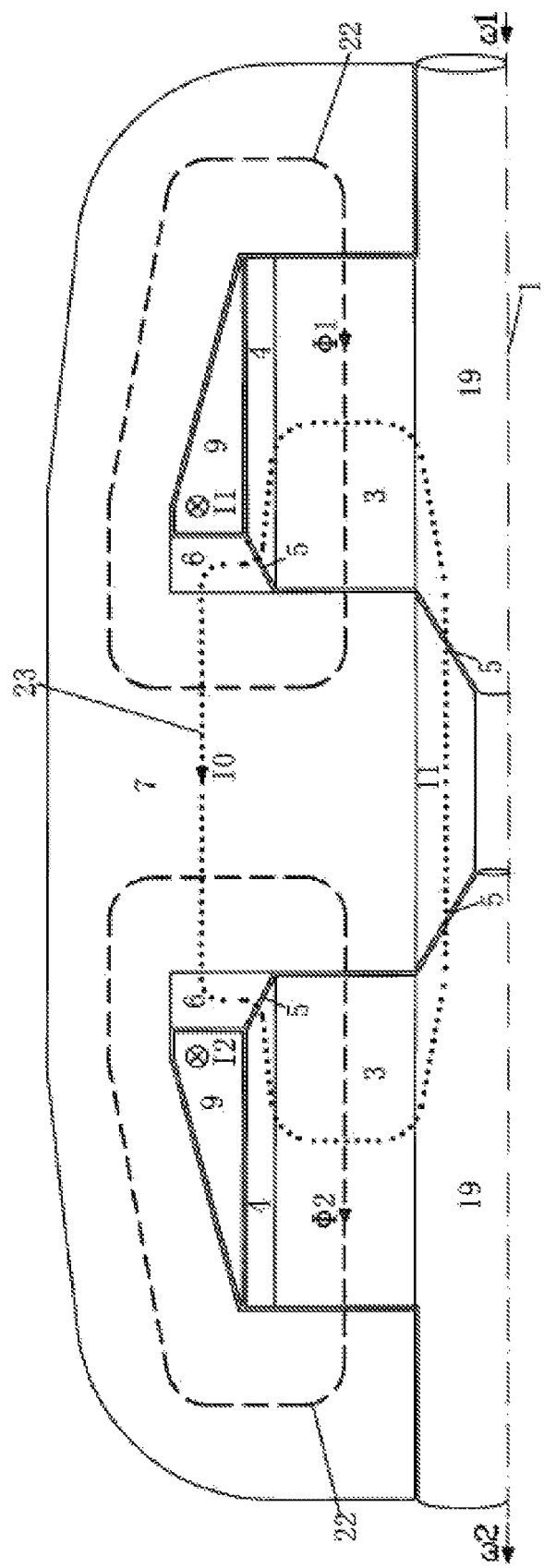
FIG. 7 is a meridian plane schematic diagram of a centralized type, two-axis two-single magnetic flux (without two-axis sharing in form), solid shaft, axial plane type (axial magnetic flux gap, axial attraction offset design), HET.

DETAILED DESCRIPTION (a) Homopolar DC Electromagnetic Transmission (HET)

In the detailed design solution of a separated HET, two half-coupled members with the same structure and size are arranged. Each of the half-coupled members is of double magnetic flux, single-stage, single circuit, near-axis coil, solid half and axial plane type. A meridian plane diagram of the HET half-coupled members is shown in FIG. 19.

The sizes of each of the half-coupled members are as follows: a shaft surface radius of a rotation shaft is 53 mm, a radius of a stator body is 138.65 mm, a radius of an external terminal is 213.5 mm, and an axial length of a stator is 280 mm. A designed value of a rotation speed of a rotation shaft of each of the half-coupled members is 10000 r/min, and a designed value of electromagnetic power is 240 kW. A designed value of main current is 40794 A. In a design point, a sum of total exciting current ohmic heat power of the HET, "connecting region clearance" friction power NaK liquid friction power and main current ohmic heat power is about 4% of the designed value 240 kW of the electromagnetic power.

Each rotor has a rotor magnetic and electric conductor (3), and two rotor electric conductors (4), two stator electric conductors (6), two magnet exciting coils (9), two stator magnetic and electric conductors (7), two NaK metal liquid "connecting region clearances" (5) and matched channels and pipelines thereof with symmetrical structures are arranged on left and right sides of the rotor. A double-magnetic-flux magnetic circuit is also of a symmetrical structure except both ends. Supporting end covers (36) at both ends are made of aluminum alloys, and symmetry of the magnetic circuit is not influenced. Although axial magnetic attraction on the rotor is not generated, a non-magnetic requirement for a magnetic fluid sealing element (37) arranged on an end cover inner ring is met. Currents with the same amplitude and opposite directions are conducted to the two magnet exciting coils, and a generated double-magnetic-flux magnetic field is basically in bilateral symmetry. The two magnet exciting coils are connected in series together to serve as a coil which has an exciting current.

A rotation shaft (2) is formed by interference fit of two parts, that is, a central fine shaft and an outer-ring annular shaft. Rolling bearings are arranged at both ends of the central fine shaft; one end with a shaft extension end is connected with an external rotation shaft, and the central fine shaft is made of 45 steel or steel 40Cr. The outer-ring annular shaft is made of 20 steel. The magnetic fluid sealing element (37) is paired with the outer-ring annular shaft, and the outer-ring annular shaft has an inner groove herein, thereby decreasing leakage flux of magnetic fluid seal and further reducing stress concentration.

The magnetic and electric conductors (3) and the electric conductors (4) on the rotors are of a whole-circle structure, are in interference fit with the rotation shaft (2) and in electric insulation with the rotation shaft (2). The magnetic and electric conductors (3) are made of 20 steel, while the electric conductors (4) are made of chromium-copper Cu-0.5Cr. Bottoms of two end surfaces of the magnetic and electric conductors (3) are widened to be conical, which is favorable for magnetizing and decreasing stress concentration caused by the interference fit. The electric conductors (4) adopt a full-height design with the same outer diameter as that of the magnetic and electric conductors (3). Joint seams between the magnetic and electric conductors (3) and the electric conductors (4) are filled with NaK metal liquid. Top ends and bottom ends of the joint seams are sealed by fluorine rubber sealing bodies and adhesives. Two liquid injection holes which are circumferentially and uniformly distributed are formed in the bottoms of the electric conductors (4) and communicated with the outside and the metal liquid joints. Stoppers are arranged at outer ends of the liquid injection holes. A vacuum suction method is adopted during assembly and liquid injection. One liquid injection hole is used for vacuumizing, and the other liquid injection hole is used for injecting the NaK metal liquid. Liquid filled in the bottom liquid injection hole may be supplemented to a volume space which is increased with the rotation of the joints, thereby ensuring that the joints are always filled with the metal liquid.

The stator electric conductors (6) are designed to be of a non-whole-circle top and bottom semi-split structure, so as to avoid an interference with the rotor electric conductors (4) in an integrated design during assembly (if each of the electric conductors (4) is divided into a left body and a right body, the stator electric conductors (6) may be in whole-circle split installation). Meanwhile, it is favorable for processing or installing needed channels, pipelines and connecting lines on a split surface. The electric conductors (6) are made of red copper. An inlet channel and an outlet channel for the NaK metal liquid are designed on the electric conductors (6). The outlet channel includes a branch clearance (25), a uniform-delivery buffer region clearance (27), and 16 circumferentially uniformly distributed through holes in radial arrangement (for insertion of a round pipe (28)). The inlet channel includes a second branch clearance (26), a uniform-delivery buffer region clearance (29), and 16 circumferentially uniformly distributed through holes in radial arrangement (for insertion of a round pipe (30)). The round pipes (28, 30) are made of the red copper, and when the round pipes are inserted into corresponding through holes, contact surfaces are sealed by the fluorine rubber sealing adhesives. In order to prevent the metal liquid that enters the channel from being heated too fast and causing temperature rise, a thermal insulating clearance (31) is designed, and a thermal insulating clearance is designed on an extended circuit of the round pipe (30). In order to conveniently process narrow clearances (25, 26, 27, 29 and 31) on the electric conductors (6), the electric conductors (6) are divided into 4 split bodies ((6a, 6b, 6c, 6d) sleeved in sequence, so that a wall surface of each narrow clearance is completely exposed outside during machining. A connecting seam allowance (the seam allowance has a cylindrical surface and an end surface) of the 6a and 6b and a connecting seam allowance of the 6b and 6c are sealed by fluorine rubber conductive adhesives, thereby maintaining electrical conductivity. A connecting seam allowance of the 6c and 6d is located on the top and sealed by a fluorine rubber sealing adhesive.

Two axisymmetric grooves (32) are formed in the stator electric conductors (6a, 6d), inner ends of the axisymmetric grooves are semicircular, fluorine rubber hoses (33) are installed in the grooves, and the hoses are hidden in the grooves and not protruded when an internal or external pressure is a barometric pressure. Each of the hose is communicated with a ventilating pipe (34), and the ventilating pipe is made of fluorine rubber, inserted into a hose opening and adhered and sealed. The ventilating pipes pass through the electric conductors (6) and the magnetic conductors (10) and are connected to an external auxiliary system. Center lines of the ventilating pipes are located on a split surface of the electric conductors (6), that is, semicircular grooves are correspondingly formed in two half split surfaces of the electric conductors (6), and a whole circular groove is formed to accommodate the ventilating pipes when the upper and lower half split surfaces are merged. During assembly, wall surfaces of the ventilating pipes and the grooves are sealed by the fluorine rubber sealing adhesives. The ventilating pipes are axially arranged on adjacent surfaces of the electric conductors (6) and the magnetic conductors (10). When the magnetic conductors (10) in the whole-circle structure are axially installed, the ventilating pipes pass through axial through holes of corresponding magnetic conductors (10).

Semicircular grooves are formed in upper and lower half split surfaces of the electric conductors (6a, 6d) close to the hoses (33), and a vent hole (35) is formed when the upper and lower half split surfaces are merged. Before the vent hole reaches a boundary of the electric conductor (6a) or the electric conductor (6d), a vent hole connecting pipe is communicated with the vent hole. The vent hole connecting pipe is made of fluorine rubber, and installation, arrangement and corresponding processing operations of the vent hole connecting pipe are the same as those of the ventilating pipes (34).

The upper and lower half split surfaces of the stator electric conductors (6) are sealed by the fluorine rubber sealing adhesives during assembly and mergence.

The two stator magnetic and electric conductors (7), two external terminals (16) and the two stator magnetic conductors (10) are of the whole-circle structure. The magnetic and electric conductors (7) and the magnetic conductors (10) are made of electromagnetic pure iron, and the external terminals (16) are made of the red copper. Joints between the stator electric conductors (6) and the magnetic and electric conductors (7) are filled with the NaK liquid, the NaK liquid is supplied by 4 circumferentially uniformly distributed small holes (44), and top ends and bottom ends of the joints are sealed by fluorine rubber sealing bodies and adhesives. Connecting surfaces of the magnetic and electric conductors (7) and the external terminals (16) are conical surfaces, the joints are filled with the NaK liquid, the NaK liquid is supplied by 4 circumferentially uniformly distributed small holes (38), and top ends and bottom ends of the joints are sealed by the fluorine rubber sealing bodies and adhesives. Mechanical connection between the two external terminals (16) and the two magnetic conductors (10) is fastened by bolts arranged in staggered directions, that is, the two external terminals and the magnetic conductor on the left side are fastened by singular bolts, and the two external terminals and the magnetic conductor on the right side are fastened by even-number bolts. Elastic taper washers (39) made of rubber are designed for transferring axial force of the bolts used for fastening the magnetic conductors (10), and axially pressing the magnet exciting coils (9), the stator electric conductors (6a, 6b) and the stator magnetic and electric conductors (7) in sequence.

16 groups of coaxial grooves and through holes which are circumferentially and uniformly distributed are formed in the two external terminals (16), spindles (40) of coaxial external conductors are bound with surfaces of the grooves, and binding surface clearances are filled with gallium-indium-tin alloy liquid (a ratio of gallium to indium to tin is 62:25:13) and sealed by fluorine rubber sealing rings (42). Pipe walls (41) of the coaxial external conductors are bound with surfaces of the through holes, and binding surface clearances are filled with the gallium-indium-tin alloy liquid (the ratio of gallium to indium to tin is 62:25:13) and sealed by fluorine rubber sealing rings (43). A vacuum suction method is adopted while filling the gallium-indium-tin alloy liquid. The spindles (40) and the pipe walls (41) are made of pure aluminum. Clearances are reserved between the spindles (40) and the pipe walls (41), and the heat is taken away by transformer oil flowing in the clearances.

The magnet exciting coils (9) adopt a continuously wound whole-circle structure in which a plug joint or a split surface does not exist.

A surface layer of being resistant to erosive wear and conductive is processed on a rotor wall surface of the "connecting region clearances" (5). The surface layer is an electroplated silver-antimony alloy.

In the external auxiliary system, a circulating NaK liquid outer flow path is formed corresponding to each of the "connecting region clearances" (5). Liquid inlet ends of the flow paths are communicated with a manifold pipe of 16 round pipes (28), and liquid outlet ends of the flow paths are communicated with a manifold pipe of 16 round pipes (30). In each of the outer flow path, starting from one side of the liquid inlet end of the flow path, a volume regulating valve, a solid impurity filter, a circulating pump, a bubble gathering discharger and a radiator are arranged in sequence.

The volume regulating valve is of a diaphragm structure, the diaphragm is made of fluorine rubber, an axial movement of the diaphragm is driven by a stepping motor with linear displacement output, and an adjustable volume chamber encircled and sealed by the diaphragm and the valve body is communicated with the outer flow path.

The solid impurity filter takes a nickel powder metallurgy porous material as a filter element, so that total NaK liquid in the outer flow path flows through the filter element, and solid impurities are intercepted on the front part of the filter element.

The circulating pump adopts a centrifugal pump and is driven by a motor with an adjustable rotation speed, and a rotation shaft of a centrifugal impeller is sealed by a fluorine rubber filler.

The bubble gathering discharger takes the nickel powder metallurgy porous material as a gas-liquid separation element. The total NaK liquid flows through a channel encircled by inner side surfaces of the element at a low speed. A chamber communicated with an air chamber around the "connecting region clearances" (5) is formed in an outer side surface of the element. Bubbles in the NaK liquid are driven to pass through pores of the separation element by virtue of an inside and outside differential pressure, so as to filter the bubbles and return to an original air chamber. However, the NaK liquid is limited due to extremely high surface tension and cannot pass through the pores of the separation element.

The radiator is of a shell-and-tube structure, the NaK liquid flows in heat exchange tubes, the transformer oil flows in a tube shell, and outer walls of the heat exchange tubes are provided with fins.

The HET includes a set of transformer oil circulating system which includes a transformer oil circulating pump, a transformer oil air-cooled heat exchanger and a solid impurity filter. The circulating pump adopts a centrifugal pump or an axial flow pump. The transformer oil is driven to flow through shell sides of 4 NaK liquid radiators and intermediate clearances of the coaxial external conductors in parallel and flow through an inside-tube flow channel of a finned-tube air-cooled heat exchanger and the solid impurity filter in a centralized manner. Cooling air is driven by an external fan. The circulating pump is positioned in front of the air-cooled heat exchanger and behind the filter. The transformer oil is sequentially subjected to continuous repeated circulating processes such as heat-absorbing temperature rise and depressurization on the radiators and the coaxial conductors, depressurization on the filter, pressurization and temperature rise on the circulating pump and heat release cooling and depressurization on an air cooler.

Magnetic fluid dynamic sealing elements (37) are arranged on inner sides of bearings at both ends of the rotation shaft. In addition to static seal mentioned above, static seals in the following positions are arranged on the stators: between the element 37 and the element 36, between the element 36 and the element 10, between the element 10 and the element 16, between two of the elements 16 (insulated and sealed), between the round pipes (28, 30) and the element 10 (adopting a sealing ring 45), between the ventilating pipe (34) and the element 10 and between the connecting pipe of the vent hole (35) and the element 10. A closed gas chamber composed of the above seals and other related objects thereof is filled with nitrogen.

The nitrogen and metal liquid should be filled when the complete set of HET system is assembled. The operating method includes the following steps: vacuumizing a closed space occupied by the nitrogen and NaK liquid, wherein the space is a mutually communicated space (the sealing hose (33) is not in expansive seal, and interior of the hose is vacuumized), and the space includes NaK liquid joints in stator bodies, NaK liquid outer flow paths and the chamber in the outer side surface of the gas-liquid separation element of the bubble filter; pressurizing the sealing hose (33) with the nitrogen, and enabling an outer wall of the hose to be in sealed contact with the wall surface of the rotor; continuously retaining vacuumizing operations of the two vent holes (35), starting to inject liquid into a NaK liquid outer pipeline according to a serial line sequence, filling the NaK liquid into a vacuum chamber communicated with the "connecting region clearances" (5), and enabling the NaK liquid to be full of the space sealed by the hose (33) by virtue of a vacuum suction effect; and decompressing the hose (33) to remove the seal, filling the gas chamber with the nitrogen via the vent holes (35), and controlling an inside-tube nitrogen pressure of the hose (33) to be consistent with a pressure in the gas chamber.

The two magnet exciting coils of each of the half-coupled members are connected in series in a manner of opposite rotation directions, are considered as a dual coil and are conducted with the same exciting current. The exciting current corresponding to the rotor 1 and the rotor 2 is recorded as I1 and I2 respectively. Since a magnetic field of two separated half-coupled members has independence, total magnetic flux $\Sigma\Phi1$ and $\Sigma\Phi2$ may be expressed as follows:

$$\Sigma\Phi1 = Ff1(|I0|,I1) \tag{a21}$$

$$\Sigma\Phi2 = Ff2(|I0|,I2) \tag{a22}$$

Further, since the two half-coupled members have the same structure size and consistent regularity, functional forms Ff1( ) and Ff2( ) are the same and may be recorded as a functional form Ff( ) that is, $$\Sigma\Phi1 = Ff(|I0|,I1) \tag{a23}$$

$$\Sigma\Phi2 = Ff(|I0|,I2) \tag{a24}$$

Meanwhile, a calculated amount of corresponding regularity content may be reduced by half, and only calculation should be performed on one of the half-coupled members.

During operating control of an output torque, any one of 5 adjustment and control methods should be selectively used as follows:

A first type of first adjustment and control methods:

A main current upper limit value I0max in an adjustment range is selected as a designed value, and a lower limit value I0min is zero.

Two numerical values are obtained by calculation or test as follows:

$$\Sigma\Phi max_d = Ff(|I0max|,I_{id}) \tag{a25}$$

$$\Sigma\Phi min_d = Ff(|I0min|,I_{id}) \tag{a26}$$

wherein Iid is respectively a designed value of the I1 and I2.

Two relation curves changing along with exciting current Is are obtained by calculation or test as follows:

$$\Sigma\Phi max = Ff(|I0max|, Is) \quad (a27)$$

$$\Sigma\Phi min = Ff(|I0min|, Is) \quad (a28)$$

wherein a range of the value Is ranges from zero to the designed value Iid.

During operating adjustment, rotation speeds ω1 and ω2 of the two rotors are acquired in real time.

When ω1 is more than or equal to ω2, I2 is taken as a constant value Iid, I1 is taken as adjustable exciting current Is, and electromagnetic law formula ((a1)-(a4), wherein R0 is a constant value) and the following formulas ((a29)-(a32)) are utilized:

$$\Sigma\Phi 1max = \Sigma\Phi max = Ff(|I0max|, Is) \quad (a29)$$

$$\Sigma\Phi 1min = \Sigma\Phi min = Ff(|I0min|, Is) \quad (a30)$$

$$\Sigma\Phi 2max = \Sigma\Phi maxd = Ff(|I0max|, Iid) \quad (a31)$$

$$\Sigma\Phi 2min = \Sigma\Phi mind = Ff(|I0min|, Iid) \quad (a32)$$

Or, when ω1 is less than ω2, I1 is taken as a constant value Iid, I2 is taken as adjustable exciting current Is, and electromagnetic law formula ((a1)-(a4), wherein R0 is a constant value) and the following formulas ((a33)-(a36)) are utilized:

$$\Sigma\Phi 2max = \Sigma\Phi max = Ff(|I0max|, Is) \quad (a33)$$

$$\Sigma\Phi 2min = \Sigma\Phi min = Ff(|I0min|, Is) \quad (a34)$$

$$\Sigma\Phi 1max = \Sigma\Phi maxd = Ff(|I0max|, Iid) \quad (a35)$$

$$\Sigma\Phi 1min = \Sigma\Phi mind = Ff(|I0min|, Iid) \quad (a36)$$

At the current rotation speed, an upper limit value Ismax and a lower limit value Ismin corresponding to the upper limit value and the lower limit value of the main current are calculated at any time, namely, $$Ismax = F(I0max, \omega 1, \omega 2) \quad (a16)$$

$$Ismin = F(I0min, \omega 1, \omega 2) \quad (a17)$$

The upper limit value (Ismax, I0max) and the lower limit value (Ismin, I0min) of the current obtained above simultaneously correspond to the upper limit value (Me1max, Me2max) and the lower limit value (Me1min, Me2min) of the electromagnetic torque at the current rotation speed, and such a corresponding relation is in monotonic change. The lower limit value of the electromagnetic torque is zero, and an upper limit value of the electromagnetic torque at a lower rotation speed is a design rated value.

When regulation is executed, an operation range of the actuator may linearly correspond to the adjustable exciting current Is in a range located between the upper limit value Ismax and the lower limit value Ismin; both ends of the operation range correspond to the upper limit value and the lower limit value of the electromagnetic torque, but an intermediate value of the electromagnetic torque and the operation range are generally not in a linear relationship. A certain nonlinear correspondence rule may also be adopted between the operation range and the adjustable exciting current Is, so that the electromagnetic torque and the operation range tend to be in approximate linear correspondence. The nonlinear correspondence rule should be obtained by analysis summary of the calculated or tested data.

A first type of the second adjustment and control methods:

A relation curve that varies along with main current I0 is obtained by calculation or test as follows:

$$\Sigma\Phi d = Ff(|I0|, Iid) \quad (a37)$$

A relationship curve changing along with main current I0 and exciting current Is is obtained by calculation or test as follows:

$$\Sigma\Phi = Ff(|I0|, Is) \quad (a38)$$

wherein the value of I0 ranges from zero to a designed value, and the value of Is ranges from zero to a designed value Iid.

A selected torque command is specific to Me1 or Me2.

When regulation is executed, rotation speeds ω1 and ω2 of the two rotors are acquired in real time.

When ω1 is more than or equal to ω2, I2 is taken as a constant value Iid, I1 is taken as adjustable exciting current Is, and electromagnetic law formula ((a1)-(a4), (a5) or (a6), wherein R0 is a constant value) and the following formulas ((a39)-(a40)) are utilized:

$$\Sigma\Phi 1 = \Sigma\Phi = Ff(|I0|, Is) \quad (a39)$$

$$\Sigma\Phi 2 = \Sigma\Phi d = Ff(|I0|, Iid) \quad (a40)$$

Or, when ω1 is less than ω2, I1 is taken as a constant value Iid, I2 is taken as adjustable exciting current Is, and electromagnetic law formula ((a1)-(a4), (a5) or (a6), wherein R0 is a constant value) and the following formulas ((a41)-(a42)) are utilized:

$$\Sigma\Phi 2 = \Sigma\Phi = Ff(|I0|, Is) \quad (a41)$$

$$\Sigma\Phi 1 = \Sigma\Phi d = Ff(|I0|, Iid) \quad (a42)$$

A current rotation speed value and a given torque command (Me1 value or Me2 value, an application range of the value Me1 or Me2 meeting a limiting condition of each factor is calculated and determined in advance) are taken as input conditions, and then the needed adjustable exciting current Is is calculated at any time for use in the execution link.

The value Is is a solving result of seven simultaneous equations ((a1)-(a4), (a5) or (a6), (a39) or (a41), (a40) or (a42)), and a functional form is as follows:

$$Is = F(Me1 \text{ or } Me2, \omega 1, \omega 2) \quad (a20)$$

A first type of the third adjustment and control methods:

A relation curve that varies along with main current I0 is obtained by calculation or test as follows:

$$\Sigma\Phi d = Ff(|I0|, Iid) \quad (a37)$$

A relationship curve that varies along with main current I0 and exciting current Is is obtained by calculation or test as follows:

$$\Sigma\Phi = Ff(|I0|, Is) \quad (a38)$$

wherein the value of I0 ranges from zero to a designed value, and the value of Is ranges from zero to a designed value Iid.

A selected torque command is for Me1 or Me2, and an application range of the torque command is given. An application range of rotation speeds of two shafts is given. By utilizing electromagnetic law formula ((a1)-(a4), (a5) or (a6), wherein R0 is a constant value), formulas (a39) and (a40) are simultaneously utilized when ω1 is more than or equal to ω2, or formulas (a41) and (a42) are simultaneously utilized when ω1 is less than ω2, to calculate a matrix of the adjustable exciting current value Is that fully covers different rotation speed conditions and torque demands (the functional form is the same as that of a formula (a20)), and the total data are stored in the control system. When ω1 is more than or equal to ω2, the I2 is a constant value Iid and I1 is the adjustable exciting current Is; or when ω1 is less than ω2, the I1 is the constant value Iid, and the I2 is the adjustable exciting current Is.

When regulation is executed, rotation speeds ω1 and ω2 of the two rotors are acquired in real time. A current rotation speed value and a given torque command (Me1 value or Me2 value) are taken as input conditions, related stored data is invoked from the control system, the corresponding adjustable exciting current value Is is calculated by adopting a spline interpolation function formula, and an adjustment coil is determined for use in the execution link.

A second type of the first adjustment and control methods: The total loss is a sum of main current ohmic heat (I0·I0·R0) and exciting current ohmic heat (ΣPoi), wherein R0 and Ri are constant values.

A relationship curve changing along with main current I0 and exciting current Ii is obtained by calculation or test as follows:

$$\Sigma\Phi = Ff(|I0|, Ii) \tag{a43}$$

wherein the value of I0 ranges from zero to a designed value, and the value of Ii ranges from zero to a designed value Iid.

The Ii in the formula (a43) is replaced with I1 and I2, so as to obtain two formulas as follows:

$$\Sigma\Phi 1 = Ff(|I0|, I1) \tag{a44}$$

$$\Sigma\Phi 2 = Ff(|I0|, I2) \tag{a45}$$

A selected torque command is for Me1 or Me2, and an application range of the torque command is given. An application range of rotation speeds of two shafts is given. By utilizing electromagnetic law formula ((a1)-(a4), (a5) or (a6), wherein R0 is a constant value) and the formulas (a44) and (a45), matrixes of optimal values I1opt and I2opt of the exciting current that fully cover different rotation speed conditions and torque demands and satisfy a total loss minimum target are calculated, and the total data are stored in the control system.

When regulation is executed, rotation speeds ω1 and ω2 of the two rotors are acquired in real time as input conditions. A given torque command (Me1 value or Me2 value) is also taken as an input condition, related stored data is invoked from the control system, the corresponding optimal values I1opt and I2opt of each exciting current are calculated by adopting a spline interpolation function formula for use in the execution link.

A second type of the second adjustment and control methods:

The total loss is a sum of main current ohmic heat (I0·I0·R0), exciting current ohmic heat (ΣPoi) and "connecting region clearance" liquid metal friction heat, wherein Ri is a constant value, R0 is a function of NaK liquid state parameters MLS, a variable in the parameters MLS is a NaK liquid capacity parameter, while a liquid center position parameter is fixed as a mean. The parameters MLS may influence the liquid metal friction heat.

A relationship curve that varies along with main current I0 and exciting current Ii is obtained by calculation or test as follows:

$$\Sigma\Phi = Ff(|I0|, Ii) \tag{a43}$$

wherein the value of I0 ranges from zero to a designed value, and the value of Ii ranges from zero to a designed value Iid.

The Ii in the formula (a43) is replaced with I1 and I2, so as to obtain two formulas as follows:

$$\Sigma\Phi 1 = Ff(|I0|, I1) \tag{a44}$$

$$\Sigma\Phi 2 = Ff(|I0|, I2) \tag{a45}$$

A selected torque command is for Me1 or Me2, and an application range of the torque command is given. An application range of rotation speeds of two shafts is given. An application range of the NaK liquid capacity parameter of the "connecting region clearance" is given. By utilizing electromagnetic law formula ((a1)-(a4), (a5) or (a6), wherein R0 is a function of the NaK liquid capacity parameter) and the formulas (a44) and (a45), matrixes of optimal values I1opt and I2opt of the exciting current that fully cover different rotation speed conditions and torque demands and satisfy a total loss minimum target, as well as a matrix of optimal values of the NaK liquid capacity parameter are calculated, and the total data are stored in the control system.

When regulation is executed, rotation speeds ω1 and ω2 of the two rotors are acquired in real time as input conditions. A given torque command (Me1 value or Me2 value) is also taken as an input condition, related stored data is invoked from the control system, the corresponding optimal values I1opt and I2opt of each exciting current as well as the optimal value of the NaK liquid capacity parameter are calculated by adopting a spline interpolation function formula for use in the execution link.

Magnitude of direct current of the magnet exciting coils is controlled by a DC chopper.

(b) Fuel Engine Power System for Vehicles Including HET

A vehicle power system solution is mainly composed of an engine, a transmission system, a control system and the like. A front engine is in rear wheel drive; and the engine is a gasoline engine and has a maximum power of 240 kW and a rotation speed of 6000 r/min at the maximum power. A single gear speed increaser with a speed ratio of 1.667 is arranged between an output shaft of the engine and an input shaft of the HET. A maximum rotation speed of each of the two rotors of the HET is 10000 r/min. An output shaft of the HET is connected with a gear reducer with a two-gear speed ratio, and the gear reducer is connected with a main reducing gear of a rear drive axle by virtue of a universal transmission shaft.

The used HET solution is the same as a solution adopted in the specific embodiment of "(a) Homopolar DC Electromagnetic Transmission (HET)".

Performance data of the gasoline engine is obtained by test in advance, and figure lines are formed as follows: on a torque-rotation speed diagram that takes the rotation speed as a horizontal axis and takes an output torque as a vertical axis, various equal throttle opening lines, equal output power lines and equal fuel efficiency lines (or a contour line of a ratio of a fuel consumption rate to the power) are drawn. A route starting from an idling condition and terminating at a maximal power condition is selected on the torque-rotation speed diagram. A selection method is as follows: passing through optimum efficiency points or better efficiency point on the equal power lines as much as possible along a progressive increase direction of the equal power lines, and giving consideration to move forwards along a progressive increase direction of the equal throttle opening lines. The above route is changed into a curve on a throttle opening-rotation speed diagram.

The gasoline engine is equipped with a speed controller, and the speed is regulated according to the above circuit between the idling condition and the maximal power condition, thereby ensuring the gasoline engine to operate on the route and a control buffer zone nearby the route. During regulation, a rotation speed value and a throttle opening value are collected, and the curve on the throttle opening-rotation speed diagram is compared. When state points of the detected rotation speed and throttle opening are located on the right side of the curve (a higher rotation speed side), the throttle opening is decreased; otherwise, the throttle opening is increased.

A driver location is set as follows: driving a torque pedal and a brake pedal, aheading at gear 1, aheading at gear 2, reversing at gear 1, and initializing an operating lever. Initial setting is performed before vehicle start only, and fails while running. Initial setting of aheading at gear 1 is as follows: a step speed change reducer is located in a gear-1 large transmission ratio state at an aheading speed of the vehicle ranging from zero to an intermediate switching speed, and located in a gear-2 small transmission ratio state in a range from the intermediate switching speed to a maximum speed. Initial setting of aheading at gear 2 is as follows: the step speed change reducer is always located in the gear-2 small transmission ratio state. Initial setting of reversing at gear 1 is as follows: the step speed change reducer is located in the gear-1 large transmission ratio state at a vehicle reversing running speed ranging from zero to an intermediate speed, and a speed limit does not exceed the intermediate speed. During reversing, the HET output shaft and a rear axle system thereof are reversed, and a special reverse gear block does not exist.

Control of aheading and reversing drive torques of the vehicle is dominated and executed by an HET adjustment and control system. The driver gives a relative value command of the drive torques from zero to a maximum value by using a drive torque pedal, the HET adjustment and control system commands the HET to output a needed aheading forward drive torque or reversing backward drive torque, while the speed controller of the gasoline engine controls the gasoline engine to run in a follow-up manner on an adjustable route, and only the needed power should be supplied.

A vehicle starting program is as follows: before starting, current of each of the magnet exciting coils of the HET is in a zero value state, liquid metals in the "connecting region clearances" are in a retracted open-circuit state, and the engine is in a stationary or idling condition; the stationary engine is started to the idling condition, initial setting of the aheading at gear 1 or the aheading at gear 2 or the reversing at gear 1 is executed by the operating lever, the torque command is given by the drive torque pedal, the liquid metals in the "connecting region clearances" are controlled to return by the HET adjustment and control system, and the drive torque is output, thereby starting the vehicle to run.

A gear-shifting operation while running is automatically controlled by the HET adjustment and control system. When a preset gear shifting speed is reached, the output torque of the HET is controlled to be decreased to zero (that is, the exciting current is decreased to zero), an original gear is released, two synchronous to-be-engaged parts are rubbed by a synchronizer, a new gear is engaged, and the HET is enabled to output the needed torque according to the current driving torque command.

A vehicle sliding program includes: returning the drive torque command to zero, returning the current of each of the magnet exciting coils of the HET to zero, enabling the liquid metals in the "connecting region clearances" to be in a retracted open-circuit, and returning the engine to the idling condition in a follow-up manner or until the vehicle shuts down.

A vehicle parking program includes: returning the drive torque command to zero, returning the current of each of the magnet exciting coils of the HET to zero, enabling the liquid metals in the "connecting region clearances" to be in a retracted open-circuit, returning the engine to the idling condition in a follow-up manner or until the vehicle shuts down, transmitting a braking instruction followed by the torque command when braking is needed, until the vehicle is stopped.

A kinetic energy recovery start button is set. The button may be pressed down under a condition that the vehicle slides or the engine shuts down or is not ignited (e.g., slope sliding). A special procedure is started. The accumulator or the motor is not started, and only kinetic energy of the vehicle is utilized. The engine is ignited and started to the idling condition by virtue of reversed power transmission of the HET.

(c) Flywheel Power System for Vehicles Including HET

A four-wheel-drive vehicle power system is mainly composed of two vertical axis type flexible flywheel devices, a transmission system from the flywheel devices to a drive axle main reducing gear, a control system thereof, and the like. The transmission system includes two sets of separated HETs independent of each other.

The two vertical axis type flexible flywheel devices (71) are arranged on a vehicle chassis, arranged adjacent to each other along a longitudinal axis center line of the vehicle, and centered in a length direction of the vehicle. Each flywheel is connected with a frame (73) through four ear flanges (74) and a supporting assembly (75). The two flywheels have the same specification and dimension, while only rotation directions are opposite to each other.

A specific embodiment (FIG. 23) of each of the vertical axis type flexible flywheel devices is as follows:

Main parameters include: a rated rotation speed of 10000 r/min, an outer diameter of 1354.4 mm, a vacuum container height of 440.2 mm, a total height of 535.3 mm, a flywheel mass on the rotation shaft of 748.8 kg, and rated stored energy of 30.6 kWh.

Two mass block bodies (53) are arranged and are made of high-strength glass fiber roving reinforced epoxy resin subjected to filament winding. In order to adapt to a big rounded angle of a shell (52), round chamfer is designed at a junction of two end surfaces of the mass block body on an outer ring and an excircle, based on an enough safety clearance existing between a deformable contour of the mass block body generated at a maximal rotation speed and the shell.

A supporting body (54) is arranged and is made of an aluminum alloy.

A bearing end surface pair (56) and an upward displacement-limiting end surface pair (57) are adopted between the mass block body on the outer ring and the mass block body on an inner ring; two end surface pairs are designed in a centralized manner; and axial positions of the two end surface pairs are flush with center of gravity of the mass block body on the outer ring. The bearing end surface pair (56) and the upward displacement-limiting end surface pair (57) are adopted between the mass block body on the inner ring and the supporting body; two end surface pairs are designed in a centralized manner; and axial positions of the two end surface pairs are flush with center of gravity of the two mass block bodies as much as possible. Two opposite end surfaces of the end surface pairs (56, 57) remain a margin on a radial height so as to compensate radial displacement dislocation generated during rotation, so that the end surface pairs always keep an effective action area in a range from a static state to the maximal rotation speed. A clearance does not exist between the two opposite end surfaces of the end surface pair (57), and the end surface pair (57) is combined with the bearing end surface pair (56) to achieve an axial positioning effect, thereby limiting angle misalignment changes in a forced manner and closely participating in transfer of force and torque. In order to achieve the purposes of increasing wear resistance of a contact surface of the end surface pairs, increasing an effective contact area, protecting a fiber reinforced plastic surface, realizing reliability, durability, vibration absorption and the like, the two opposite end surfaces of the end surface pairs (56, 57) are made of polyurethane rubber. An end-surface thin plate (65) and an end-surface thick block (66) made of the polyurethane rubber material are adhered with a matrix together. The end-surface thick block (66) has high elasticity and deformation adaptability, but high centrifugal load, and is installed on an outer ring matrix. The centrifugal load is borne by an inner hole surface of the matrix. Since a load of the bearing end surface pair (56) is higher, the selected matrix adhered and a main body of a wheel body structure are made into an integral structure, thereby ensuring that a load transfer path has full strength reserve. However, a matrix at one end of the non-bearing end surface pair (57) adopts an accessory structure, and the accessory is fixedly connected with a main matrix by virtue of an adhesive and is made of a material identical to that of the main matrix.

Two flexible membrane rings (55) with large axial span are respectively arranged between the mass block body on the outer ring and the mass block body on the inner ring and between the mass block body on the inner ring and the supporting body. Each of the flexible membrane rings is directly adhered to an inner ring or outer ring main matrix connected with the flexible membrane ring. The flexible membrane ring is made of the polyurethane rubber, does not have pre-bending deformation in an installation state and is composed of roots at both ends and a middle body. The roots with semicircular heads are adhered with the main matrix, and a thickness of the body is in a gradually decreased design along a radial direction, thereby decreasing maximum stress. Since a larger axial distance exists between the flexible membrane rings between the two mass blocks and a positioning end surface pair, the two flexible membrane rings adopt an inclined design, thereby enabling the film rings to be located in a radial straightening state at the maximal rotation speed.

A steel support disc (62) and a polyurethane rubber elastic material ring (63) are arranged between a steel rotation shaft (51) and the supporting body (54). A central inner hole of the support disc and the rotation shaft are in conical interference fitting. A disc body of the support disc is positioned below the supporting body. An elastic material ring is installed between the support disc and the supporting body, and the elastic material ring is adhered with the support disc and the supporting body. The elastic material ring achieves flexible connecting, bearing and axial positioning effects.

A vacuum container shell (52) is designed into a two-half structure split by a vertical axis. A circle of flanges (67) is positioned at a middle part on a surface of an excircle of the shell. Flange edges are positioned on an inner side of the container. Fastening bolts are not arranged on flange edges on an inner side, and the flange edges are pressed by virtue of a pressure produced by vacuum of the container. Four sections of ear flanges (74) and fastening bolts thereof are arranged at 45-degree four corners, which do not influence the arrangement width and length, on the outer side of the container. A rubber sealing ring is arranged on the edges of the whole circle of flanges, vacuum sealing grease is arranged on an outer side of the rubber sealing ring, and a soft metal sealing ring is arranged on an inner side of the rubber sealing ring. Installation and support of the shell (and the whole flywheel device) may be realized by connecting the exposed ear flanges (74) and the supporting assembly (75) with a frame (73).

Figure 25:
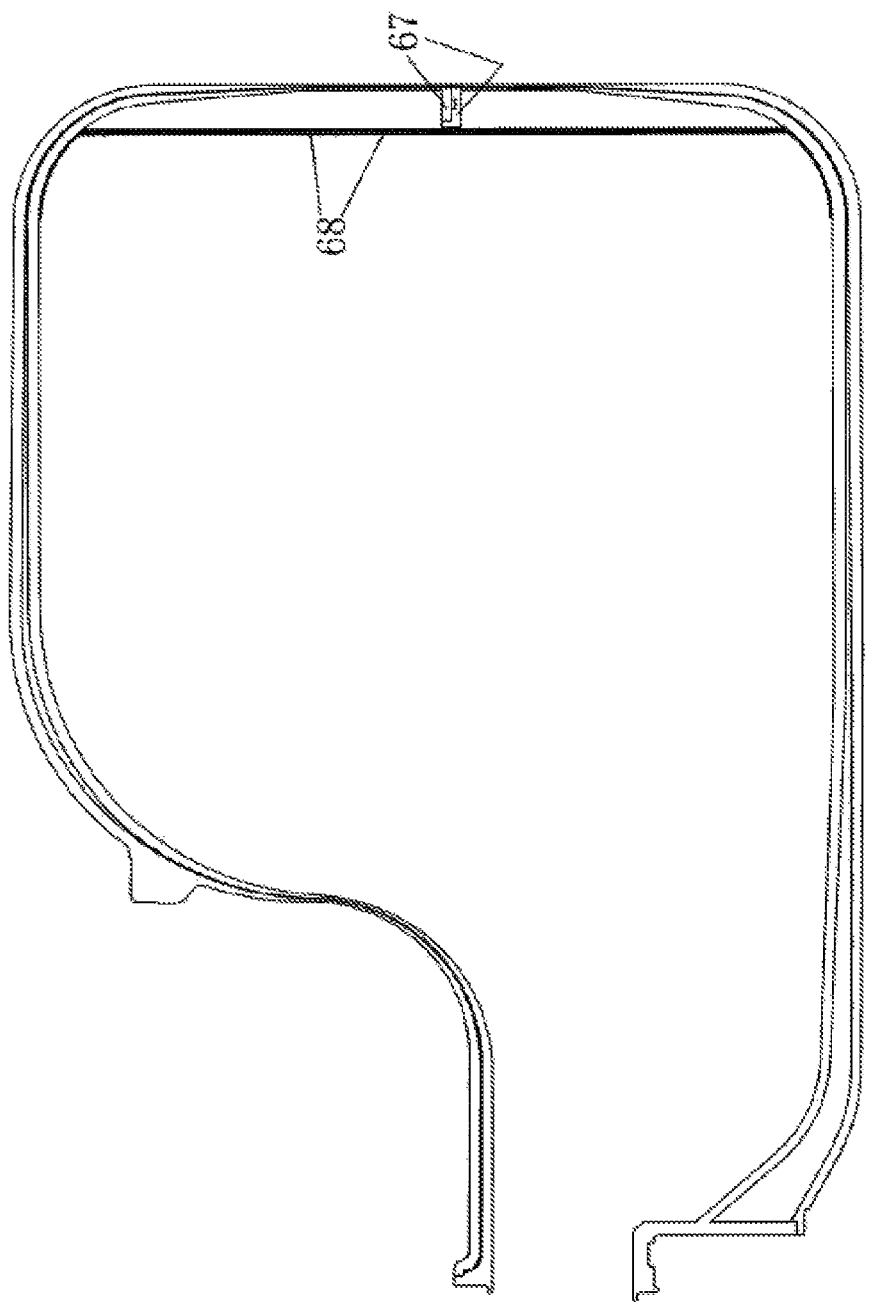
FIG. 25 is a meridian plane diagram of a flexible flywheel shell and protective sleeve.

The shell (52) is of a three-layer composite structure (FIG. 25). An intermediate layer is a glass chopped fiber reinforced epoxy resin, the two outer surfaces are made of aluminum alloys, and the intermediate layer is adhered with the outer surface layers. A magnetic fluid sealing assembly is arranged between the shell (52) and the rotation shaft (51).

Radial supporting bearings of the rotation shaft (51) are two groups of rolling bearings. The rolling bearing positioned at the lower end bears a radial load and is a single-row deep groove ball bearing; and the rolling bearings positioned at the upper end bear the radial load and bidirectional axial load, serve as an axial positioning end and are a pair of angular contact ball bearings. A spherical rolling bearing for radial protection is arranged on the rolling bearing side at the lower end; and a CARB ring rolling bearing for radial protection is arranged on the rolling bearing side at the upper end.

An axial supporting bearing of the rotation shaft (51) is a permanent magnet attraction type axial supporting magnetic bearing. An axial positioning bearing close to the upper end has a stepped rotary disc (59) and a stepped stationary disc (60). The stationary disc is directly fixedly connected with a bearing block. The rotary disc is positioned below the stationary disc. An air gap is formed between end surfaces on adjacent sides of the two discs. The rotary disc is of a 45-steel axisymmetric structure. The stationary disc is of an axisymmetric structure of an aluminium alloy, electromagnetic pure iron and Nd—Fe—B permanent magnet. The aluminium alloy structure is a matrix of the stationary disc; a mixed disc structure formed by arranging electromagnetic pure iron rings and Nd—Fe—B permanent magnet rings at intervals forms a side end surface opposite to the rotary disc; the permanent magnet rings are magnetized outwards or inwards along a radial direction; adjacent permanent magnet rings have opposite magnetizing directions; and upward magnetic attraction force in an air-gap field acts on the rotary disc and is designed for offsetting gravity of the rotors. The magnetic bearings do not have magnetic hysteresis or eddy losses.

A loading disc (69) is arranged at the lower end of the flywheel rotation shaft and is used for connecting a load joint of an external loading system and the rotation shaft and performing high-power rapid load charging by transmitting mechanical torques to the flywheel rotation shaft. Rated design load power is 2000 kW.

Each flywheel is correspondingly equipped with a set of HET. Each flywheel and a rotor of an HET corresponding to the flywheel (an HET input end rotor) share the same rotation shaft. The two sets of separated HET have the same specification and dimension.

A specific embodiment of each set of the separated HET is as follows.

Each set of the separated HET has two half-coupled members with the same electromagnetic structure and size.

The two half-coupled members only have differences in bearings at both ends and supporting structures. A flywheel shaft-end half-coupled member (part A in FIG. 23) and the flywheel are vertically installed in a coaxial manner, and a non-flywheel shaft end half-coupled member (72) is horizontally installed on the frame and has a meridian plane diagram shown in FIG. 19. Each of the half-coupled members is of double-magnetic flux, single-stage, single-circuit, near-axis coil, solid shaft and axial surface type.

Sizes of the half-coupled member are as follows: an axial surface radius of the rotation shaft is 53 mm, a radius of the stator body is 138.65 mm, a radius of an external terminal is 213.5 mm, and an axial length of the stator of the non-flywheel shaft end half-coupled member is 280 mm. A designed value of the rotation speed of the rotation shaft of each of the half-coupled members is 10000 r/min, and an electromagnetic power designed value is 240 kW. A main current designed value is 40794 A. In a design point condition, a sum of total exciting current ohmic heat power of the HET, circuit "connecting region clearance" NaK liquid friction power and main current ohmic heat power is about 4% of the electromagnetic power designed value 240 kW.

Supporting end covers (36) at both ends of the non-flywheel shaft end half-coupled member and a supporting end cover (36) at the upper end of the flywheel shaft end half-coupled member serve as bearing blocks, and magnetic fluid sealing elements (37) are arranged on inner rings of the bearing blocks. A supporting end cover (36) at the lower end of the flywheel shaft end half-coupled member and an upper side wall of the vacuum container shell (52) of the flywheel are in matched connection with each other and can mutually slide to each other, and a rubber sealing ring is arranged on a sliding cylindrical surface. A dynamic seal at the lower end of the flywheel shaft end half-coupled member and a dynamic seal of the vacuum container shell (52) are merged into one magnetic fluid sealing element (37), that is, the former depends on the latter, and sealing performance of the latter is preferred.

A center shaft of a rotor of the flywheel shaft end half-coupled member and a steel flywheel rotation shaft (51) share the same axis. The steel flywheel rotation shaft is made of 45 steel or steel 40Cr, an outer ring loop axis is made of 20 steel, and the magnetic fluid sealing element (37) and the center shaft are paired.

Detailed description of other structures of the solutions of the HET half-coupled members and the second type of adjustment and control method of each set of the HET are the same as description in Chapter I in embodiments of "(a) Homopolar DC Electromagnetic Transmission (HET)".

In order to form an external conductor between two HET half-coupled members in a set of main current closed circuit, a coaxial conductor in which a spindle (40) is matched with a sleeve (41), and the spindle and the sleeve have opposite current directions.

Two HET half-coupled members (that is, non-flywheel shaft end half-coupled members) (72) which do not share the rotation shaft with the flywheel are horizontally arranged on the frame. A half-coupled member rotation shaft corresponding to a front flywheel is connected with a front drive axle main reducing gear by virtue of a two-stage speed ratio reducer, while a half-coupled member rotation shaft corresponding to a rear flywheel is connected with a rear drive axle main reducing gear by virtue of a two-stage speed ratio reducer. The two two-stage speed ratio reducers have the same design. The front drive axle and the rear drive axle have the same reduction ratio, are both disconnected and adopt independent suspensions.

Wires connected with an external DC power supply are connected in parallel on the external conductors on each flywheel shaft end HET half-coupled member, and are used for realizing (respectively) plug-in charging or unloading on each of the flywheels. The external power supply used for performing plug-in charging or unloading on the flywheels adopts an adjustable voltage DC power unit which is arranged in the vehicle and connected with power grid alternating current, and the maximal design power is 7 kW. During plug-in charging, the circuit "connecting region clearances" (5) of the non-flywheel shaft-end HET half-coupled member are disconnected, the circuit "connecting region clearances" (5) of the flywheel shaft end half-coupled members are connected, related magnet exciting coils enabling magnetic flux of the HET flywheel end rotor to reach a maximum value are connected, and the maximum exciting current is always maintained. A voltage size of the DC power supply is adjusted to be equal to electromotive force of the HET flywheel end rotor, and the voltage direction is opposite to the electromotive force direction. A main current circuit is connected with the DC power supply. The voltage of the DC power supply is increased to reach a rated limit value of plug-in main current or a rated limit value of plug-in power. The voltage of the DC power supply is continuously increased in a flywheel charging and speeding-up process, and the rated limit value of the plug-in main current and/or the plug-in power is maintained. Current limitation and power limitation are performed in sequence. When a starting point of the flywheel rotation speed is high, only power limitation is performed. When charging is ended, the voltage of the DC power supply is decreased to obtain zero current, the main current circuit is disconnected from the DC power supply, and HET magnet excitation is canceled. During plug-in unloading, a set-up procedure is the same as above, current directions are opposite, and operating procedures are opposite, that is, the voltage of the DC power supply is decreased to reach a rated limit value of plug-in unloading power or a rated limit value of plug-in unloading main current.

Power control units are arranged on a vehicle driving seat as follows: a drive pedal, a brake pedal, aheading gear 1, aheading gear 2 and reversing gear 1 initial setting operating levers and a two-flywheel torque setting button.

Instructions for driving torque relative values ranging from zero to a maximal value are correspondingly output in a drive pedal travel. The torque and the travel adopt a non-linear relation. The torque at an initial stage is increased slowly, so as to easily control a low running speed of the vehicle.

Travel of the brake pedal is divided into a front travel and a rear travel. The front travel corresponds to kinetic energy recovery braking torque relative values ranging from zero to a maximal value. The rear travel corresponds to friction braking torque relative values ranging from zero to a maximal value. The maximal value of the kinetic energy recovery braking torque is simultaneously maintained in the rear travel. Kinetic energy recovery braking is to recover kinetic energy of the vehicle to the flywheels by virtue of reverse power flow transfer of the HET. Friction braking is to convert the kinetic energy of the vehicle into heat energy by adopting four vehicle friction braking discs.

Initial setting operating levers of the aheading gear 1, aheading gear 2 and reversing gear 1 give consideration to aheading and reversing settings and initial speed ratio gear settings. Initial setting of aheading at gear 1 is as follows: a step speed change reducer is located in a gear-1 large transmission ratio state at an aheading speed of the vehicle ranging from zero to an intermediate switching speed, and located in a gear-2 small transmission ratio state in a range from the intermediate switching speed to a maximum speed. Initial setting of aheading at gear 2 is as follows: the step speed change reducer is always located in the gear-2 small transmission ratio state. Initial setting of reversing at gear 1 is as follows: the step speed change reducer is located in the gear-1 large transmission ratio state at a vehicle reversing running speed ranging from zero to an intermediate speed, and a speed limit does not exceed the intermediate speed. During reversing, the HET output shaft and a rear axle system thereof are reversed, and a special reverse gear block does not exist.

The two-flywheel torque setting button is used for manually setting a rotation speed electromagnetic torque ratio of the two HET output end rotors by a driver before starting-up or during sliding. Meanwhile, the setting button has a function of automatically setting a torque ratio value in the control system, and automatic setting can be executed before starting-up or during sliding or while non-sliding running. The automatically set ratio value is calculated according to a logic rule in the control system. While running, manual setting and automatic setting are alternative, and the setting button has only one automatic gear.

Control of adhead running and reversing driving torques of the vehicle is executed by the HET adjustment and control system. Adhead running or reversing intention is set before starting-up. The driver gives instructions for the relative values of the driving torques from zero to the maximal value by virtue of the drive pedal. According to the set electromagnetic torque ratio value of the two sets of HETs, the HET adjustment and control system commands the HET to output a needed adhead running forward driving torque or a reversing backward driving torque.

Control of the kinetic energy recovery braking torque of the vehicle during adhead running or reversing is executed by the HET adjustment and control system. Adhead running or reversing intention is set before starting-up. The driver gives instructions for the relative values of the kinetic energy recovery braking torque from zero to the maximal value by virtue of the brake pedal. According to the set electromagnetic torque ratio value of the two sets of HETs, the HET adjustment and control system commands the HET to transmit the kinetic energy of the vehicle to the flywheels, thereby making a needed adhead running backward braking torque or a reversing forward braking torque.

A vehicle starting program is as follows: before starting, current of each of the magnet exciting coils of the HET is in a zero value state, liquid metals in the "connecting region clearances" are in a retracted open-circuit state, initial setting of the aheading at gear 1 or the aheading at gear 2 or the reversing at gear 1 is executed by the operating lever, the ratio value of the electromagnetic torque of the two sets of the HETs is manually controlled or manually set, the torque command is given by the drive pedal, the liquid metals in the "connecting region clearances" are controlled to return by the HET adjustment and control system, and the drive torque is output, thereby starting the vehicle to run.

A gear-shifting operation while running is automatically controlled by the HET adjustment and control system. When a preset gear shifting speed is reached, the output torque of the HET is controlled to be decreased to zero (that is, the exciting current is decreased to zero), an original gear is released, two synchronous to-be-engaged parts are rubbed by a synchronizer, a new gear is engaged, and the HET is enabled to output the needed torque according to the current driving torque command.

(d) Fuel Engine and Flywheel Hybrid Power System for Vehicles Including HET

A car hybrid power system includes: a gasoline engine (76), a vertical axis type flexible flywheel device (71), a transmission system connected with the engine, the flywheel device and a drive axle main reducing gear, and a control system thereof.

The vertical axis type flexible flywheel device (71) is arranged on a vehicle chassis and connected with a frame (73) through four ear flanges (74) and a supporting assembly (75).

Figure 26:
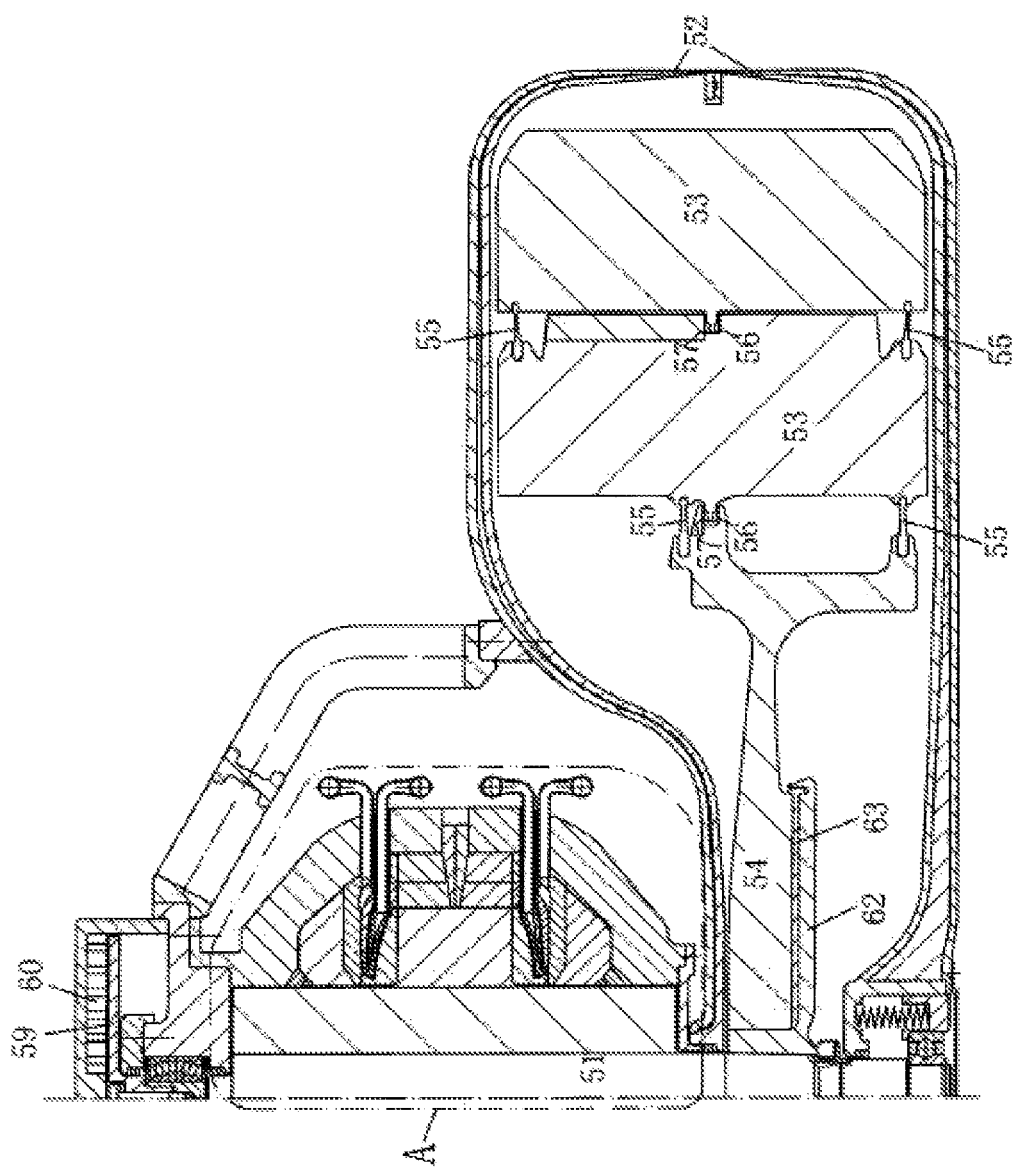
FIG. 26 is a meridian plane diagram (II) of a flexible flywheel and a separated HET half-coupled member (part A)
Figure 27:
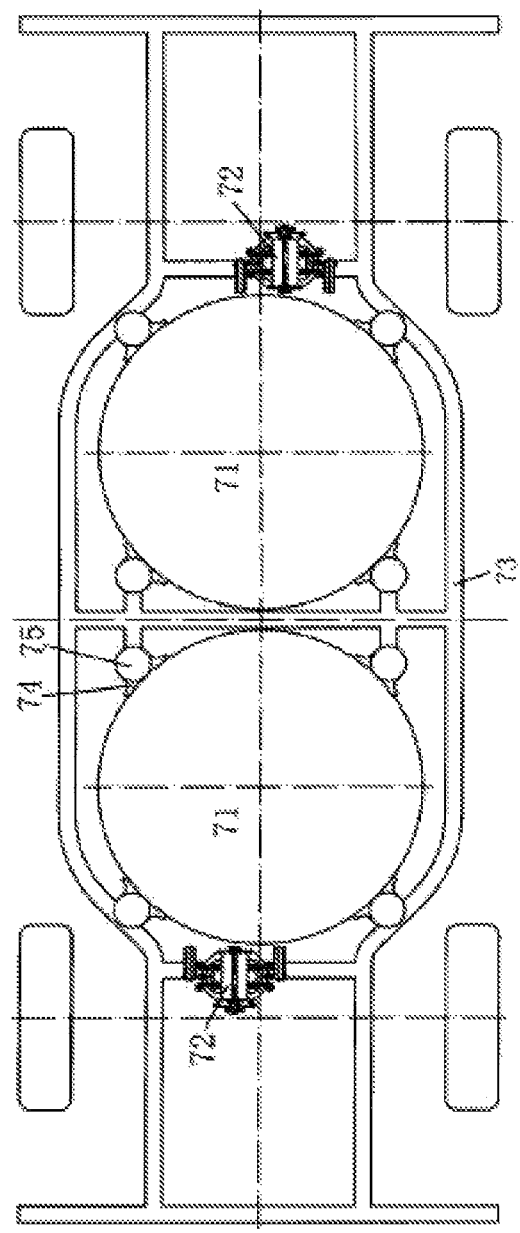
FIG. 27 is a schematic diagram of arrangement of a flywheel and a separated HET non-flywheel shaft half-coupled member for a four-wheel-drive car power system.
Figure 28:
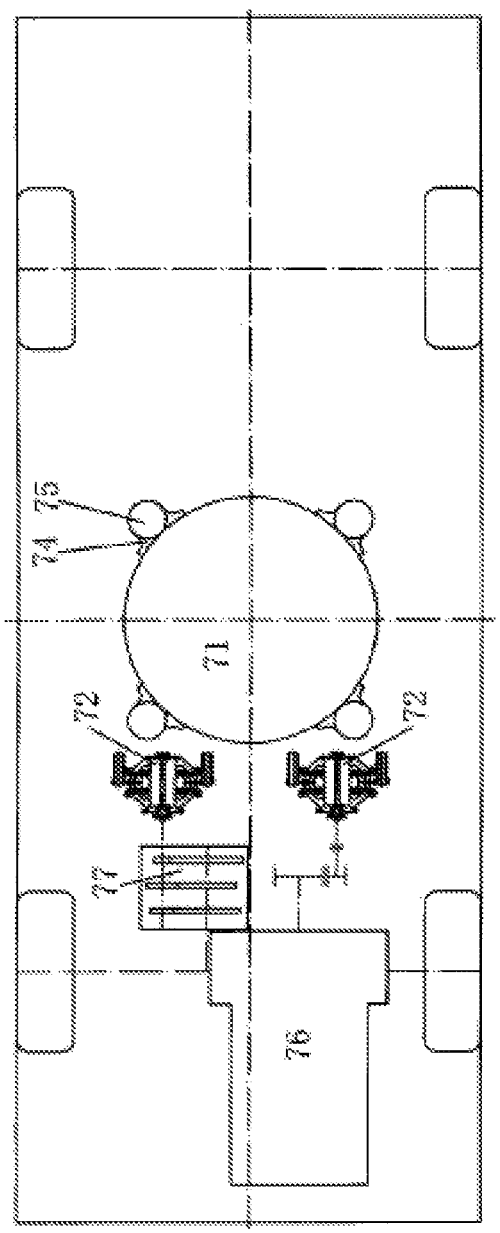
FIG. 28 is a schematic diagram of arrangement of an engine, a flywheel and a separated HET non-flywheel shaft half-coupled member for a car hybrid power system.

A specific embodiment (FIG. 26) of the vertical axis type flexible flywheel device is as follows:

Main parameters include: a rated maximal rotation speed of 13793.1 r/min, an outer diameter of 982 mm, a vacuum container height of 229 mm, a total height of 409.6 mm, a flywheel mass on the rotation shaft of 203.9 kg, and rated stored energy of 8.1 kWh.

Two mass block bodies (53) are arranged and are made of high-strength glass fiber roving reinforced epoxy resin subjected to filament winding. In order to adapt to a big rounded angle of a shell (52), round chamfer is designed at a junction of two end surfaces of the mass block body on an outer ring and an excircle, based on an enough safety clearance existing between a deformable contour of the mass block body generated at a maximal rotation speed and the shell.

A supporting body (54) is arranged and is made of an aluminum alloy.

A bearing end surface pair (56) and an upward displacement-limiting end surface pair (57) are adopted between the mass block body on the outer ring and the mass block body on an inner ring; the two end surface pairs are designed in a centralized manner; and axial positions of the two end surface pairs are flush with center of gravity of the mass block body on the outer ring. The bearing end surface pair (56) and the upward displacement-limiting end surface pair (57) are adopted between the mass block body on the inner ring and the supporting body; the two end surface pairs are designed in a centralized manner; and axial positions of the two end surface pairs are flush with center of gravity of the two mass block bodies as much as possible. Two opposite end surfaces of the end surface pairs (56, 57) remain a margin on a radial height so as to compensate radial displacement dislocation generated during rotation, so that the end surface pairs always keep an effective action area in a range from a static state to the maximal rotation speed. A clearance does not exist between the two opposite end surfaces of the end surface pair (57), and the end surface pair (57) is combined with the bearing end surface pair (56) to achieve an axial positioning effect, thereby limiting angle misalignment changes in a forced manner and closely participating in transfer of force and torque. In order to achieve the purposes of increasing wear resistance of a contact surface of the end surface pairs, increasing an effective contact area, protecting a fiber reinforced plastic surface, realizing reliability, durability, vibration absorption and the like, the two opposite end surfaces of the end surface pairs (56, 57) are made of polyurethane rubber. An end-surface thin plate (65) and an end-surface thick block (66) made of the polyurethane rubber material are adhered with a matrix together. The end-surface thick block (66) has high elasticity and deformation adaptability, but high centrifugal load, and is installed on an outer ring matrix. The centrifugal load is borne by an inner hole surface of the matrix. Since a load of the bearing end surface pair (56) is higher, the selected matrix adhered and a main body of a wheel body structure are made into an integral structure, thereby ensuring that a load transfer path has full strength reserve. However, a matrix at one end of the non-bearing end surface pair (57) adopts an accessory structure, and the accessory is fixedly connected with a main matrix by virtue of an adhesive and is made of a material identical to that of the main matrix.

Two flexible membrane rings (55) with large axial span are respectively arranged between the mass block body on the outer ring and the mass block body on the inner ring and between the mass block body on the inner ring and the supporting body. Each of the flexible membrane rings is directly adhered to an inner ring or outer ring main matrix connected with the flexible membrane ring. The flexible membrane ring is made of the polyurethane rubber, does not have pre-bending deformation in an installation state and is composed of roots at both ends and a middle body. The roots with semicircular heads are adhered with the main matrix, and a thickness of the body is in a gradually decreased design along a radial direction, thereby decreasing maximum stress. Since a larger axial distance exists between the flexible membrane rings between the two mass blocks and a positioning end surface pair, the two flexible membrane rings adopt an inclined design, thereby enabling the film rings to be located in a radial straightening state at the maximal rotation speed.

A steel support disc (62) and a polyurethane rubber elastic material ring (63) are arranged between a steel rotation shaft (51) and the supporting body (54). A central inner hole of the support disc and the rotation shaft are in conical interference fitting. A disc body of the support disc is positioned below the supporting body. An elastic material ring is installed between the support disc and the supporting body, and the elastic material ring is adhered with the support disc and the supporting body. The elastic material ring achieves flexible connecting, bearing and axial positioning effects.

A vacuum container shell (52) is designed into a two-half structure split by a vertical axis. A circle of flanges (67) is positioned at a middle part on a surface of an excircle of the shell. Flange edges are positioned on an inner side of the container. Fastening bolts are not arranged on flange edges on an inner side, and the flange edges are pressed by virtue of a pressure produced by vacuum of the container. Four sections of ear flanges (74) and fastening bolts thereof are arranged at 45-degree four corners, which do not influence the arrangement width and length, on the outer side of the container. A rubber sealing ring is arranged on the edges of the whole circle of flanges, vacuum sealing grease is arranged on an outer side of the rubber sealing ring, and a soft metal sealing ring is arranged on an inner side of the rubber sealing ring. Installation and support of the shell (and the whole flywheel device) may be realized by connecting the exposed ear flanges (74) and the supporting assembly (75) with a frame.

The shell (52) is of a three-layer composite structure (FIG. 25). An intermediate layer is a glass chopped fiber reinforced epoxy resin, the two outer surfaces are made of aluminum alloys, and the intermediate layer is adhered with the outer surface layers. A magnetic fluid sealing assembly is arranged between the shell (52) and the rotation shaft (51).

Radial supporting bearings of the rotation shaft (51) are two groups of rolling bearings. The rolling bearing positioned at the lower end bears a radial load and is a single-row deep groove ball bearing; and the rolling bearings positioned at the upper end bear the radial load and bidirectional axial load, serve as an axial positioning end and are a pair of angular contact ball bearings.

An axial supporting bearing of the rotation shaft (51) is a permanent magnet attraction type axial supporting magnetic bearing. An axial positioning bearing close to the upper end has a stepped rotary disc (59) and a stepped stationary disc (60). The stationary disc is directly fixedly connected with a bearing block. The rotary disc is positioned below the stationary disc. An air gap is formed between end surfaces on adjacent sides of the two discs. The rotary disc is of a 45-steel axisymmetric structure. The stationary disc is of an axisymmetric structure of an aluminium alloy, electromagnetic pure iron and Nd—Fe—B permanent magnet. The aluminium alloy structure is a matrix of the stationary disc, a mixed disc structure formed by arranging electromagnetic pure iron rings and Nd—Fe—B permanent magnet rings at intervals forms a side end surface opposite to the rotary disc, the permanent magnet rings are magnetized outwards or inwards along a radial direction, adjacent permanent magnet rings have opposite magnetizing directions, and upward magnetic attraction force in an air-gap field acts on the rotary disc and is designed for offsetting gravity of the rotors. The magnetic bearings do not have magnetic hysteresis or eddy losses.

The front gasoline engine includes: a maximal power of 60 kW, a rotation speed of 6000 r/min under a maximal power condition, a power of 40 kW under the maximal power condition, and a rotation speed of 4000 r/min under the maximal power condition.

The transmission system includes three separated HET half-coupled members, i.e., a single flywheel, a separated HET and a two-wheel drive structure: the first half-coupled member (recorded as HETh11) shares the same rotation shaft with the flywheel (71), a rotation shaft of the second half-coupled member (recorded as HETh12) (72) is connected with a main reducing gear of the front drive axle by virtue of a three-stage speed ratio gear reducer (77), and a rotation shaft of the third half-coupled member (recorded as HETh3) (72) is connected with an output shaft of the engine (76) by virtue of a single-stage gear speed increaser. A main circuit of the three HET half-coupled members is connected in series with the external conductor by virtue of an external terminal (16) so as to form a main current closed circuit.

The three HET half-coupled members are all double-magnetic flux, single-stage, single-circuit, near-axis coil, solid shaft, and axial surface type, and have the same electromagnetic structure and size. A meridian plane diagram of the flywheel shaft end half-coupled member HETh11 is shown in the part A in FIG. 26. A meridian plane diagram of each of the wheel-side half-coupled member HETh12 and the engine-side half-coupled member HETh3 installed on the frame is shown in FIG. 19.

Sizes of the HET half-coupled members are as follows: a shaft surface radius of a rotation shaft is 53 mm, a radius of a stator body is 138.65 mm, a radius of an external terminal is 213.5 mm, and an axial length of a stator of the non-flywheel shaft end half-coupled member is 280 mm. A maximal designed value of a rotation speed of a rotation shaft of each of the half-coupled members is 13793.1 r/min, and a maximal designed value of main current is 29576 A. A maximal designed value of electromagnetic power of the HETh11 and HETh12 is 240 kW. A rated designed value of electromagnetic power of the HETh3 is 60 kW, and a maximal magnetic flux of the HETh3 is the same as that of the HETh11 or HETh12. Therefore, under a condition that the maximal magnetic flux and the maximal rotation speed of the HETh3 are used, when the electromagnetic power of 60 kW is reached, only ¼ of the maximal designed value of the main current should be used.

Two magnet exciting coils of each of the half-coupled members are connected in series together in opposite rotation directions, are considered as a dual coil and are conducted with the same exciting current. The exciting current of the three half-coupled members is recorded as Ih11, Ih12 and Ih3 respectively. Since a magnetic field of the three separated half-coupled members mutually has independence, total magnetic flux may be expressed as follows:

$$\Sigma\Phi h11 = Ffh11(|I0|, Ih11) \quad (d21)$$

$$\Sigma\Phi h12 = Ffh12(|I0|, Ih12) \quad (d22)$$

$$\Sigma\Phi h3 = Ffh3(|I0|, Ih3) \quad (d23)$$

Further, since the three half-coupled members have the same electromagnetic structure size and consistent regularity, functional forms are the same and may be recorded as a functional form Ffh( ) that is, $$\Sigma\Phi h11 = Ffh(|I0|, Ih11) \quad (d24)$$

$$\Sigma\Phi h12 = Ffh(|I0|, Ih12) \quad (d25)$$

$$\Sigma\Phi h3 = Ffh(|I0|, Ih3) \quad (d26)$$

Meanwhile, a calculated amount of corresponding regularity content may be reduced, and only calculation should be performed on one of the half-coupled members.

An adjustment and control method based on a minimal sum principle of two losses adopted by the series system of the three HET half-coupled members is as follow:

The total loss is a sum of main current ohmic heat (I0·I0·R0) and each exciting current ohmic heat ($\Sigma Poi$), wherein R0 and Ri are constant values.

An application range of rotation speeds of three shafts, an application range of Mhe12 and an application range of Mhe3 or Mhe11 are given. By utilizing the electromagnetic law formulas ((d1), (d3), (d5), (d6), (d10), (d13), (d15) or (d11), and R0 is a constant value) and the above multidimensional variable function relationships ((d24), (d25), (d26)), a matrix of optimum values Iiopt of each exciting current that fully covers different rotation speed conditions and torque demands and satisfies a total loss minimum target is calculated, and all the data are stored in the control system.

When regulation is executed, rotation speeds ($\omega h11$, $\omega h12$ and $\omega h3$) of the three rotors are acquired in real time as input conditions, an instruction of the needed torque Mhe12, Mhe3 or Mhe11 is given as an input condition, related stored data is invoked from the control system, and a corresponding optimum value Iiopt of each exciting current is calculated by adopting a spline interpolating function formula for use in the execution link.

An adjustment and control method, with a principle that a sum of three losses is minimal, adopted by the series system of the three HET half-coupled members is as follow.

The total loss is a sum of main current ohmic heat (I0·I0·R0), each exciting current ohmic heat ($\Sigma Poi$) and circuit "connecting region clearance" liquid metal friction heat, wherein R0 is a function of liquid metal state parameters MLS, and Ri is a constant value.

An application range of rotation speeds of three shafts, an application range of Mhe12, an application range of Mhe3 or Mhe11 and an application range of the circuit "connecting region clearance" liquid metal state parameters MLS are given. By utilizing the electromagnetic law formulas ((d1), (d3), (d5), (d6), (d10), (d13), (d15) or (d11), and R0 is a function of the liquid metal state parameters MLS) and the above multidimensional variable function relationships ((d24), (d25), (d26)), a matrix of optimum values Iiopt of each exciting current and a matrix of optimum values MLSopt of the liquid metal state parameters, which fully cover different rotation speed conditions and torque demands and satisfy a total loss minimum target, are calculated, and all the data are stored in the control system.

When regulation is executed, rotation speeds ($\omega h11$, $\omega h12$ and $\omega h3$) of the three rotors are acquired in real time as input conditions, an instruction of the needed torque Mhe12, Mhe3 or Mhe11 is given as an input condition, related stored data is invoked from the control system, and a corresponding optimum value Iiopt of each exciting current and an optimum value MLSopt of the liquid metal state parameters are calculated by adopting the spline interpolating function formula for use in the execution link.

Wires connected with an external DC power supply are connected in parallel on the external conductors on each of the flywheel shaft end HET half-coupled members, and are used for realizing (respectively) plug-in charging or unloading on each of the flywheels. The external power supply used for performing plug-in charging or unloading on the flywheels adopts an adjustable voltage DC power unit which is arranged in the vehicle and connected with power grid alternating current, and the maximal design power is 7 kW. During plug-in charging, the circuit "connecting region clearances" (5) of the non-flywheel shaft end HET half-coupled member are disconnected, the circuit "connecting region clearances" (5) of the flywheel shaft end half-coupled members are connected, related magnet exciting coils enabling magnetic flux of the HET flywheel end rotor to reach a maximum value are connected, and the maximum exciting current is always maintained. A voltage size of the DC power supply is adjusted to be equal to electromotive force of the HET flywheel end rotor, and the voltage direction is opposite to the electromotive force direction. A main current circuit is connected with the DC power supply. The voltage of the DC power supply is increased to reach a rated limit value of plug-in main current or a rated limit value of plug-in power. The voltage of the DC power supply is continuously increased in a flywheel charging and speeding-up process, and the rated limit value of the plug-in main current and/or the plug-in power is maintained. Current limitation and power limitation are performed in sequence. When a starting point of the flywheel rotation speed is high, only power limitation is performed. When charging is ended, the voltage of the DC power supply is decreased to obtain zero current, the main current circuit is disconnected from the DC power supply, and HET magnet excitation is canceled. During plug-in unloading, a set-up procedure is the same as above, current directions are opposite, and operating procedures are opposite, that is, the voltage of the DC power supply is decreased to reach a rated limit value of plug-in unloading power or a rated limit value of plug-in unloading main current.

In a situation that the flywheel has available energy or kinetic energy is being recovered, the engine is preferably started by adopting the energy of the flywheel or the recovered kinetic energy, directly dragged to an idling speed, and then ignited by virtue of fuel injection.

When the vehicle is parked, an operation of starting the engine by the energy of the flywheel is performed by a control system as follows: the circuit "connecting region clearances" (5) of the three HET half-coupled members are connected, an instruction for a set electromagnetic torque Mhe3 for reversely dragging the engine to be started is given, the electromagnetic torque Mhe1 is set as zero, the HET series system is controlled by adopting a corresponding separated HET adjustment and control method, and the engine is started by utilizing the energy of the flywheel so as to reach the idling speed.

When the vehicle runs, an operation of starting the engine by the energy of the flywheel or the recovered kinetic energy is performed by the control system as follows: the instruction for the set electromagnetic torque Mhe3 for reversely dragging the engine to be started is given, an original instruction of the electromagnetic torque Mhe12 is maintained, the HET series system is controlled by adopting the corresponding separated HET adjustment and control method, and the engine is started by utilizing the energy of the flywheel or less recovered energy thereof so as to reach the idling speed.

The engine is equipped with a speed controller. An operating condition is adjusted and controlled on a working condition route connecting an idling speed condition, a maximum efficiency condition and a maximum power condition by the speed controller, and in an adjustable buffer zone nearby the route. On an overall working condition route represented on a torque-rotation speed diagram (vertical axis torque, horizontal axis torque), the rotation speed, torque, power and throttle opening at each point are always monotonically increased, and optimum efficiency points of a series of equipower lines are selected to form an optimal condition route. The above working condition route is changed into a curve on a throttle opening-rotation speed diagram. During adjustment, when detected state points of the rotation speed and the throttle opening are located on the right side of the route (a higher rotation speed side), the throttle opening is decreased; otherwise the throttle opening is increased.

When the vehicle is parked, the engine charging the flywheel preferably selects the maximum efficiency condition. When shorter load time is needed, a higher power condition is used until the maximum efficiency condition is reached. Before the selected engine load condition is reached, a raising condition transition process starting from the idling condition exists. When the rotation speed of the flywheel is not lower than an indicator rotation speed before loading, that is, loaded power capacity is not lower than a load condition power of the engine, the raising condition transition process is very fast; and when the rotation speed of the flywheel is lower than the indicator rotation speed before loading, the raising condition transition process is synchronized with a process of raising the speed of the flywheel to the indicator rotation speed, and then a higher torque of the flywheel is controlled, thereby accelerating the transition process.

Three typical solutions of charging the flywheel by the engine while parking the vehicle are as follows:

a condition that an initial rotation speed of the flywheel is zero: the circuit "connecting region clearances" (5) of the three HET half-coupled members are connected, and the HET series system is controlled by adopting the corresponding separated HET adjustment and control method: giving an Mhe12 zero instruction, giving an Mhe11 instruction according to two sections, enabling the Mhe11 instruction on the former section to be identically equal to a maximum torque Mhe11max, converting into constant power control when the rotation speed $\omega h11$ of the flywheel reaches an indicated rotation speed $\omega h11p$, and enabling the Mhe11 instruction to be equal to a ratio Pload/$\omega h11$ of the load condition power of the engine to the rotation speed of the flywheel;

a condition that the initial rotation speed of the flywheel is not zero but lower than the indicated rotation speed: the circuit "connecting region clearances" (5) of the three HET half-coupled members are connected, and the HET series system is controlled by adopting the corresponding separated HET adjustment and control method: giving an Mhe12 zero instruction, giving an Mhe11 instruction according to three sections, enabling the Mhe11 instruction on the former section to adopt a curve changing from zero to the maximum torque Mhe11max rapidly, enabling the intermediate Mhe11 instruction to be equal to the maximum torque Mhe11max, converting into constant power control when the rotation speed $\omega h11$ of the flywheel reaches an indicated rotation speed $\omega h11p$, and enabling the Mhe11 instruction to be equal to the Pload/$\omega h11$; and a condition that the initial rotation speed of the flywheel is higher than the indicated rotation speed: the circuit "connecting region clearances" (5) of the three HET half-coupled members are connected, and the HET series system is controlled by adopting the corresponding separated HET adjustment and control method: giving an Mhe12 zero instruction, giving an Mhe11 instruction according to two sections, enabling the Mhe11 instruction on the former section to adopt a curve changing from zero to the Pload/$\omega h11$ rapidly, and enabling the Mhe11 instruction on the rear section to be equal to the Pload/$\omega h11$.

A load rotation speed upper limit value is set for the flywheel, that is, charge loading of the flywheel is ended when the rotation speed reaches the limit value. The upper limit value of the rotation speed is a maximal rotation speed 13793.1 r/min of the flywheel.

A running rotation speed lower limit value of 9194.5 r/min is set for the flywheel. When the rotation speed of the flywheel reaches the running rotation speed lower limit value from a higher speed to a lower speed, the flywheel stops outputting power, and charge loading to the flywheel is started. The vehicle is not driven by the flywheel any more before the rotation speed of the flywheel rises to an intermediate rotation speed limit value of 9655.2 r/min.

When the vehicle runs, the speed is always switched between two stages, that is, an overall flywheel speed increasing stage (occasionally speed decreasing) and an overall flywheel speed decreasing stage (occasionally speed increasing). Uninterrupted continuity of the vehicle driving/braking torque is maintained during switch of a current stage and a next stage, that is, the wheel-side torque Mhe12 is kept invariable, and the engine-side and flywheel-side torque and power are in smooth balanced transition.

At the overall flywheel speed increasing stage: the flywheel runs in a range from the running rotation speed lower limit value to the load rotation speed upper limit value; the engine always outputs the power, even if the vehicle is braked by the flywheel; the engine runs in the maximal power condition in an area between the running rotation speed lower limit value and the intermediate rotation speed limit value; the engine operating condition is preferably the maximum efficiency condition for loading the flywheel and driving the vehicle in an area between the intermediate rotation speed limit value and the load rotation speed upper limit value; when power Pmaxe of the engine under the maximum efficiency condition is totally used for driving the vehicle and is still insufficient, the flywheel outputs power to assist driving; and when driving power of the flywheel reaches the current maximum value and is still insufficient, the power of the engine is increased, that is, transition from the power Pmaxe to the maximal power Pmax is performed until the maximal driving power of the flywheel and the maximal power of the engine are totally used for driving the vehicle.

At the overall flywheel speed decreasing stage: the flywheel runs in a range from the load rotation speed upper limit value to the running rotation speed lower limit value; the engine occasionally outputs power; when the vehicle is braked by the flywheel, the engine does not run; the vehicle is driven by the flywheel mainly, and when the driving power of the flywheel reaches the current maximal value and is still insufficient, the power Pmaxe of the engine is added, and the power of the flywheel is correspondingly decreased; and when a sum of the maximal power of the flywheel and the Pmaxe is still insufficient, the power of the engine is increased, that is, transition from the power Pmaxe to the maximal power Pmax is performed.

Power control units are arranged on a vehicle driving seat as follows: a drive pedal, a brake pedal, and initial setting operating levers of aheading gear 1, aheading gear 2, aheading gear 3 and reversing gear 1.

Instructions for driving torque relative values ranging from zero to a maximal value are correspondingly output in a drive pedal travel. The torque and the travel adopt a non-linear relation. The torque at an initial stage is increased slowly, so as to easily control a low running speed of the vehicle. The maximal value of the driving torque is a currently available maximal value and is calculated by a power control system according to current state measurement parameters.

Travel of the brake pedal is divided into a front travel and a rear travel. The front travel corresponds to kinetic energy recovery braking torque relative values ranging from zero to a maximal value. The rear travel corresponds to friction braking torque relative values ranging from zero to a maximal value. The maximal value of the kinetic energy recovery braking torque is simultaneously maintained in the rear travel. Kinetic energy recovery braking is to recover kinetic energy of the vehicle to the flywheels by virtue of reverse power flow transfer of the HET. Friction braking is to convert the kinetic energy of the vehicle into heat energy by adopting four vehicle friction braking discs. The maximal value of the kinetic energy recovery braking torque is a currently available maximal value and is calculated by the power control system according to current state measurement parameters.

The initial setting operating levers of the aheading gear 1, aheading gear 2, aheading gear 3 and reversing gear 1 give consideration to aheading and reversing settings and initial speed ratio gear settings. A transmission ratio at the gear 1 is larger, the transmission ratio at the gear 2 is intermediate, and the transmission ratio at the gear 3 is smaller. Initial setting of aheading at gear 1 is as follows: a three-stage speed ratio gear reducer is located in a gear-1 transmission ratio state at an aheading speed of the vehicle ranging from zero to a first intermediate switching speed, located in a gear-2 transmission ratio state in a range from the first intermediate switching speed to a second intermediate switching speed, and located in a gear-3 transmission ratio state in a range from the second intermediate switching speed to the highest vehicle speed. Initial setting of aheading at gear 3 is as follows: the three-stage speed ratio gear reducer is always located in the gear-3 transmission ratio state. Initial setting of reversing at gear 1 is as follows: the three-stage speed ratio gear reducer is located in the gear-1 transmission ratio state at a vehicle reversing running speed ranging from zero to an intermediate speed, and a speed limit does not exceed the intermediate speed. During reversing, the HETh12 output shaft and a rear axle system thereof are reversed, and a special reverse gear block does not exist.

A gear-shifting operation while running is automatically controlled by the power control system. When a preset gear shifting speed is reached, the transferred torque is controlled to be decreased to zero, an original gear is released, two synchronous to-be-engaged parts are rubbed by a synchronizer, a new gear is engaged, and the needed torque is transferred according to the current driving torque command.

Figure 30:
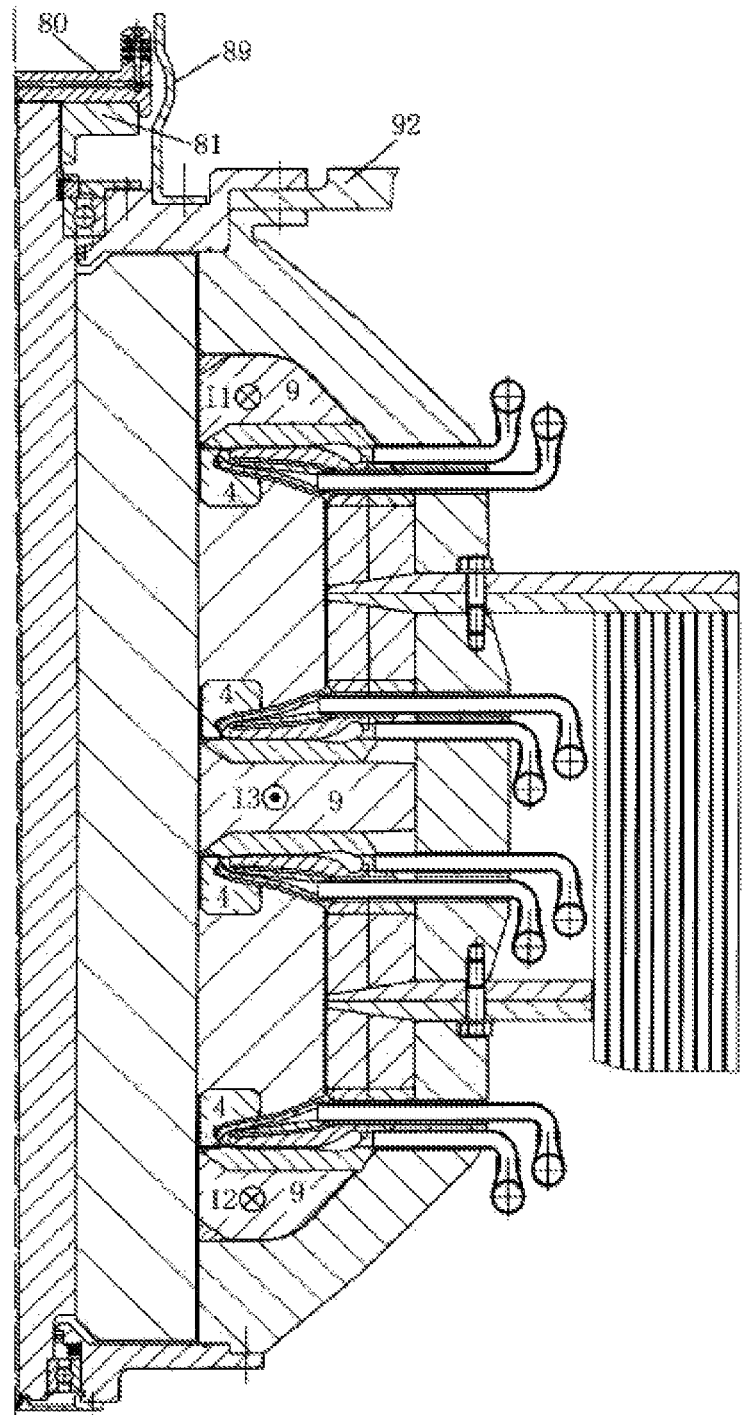
FIG. 30 is a diagram of a load-end vertical separated half-coupled member HETho meridian plane (section A-A of FIG. 29) (double-magnetic flux, near-axis coil, two-stage external series, non-full-height conductor)
Figure 31:
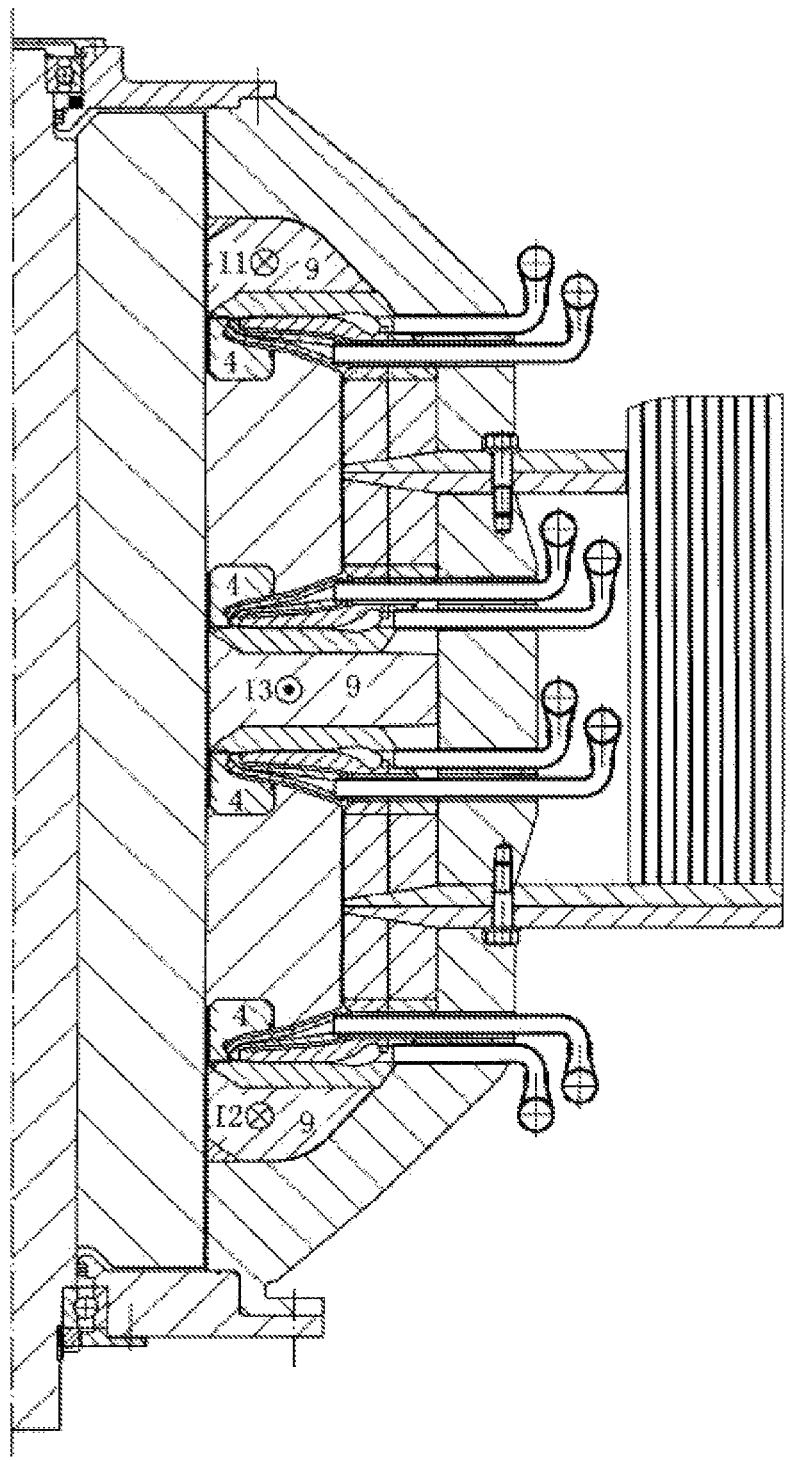
FIG. 31 is a diagram of an energy supply end vertical separated half-coupled member HEThi meridian plane (double magnetic flux, near-axis coil, solid shaft, two-stage external series, non-full-height conductor)

(e) Mechanical Connection and Load Charging System for Energy Storage Flywheel of Vehicle Including HET A mechanical connection and load charging system for flywheel of vehicle adopts components as follows: a load joint, a load-end vertical separated half-coupled member HETho (FIG. 30) and a manipulator system, an energy supply end vertical separated half-coupled member HEThi (FIG. 31), a bevel gear speed increaser and a horizontal synchronous motor. A rated load power is 2000 kW.

The HETho rotation shaft serves as a load rotation shaft. The load joint is assembled at the upper end of the load rotation shaft. The load joint and a loading disc (69) at the lower end of a vehicle flywheel rotation shaft adopt an external-contacting rubber tube hydraulic connecting structure. The load joint has a hydraulic connecting disc (80) and a spline disc (81). The spline disc and an involute spline of the load rotation shaft are in matched connection and torque transfer. The hydraulic connecting disc and the spline disc are located by adopting a seam allowance and subjected to torque transfer by using four circumferentially uniformly distributed cylindrical pins (87). A central end surface of the hydraulic connecting disc and a shaft end surface of the load rotation shaft are fixedly attached by adopting four screws (88). An outer edge of the hydraulic connecting disc is of a cylinder type extending upwards. A peripheral groove is formed in an inner wall of the cylindrical part. A rubber ring (82) made of polyurethane is arranged in the groove. An outer surface of the rubber ring has a longer inner cylindrical surface and a longer outer cylindrical surface. Three axially arranged circular round holes are included in the rubber ring. Two circumferentially uniformly distributed radial through holes towards the outer side are formed corresponding to each of the circular round holes. Corresponding to an orientation of the two rows of radial through holes, two hydraulic circuits (83) communicated with the radial through holes are formed inside the hydraulic connecting disc. The two hydraulic circuits are converged at an axis oil hole of the hydraulic connecting disc. The axis oil hole is butted and communicated with an axis through hole (84) in the load rotation shaft (that is, the HETho rotation shaft). Hydraulic oil is supplied by a hydraulic pressure station of an auxiliary system, and input into the axis through hole (84) and an oil circuit communicated thereby by virtue of a pipeline and a sealed joint at a shaft end at the lower end of the HETho rotation shaft. The outer cylindrical surface of the rubber ring and an outer round-corner surface are adhered and sealed with the surface of the groove in the hydraulic connecting disc, thereby ensuring docking seal between the two rows of radial through holes and the hydraulic circuit. When the hydraulic circuit is subjected to emptied oil filling and is not pressurized, the rubber ring retains an initial shape, a radius of the inner cylindrical surface of the rubber ring is 0.5 mm larger than a radius of the outer cylindrical surface of the flywheel loading disc, and then the load joint may be controlled to axially move (approaching or deviating). When a pressure of the hydraulic oil is increased, a pressure in an inner hole chamber of the rubber ring is increased, the rubber ring expands, and a radius of the inner cylindrical surface of the rubber ring is shrunk, thereby achieving an effect of holding the outer cylindrical surface of the flywheel loading disc; and after the pressure of the hydraulic oil is decreased, the rubber ring restores to the initial shape. When the load rotation shaft rotates, the hydraulic oil in the inner hole chamber of the rubber ring is increased by virtue of a generated centrifugal force effect, and centrifugal force of the rubber ring is increased to cause an outward displacement of the inner cylindrical surface of the rubber ring. In order to avoid uncertainty of the centrifugal force effect and action effects thereof, before the load rotation shaft reaches a load operating position and when the load rotation shaft deviates from the load operating position, the load rotation shaft is positioned in a zero rotation speed state. In order to prevent residual air existing in an engagement area when the rubber ring externally contracts the loading disc, two annular grooves (85) are formed in the outer cylindrical surface of the loading disc. Axial positions of the grooves correspond to a centrally parting point of axial positions of two annular round holes of the rubber ring, and two groups of circumferentially uniformly distributed vent holes (86) are formed in the loading disc, thereby communicating the grooves with outside.

The load-end vertical separated half-coupled member HETho (FIG. 30) and the energy supply end vertical separated half-coupled member HEThi (FIG. 31) are arranged on the same axis, and are electromagnetic structure types of two-stage external series, each-stage double-magnetic flux, near-axis magnet exciting coils and half-height rotor electric conductors (4). Main parameters of each of the half-coupled members include: rated electromagnetic power of 2000 kW, a rated rotation speed of 10000 r/min, a rated main current value of 65644 A, a rated electromotive force value of 30.5V, an axial surface radius 85.285 mm of the rotation shaft, a maximal rotor radius of 145.8 mm, a stator body radius of 232.8 mm, an external terminal radius of 342.8 mm, a stator axial length of 600.5 mm, and rotor mass of 175 kg.

The half-coupled member HETho (FIG. 30) and the half-coupled member HEThi (FIG. 31) have most of the same structural details as those of the separated HET half-coupled members (FIG. 19) adopted in specific embodiments of the above power system. Since the separated HET half-coupled members (FIG. 19) are described above, only main differences between the half-coupled members HETho and HEThi and the separated HET half-coupled members shown in FIG. 19 are described below.

Figure 12:
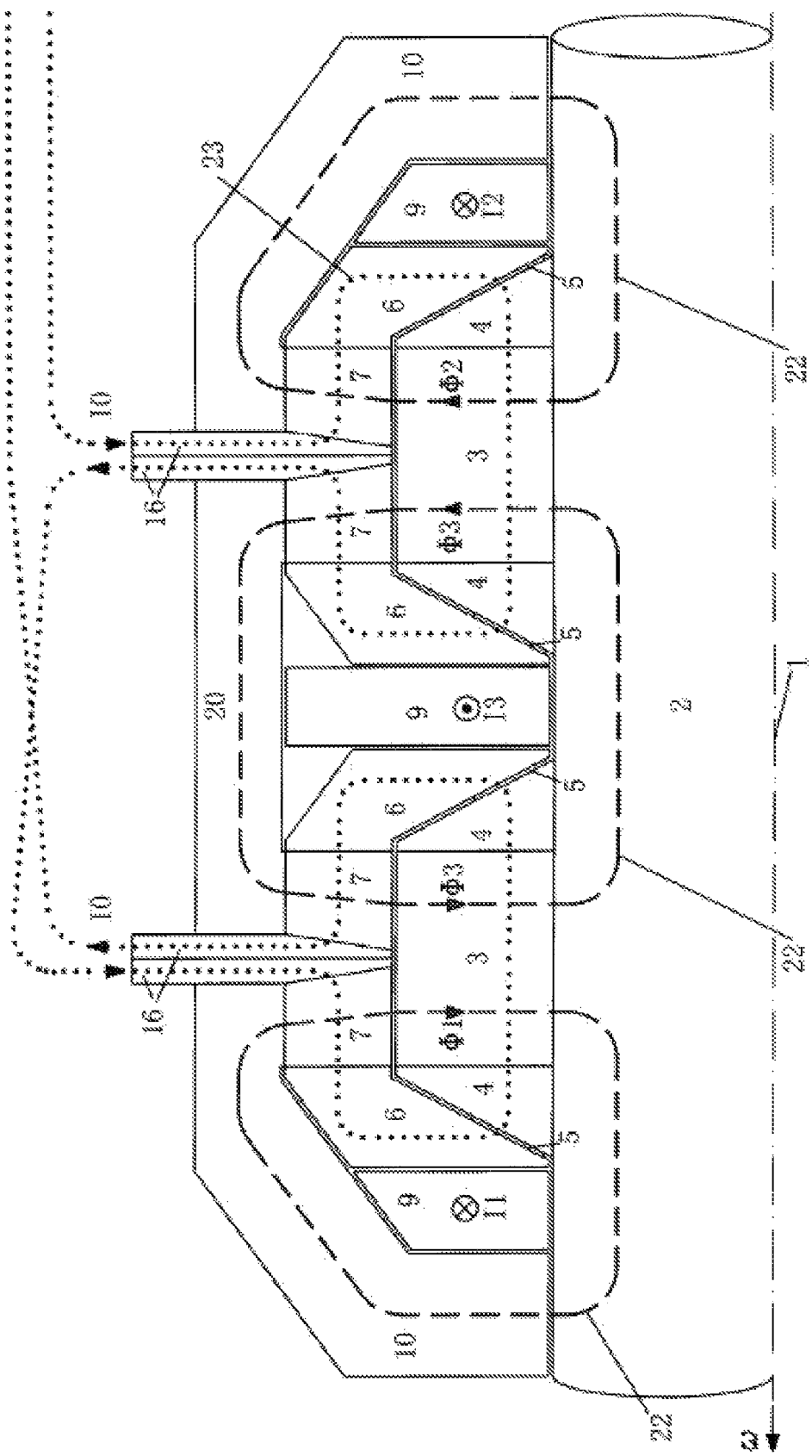
FIG. 12 is a meridian plane schematic diagram of a separated type, double-magnetic flux, two-stage external series, near-axis coil, solid shaft, axial plane type, HET half-coupled member.
Figure 13:
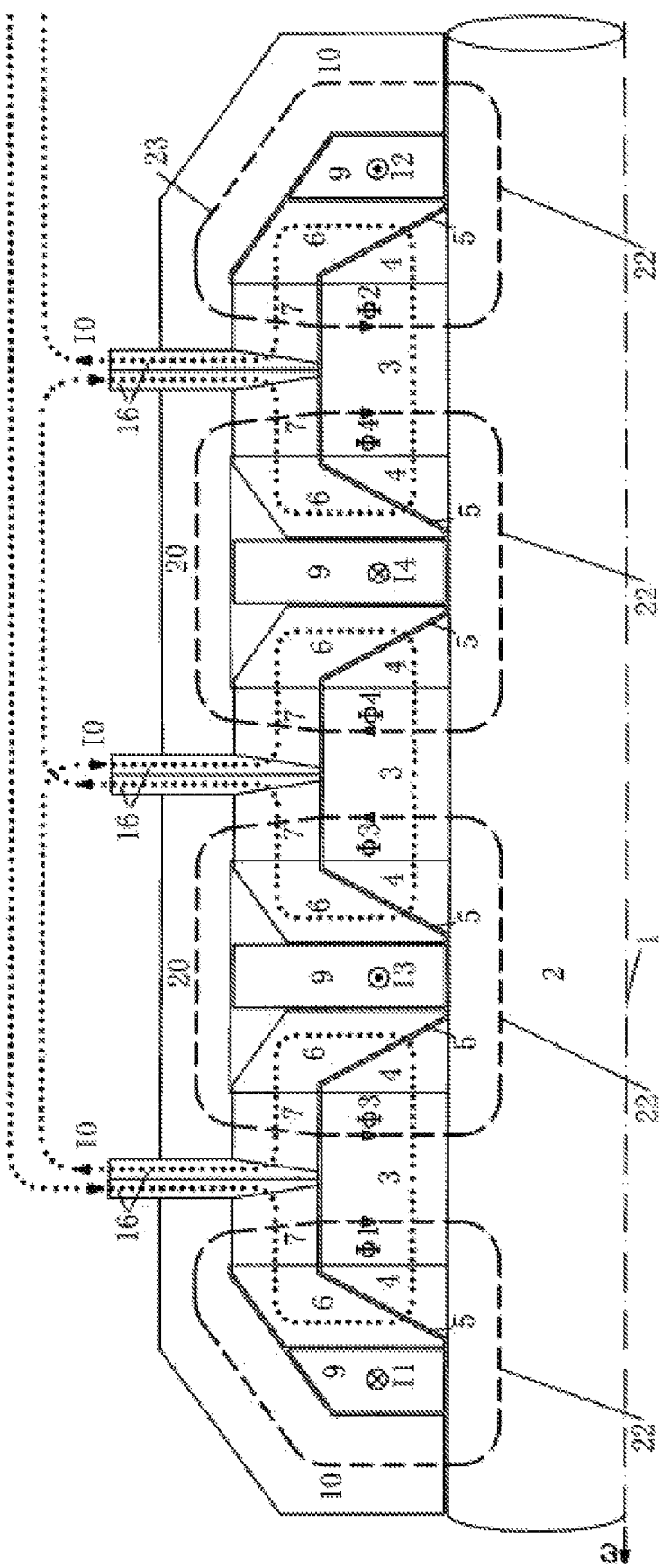
FIG. 13 is a meridian plane schematic diagram of a separated type, double-magnetic flux, three-stage external series, near-axis coil, solid shaft, axial plane type, HET half-coupled member.
Figure 14:
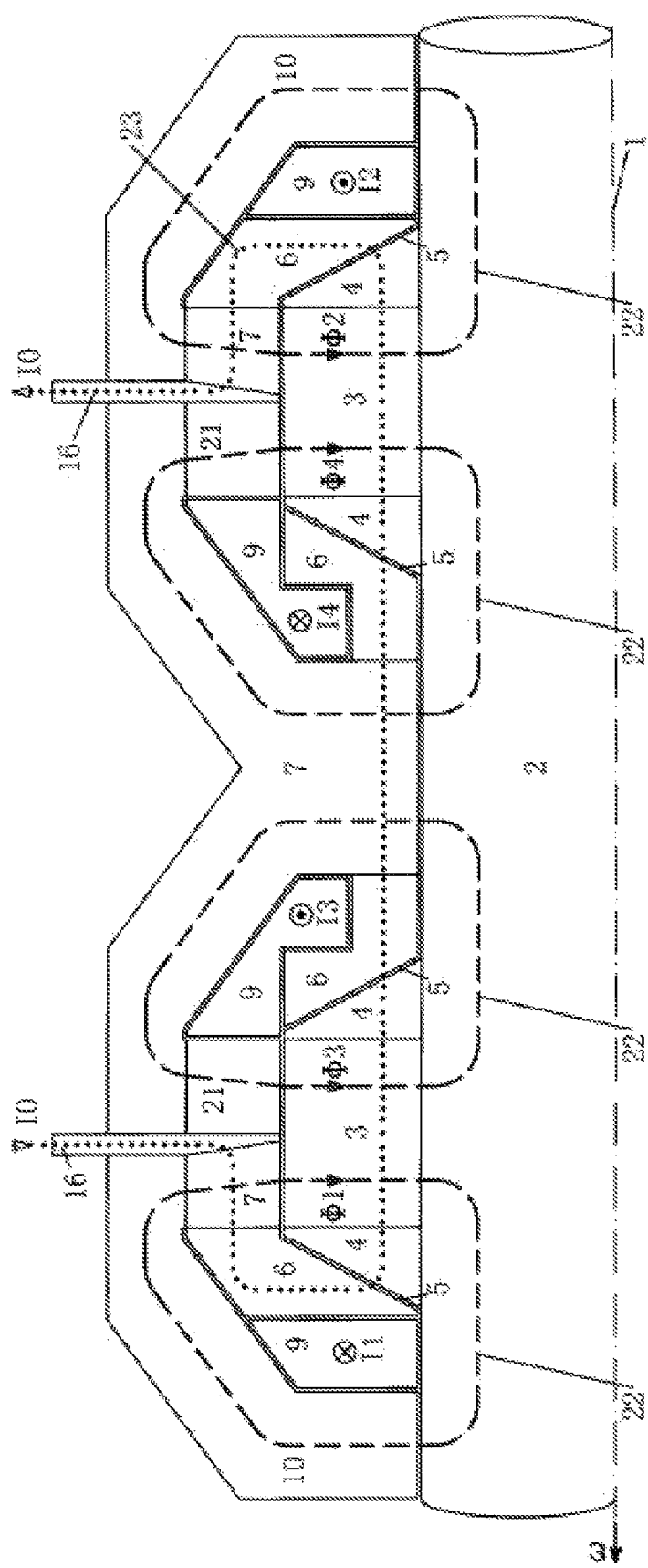
FIG. 14 is a meridian plane schematic diagram of a separated type, double-magnetic flux, two-stage internal series, near-axis coil, solid shaft, axial plane type, HET half-coupled member.
Figure 15:
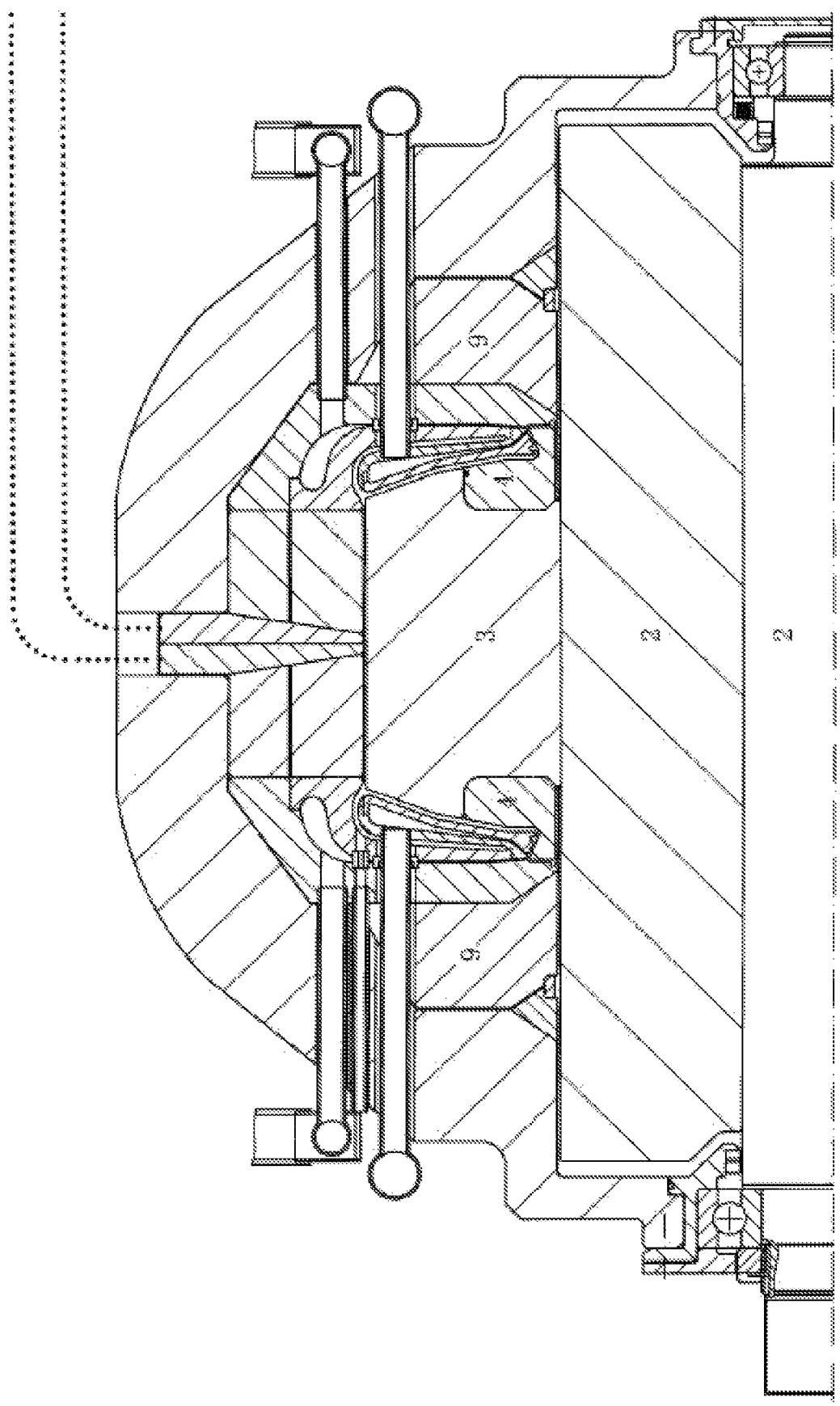
FIG. 15 is a meridian plane schematic diagram of a separated type, double-magnetic flux, near-axis coil, solid shaft, axial plane type, rotor electric conductor not-full-height HET half-coupled member.
Figure 16:
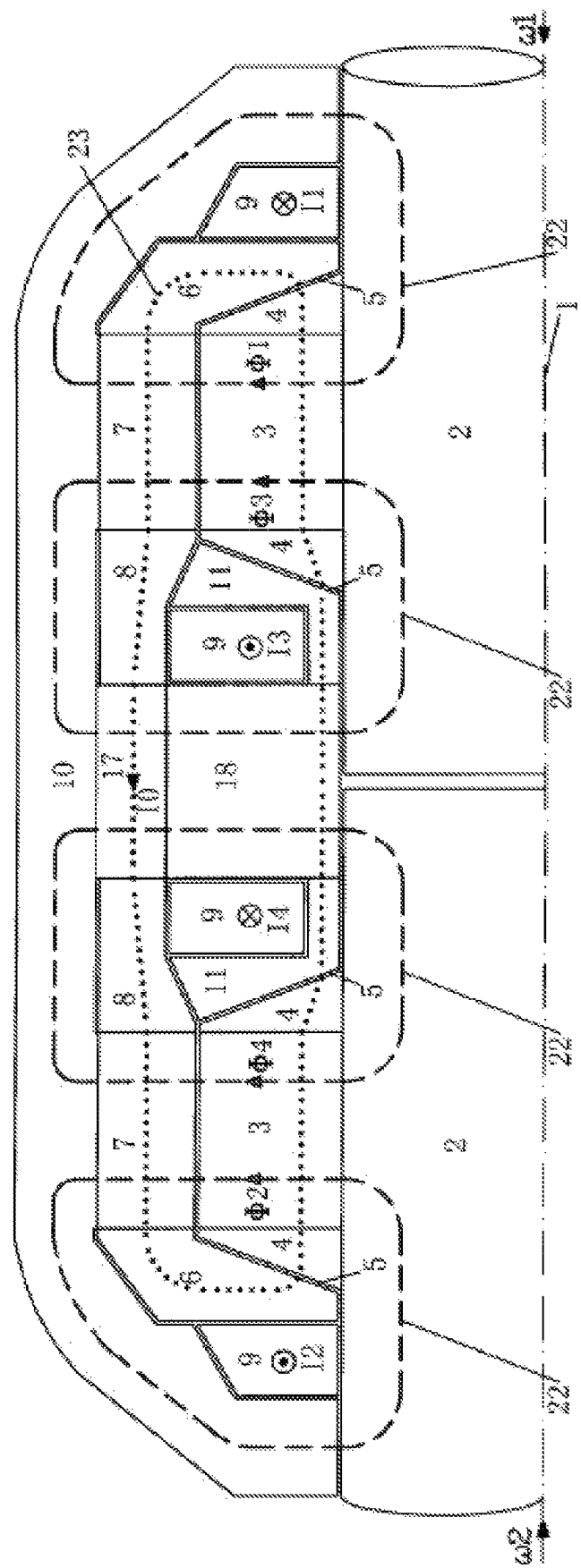
FIG. 16 is a meridian plane schematic diagram of a centralized type, two-axis two-double magnetic flux (without two-axis sharing in form), near-axis coil, solid shaft, axial plane type, opposite two-axis rotation directions, HET.
Figure 17:
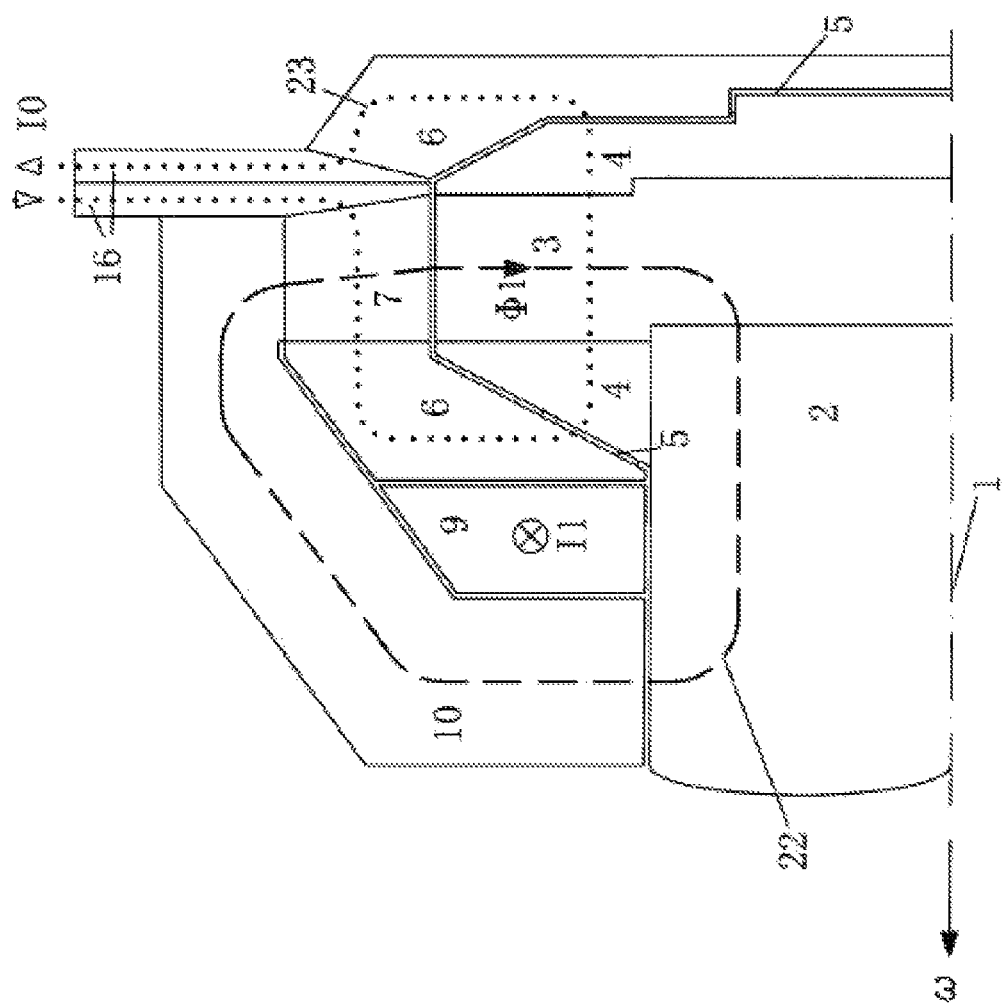
FIG. 17 is a meridian plane schematic diagram of a separated type, single-magnetic flux, near-axis coil, solid shaft, axial plane type, shaft end collector design, HET half-coupled member.
Figure 18:
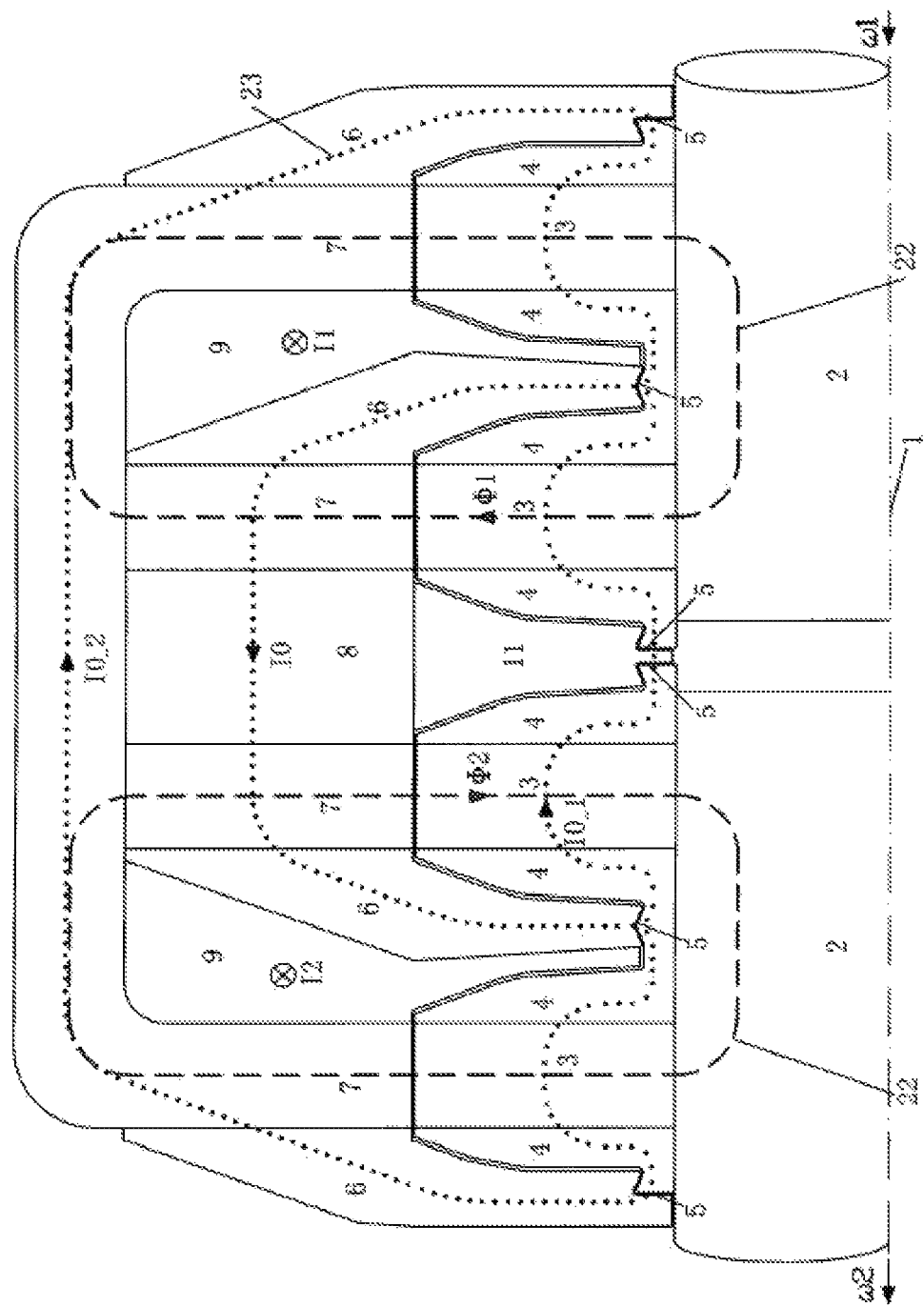
FIG. 18 is a meridian plane schematic diagram of a centralized type, double-circuit, solid shaft, axial plane type, HET.
Figure 20:
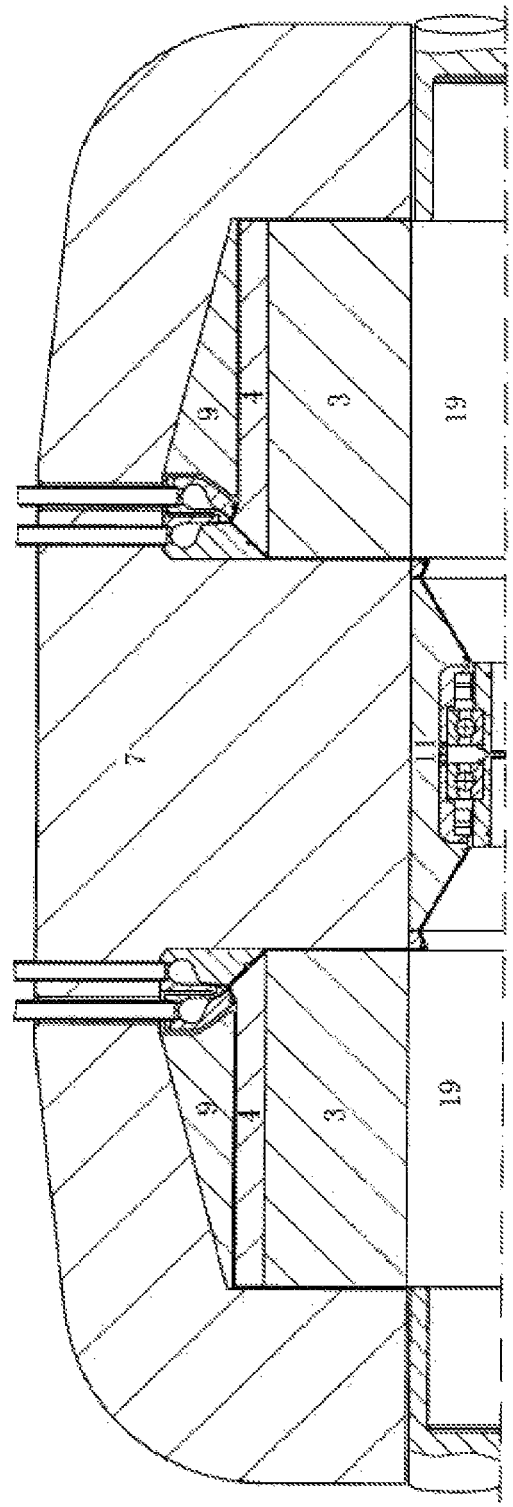
FIG. 20 is a meridian plane diagram of a centralized type, two-axis two-single magnetic flux (without two-axis sharing in form), solid shaft, axial plane type (axial magnetic flux gap, axial attraction offset design), HET.
Figure 21:
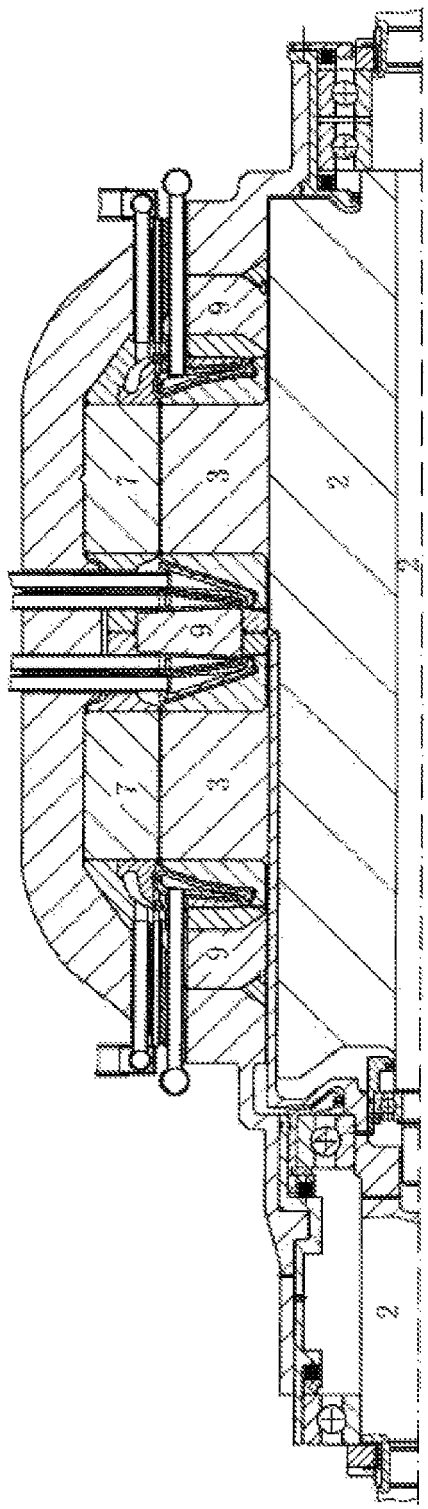
FIG. 21 is a meridian plane diagram of a centralized type, two-axis two-double magnetic flux (two-axis shared), near-axis coil, solid shaft, axial plane type, HET.
Figure 22:
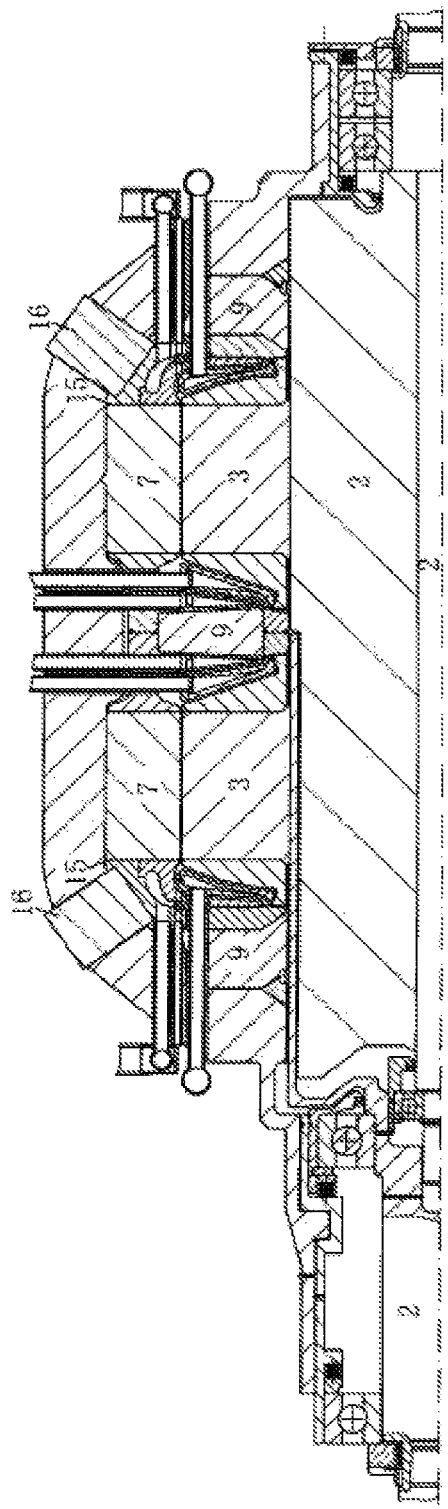
FIG. 22 is a meridian plane diagram of a centralized type, two-axis two-double magnetic flux (two-axis shared), near-axis coil, solid shaft, axial plane type, external terminal led-out, HET.
Figure 24:
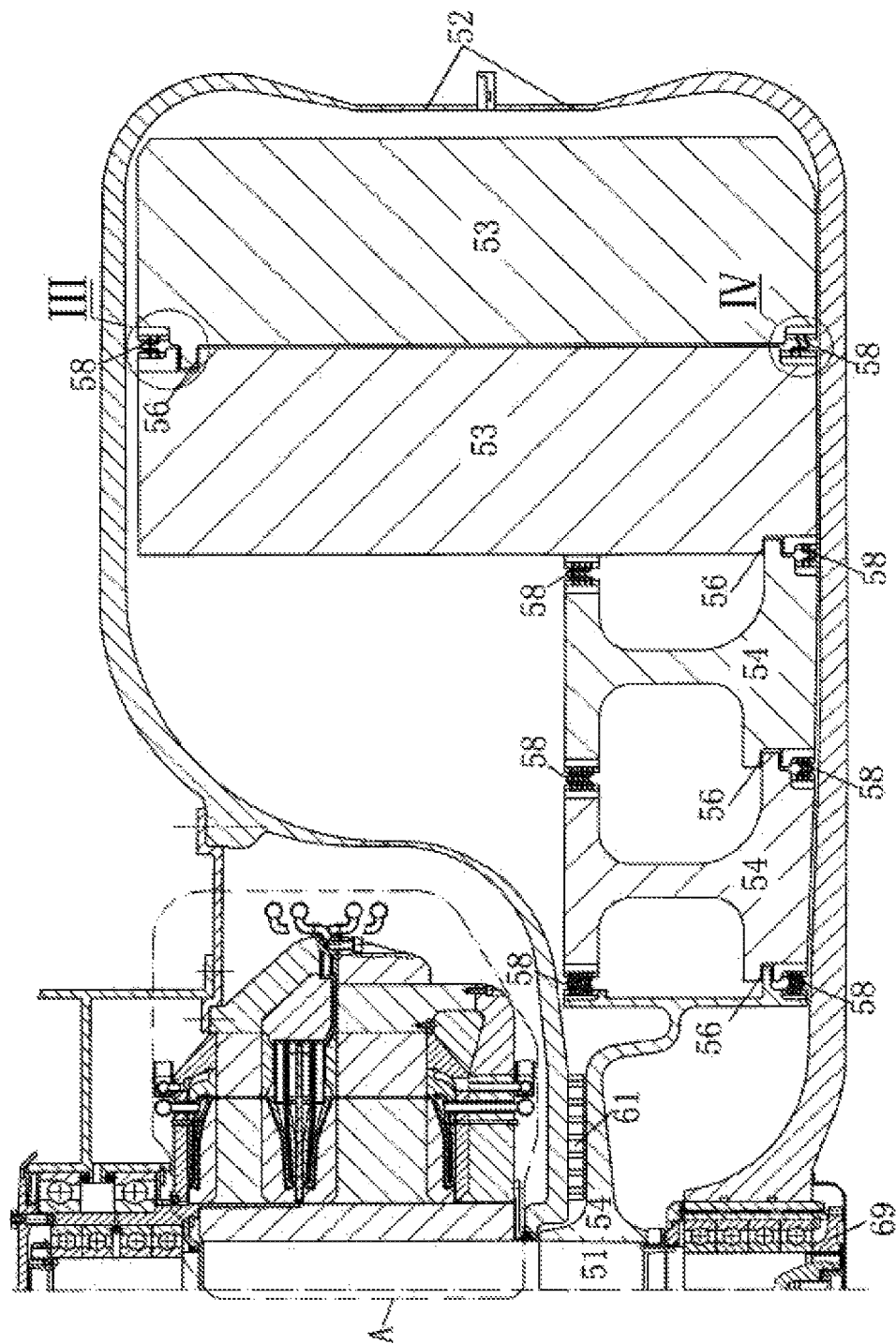
FIG. 24 is a meridian plane diagram of a flexible flywheel and centralized HET (part A)

The HETho and HEThi have a series two-stage structure. The series two-stage structure is basically formed in combining single-stage structures shown in FIG. 19 in series. Four magnet exciting coils (9) of the two single-stage structures are reduced to three magnet exciting coils (9) (corresponding to exciting current I1, I2 and I3 in FIG. 12, FIG. 30 and FIG. 31), that is, two coils at intermediate positions of the original four magnet exciting coils with consistent exciting current directions are merged into a coil (I3), original two main magnetic circuits are merged into a main magnetic circuit, and original two stator magnetic conductors (10) are canceled. Coils at both ends with exciting current of I1 and I2 have the same structure and number of turns. Since the magnetic circuit structures are symmetrical, magnetic flux passing through rotor magnetic and electric conductors generated when I1 and I2 are equal to each other also has the same size. An intermediate coil with exciting current of the I3 has a large number of turns. The arranged number of turns ensures that magnetic flux generated by the rated value of I3 is the same as magnetic flux generated by rated values of the I1 and I2, that is, an effect of combining the two single-stage structures is achieved. In an actual application, wires of the three magnet exciting coils are connected in series, the I1 and the I2 are always equal to each other and have the same direction, the I3 and the I1 have opposite directions, and a ratio of numerical values of the I3 and the I1 is always equal to a ratio of the number of turns thereof, so that functional relations between the total rotor magnetic flux and influencing factor changes thereof are simplified, and electromagnetic law formulas and adjustment and control methods of the separated HET half-coupled members shown in FIG. 19 can be adopted in reference.

Figure 29:
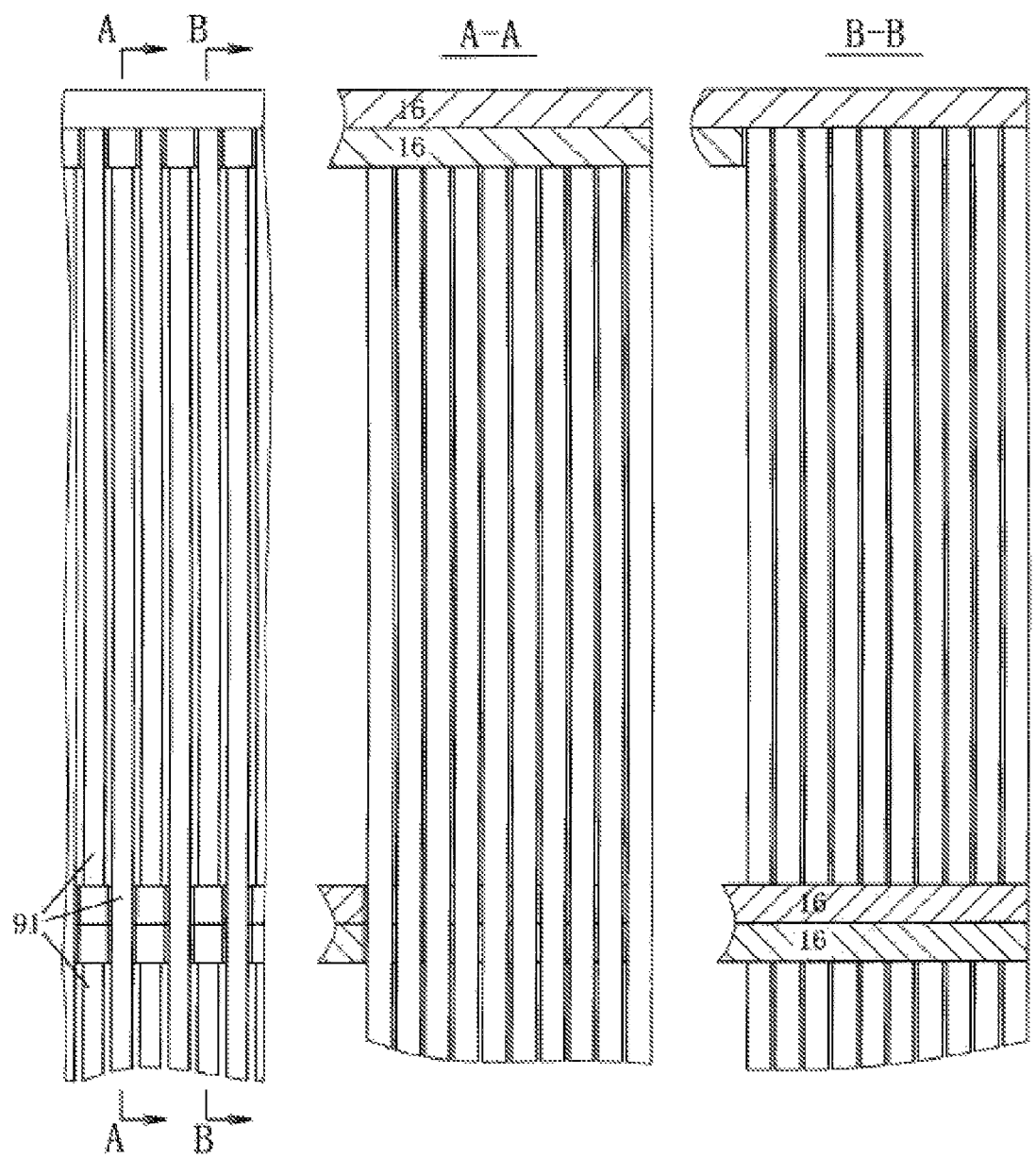
FIG. 29 is a diagram of external terminal and mixed flexible cable (I) of two-stage external series separated HET half-coupled members.

Connection of main current circuits adopts solutions of mixed flexible cables arranged between external terminals (16) (FIG. 29, FIG. 30 and FIG. 31) between the two stages of each of the half-coupled members and between the HETho and HEThi. The mixed flexible cables adopt circular flexible wire bundles (91) with an outer contour diameter of 6 mm which are made of red copper wire materials with a wire diameter of a fraction of a millimeter and composed of fine wires. The flexible cables are connected between two-stage external terminals of each of the half-coupled members and between external terminals of the HETho and HEThi according to the solutions shown in FIG. 29, FIG. 30 and FIG. 31. The wire bundles in the same path and same current direction are arranged in a row. Various rows of the wire bundles in different paths and different current directions are alternatively arranged into fan-shaped blocks. Eight fan-shaped blocks are circumferentially and uniformly distributed. Spaces through which other pipelines and leads pass are reserved among the fan-shaped blocks. The wire bundles and red copper external terminals are in brazed connection, or red copper intermediate transition terminals are in brazed connection with the wire bundles and the red copper external terminals. Lengths of the wire bundles between the HETho and HEThi external terminals should meet as follows: upward and left-and-right movements of the HETho and the load rotation shaft meet limit requirements of the operating positions, that is, the HETho and the load rotation shaft have full stretching flexibility.

The manipulator system is provided with three spherical hinge fulcrums (fulcrums P1, P2 and P3) on the outer surface of the HETho. In an attached rectangular coordinate system by taking an axial lead of the HETho rotation shaft as a vertical axis Zb, the three fulcrums have the same Zb coordinates (the Zb value is set as zero). A distance between each of the three supports and the Zb axis is the same (the distance is R=340 mm). The three fulcrums are circumferentially and uniformly distributed. The point P1 is located on an Xb axis. Six linear stepping actuators are adopted to control absolute coordinates of the three supports. A ground absolute rectangular coordinate system (X, Y, Z) and an attached rectangular coordinate system (Xb, Yb, Zb) at an initial position are coincided. Z-axis coordinates of the three supports are directly controlled. A Y-axis coordinate of the point P1 is directly controlled. X-axis coordinates of the points P2 and P3 are directly controlled. An X-axis coordinate of the point P1 and Y-axis coordinates of the points P2 and P3 are indirectly controlled by a rigid connection relation of the three points. Z-axis control of each of the supports is as follows: a prismatic kinematic pair of upper and lower members (specifically a cylindrical kinematic pair with a guide sliding key, the same below) is adopted, a lower-end member is rigidly connected to a stationally frame and a foundation, a cylindrical hole seat with a key groove is formed in the upper end of the lower-end member, a shaft extension with a key is arranged at the lower end of an upper-end member, the lower-end member and the upper-end member are assembled into the prismatic kinematic pair, an output shaft of a linear stepping actuator (specifically a stepping motor and leadscrew nut transmission mechanism, the same below) is connected below the shaft extension end, and machine legs of the linear stepping actuator are fixed on the lower-end member. Y-axis control of the point P1 is as follows: a prismatic kinematic pair is adopted, wherein one member is an upper-end member of a Z-axis control kinematic pair of the point P1, and a pair of cylindrical hole seats with key grooves of which axes are parallel to the axis Y is arranged on the member; and shaft extensions with keys are arranged at both ends of the other member, a cylindrical hole seat without a key groove of which the axis is parallel to the axis Z is arranged in the middle of the member, the shaft extensions at the both ends and the pair of hole seats are assembled into the prismatic kinematic pair, the shaft extension at one end is connected with the output shaft of the linear stepping actuator, and machine legs of the linear stepping actuator are fixed on the upper-end member. X-axis control of the point P2 (point P3) is as follows: a prismatic kinematic pair is adopted, wherein one member is an upper-end member of a Z-axis control kinematic pair of the point P2 (point P3), and a pair of cylindrical hole seats with key grooves of which axes are parallel to the axis Y is arranged on the member; and shaft extensions with keys are arranged at both ends of the other member, a cylindrical hole seat without a key groove of which the axis is parallel to the axis Y is arranged in the middle of the member, the shaft extensions at the both ends and the pair of hole seats are assembled into the prismatic kinematic pair, the shaft extension at one end is connected with the output shaft of the linear stepping actuator, and machine legs of the linear stepping actuator are fixed on the upper-end member. A cylindrical piston is respectively assembled in each of the three cylindrical hole seats without the key grooves. A spherical plain bearing block is installed in the center of an end surface, which is close to the axis Z, of the piston. The spherical plain bearing block and a matched spherical bar head are combined into a spherical hinge. Centers of spheres of the three spherical hinges are the points P1, P2 and P3. Three supporting rods with the spherical bar heads are fixedly connected above a support ring (92) added at a flange at the upper end of the HETho stator.

A system for detecting the orientation of the vertical flywheel rotation shaft of the vehicle in the manipulator system is also applied. A non-contact distance measuring instrument is adopted. Nine distance data between three measuring mark points on a symmetrical fixing piece coaxial with the rotation shaft at the flywheel rotation shaft end and three fixed datum points of the detection system are measured, and three-dimensional spatial absolute coordinates of the three measuring mark points are calculated and determined, thereby determining the spatial positions and direction angles of the flywheel shaft end (that is, three spatial coordinates and two direction angles). Working procedures performed before loading include steps: opening a protective cover at the flywheel shaft end, measuring and determining the spatial positions and direction angles of the flywheel shaft end, adjusting and moving the HETho in a ready position and a posture that the axis is coincided with the flywheel by utilizing the manipulator system, and linearly translating the HETho to a load operating position. In order to ensure smooth engagement and alignment before loading, guiding measures are added: a guide sleeve ring (90) is attached to a flywheel shaft end shell, a guide sleeve (89) is attached to a bearing block at the upper end of the HETho, and the guide sleeve ring and the guide sleeve are matched to achieve an auxiliary guiding effect during engagement and alignment. The guiding measures may also be applied to manual engagement and alignment.

The horizontal synchronous motor has a rated power of 2000 kW, runs at a synchronous rotation speed of 3000 r/min after started, and can reversely run to serve as a synchronous generator when stored energy of the flywheel of the vehicle should be unloaded to the power grid. The bevel gear speed increaser has a pair of spiral bevel gears subjected to gear grinding, two axes are perpendicular to each other, and a speed-up transmission ratio is 3.333.

A fixing and supporting device for the vehicle frame is arranged and adopts a three-point supporting structure, that is, two front supporting points and a rear supporting point of the vehicle are arranged. Three hydraulic jacks are arranged between a standard setting supporting bottom surface of the frame and a ground support. The vehicle is controlled to be jacked by the system after entry, tires are overhead, and the frame is fixed, so that the positions of the flywheels located on the frames are stabilized.

(f) Wind Power Generation System Including HET

Figure 40:
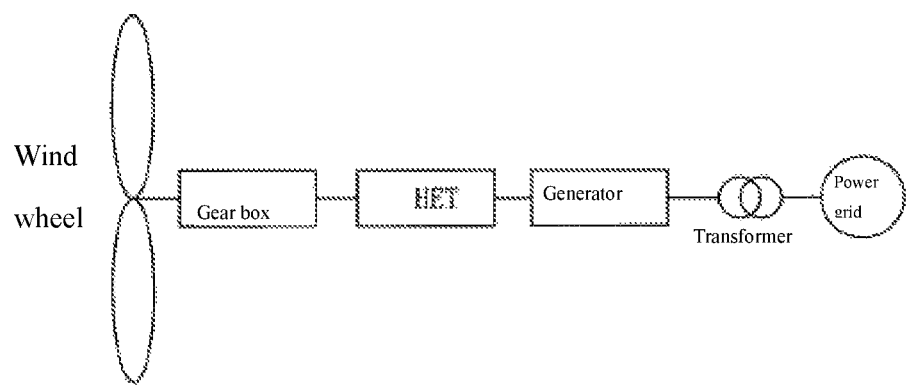
FIG. 40 shows a wind power generation system having HET.

A specific embodiment of a 1.5 MW wind power generation system (FIG. 40) with HET is as follows.

The system includes: a horizontal axis type variable pitch blade wind wheel, a horizontal speed-up gear box connected with a wind wheel shaft, a homopolar DC electromagnetic transmission (HET) connected with a gear box output shaft and a generator shaft, a horizontal synchronous generator, a mechanical brake apparatus arranged at the wind wheel shaft, a yawing driven active yawing mechanism, a cabin, a tower and a control and attached system.

The wind wheel adopts three aerofoil profile blades. A maximum value of a wind-power utilization coefficient Cp is 0.47, a corresponding optimal tip speed ratio is 7, and the optimal tip speed ratio and the maximum value Cp are used at a rated design point. A rated wind speed 12 m/s of lower wind energy with a wide applicable wind field range is selected. A rated rotation speed of the wind wheel is 24.31 r/min, a rated tip linear speed is 84 m/s, and the rated power is 1670 kW. A diameter of the wind wheel is 66 m.

The speed-up gear box increases the rotation speed from 24.31 r/min to 1500 r/min under a rated working condition, so that the two rotors of the HET have the same rated rotation speed. A speed-up ratio is 61.7. A three-stage transmission manner is adopted. The forward two stages are planet gears, and the backward stage is a parallel shaft cylindrical gear.

The synchronous generator has a rated output power of 1.5 MW, runs at a constant speed of 1500 r/min, outputs alternating current of 50 Hz and is connected to the power grid by virtue of a boosting transformer.

Figure 38:
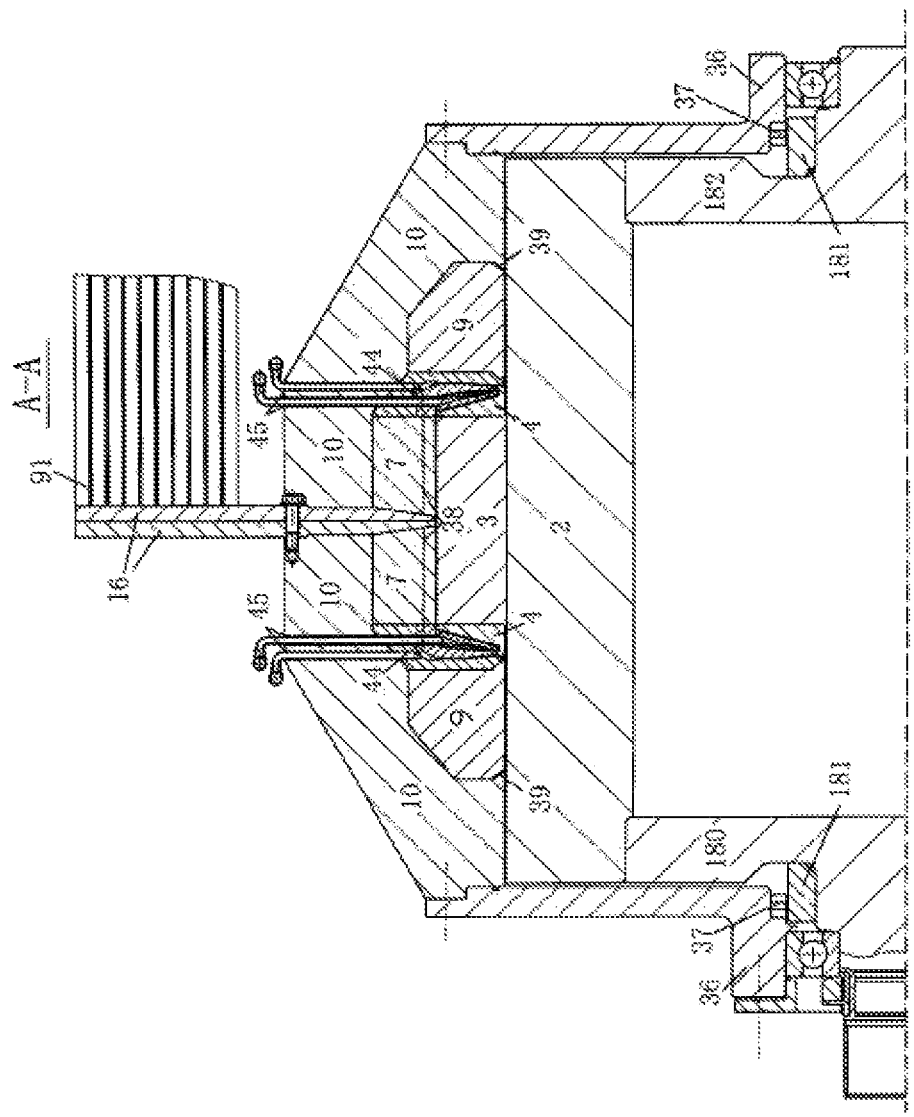
FIG. 38 is a meridian plane schematic diagram of a separated type, double magnetic flux, near-axis coil, solid shaft, axial plane type, single-stage, horizontal HET half-coupled member (section A-A of FIG. 39)

The HET is a horizontal separated type, has a pair of HET half-coupled members (FIG. 38) of the same specification, and has a rated power of 1612 kW, a rated rotation speed of 1500 r/min, rated main current of 107873 A and rated efficiency of 97%. Each of the HET half-coupled members has a single-stage, solid-shaft, double-magnetic flux and near-axis coil structural form. Geometry and weight parameters of each of the HET half-coupled members include: a maximum rotor outer diameter of 701.8 mm, a maximum stator body outer diameter of 928.9 mm, an external terminal outer diameter of 1239.5 mm, an overall length of 804.7 mm, a rotor weight of 927 kg and a total weight of 2604 kg.

Embodiments of the HET half-coupled members (FIG. 38) are as follows. Only parts different from explanations in embodiments of "(a) homopolar DC electromagnetic transmission (HET)" are described.

The rotation shaft is a hollow shaft. A middle section is provided with hollow 20-steel magnetic conductors (2). Both ends are provided with 40Cr steel end shafts (180, 182) and a 20-steel steel lantern ring (181). The lantern ring (181) is used for magnetic conduction of a magnetic fluid sealing element (37). Interference fitting is formed between the magnetic conductors (2) and the end shafts and between the end shafts and the lantern ring, and sealants are applied to contact end surfaces. A rolling bearing (a deep groove ball radial bearing, grease lubricating, with contact-type sealing rings on two sides) is respectively arranged on each of the end shafts. The bearing on one side of a shaft extension end is an axial positioning end and can bear a bidirectional axial load, and the bearing on one side without the shaft extension end is a free end capable of producing an axial displacement. An axial bearing load generated by gravity of the rotor is larger than a minimum load thereof, and additional pre-loading measures do not need to be increased for the two bearings. An external spline is arranged at the shaft extension end and is used for installing a coupling to be connected the generator rotation shaft and the gearbox output shaft.

Figure 39:
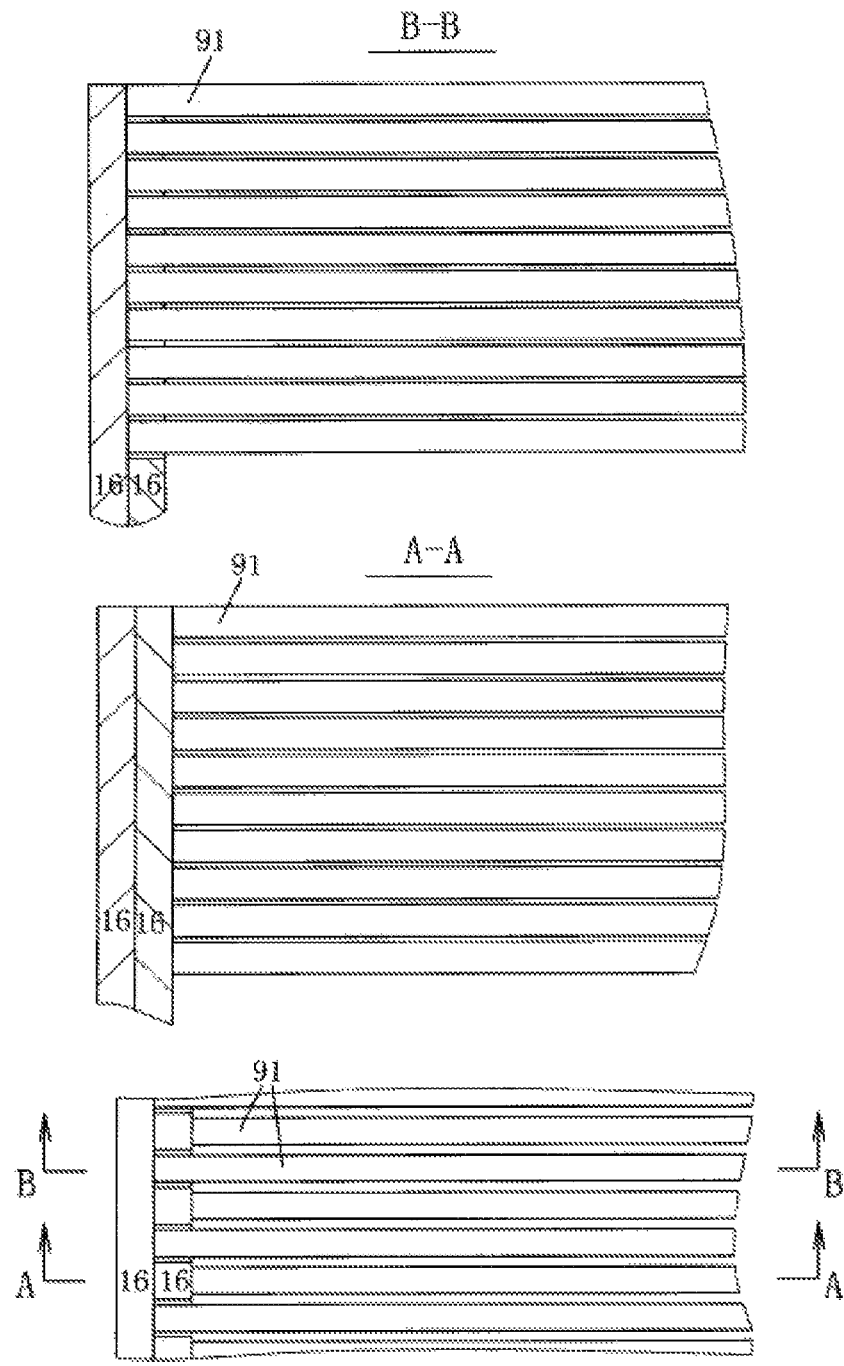
FIG. 39 shows external terminal and mixed flexible cable of single-stage separated HET half-coupled members.

Connection of main current circuits between the two separated HET half-coupled members adopts solutions of external terminals (16) and mixed flexible cables (FIG. 39). The mixed flexible cables adopt circular flexible wire bundles (91) which are made of red copper wire materials with a wire diameter of a fraction of a millimeter and composed of fine wires. The wire bundles in the same current direction are arranged in a row. Various rows of the wire bundles in different current directions are alternatively arranged into fan-shaped blocks. 16 fan-shaped blocks are circumferentially and uniformly distributed. Spaces through which other pipelines and leads pass are reserved among the fan-shaped blocks. The wire bundles and red copper external terminals are in brazed connection, or red copper intermediate transition terminals are in brazed connection with the wire bundles and the red copper external terminals.

The second type of adjustment and control method of the HET above can be adopted for electromagnetic torque control of the HET.

A wind power system start-up process is as follows: when a start-up wind speed is reached, a pitch angle of the blades of the wind wheel ranges from a decreased angle at a "feathering" position to a pitch angle with a larger starting torque, an impeller is driven to be self-started by the wind power, the synchronous generator rotor is driven to speed up from a zero rotation speed to a synchronous rotation speed of 1500 r/min by virtue of HET transmission, and then connected to the power grid by virtue of synchronous grid-connected operating procedures; and after the starting process is completed, the blade pitch angle rotates to a rated design pitch angle, and the rotation speed of the impeller is adjusted to a rotation speed value meeting the optimal tip speed ratio of 7.

A conventional operating control solution in a range from a cut-in wind speed to a rated wind speed is as follows: the wind wheel blades maintain a control objective that the design pitch angle linearly changes along with a direct wind speed ratio according to the wind wheel rotation speed (that is, a ratio of the tip linear speed to the wind speed is equal to 7), a local mean wind speed (outside the cabin), the wind wheel rotation speed and the generator rotation speed are measured in real time, a proportional relation between the wind wheel torque and second power of the wind speed is taken as a mater control rule, an instruction for the torque Me1 of the rotation shaft of the wind-wheel-side HET half-coupled member HETh1 is given, and operations of the HET and power transfer thereof are adjusted and controlled. When the rotation speed of the wind wheel is lower than a constant value of a target rotation speed, the Me1 instruction is appropriately decreased so as to lighten an output load of the wind wheel, thereby speeding up the wind wheel. When the rotation speed of the wind wheel is higher than the constant value of the target rotation speed, the Me1 instruction is appropriately increased so as to increase the output load of the wind wheel, thereby reducing the speed of the wind wheel.

A power limitation control solution in a range from the rated wind speed to the cut-in wind speed is as follows: by taking measures that the variable pitch angle changes towards aspects of decreasing a stall trend, decreasing an airflow angle of attack and increasing the pitch angle of the blades, the power and the impeller rotation speed are kept constant in principle (equal to the rated value), that is, the wind-power utilization coefficient Cp of the impeller and third power of the wind speed are in inversely proportional change, and a tip speed ratio $\lambda$ and the wind speed are in inversely proportional change. A moving track that the value Cp and third power of the $\lambda$ are proportional is shown in a Cp-$\lambda$ diagram, and is a steep curve. An intersection set of a set of curves and the steep curve is solved by utilizing a set of Cp-$\lambda$ curves under different pitch angles in an adjustable pitch angle range, and a corresponding law that the pitch angle changes along the wind speed is determined from the intersection set. The local mean wind speed, the wind wheel rotation speed and the generator rotation speed are measured in real time, the pitch angle is adjusted according to the corresponding law, a torque Me1 instruction for the rotation shaft of the HETh1 is given according to a master control rule that the wind wheel torque is equal to a rated torque, and the operations of the HET and the power transfer thereof are adjusted and controlled. When the rotation speed of the wind wheel is lower than a constant value of a rated rotation speed, the Me1 instruction is appropriately decreased so as to lighten the output load of the wind wheel, thereby speeding up the wind wheel. When the rotation speed of the wind wheel is higher than the constant value of the rated rotation speed, the Me1 instruction is appropriately increased so as to increase the output load of the wind wheel, thereby speeding down the wind wheel.

An impeller brake and stop process is as follows: when the cut-out wind speed is reached, or other braking instructions are transmitted, the pitch angle of the wind wheel blades is rotated to the "feathering" position, aerodynamic braking is implemented, and mechanical braking of a brake disc arranged at the wind wheel shaft is performed until the wind wheel stops rotating.

(g) Wind Power Generation System Including HET and Flywheels

Figure 41:
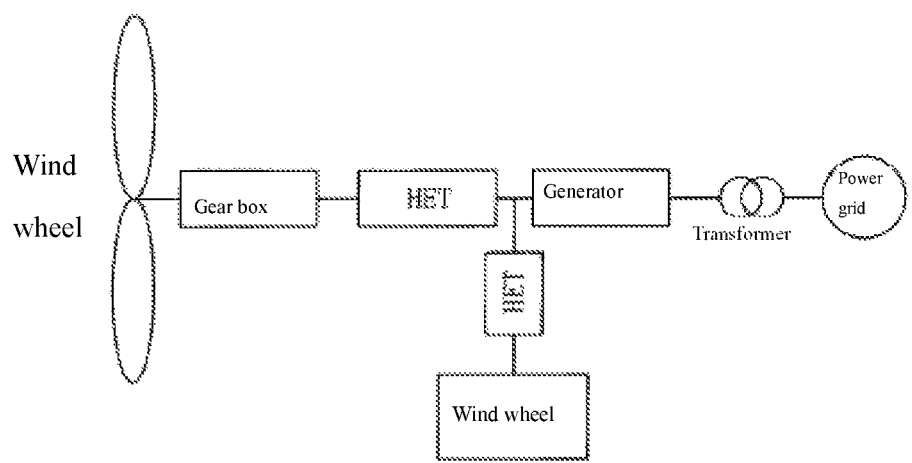
FIG. 41 shows a wind power generation system having flywheels and HET.
Figure 42:
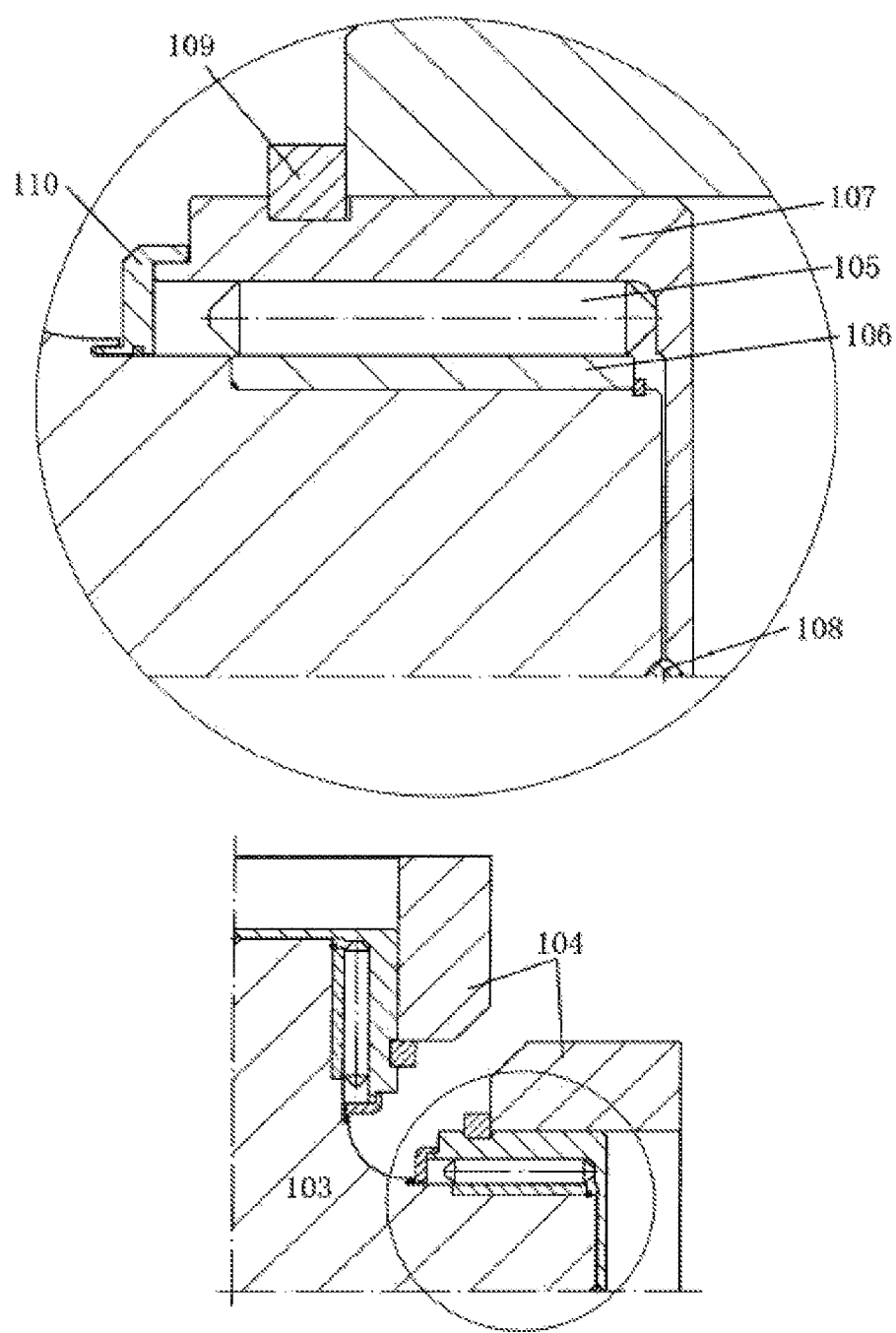
FIG. 42 is a diagram (I) of an intersecting cross-shaft universal joint.
Figure 43:
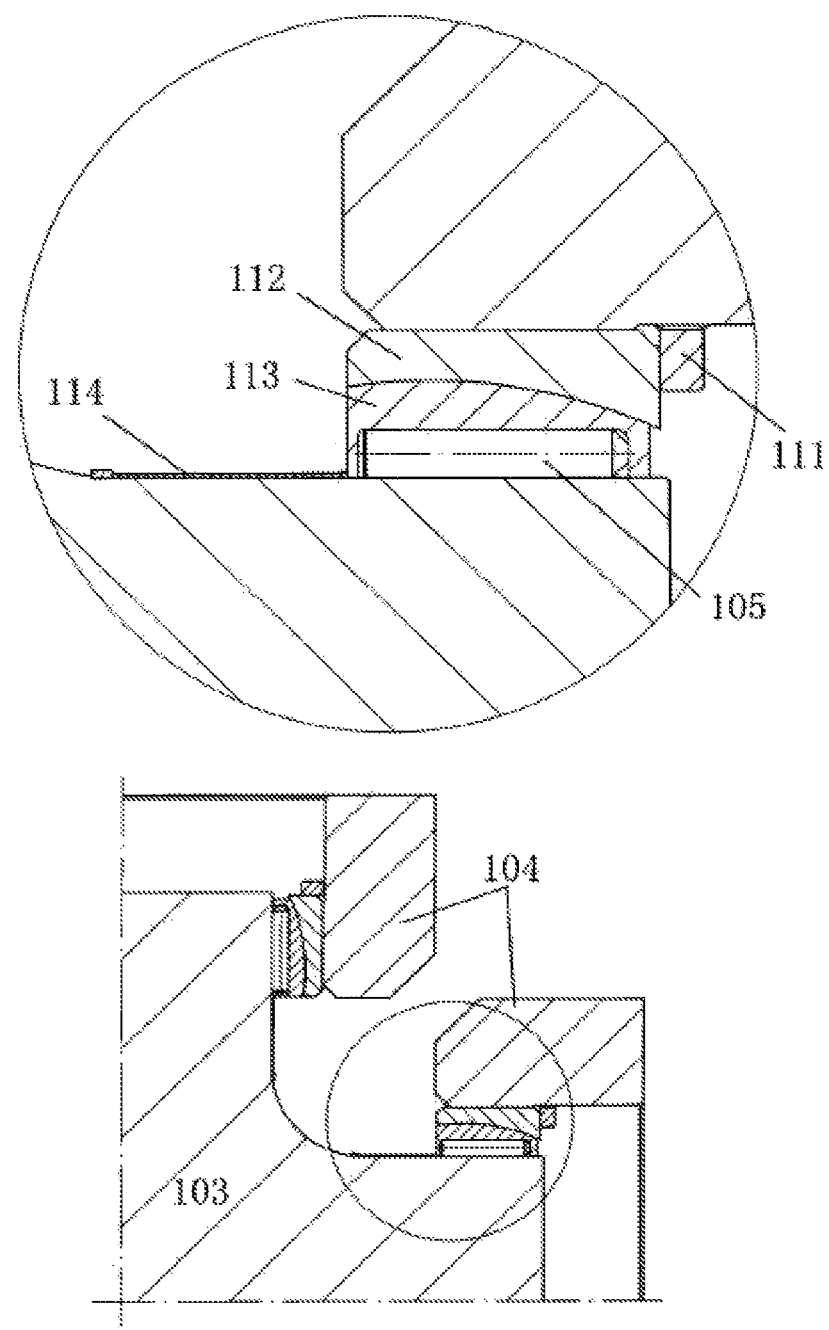
FIG. 43 is a diagram (II) of an intersecting cross-shaft universal joint.
Figure 44:
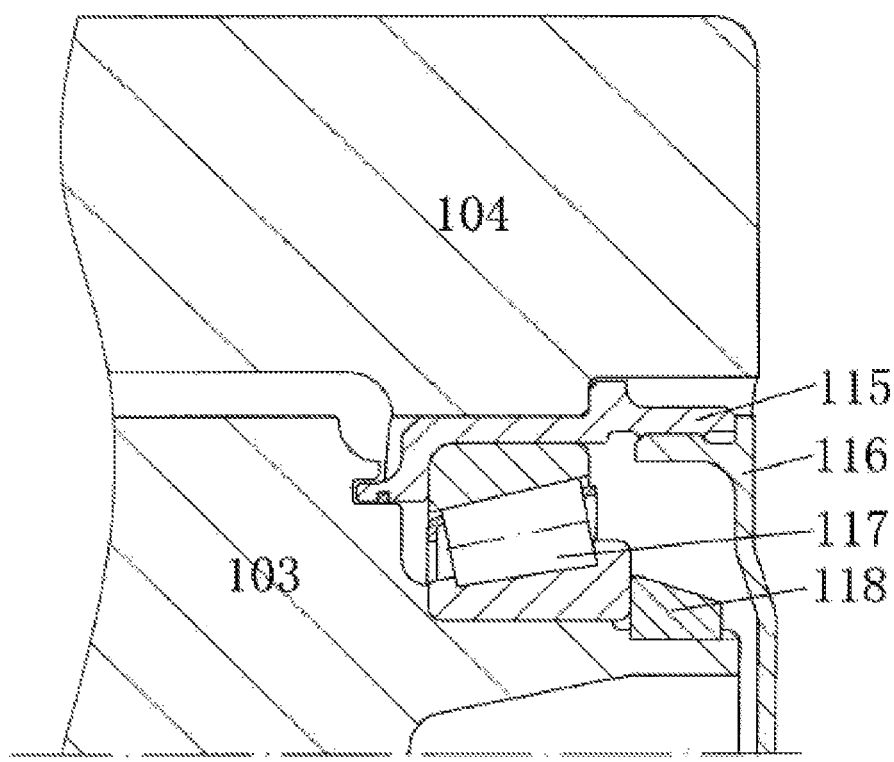
FIG. 44 is a diagram of revolute pairs of universal joints.
Figure 45:
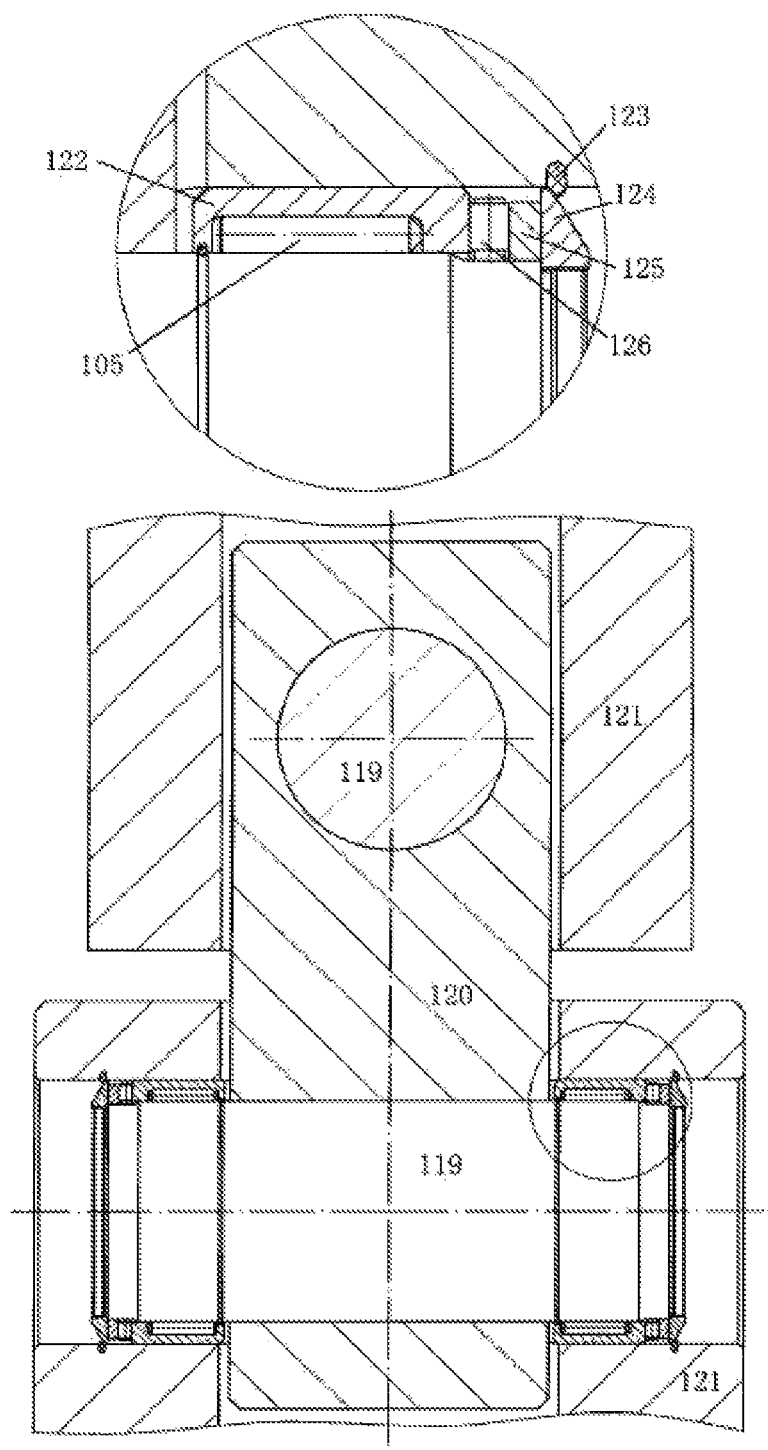
FIG. 45 is a diagram of intersecting cross-shaft universal joints.

A specific embodiment of a 1.5 MW wind power generation system (FIG. 41) with HET and flywheels is as follows.

The system includes: a horizontal axis type variable pitch blade wind wheel, a horizontal speed-up gear box connected with a wind wheel shaft, a homopolar DC electromagnetic transmission (HETw) connected with a gear box output shaft and indirectly connected a generator shaft, a horizontal synchronous generator, a suspended flexible flywheel device, a homopolar DC electromagnetic transmission (HETf) connected with flywheel rotation shafts and the generator shaft, a mechanical brake apparatus arranged at the wind wheel shaft, a yawing driven active yawing mechanism, a cabin, a tower and a control and auxiliary system.

The wind wheel adopts three aerofoil profile blades. A maximum value of a wind-power utilization coefficient Cp is 0.47, a corresponding optimal tip speed ratio is 7, and the optimal tip speed ratio and the maximum value Cp are used at a rated design point. A rated wind speed 12 m/s of lower wind energy with a wide applicable wind field range is selected. A rated rotation speed of the wind wheel is 24.31 r/min, a rated tip linear speed is 84 m/s, and the rated power is 1670 kW. A diameter of the wind wheel is 66 m.

The speed-up gear box increases the rotation speed from 24.31 r/min to 1500 r/min under a rated working condition, so that the two rotors of the HET have the same rated rotation speed. A speed-up ratio is 61.7. A rated input power is 1670 kW. A three-stage transmission manner is adopted. The forward two stages are planet gears, and the backward stage is a parallel shaft cylindrical gear.

The synchronous generator has a rated output power of 750 kW (power halved design), runs at a constant speed of 1500 r/min, outputs alternating current of 50 Hz and is connected to the power grid by virtue of a boosting transformer.

The HETw is a horizontal separated type, has a pair of HET half-coupled members (FIG. 38) of the same specification, and has a rated power of 1612 kW, a rated rotation speed of 1500 r/min, rated main current of 107873 A and rated efficiency of 97%. Each of the HET half-coupled members has a single-stage, solid-shaft, double-magnetic flux and near-axis coil structural form. Geometry and weight parameters of each of the HET half-coupled members include: a maximum rotor outer diameter of 701.8 mm, a maximum stator body outer diameter of 928.9 mm, an external terminal outer diameter of 1239.5 mm, an overall length of 804.7 mm, a rotor weight of 927 kg and a total weight of 2604 kg.

Figure 66:
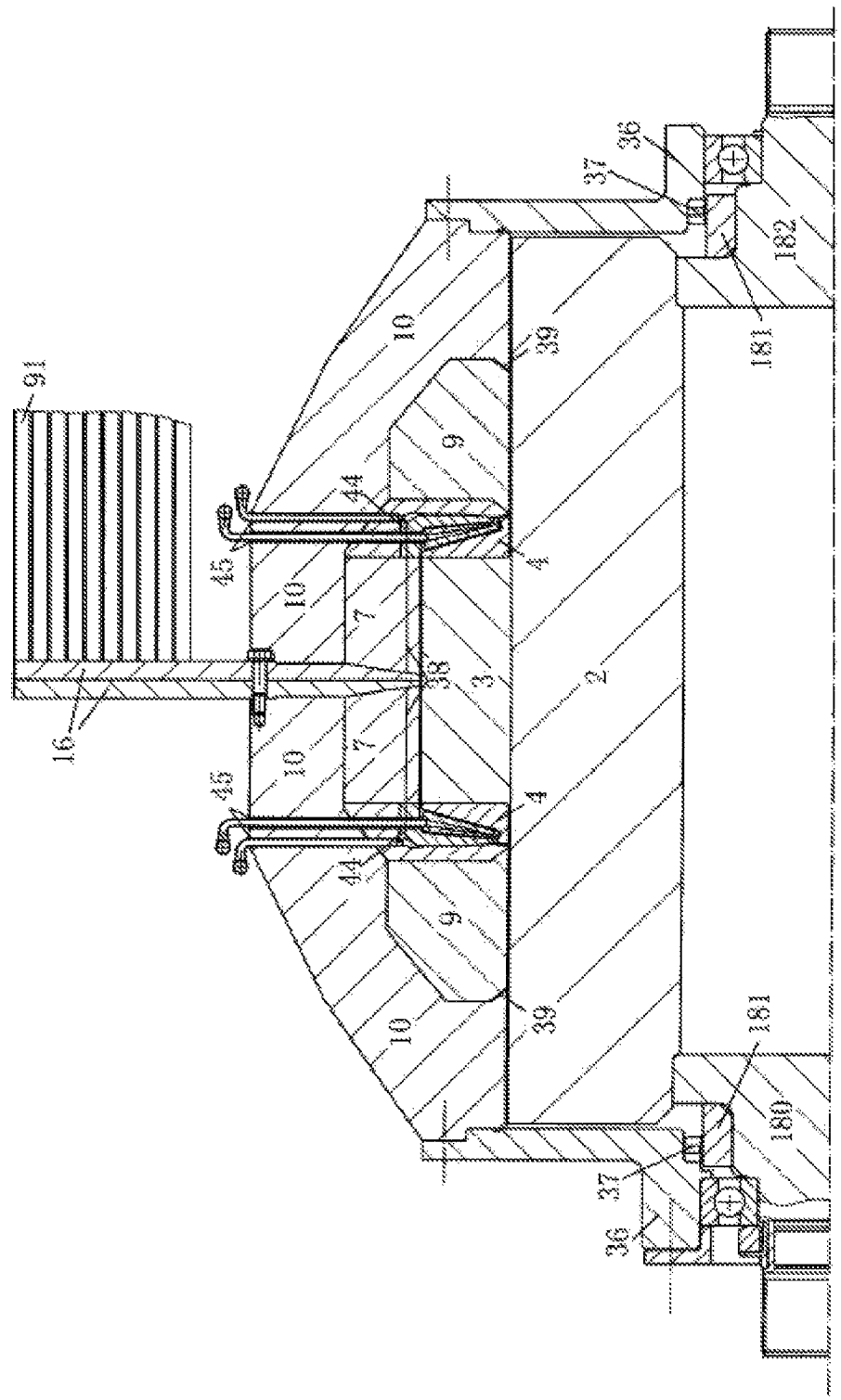
FIG. 66 is a meridian plane diagram of a horizontal separated HET half-coupled member HETfhe (double magnetic flux, near-axis coil, hollow shaft, axial plane type, single-stage)

The HETf is a horizontal separated type, and has a horizontal half-coupled member HETfhe (FIG. 66) connected with the generator shaft and a vertical half-coupled member HETfhf (FIG. 67) connected with the flywheel rotation shaft, as well as a rated output power of 750 kW (power halved design), and rated main current of 60959 A. The half-coupled member HETfhe has a rated rotation speed of 1500 r/min, has a single-stage, solid-shaft, double-magnetic flux and near-axis coil structural form, and includes parameters: a maximum rotor outer diameter of 571.1 mm, a maximum stator body outer diameter of 806.6 mm, an external terminal outer diameter of 1133 mm, an overall length of 945 mm, a rotor weight of 821 kg and a total weight of 2481 kg. The half-coupled member HETfhf has a rated rotation speed of 3796.25 r/min, has a design power of 3×750 kW (may reach a rated power of 750 kW at ⅓ of the rated rotation speed), has a single-stage, solid-shaft, double-magnetic flux and near-axis coil structural form, and includes parameters: a maximum rotor outer diameter of 527.7 mm, a maximum stator body outer diameter of 756.5 mm, an external terminal outer diameter of 1080.4 mm, an overall length of 820 mm, a rotor weight of 871 kg and a total weight of 2356 kg. Mean rated efficiency of the HETf is 97% under conditions as follows: the power is the rated value of 750 kW, the rotation speed of the half-coupled member HETfhe is the rated value of 1500 r/min, the rotation speed of the half-coupled member HETfhf is a whole-process rotation speed from the ⅓ of the rated rotation speed to 100% of the rated rotation speed (whole process of corresponding flywheels from ⅓ of the rated rotation speed and ⅑ of stored energy to the 100% of the rated rotation speed and 100% of stored energy).

The HETf is connected to a generator rotation shaft end that faces the wind wheel side. Connection of various devices between the speed-up gear box and the generator is as follows: a coupling is connected with the gear box output shaft and a front half-coupled member end shaft of the HETw, a set of external cable is connected with a main current circuit of the two half-coupled member of the HETw, a coupling is connected with a rear half-coupled member end shaft of the HETw and a front end shaft of the horizontal half-coupled member HETfhe, and a coupling is connected with a rear end shaft of the horizontal half-coupled member HETfhe and the generator rotation shaft. The HETfhe rotation shaft has an effect of transferring power to the rear generator rotation shaft. A rated value of the power transferred at the front end of the rotation shaft is 1563 kW, and a rated value of the power transferred at the rear end of the rotation shaft is 782 kW.

Figure 64:
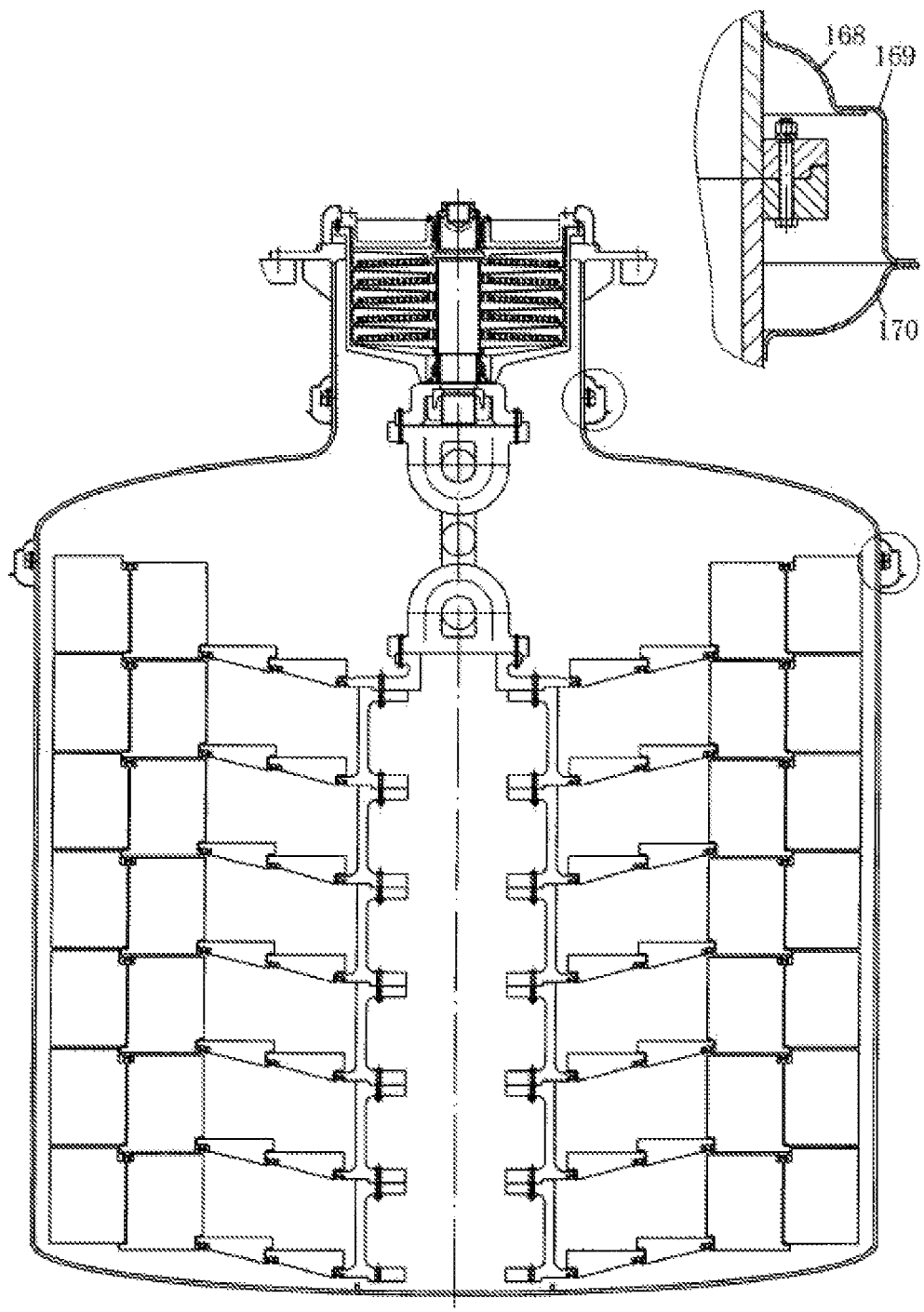
FIG. 64 shows a suspended flexible flywheel device (rated stored energy of 1567 kWh)

Main parameters of the suspended flexible flywheel device (FIG. 64) include: a rated rotation speed of 3796.25 r/min, a rated transmission power of 750 kW (power halved design), a maximum transmission torque of 5660 Nm (capable of transmitting the rated power of 750 kW under the ⅓ of the rated rotation speed and higher), a maximum flywheel outer diameter of 3360 mm, a maximum device outer diameter of 3727 mm, a total device height of 4675 mm, an overall device weight of 51581 kg, a total rotor weight of 42837 kg and rated stored energy of 1567 kWh.

Embodiments of the suspended flexible flywheel device (FIG. 64) are as follows.

Figure 59:
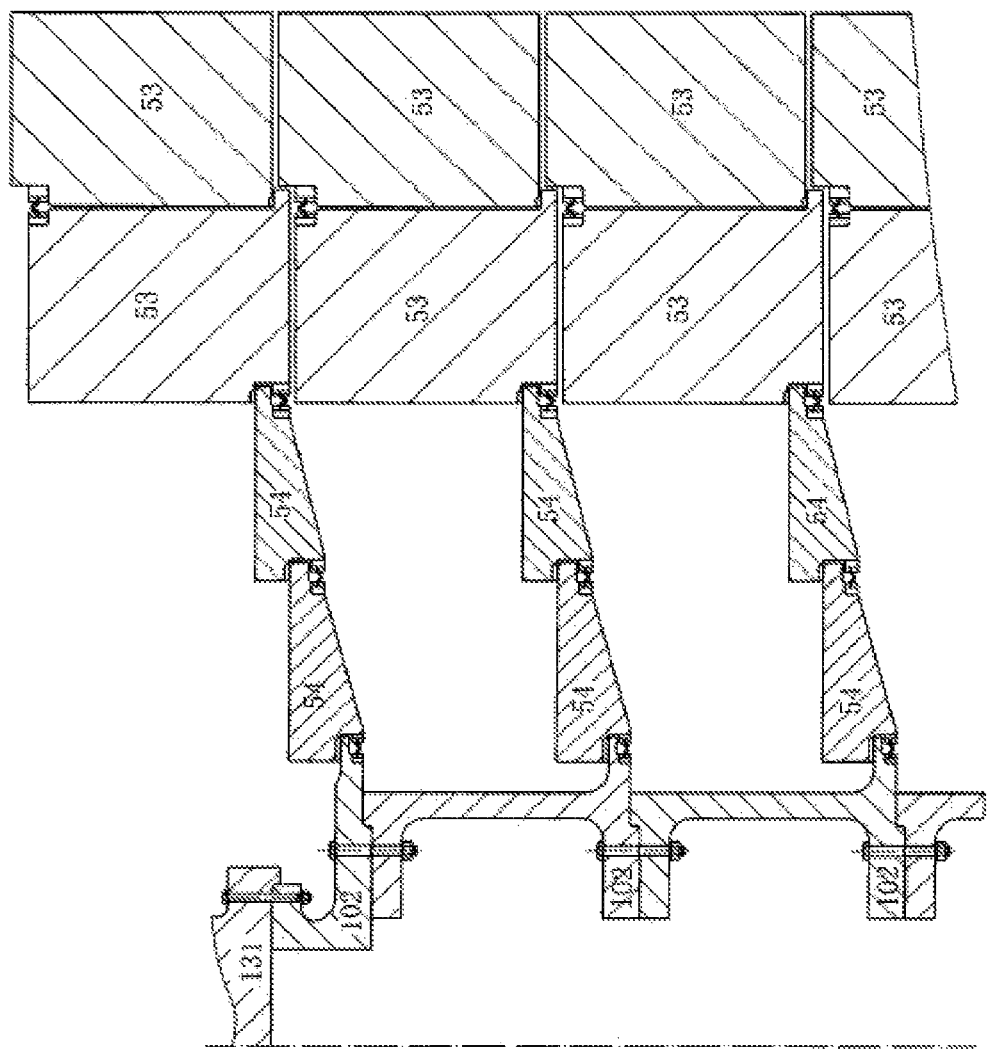
FIG. 59 shows connection between multiple sets of series wheel bodies and a multi-section cylindrical center shaft (I)
Figure 60:
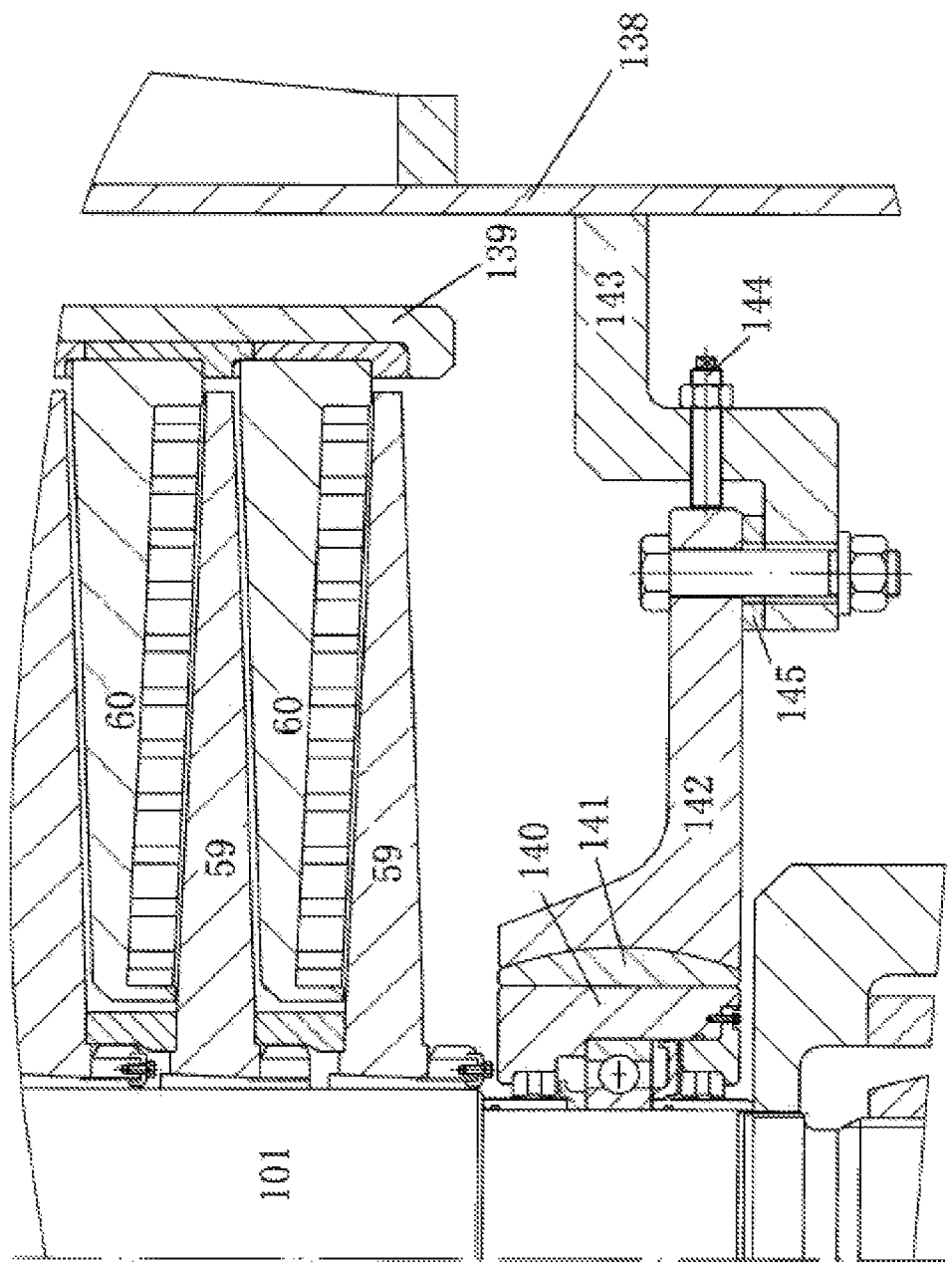
FIG. 60 shows an axial permanent magnetic bearing and a lower-end radial bearing (I)

Flywheel rotors have 7 sets of upper and lower tandem wheel bodies. Each set of the wheel bodies has two mass block bodies (53) and two supporting bodies (54) (FIG. 59). Each set of the wheel bodies is connected with a section of cylindrical center shaft (102). Upper and lower adjacent center shafts are connected by virtue of flanges and threaded fasteners. 6 sections of center shafts located on the lower side have the same structure. One section of center shaft on the uppermost side has a flange plate (FIG. 59) connected with a flange plate (131) at the lower end of a circular chain. During installation and assembly, one set of wheel bodies at the bottommost end and the center shaft assembly are supported and installed from the bottom, and the rest wheel bodies and center shaft assemblies are assembled and connected one by one from bottom to top.

The mass block body on the outer ring is made of high-strength glass fiber roving reinforced epoxy resin subjected to filament winding. The mass block body on the inner ring is made of E-type glass fiber roving reinforced epoxy resin subjected to filament winding. Each of the supporting bodies is made of E-type glass fiber roving reinforced unsaturated polyester resin subjected to filament winding. The cylindrical center shaft is made of nodular cast iron.

A bearing end surface pair (56) is adopted between the mass block body on the outer ring and the mass block body on the inner ring. A bearing end surface pair (56) and an upward displacement-limiting end surface pair (64) are adopted between the mass block body on the inner ring and the supporting body on the outer ring, between the supporting body on the outer ring and the supporting body on the inner ring and between the supporting body on the inner ring and the cylindrical center shaft. The two end surface pairs are designed in a centralized manner. Two opposite end surfaces of the bearing end surface pair (56) remain a margin on a radial height so as to compensate radial displacement dislocation generated during rotation, so that the end surface pairs always keep an effective action area in a range from a static state to the maximal rotation speed. In order to achieve the purposes of increasing wear resistance of a contact surface of the end surface pairs, increasing an effective contact area, protecting a fiber reinforced plastic surface, realizing reliability, durability, vibration absorption and the like, the two opposite end surfaces of the end surface pairs (56) are made of polyurethane rubber. An end-surface thin plate (65) and an end-surface thick block (66) made of the polyurethane rubber material are adhered with a matrix together. The end-face thick block (66) has high elasticity and deformation adaptability, but high centrifugal load, and is installed on an outer ring matrix. The centrifugal load is borne by an inner hole surface of the matrix. Since a load of the bearing end surface pair (56) is higher, the selected matrix adhered and a main body of a wheel body structure are made into an integral structure, thereby ensuring that a load transfer path has full strength reserve. However, a matrix at one end of the non-bearing end surface pair (57) adopts an accessory structure, and the accessory is fixedly connected with a main matrix by virtue of an adhesive and is made of a material identical to that of the main matrix.

A single flexible membrane ring (58) is respectively arranged between the mass block on the outer ring and the mass block on the inner ring, between the mass block on the inner ring and the supporting body on the outer ring, between the supporting body on the outer ring and the supporting body on the inner ring and between the supporting body on the inner ring and the cylindrical center shaft. Each of the flexible membrane rings is adhered to the accessory structure, and then the accessory structure is adhered to the main matrix. The accessory is made of the same material as the main matrix. The flexible membrane ring adopts a polyurethane rubber material. A free state of film ring parts before installation is of a uniform thickness flat washer shape. During installation, the film ring is forced to deform into a shape bending to one side surface, and a film ring farther away from the center shaft has a larger bending degree. The film ring is basically straightened while rotating at the maximum rotation speed. The flexible membrane ring is circumferentially stretched during installation, and an inner hole diameter of the film ring is increased to a fit dimension.

Figure 46:
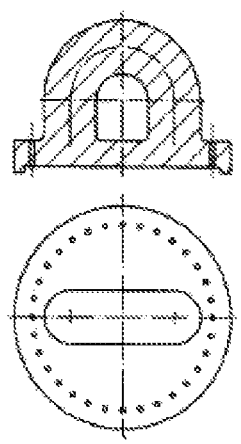
FIG. 46 is a diagram of semi-rings at ends of circular chains.
Figure 47:
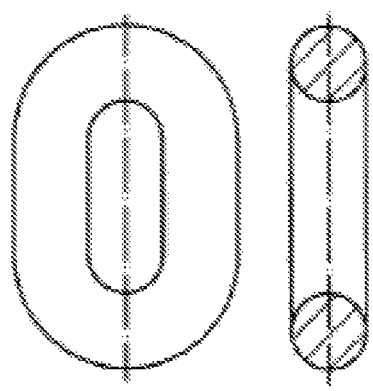
FIG. 47 is a diagram of rings of circular chains.
Figure 48:
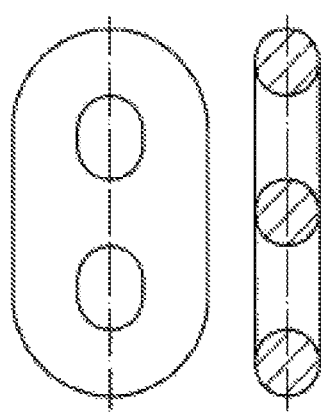
FIG. 48 is a diagram of rings with beams of circular chains.
Figure 49:
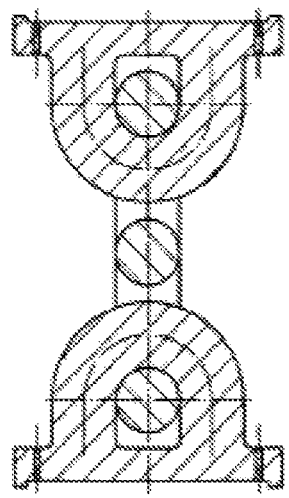
FIG. 49 is a diagram of circular chains with an intermediate circular ring.
Figure 50:
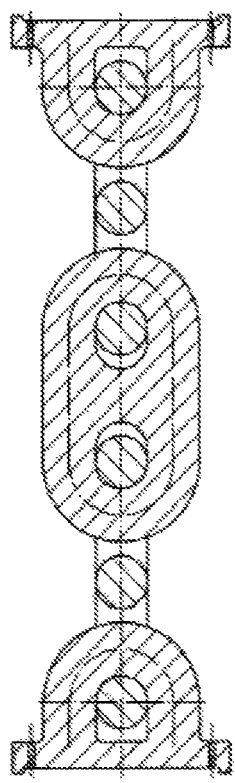
FIG. 50 is a diagram of circular chains with three intermediate circular rings.
Figure 51:
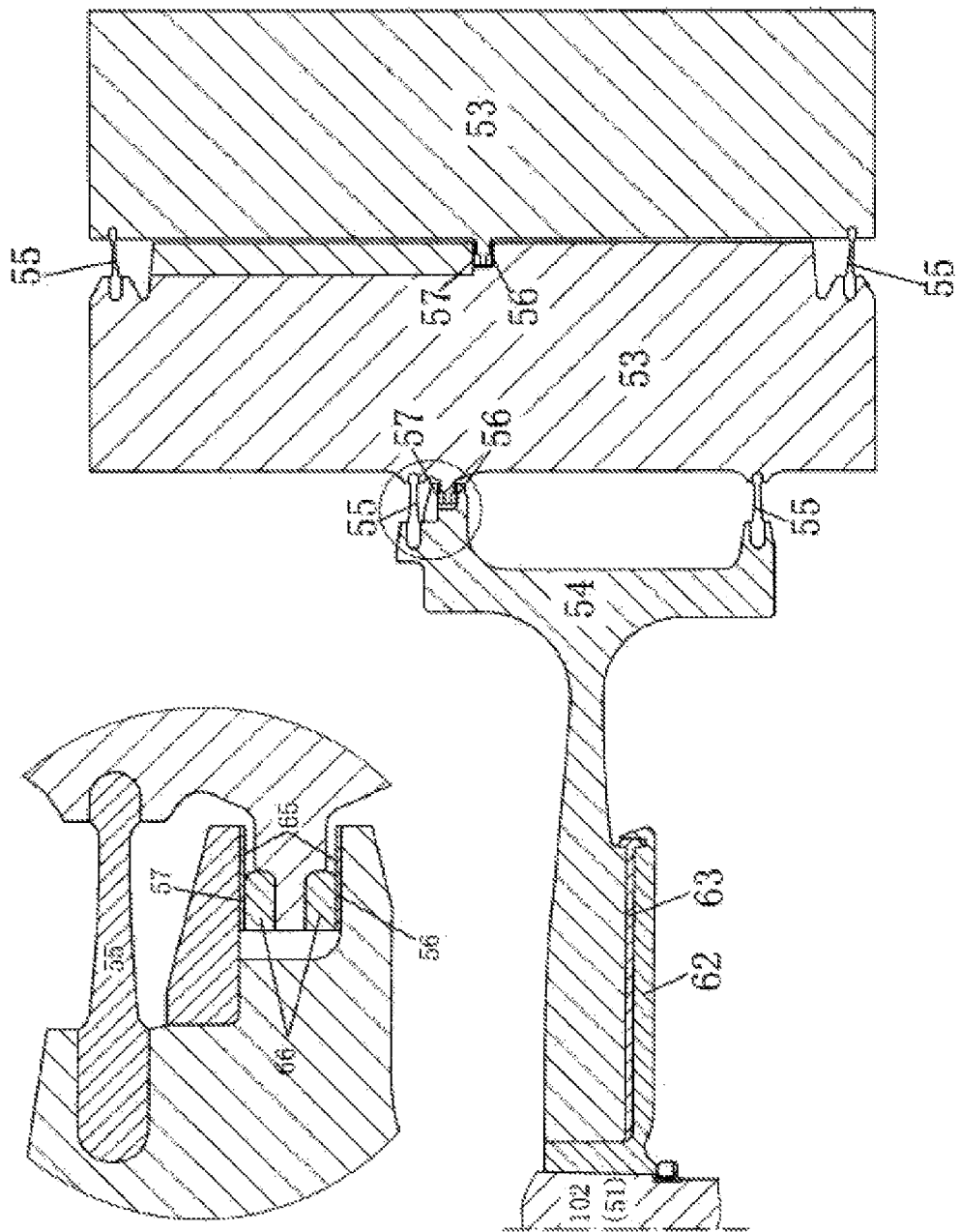
FIG. 51 is a meridian plane diagram (I) of a set of flexible flywheel bodies.
Figure 52:
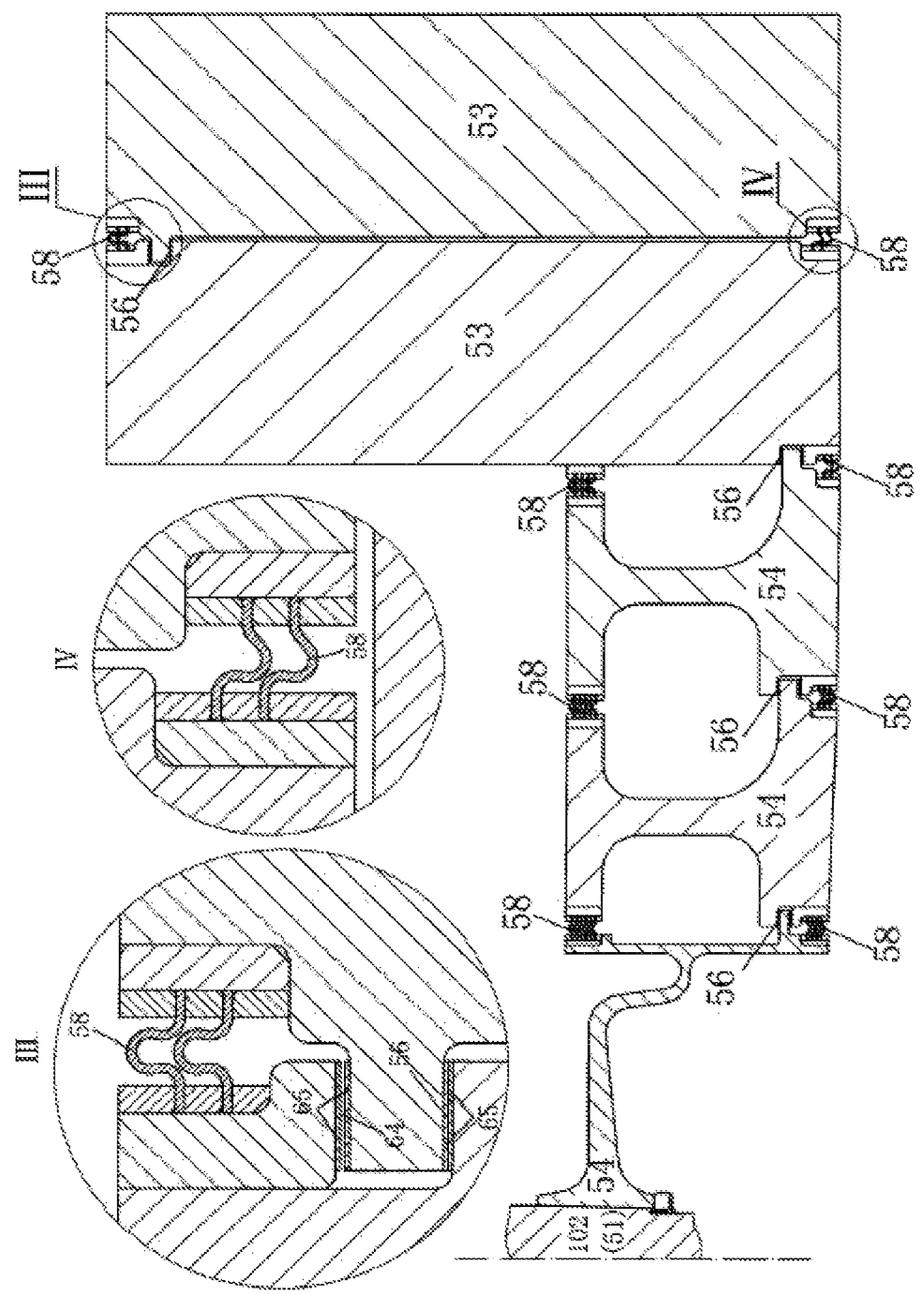
FIG. 52 is a meridian plane diagram (II) of a set of flexible flywheel bodies.
Figure 53:
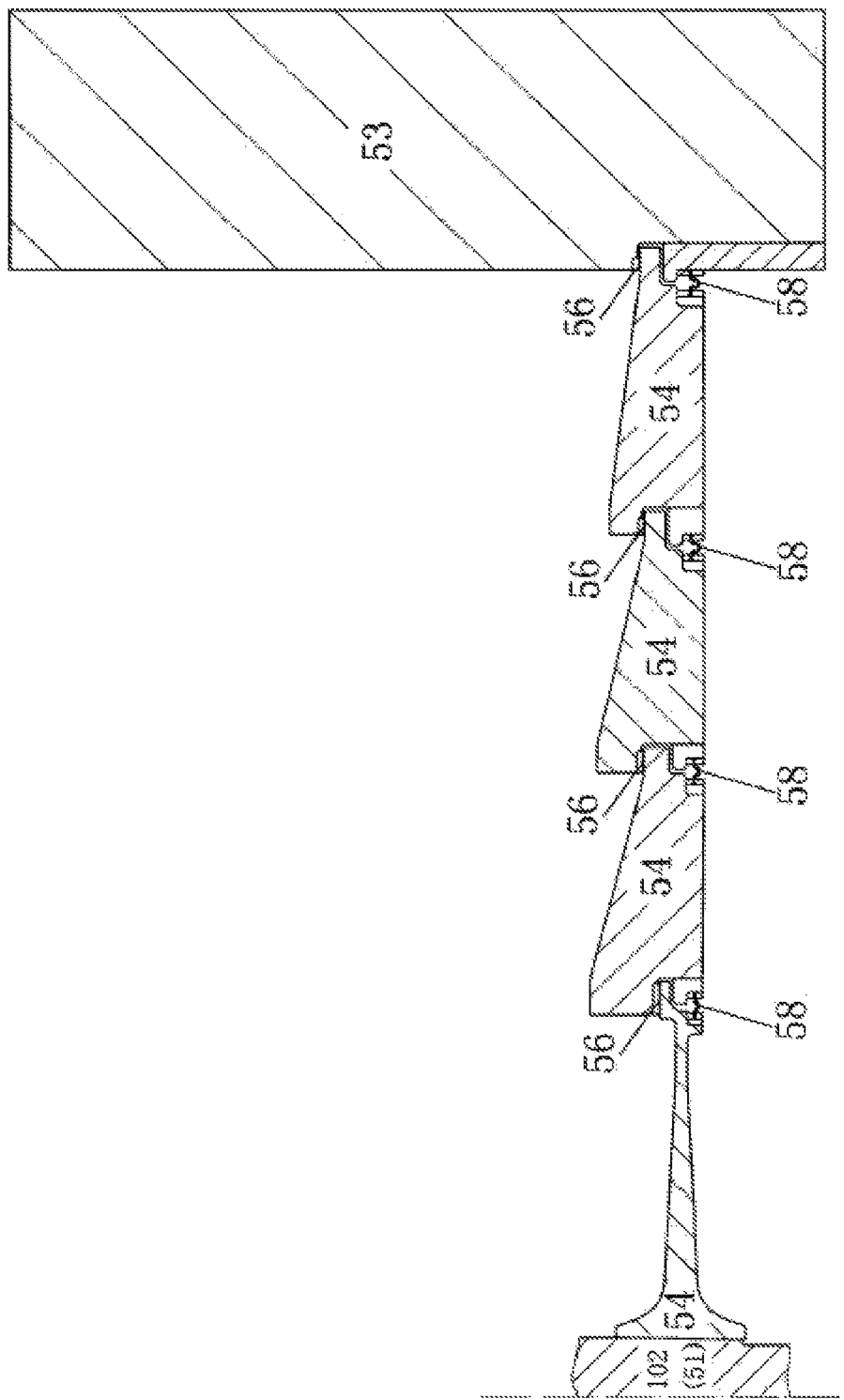
FIG. 53 is a meridian plane diagram (III) of a set of flexible flywheel bodies.
Figure 54:
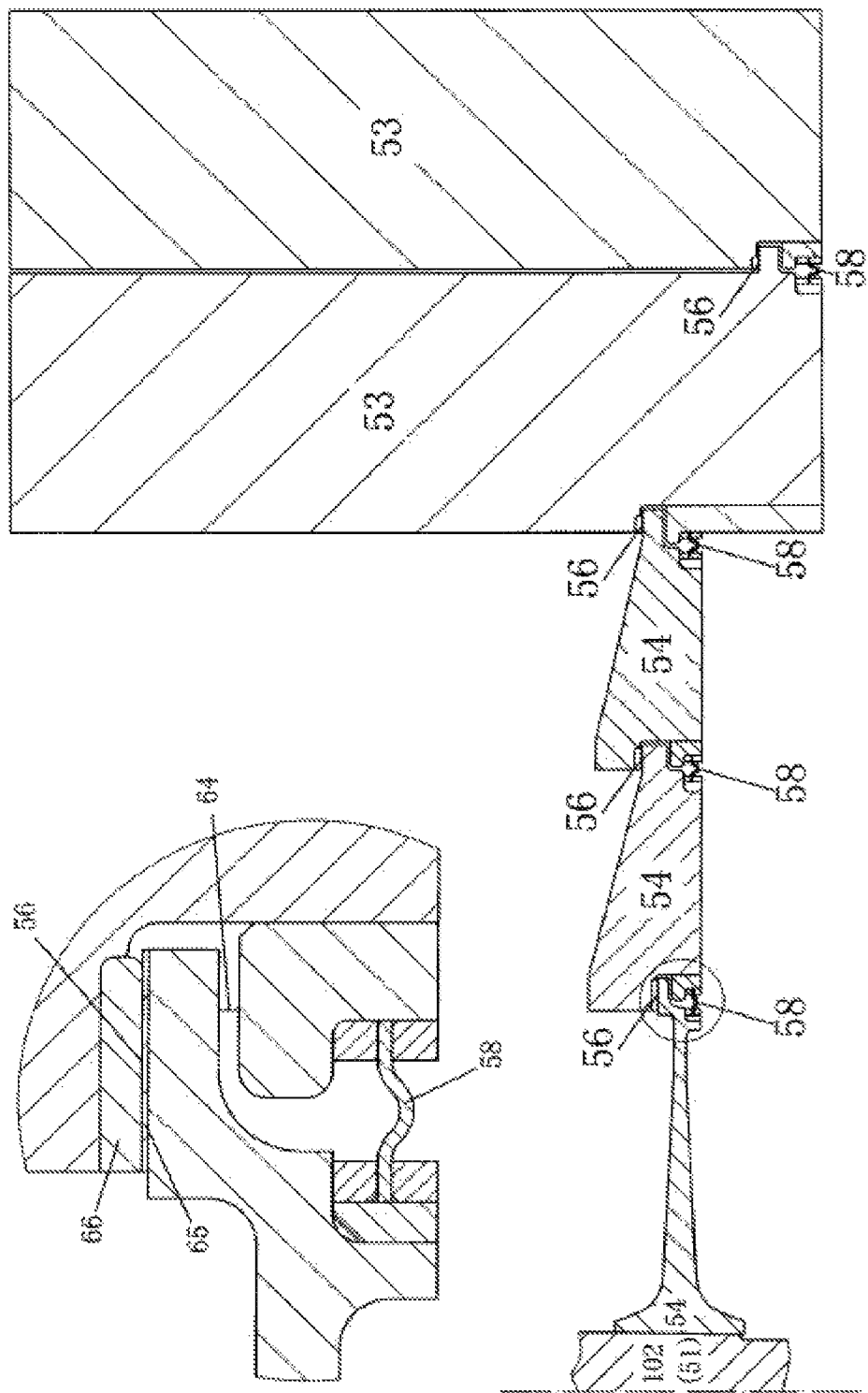
FIG. 54 is a meridian plane diagram (IV) of a set of flexible flywheel bodies.

A pulling torque transfer flexible transmission part between the flywheel rotation shaft (101) and the wheel body center shaft (102) adopts a circular chain (FIG. 49). A half circular ring (FIG. 46) with a flange plate is respectively adopted at each of upper and lower ends of the circular chain, and a circular ring with a horizontal connecting beam (FIG. 48) is adopted in the middle of the chain. Fastened "hole shafts" of the two rings are in close fit, and a radius of the hole is 70 mm and only slightly larger than a radius 69.6 mm of the shaft, thereby decreasing bearing stress. Nodular cast iron casting and processing is adopted, two end semicircular rings (FIG. 46) are cast and processed, and casting of an intermediate circular ring and subsequent processing may be performed under a condition in which the two end semicircular rings are joined.

Figure 58:
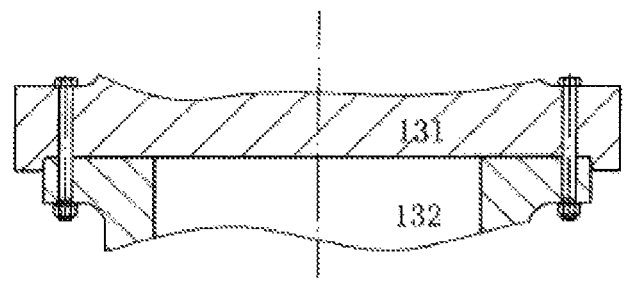
FIG. 58 shows an external flange connecting structure for a center shaft and a pulling torque transfer flexible transmission part.

A flange structure (FIG. 58, FIG. 59) is adopted for connection between the upper end of the center shaft and the lower end of the circular chain.

Figure 55:
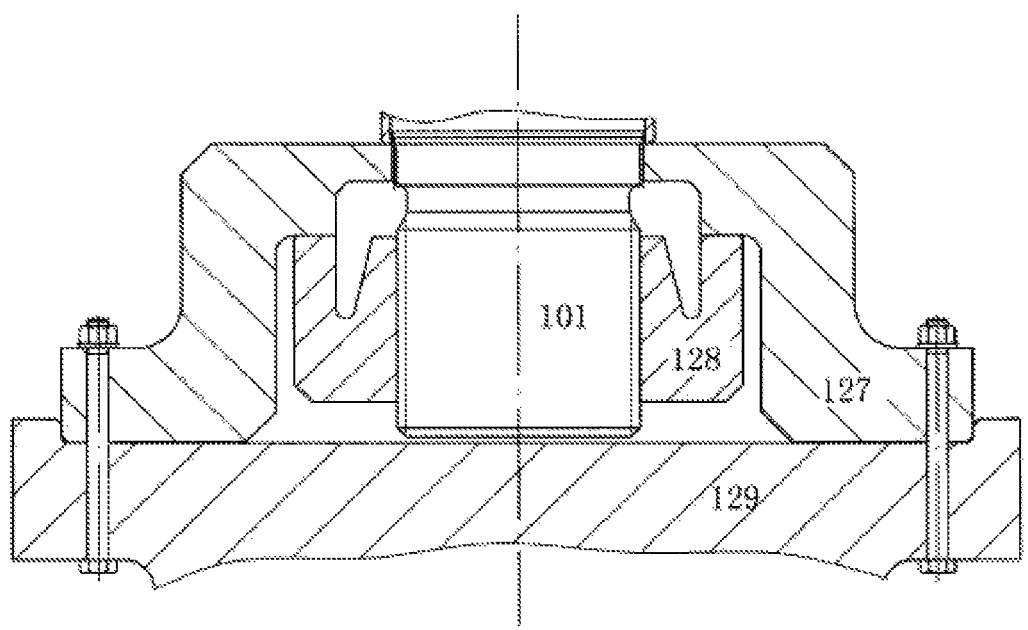
FIG. 55 shows a spline, thread and flange connecting structure of a rotation shaft and a pulling torque transfer flexible transmission part.
Figure 56:
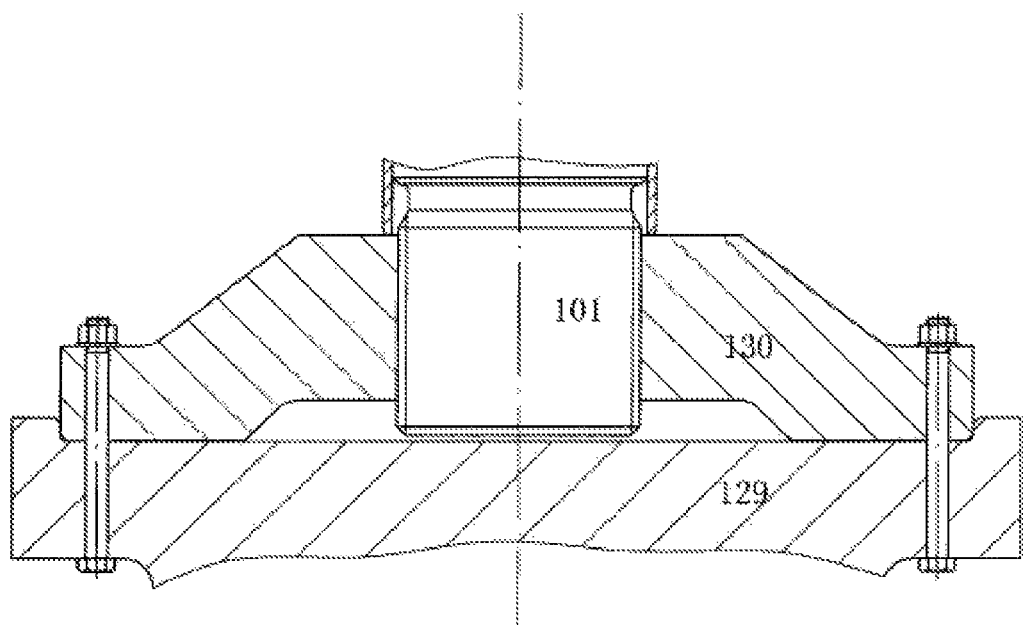
FIG. 56 shows a thread and flange connecting structure of a rotation shaft and a pulling torque transfer flexible transmission part.
Figure 57:
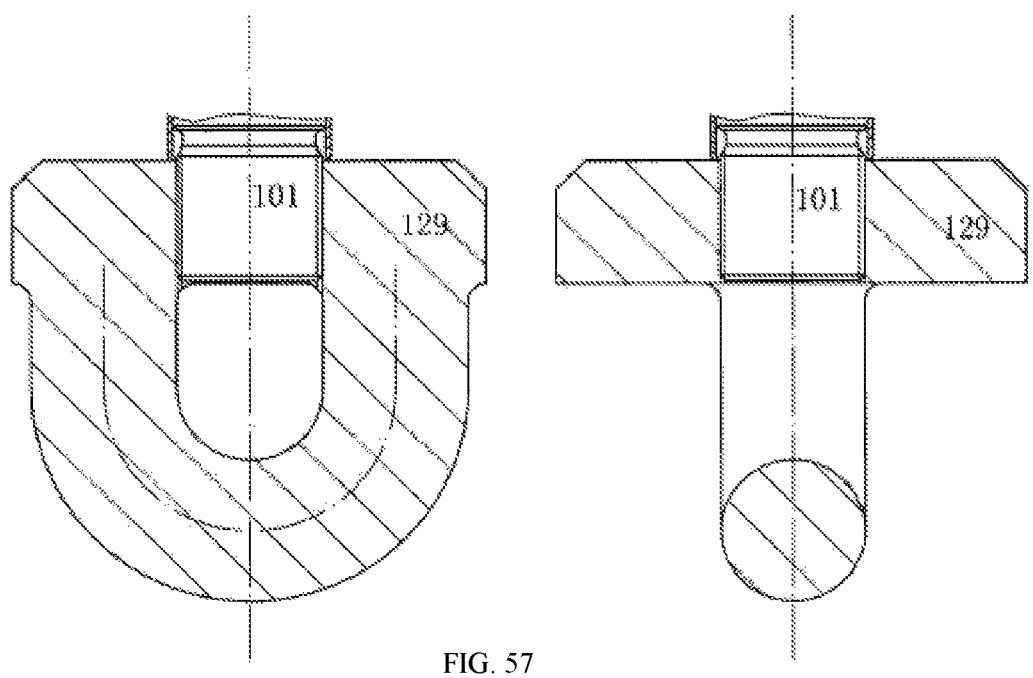
FIG. 57 shows a direct thread connecting structure of a rotation shaft and a pulling torque transfer flexible transmission part (semi-rings of circular chains are shown in the figure)

A spline, thread and flange connecting structure shown in FIG. 55 is adopted for connection between the lower shaft end of the rotation shaft and the upper end of the circular chain. An internal spline of a connecting piece (127) and an external spline of the lower shaft end of the rotation shaft (101) are in matched connection to transfer the torque. An external flange plate of the connecting piece (127) is matched with an external flange plate (129) at an upper end of the circular chain through a seam allowance and fastened by a bolt. A nut (128) is fastened at a tail end of the rotation shaft and bears gravity transferred by the connecting piece (127). A ring groove structure of the nut (128) is favorable for thread load uniformity.

Figure 61:
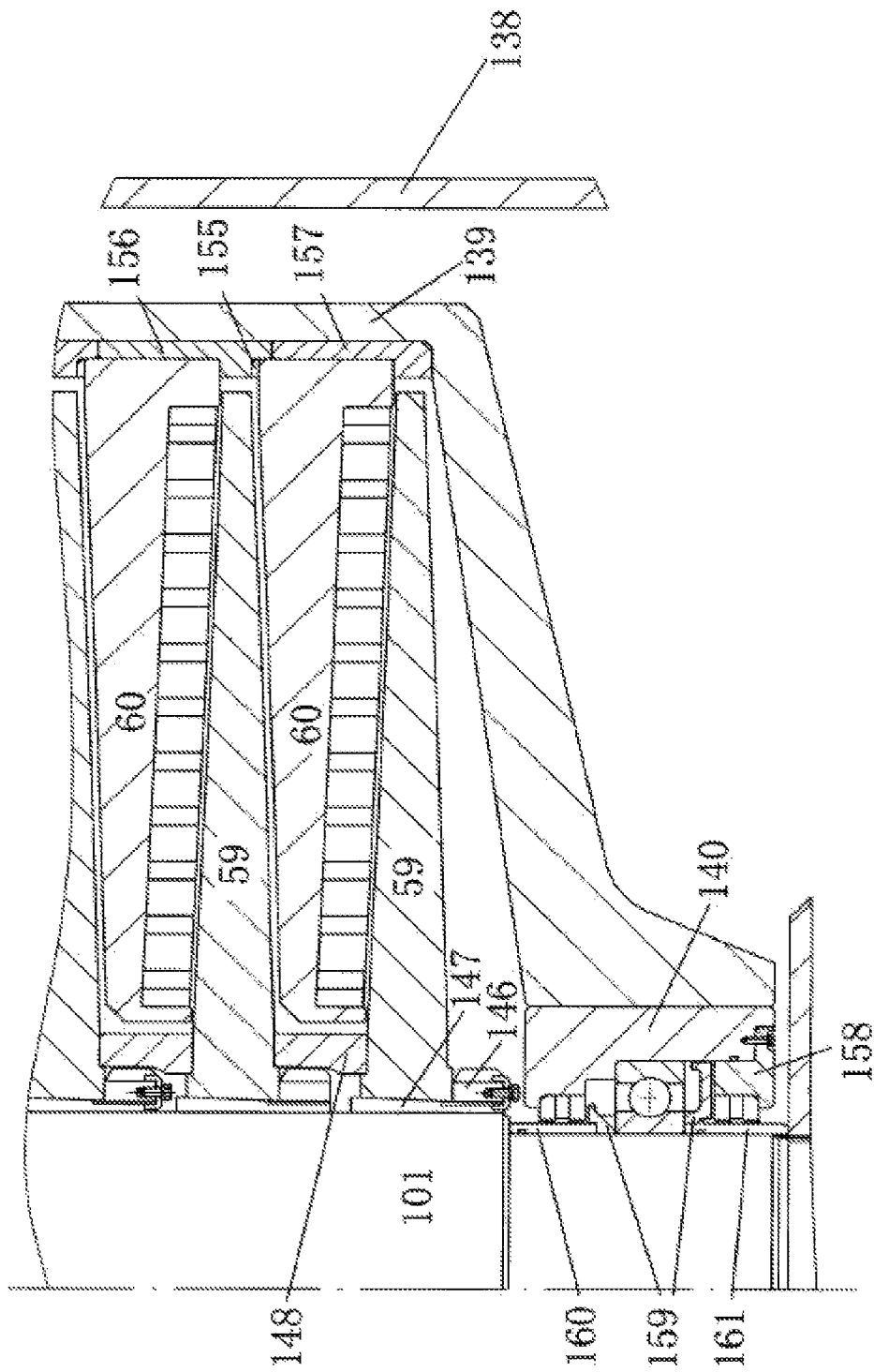
FIG. 61 shows an axial permanent magnetic bearing and a lower end radial bearing (II)
Figure 62:
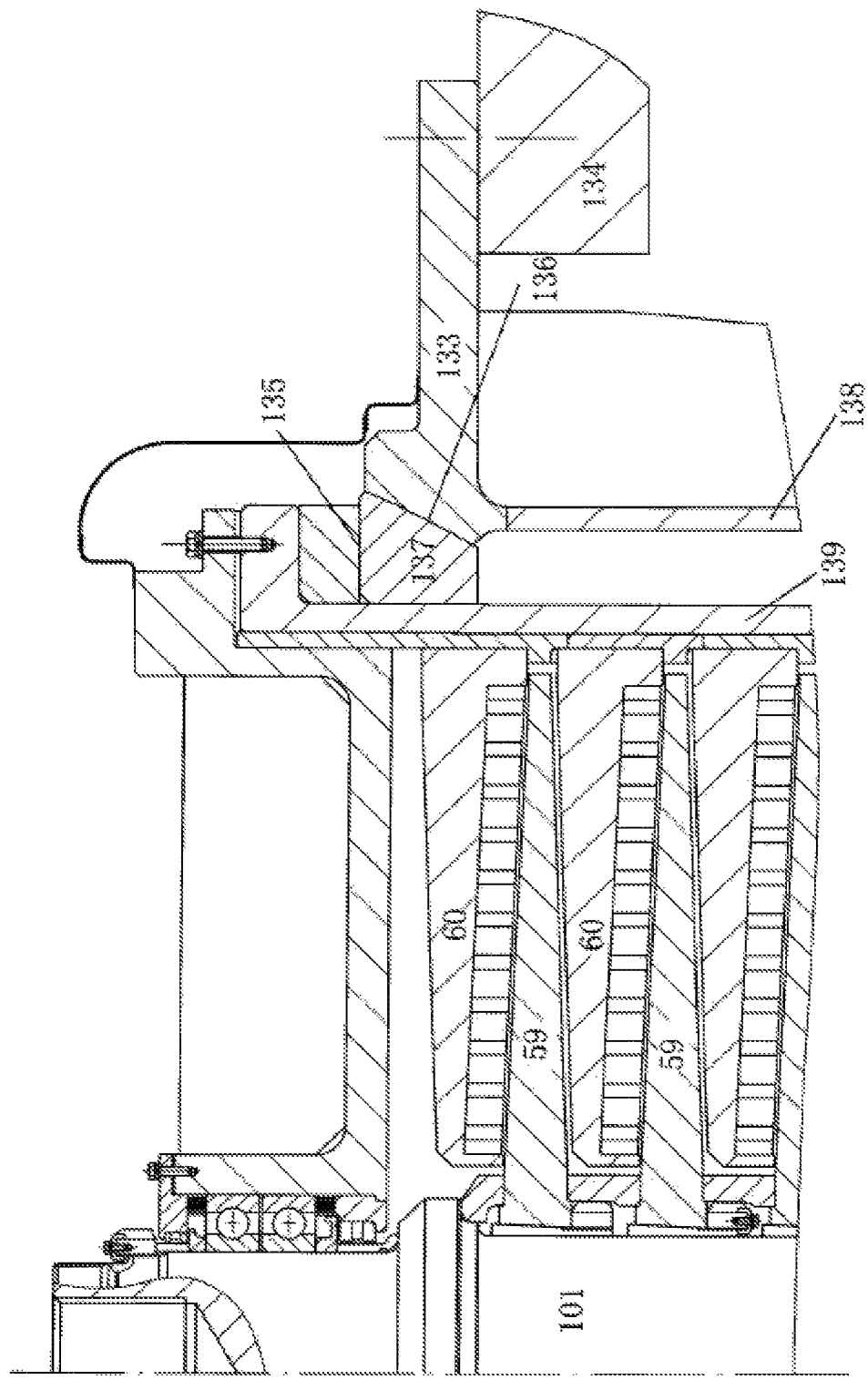
FIG. 62 shows a suspended flexible flywheel upper-end structure (I)
Figure 63:
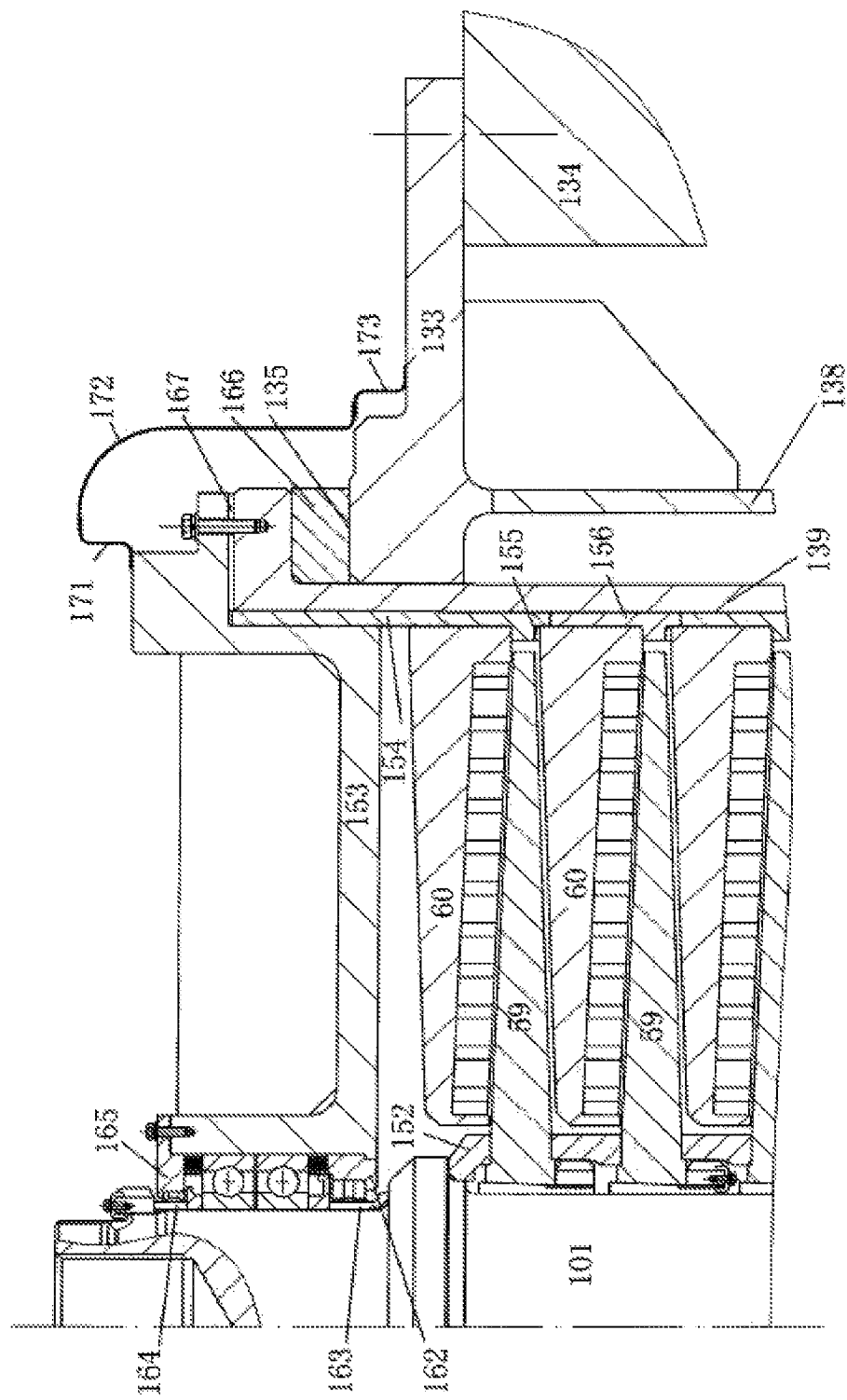
FIG. 63 shows a suspended flexible flywheel upper-end structure (II)
Figure 65:
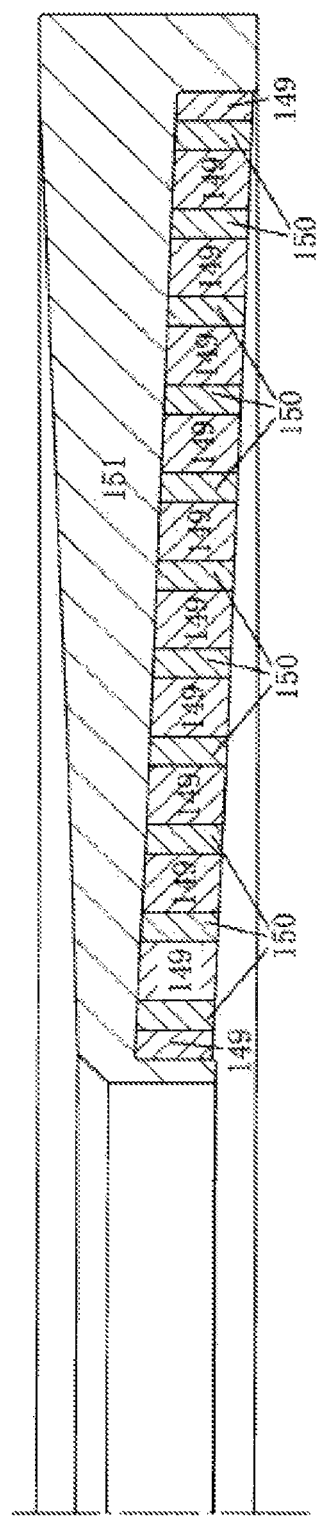
FIG. 65: an attractive stationary disc for axial supporting permanent magnetic bearings.

Axial supporting permanent magnetic bearings are composed of 5 serial force attraction type axial supporting permanent magnetic bearings. Each bearing has a rotary disc (59) and a stationary disc (60) (FIG. 61 and FIG. 63). The rotary disc is located below the stationary disc. A clearance is formed between end surfaces on adjacent sides of the two discs. The rotary discs adopt 5 soft magnetic material 45# steel cone discs with the same size structure. Each of the rotary discs is fastened with the rotation shaft (101) by virtue of an adapter sleeve (147) (with an outer conical surface and an inner cylindrical surface, with a gap formed in a longitudinal direction) and a nut (146). An intermediate spacer bush (148) is arranged between two adjacent rotary discs. A spacer bush (152) is arranged between the rotary disc at the uppermost end and a shoulder on the spindle. These spacer bushes achieve the effects of axially positioning and ensuring reliable axial transfer force. The stationary discs (FIG. 65) are composed of axisymmetric non-magnetic material aluminum alloy matrixes (151), soft magnetic material electromagnetic pure iron rings (149) and permanent magnet material Nd—Fe—B rings (150), and the three kinds of materials are connected by adhesives. The Nd—Fe—B rings (150) are magnetized along a radial direction. Adjacent Nd—Fe—B rings have opposite magnetizing directions. Main magnetic flux circuits pass through the Nd—Fe—B rings, two adjacent electromagnetic pure iron rings and opposite rotary discs thereof. A strong air-gap field is generated between the electromagnetic pure iron rings and the rotary discs, and upward magnetic attraction is formed relative to the rotary discs and designed to be used for offsetting gravity of the rotors. Connecting structures of the stationary discs (60) and other members and assembling steps are as follows: after the bearing block and adjacent parts thereof at the upper end of the rotation shaft and a steel bearing block (153) are assembled, installing the stationary disc at the uppermost end and an upper-end steel bushing (154); installing the rotary disc (59) at the uppermost end, the spacer bush (152), the adapter sleeve (147), the nut (146) and locking accessories thereof; installing the stationary disc in the middle, a rubber elastic cushion cover (155) and an intermediate steel bushing as well as the rotary disc in the middle, the intermediate spacer bush (148), the adapter sleeve (147), the nut (146) and locking accessories thereof one by one according to a sequence of installing stationary members and rotary members in sequence; and finally, installing the stationary disc at the bottommost end, the rubber elastic cushion cover (155) and a lower-end steel bushing (157), and finally accommodating and sleeving various sections of serial steel bushings (154, 156 and 157) by virtue of a through-long outer steel bushing (139).

Radial rolling bearing supports are adopted at the upper and lower ends of the rotation shaft (101). The rotary discs of the axial supporting permanent magnetic bearings are positioned in the middle of the rotation shaft. The rotation shaft is designed as a rigid rotor, and a first-order bending critical rotation speed of the rotor is higher than the rated rotation speed.

A deep groove ball bearing (FIG. 61) is adopted at the lower end of the rotation shaft, and lubricating grease is used. Magnetic fluid sealing components (Nd—Fe—B rings and electromagnetic pure iron rings with three teeth respectively on two sides thereof, as well as magnetic fluid at tooth tips) are arranged on both sides of the bearing, so that the bearing is isolated from a surrounding vacuum environment, and a bearing chamber is communicated with atmosphere. Centrifugal isolating discs (159) that prevent the lubricating grease from moving to both sides are arranged on the two sides of the bearing. Spacer bushes (160, 161) are installed on the rotation shaft at positions relative to the magnetic fluid sealing components. The spacer bushes are made of 45# steel of which magnetic conductivity is higher than that of the material of the rotation shaft, thereby ensuring sealed magnetic flux. Meanwhile, the spacer bushes have axial positioning effects of related parts. Rubber sealing rings and vacuum sealing grease are arranged between the spacer bushes (160, 161) and the rotation shaft (101). The spacer bush (160) and the rotation shaft may also be fixedly connected and sealed by a brazing method. The two sets of upper and lower magnetic fluid sealing components are respectively fixed on the bearing block (140) and the end cover (158), connection surfaces are adhered and sealed by adhesives, the end cover and the bearing block are fastened by screws, and rubber sealing rings and vacuum sealing grease are arranged. The bearing block (140), the end cover (158) and the centrifugal isolating discs (159) are made of non-magnetic material aluminium alloys, thereby meeting magnetic fluid sealing requirements.

The deep groove ball bearing (FIG. 61) at the lower end of the rotation shaft is a free end bearing in a non-axial positioning manner. An axial free displacement of an outer ring of the bearing should be ensured. In addition, a load of the bearing should not be lower than the minimum load, so as to avoid severe sliding friction. In order to meet the above two requirements, structure measures are taken as follows: the bearing block (140) is contacted with an upper end surface of the outer ring of the bearing, an outer cylindrical surface of the bearing block allows the axial free displacement, an axial load formed by total weight of the bearing block, the end cover (158), the two sets of magnetic fluid sealing components and the outer ring of the bearing acts on a bearing ball. An equivalent load of the bearing generated by the axial load is not lower than the required minimum load.

The bearing at the lower end of the rotation shaft adopts the solution (FIG. 61) transferring force to the support by virtue of the outer steel bushing (139). The outer cylindrical surface of the bearing block (140) is directly contacted with an inner cylindrical hole of the outer steel bushing. In order to ensure coaxiality of bearing block holes in the upper and lower ends, the related parts (139, 153 and 154) including the outer steel bushing are combined and machined with upper and lower end seat holes.

A pair of deep groove ball bearings (FIG. 63) is adopted at the upper end of the rotation shaft. A space ring is arranged between inner rings of the two bearings. A supporting space ring with more than ten circumferentially and uniformly distributed axial through holes and built-in spiral compression springs thereof is respectively arranged above an upper end surface of an outer ring of the upper bearing and below a lower end surface of an outer ring of the lower bearing, so that a face-to-face bearing combination is formed by the two bearings. The two bearings bear the radial load and the bidirectional axial load and serve as axial positioning ends. The more than ten built-in spiral compression springs in the supporting space ring are used for ensuring that the equivalent load of each of the bearings is not lower than the required minimum load. The supporting space ring at the lower end is limited and supported by an aluminium-alloy end base (162). The supporting space ring at the upper end is limited and supported by an aluminium-alloy end cover (165). The aluminium-alloy end base (162) and the steel bearing block (153) are positioned by a seam allowance and fixed and sealed by brazing. An adjusting washer is arranged between the aluminium-alloy end cover (165) and the steel bearing block. During assembly, a thickness of the adjusting washer is ground according to related dimension measurement results when the bearing reaches a required pre-rightening load by virtue of a special tool. The bearings are lubricated by the lubricating grease. Centrifugal isolating discs preventing the lubricating grease from moving to the two sides are arranged on both sides of the bearing pack. A magnetic fluid sealing element with six sealing teeth is arranged on the lower side of the bearing pack, so that the bearings are isolated from a vacuum environment in which the rotors are located, and the bearing chamber is communicated with an atmospheric gas circuit. A magnetic fluid sealing element with two sealing teeth is arranged on the upper side of the bearing pack. The magnetic fluid sealing elements are respectively fixed on the aluminium-alloy end base (162) and the aluminium-alloy end cover (165), and connection surfaces are adhered and sealed by adhesives. Spacer bushes (163, 164) are installed on the rotation shaft at positions relative to the magnetic fluid sealing components. The spacer bushes are made of 45# steel of which the magnetic conductivity is higher than that of the material of the rotation shaft, thereby ensuring sealed magnetic flux. Meanwhile, the spacer bushes have axial positioning and force transferring effects of the related parts. Rubber sealing rings and vacuum sealing grease are arranged between the spacer bush (163) and the rotation shaft (101). The spacer bush (163) and the rotation shaft may also be fixedly connected and sealed by a brazing method. An upper end surface of the spacer bush (164) is fastened by a shaft-end nut. An external spline is arranged at the upper shaft end of the rotation shaft (101) and connected with a rotation shaft of peripheral equipment. An internal thread at a central hole is used in an installation process.

In order to locate a center line of the flywheel rotation shaft (101) at a vertical position, installation levelness of the support plate (133) and the base (134) is adjusted by adopting a structure shown in FIG. 63, so that levelness of the installed reference plane (135) of the flywheel rotation shaft meets strict requirements. Meanwhile, related machining form and position accuracy of the bearing block (153), the outer steel bushing (139), fan-shaped cushion blocks (166) and fan-shaped adjusting base plates (167) is strictly controlled. The fan-shaped cushion blocks (166) are circumferentially and uniformly distributed and temporarily not used at the beginning of installation. After connection with the circular chain is completed at the lower end of the rotation shaft and connection between the circular chain and the flywheel bodies and the center shaft located at the bottom is completed, the whole rotor (total stator members including the bearing block (153) and the outer steel bushing (139)) is lifted by a lifting tool installed at the internal thread of the upper shaft end of the rotation shaft; or the heaviest flywheel body is jacked up at the bottom of the center shaft of the flywheel body by adopting a hydraulic jack, the total rotors are lifted and straightened, and then the fan-shaped cushion blocks (166) are installed from side surfaces. The fan-shaped adjusting base plates (167) which are circumferentially and uniformly distributed and installed from the side surfaces are used for clearances between the rotary discs and the stationary discs of the axial supporting permanent magnetic bearings, thereby adjusting the magnetic attraction. When the stationary discs and the rotary discs of the permanent magnetic bearings are assembled one by one, the stationary discs are sucked onto the rotary discs. Since limiting flanges with smaller clearances are formed in inner edges and outer edges of opposite end surfaces of the stationary discs and the rotary discs, about one half of rated air-gap distance is still remained in the air gap formed when the two discs are attracted with each other. Therefore, the magnetic attraction at the moment is not too high, and a debugging operation of the magnetic attraction is facilitated.

A vacuum container shell which is fixedly installed on the base (134) is in the shape of a bottle (FIG. 64) which is fine in top and thick in bottom, and has three parts, i.e., an upper part, a middle part and a lower part. The lower part is composed of a bottom elliptical head and a lower cylindrical section, the middle part is an elliptical closing port, and the upper part is composed of a cylindrical section and the support plate (133). The bearing block (153) is also a seal head of the vacuum container. The middle part is connected with a flange arranged on a lower shell, and the upper part is connected with a flange arranged on a middle shell. An installation sequence is as follows: the lower shell, the wheel body and the center shaft assembly, the middle shell, the base (134), the upper shell and the rest parts. A brazing ring cavity wall structure is formed in an outer ring at a flange connection joint (FIG. 64, an enlarged drawing) between the middle part and the lower shell and between the upper part and the middle shell respectively. Thin-walled ring units (168, 170) at both ends are fixedly welded with a thick-walled shell. After field installation and flange connection fastening, an intermediate thin-walled ring unit (169) and the thin-walled ring units (168, 170) are welded by adopting a field soldering method, thereby ensuring a reliable vacuum seal. Meanwhile, semi-detachable seal and connection can be realized. The thin-walled units and transition structures at both ends are mainly used for preventing heat from dissipating too fast during field soldering. A brazing ring cavity wall structure (FIG. 63) accommodating total connection surfaces between the support plate (133) and the bearing block (153) is formed between the support plate (133) and the bearing block (153). Thin-walled ring units (171, 173) at both ends are fixedly welded with the bearing block and the support plate first. After thicknesses of the fan-shaped adjusting base plates (167) are determined under conditions that the container is not vacuumized and the rotors are static and fastening between the bearing block (153) and the outer steel busing is completed, an intermediate thin-walled ring unit (172) and the thin-walled ring units (171, 173) at both ends are welded by adopting the field soldering method, thereby ensuring a reliable seal of the accommodating members. Moreover, when the thicknesses of the fan-shaped adjusting base plates (167) should be further adjusted, the thin-walled ring units may be removed and reused.

The two horizontal half-coupled members (FIG. 38) of the HETw with the same design and the horizontal half-coupled member HETfhe (FIG. 66) and the vertical half-coupled member HETfhf (FIG. 67) of the HETf are in single-stage, double-magnetic flux and near-axis coil forms, and adopt the mixed flexible external cables. General description of the common part of the embodiments of the three half-coupled members is the same as description explained in specific embodiments of "(f) Wind Power Generation System Including HET".

The half-coupled members (FIG. 38) of the HETw and the half-coupled member HETfhe (FIG. 66) of the HETf are of horizontal hollow-shaft structures. Intermediate sections of rotation shafts of the half-coupled members are provided with hollow 20-steel magnetic conductors (2); both ends are provided with 40Cr-steel end shafts (180, 182) and 20-steel lantern rings (181); and the lantern rings (181) are used for magnetizing the magnetic fluid sealing elements (37). Interference fitting is respectively formed between the magnetic conductors (2) and the end shafts and between the end shafts and the lantern rings, and sealants are applied to the contact end surfaces. A rolling bearing (a deep groove ball radial bearing, grease lubricating, with contact-type sealing rings on two sides) is respectively arranged on each of the end shafts. The bearing on one side of the end shaft (180) is an axial positioning end and can bear a bidirectional axial load, and the bearing on one side of the end shaft (182) is a free end capable of producing an axial displacement. An axial bearing load generated by gravity of the rotor is larger than a minimum load thereof, and additional pre-loading measures do not need to be increased for the two bearings. The half-coupled members (FIG. 38) of the HETw have a shaft extension end with an external spline. The half-coupled member HETfhe (FIG. 66) of the HETf has two shaft extension ends with external splines.

The half-coupled member HETfhf (FIG. 67) of the HETf is of a vertical and solid-shaft structure. The rotation shaft (2) is composed of two parts, i.e., a central fine shaft and an outer ring annular shaft which are in interference fit. The central fine shaft is made of 45 steel. The outer-ring annular shaft is made of 20 steel. The half-coupled member HETfhf has a shaft extension end having an external spline and facing the lower side.

Figure 68:
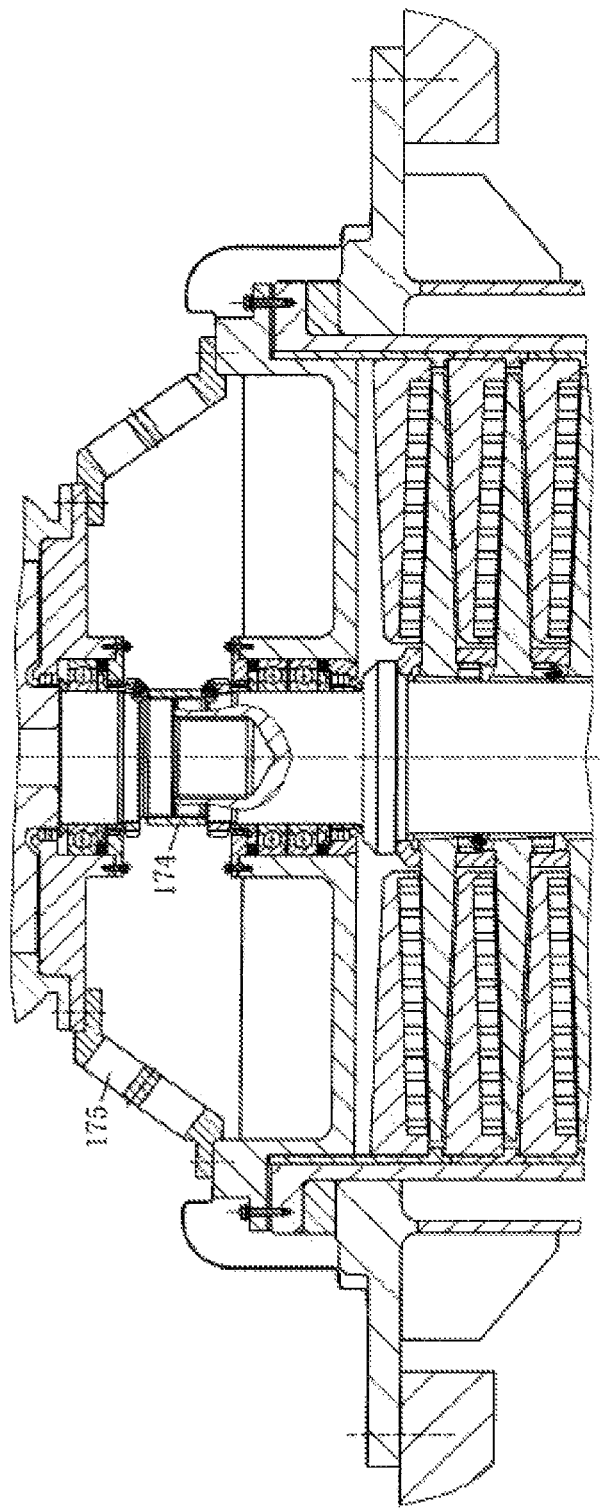
FIG. 68 shows connection between a flywheel-side vertical separated HET half-coupled member (HETfhf) and a suspended flexible flywheel.
Figure 69:
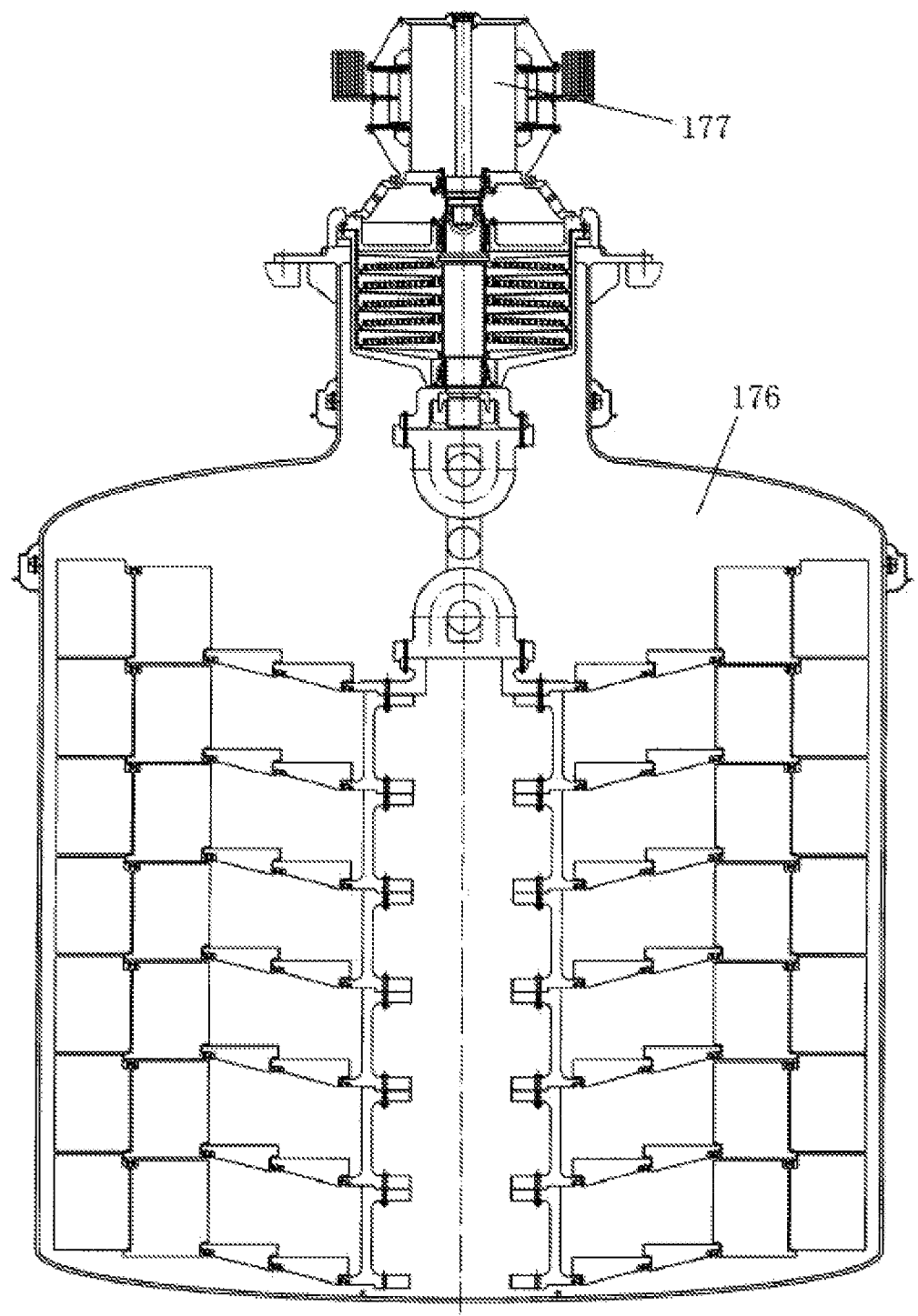
FIG. 69 is a meridian plane diagram of a suspended flexible flywheel (176) and a flywheel-side HET half-coupled member (HETfhf, 177)

A stator of the HETfhf (FIG. 67) is connected with the bearing block (153) (FIG. 68, FIG. 69) at the upper end of the flywheel rotation shaft by virtue of a bracket (175), i.e., a small-diameter seam allowance ring body at the upper end of the bracket (175) is connected and fastened with a seam allowance of a flange plate at the lower end of the stator of the HETfhf, and a large-diameter seam allowance ring body at the lower end of the bracket is connected and fastened with a seam allowance of a boss on an outer edge of the bearing block (153) at the upper end of the flywheel rotation shaft, so that a support of the stator of the HETfhf and the flywheel device are integrated. Due to form and position tolerance machining control of related connecting parts, the rotation shaft of the HETfhf is coincided with the axis of the flywheel rotation shaft. The bracket (175) is composed of the small-diameter seam allowance ring body at the upper end, the large-diameter seam allowance ring body at the lower end, and circumferenally and uniformly distributed rectangular-section radial spokes connecting the both ends, and is cast by nodular cast iron and manufactured by a machining process. The lower end surface of the rotation shaft of the HETfhf is pressed on the upper end surface of the flywheel rotation shaft (FIG. 68). Gravity of the rotor of the HETfhf is transferred onto the flywheel rotation shaft and borne by the axial supporting permanent magnetic bearings of the flywheels in a unified manner, so that the HETfhf is not equipped with an axial supporting bearing with an extremely high load, and also not equipped with an axial positioning dead point. External splines with the same specification and size are machined in shaft ends of the two shafts. Torque between the two shafts is transferred by an internal spline sleeve (174) (FIG. 68) assembled at the two shaft ends. A coupling between two devices (one of the devices does not have the axial positioning dead point) may not generate an extra undesired axial load to the only one axial positioning bearing during operation. However, on a general occasion that the two devices have the axial positioning dead point, an elastic coupling between the two devices may generate axial force (caused by the axial displacement, misalignment and other conditions), a rigid fixed coupling between the two devices may generate extremely high thermal expansion axial force, and a toothed coupling between the two devices may generate frictional axial force when an axial displacement between engaging teeth is caused by thermal expansion and shrinkage of the rotation shafts and other parts. The above axial force is action and reaction in a paired manner, and simultaneously transferred to the axial supporting bearings at the axial positioning end of the two devices.

Figure 67:
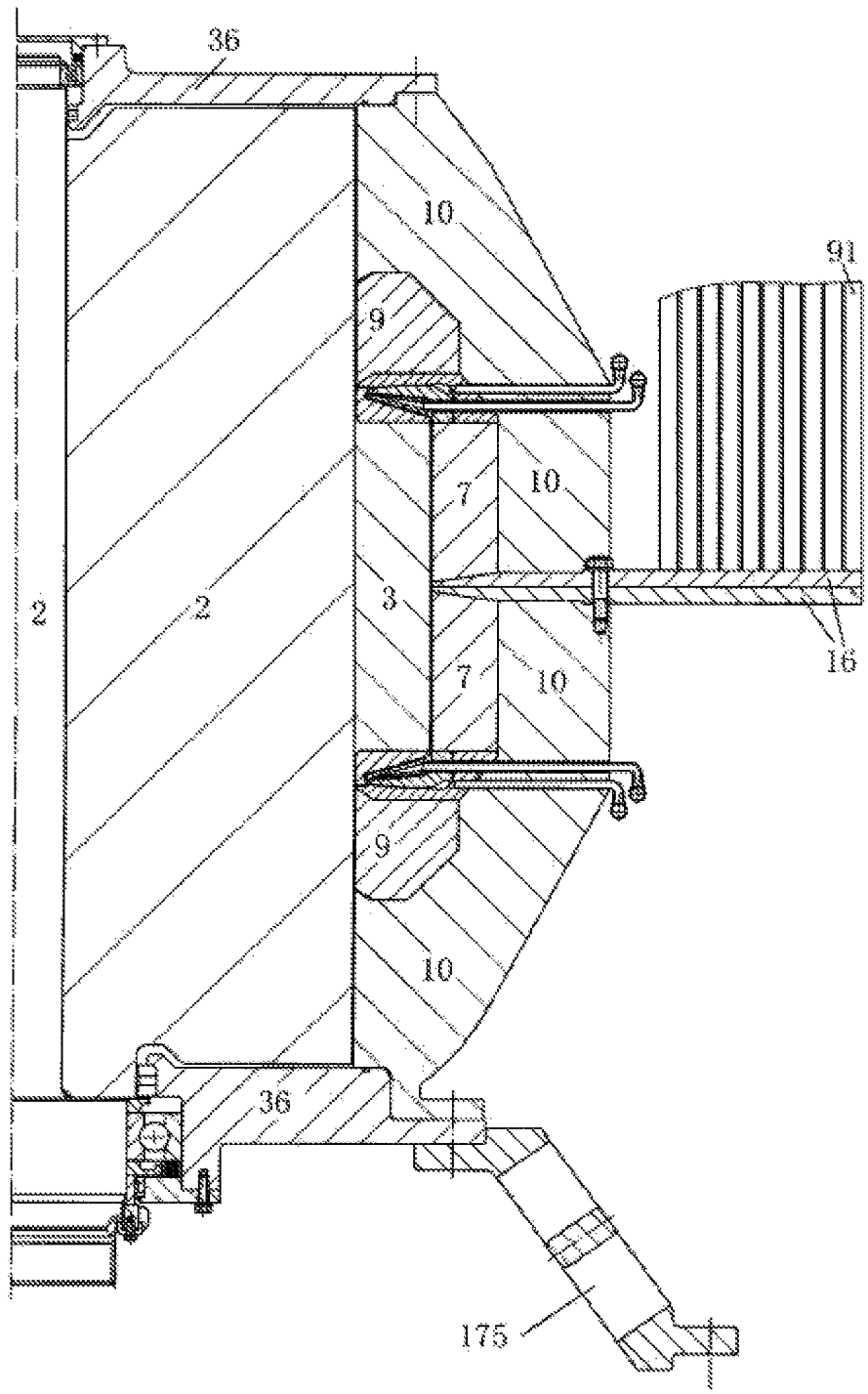
FIG. 67 is a meridian plane diagram of a vertical separated HET half-coupled member HETfhf (double magnetic flux, near-axis coil, solid shaft, axial plane type, single-stage)

Only one radial rolling bearing (deep groove ball bearing) is respectively arranged at each of both ends of the rotation shaft (the central fine shaft) of the HETfhf (FIG. 67). Outer rings can generate free axial displacements. Any axial positioning bearing capable of bearing the bidirectional axial load is not arranged. Since the bearings of the vertical rotors do not bear the gravity, in order to retain the minimum load of the bearings, the spiral compression springs acting on end surfaces of the bearing outer rings are added on one side of the bearing block end cover, so as to apply the axial pre-tightening load.

The suspended flexible flywheel device and the HETfhf (FIG. 69) are arranged at central positions of the tower. A center line of the flywheel rotation shaft is coincided with a yawing rotation center line. During wind wheel yawing, a flywheel gyroscoopic torque is not generated, and rotation of center of gravity of the flywheel is not caused.

Figure 9:
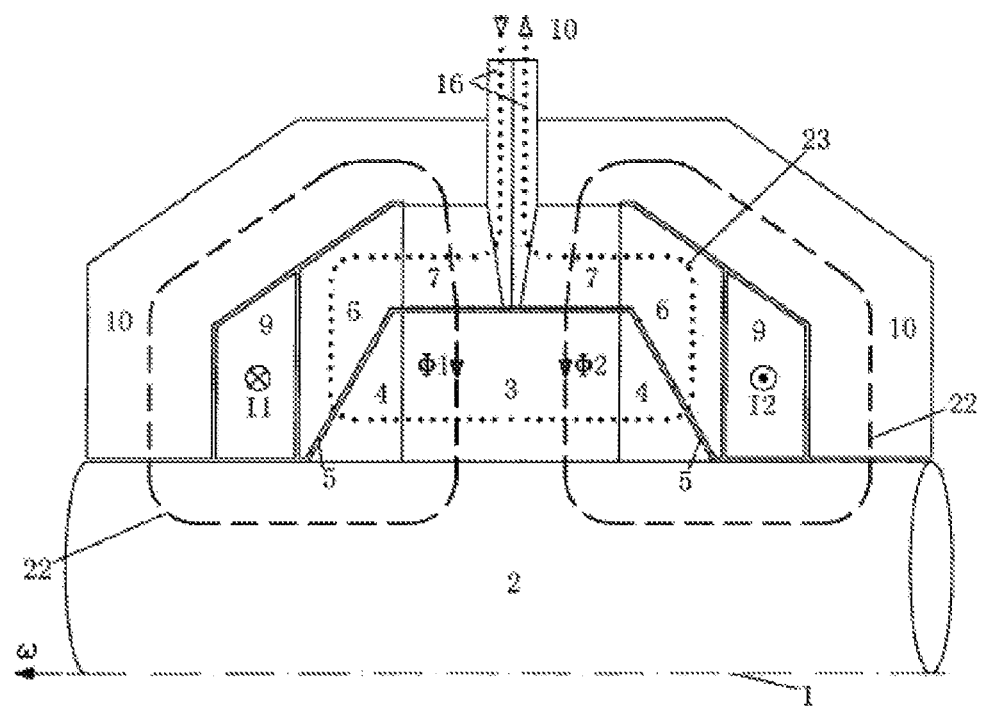
FIG. 9 is a meridian plane schematic diagram of a separated type, double-magnetic flux, near-axis coil, solid shaft, axial plane type, HET half-coupled member.
Figure 10:
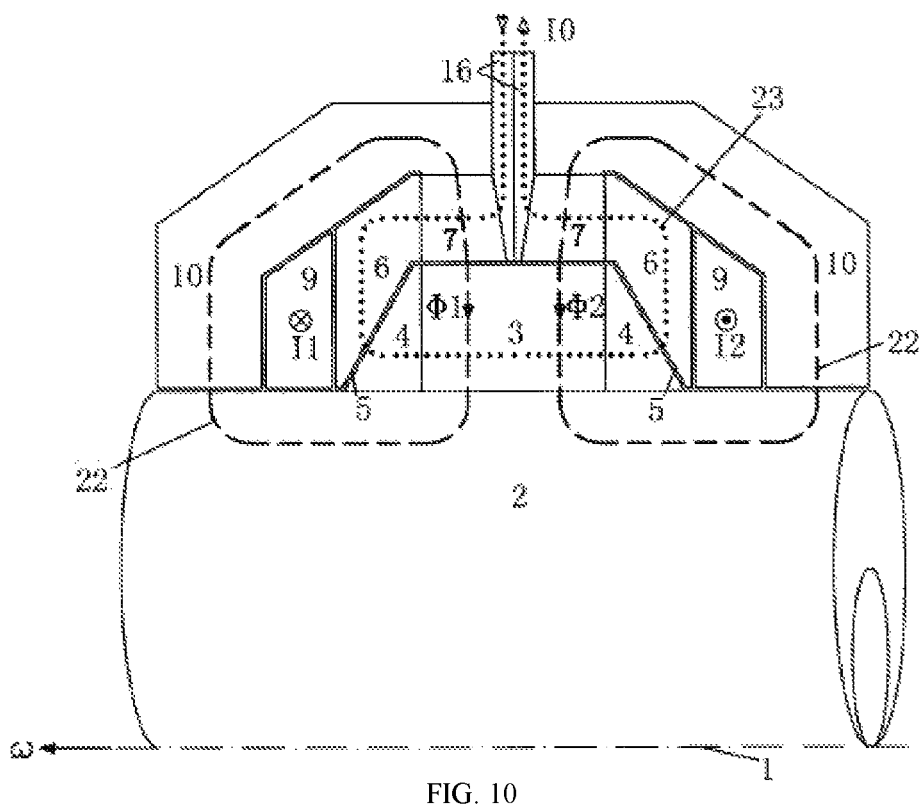
FIG. 10 is a meridian plane schematic diagram of a separated type, double-magnetic flux, near-axis coil, hollow shaft, axial plane type, HET half-coupled member.
Figure 11:
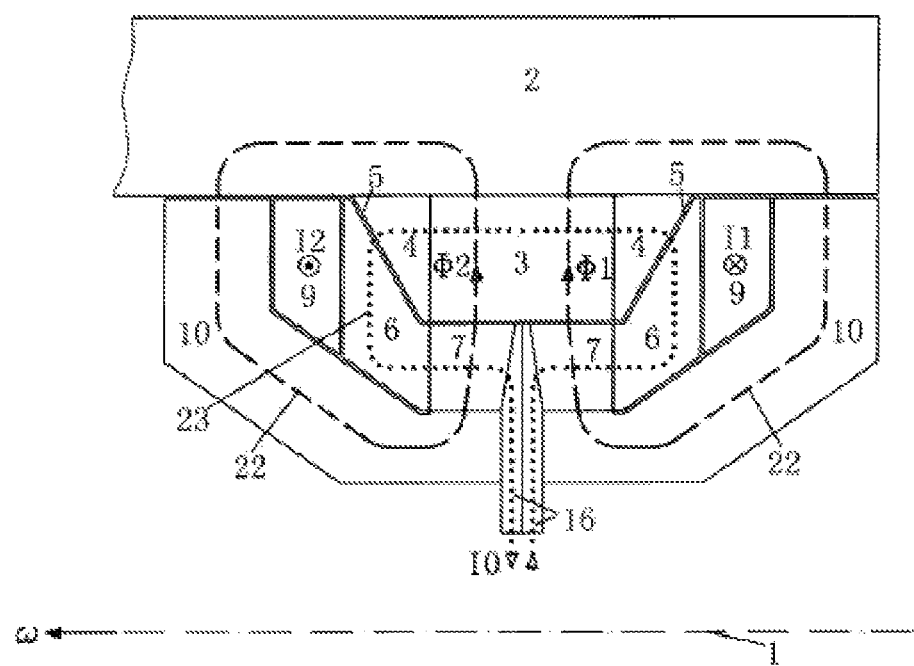
FIG. 11 is a meridian plane schematic diagram of a separated type, double-magnetic flux, outer rotor, axial plane type, HET half-coupled member.

In the half-coupled members of the HETw and the half-coupled members HETfhe and HETfhf of the HETf, currents with the same magnitude and opposite directions (I1 and I2, FIG. 9, FIG. 10) are conducted to two magnet exciting coils (9) of each of the half-coupled members, and generated double-magnetic flux magnetic fields are bilaterally symmetrical. Windings of the two magnet exciting coils are connected in series together and have the same exciting winding current Ic1, I1=Z1×Ic1, I2=Z2×Ic1, the number of turns Z1 and Z2 are equal to each other, and total magnetic flux ΣΦ1 of the rotors of the half-coupled members is equal to Ff1(|I0|, I1, I2)=Ff1(|I0|, Z1×Ic1, Z2×Ic1).

Since the two half-coupled members of the HETw have an identical design, a set of electromagnetic interaction relationship curve formula may be shared by the two half-coupled members, i.e., ΣΦ2=Ff1(|I0|, Z1×Ic2, Z2×Ic2), wherein Ic2 is exciting winding current of the second half-coupled member of the HETw.

Operating control of the HETw and HETf is respectively independently executed. Each set of the HET may be controlled by selecting any one of two adjustment and control methods as follows:

A first type of adjustment and control method:

The total loss is a sum of main current ohmic heat ($I0 \cdot I0 \cdot R0$) and each exciting current ohmic heat (ΣPoi), wherein R0 and Ri are constant values.

A relationship curve that varies along with main current I0 and exciting winding current Ic1 and Ic2 is obtained by calculation or test as follows:

$$\Sigma\Phi 1 = Ff1(|I0|, Z11 \times Ic1, Z12 \times Ic1) \tag{g16}$$

$$\Sigma\Phi 2 = Ff2(|I0|, Z21 \times Ic2, Z22 \times Ic2) \tag{g17}$$

wherein the value of I0 ranges from zero to a designed value, and the values of Ic1 and Ic2 range from zero to a designed value, Z11 and Z12 are numbers of turns of the two magnet exciting coils of the first HET half-coupled member, and Z21 and Z22 are numbers of turns of the two magnet exciting coils of the second HET half-coupled member.

An application range of an electromagnetic torque of a specified rotation shaft and an application range of rotation speeds of two shafts are given. By utilizing the electromagnetic law formulas (formulas (a1)-(a4), (a5) or (a6), and R0 is a constant value) and the above formulas (g16) and (g17), a matrix of optimum values Ic1opt and Ic2opt of exciting winding current, which fully covers different rotation speed conditions and torque demands and satisfies a total loss minimum target, is calculated, and all the data are stored in the control system.

When regulation is executed, rotation speeds (ω1 and ω2) of the two rotors are acquired in real time input conditions, a torque instruction of the specified rotation shaft is given as an input condition, related stored data is invoked from the control system, and corresponding optimum values Ic1opt and Ic2opt of each exciting winding current are calculated by adopting a spline interpolating function formula for use in the execution link.

A second type of adjustment and control method:

The total loss is a sum of main current ohmic heat ($I0 \cdot I0 \cdot R0$), each exciting current ohmic heat (ΣPoi) and circuit "connecting region clearance" liquid metal friction heat, wherein Ri is a constant value, and R0 is a function of liquid metal state parameters MLS, a variable in the parameters MLS is a NaK liquid capacity parameter, while a liquid center position parameter is fixed as an average value. The parameters MLS may influence the liquid metal friction heat.

A relationship curve that varies along with main current I0 and exciting winding current Ic1 and Ic2 is obtained by calculation or test as follows:

$$\Sigma\Phi 1 = Ff1(|I0|, Z11 \times Ic1, Z12 \times Ic1) \tag{g16}$$

$$\Sigma\Phi 2 = Ff2(|I0|, Z21 \times Ic2, Z22 \times Ic2) \tag{g17}$$

wherein the value of I0 ranges from zero to a designed value, and the values of Ic1 and Ic2 range from zero to a designed value, Z11 and Z12 are numbers of turns of the two magnet exciting coils of the first HET half-coupled member, and Z21 and Z22 are numbers of turns of the two magnet exciting coils of the second HET half-coupled member.

An application range of a torque of a specified rotation shaft, an application range of rotation speeds of two shafts and an application range of the circuit "connecting region clearance" NaK liquid capacity parameter are given. By utilizing the electromagnetic law formulas (formulas (a1)-(a4), (a5) or (a6), and R0 is a function of the NaK liquid capacity parameter) and the above formulas (g16) and (g17), a matrix of optimum values Ic1opt and Ic2opt of exciting winding current, which fully covers different rotation speed conditions and torque demands and satisfies a total loss minimum target, as well as a matrix of optimum values of the NaK liquid capacity parameter are calculated, and all the data are stored in the control system.

When regulation is executed, rotation speeds (ω1 and ω2) of the two rotors are acquired in real time as input conditions, a torque instruction of the specified rotation shaft is given as an input condition, related stored data is invoked from the control system, and corresponding optimum values Ic1opt and Ic2opt of each exciting winding current, as well as the optimum value of the NaK liquid capacity parameter are calculated by adopting the spline interpolating function formula for use in the execution link.

A stable power generation operating method is adopted during a normal operation of the wind power system in the present invention. The generator is operated according to planned average power generation power. When the output power of the wind wheel is higher than an average value under a strong wind condition or under gust of wind, the higher difference is absorbed by the flywheel. When the output power of the wind wheel is lower than the average value under a small wind condition, the insufficient difference is compensated and output by the flywheel.

The wind power system may also realize a peak regulation function of the power grid when necessary. When the power grid needs to store energy and the wind speed is small, the generator serves as a motor, and electric energy from the power grid is absorbed by the flywheel. When the load of the power grid is increased and the wind speed is small, the stored energy is totally output by the flywheel.

A process of starting the wind wheel and the generator by adopting wind power is as follows: when a start-up wind speed is reached, a pitch angle of the blades of the wind wheel ranges from a decreased angle at a "feathering" position to a pitch angle with a larger starting torque, an impeller is driven to be self-started by the wind power, the synchronous generator rotor is driven to speed up from a zero rotation speed to a synchronous rotation speed of 1500 r/min by virtue of HET transmission, and then connected to the power grid by virtue of synchronous grid-connected operating procedures; and after the starting process is completed, the blade pitch angle rotates to a rated design pitch angle, and the rotation speed of the impeller is adjusted to a rotation speed value meeting the optimal tip speed ratio of 7.

The peak regulation function of the power grid is realized in the absence of wind. A process of starting the generator (motor) by adopting the flywheel is as follows: by utilizing kinetic energy of the flywheels, the synchronous generator rotor is driven to speed up from a zero rotation speed to a synchronous rotation speed of 1500 r/min by virtue of the HET transmission, and then connected to the power grid by virtue of synchronous grid-connected operating procedures. Thus, the synchronous motor is operated according to the planned power generation conditions, or operated in an electric working condition. When the flywheel is in a zero rotation speed state and does not have the kinetic energy, the synchronous motor is started under no-load by adopting an own starting winding, and then operated in the electric working condition.

A conventional operating control solution in a range from a cut-in wind speed to a rated wind speed is as follows: the wind wheel blades maintain a control objective that the design pitch angle linearly changes along with a direct wind speed ratio according to the wind wheel rotation speed (that is, a ratio of the tip linear speed to the wind speed is equal to 7), a local mean wind speed (outside the cabin), the wind wheel rotation speed, the generator rotation speed and the flywheel rotation speed are measured in real time, a proportional relation between the wind wheel torque and second power of the wind speed is taken as a mater control rule, an instruction for the torque Mew1 of the rotation shaft of the wind-wheel-side half-coupled member of the HETw is given, a stable operation of the generator according to the planned mean power generation power is taken as an energy allocation principle, and an instruction for the torque Mefhe (positive or negative) of the rotation shaft of the half-coupled member HETfhe is given, so that operations of the HETw and HETf and power transfer thereof are adjusted and controlled. When the rotation speed of the wind wheel is lower than a constant value of a target rotation speed, the Mew1 instruction is appropriately decreased (the instruction Mefhe is correspondingly changed), so as to lighten an output load of the wind wheel, thereby speeding up the wind wheel. When the rotation speed of the wind wheel is higher than the constant value of the target rotation speed, the Mew1 instruction is appropriately increased (the instruction Mefhe is correspondingly changed), so as to increase the output load of the wind wheel, thereby reducing the speed of the wind wheel.

A power limitation control solution in a range from the rated wind speed to the cut-in wind speed is as follows: by taking measures that the variable pitch angle changes towards aspects of decreasing a stall trend, decreasing an airflow angle of attack and increasing the pitch angle of the blades, the power and the impeller rotation speed are kept constant in principle (equal to the rated value), that is, the wind-power utilization coefficient Cp of the impeller and third power of the wind speed are in inversely proportional change, and a tip speed ratio $\lambda$ and the wind speed are in inversely proportional change. A moving track that the value Cp and third power of the $\lambda$ are proportional is shown in a Cp-$\lambda$ diagram, and is a steep curve. An intersection set of a set of curves and the steep curve is solved by utilizing a set of Cp-$\lambda$ curves under different pitch angles in an adjustable pitch angle range, and a corresponding law that the pitch angle changes along the wind speed is determined from the intersection set. The local mean wind speed, the wind wheel rotation speed, the generator rotation speed and the flywheel rotation speed are measured in real time, the pitch angle is adjusted according to the corresponding law, a torque Mew1 instruction for the rotation shaft of the wind-wheel-side half-coupled member of the HETw is given according to a master control rule that the wind wheel torque is equal to a rated torque, and a torque Mefhe instruction for the rotation shaft of the HETfhe half-coupled member is given by taking the stable operation of the generator according to the planned mean power generation power as the energy allocation principle, so that operations of the HETw and HETf and power transfer thereof are adjusted and controlled. When the rotation speed of the wind wheel is lower than a constant value of a rated rotation speed, the Mew1 instruction is appropriately decreased (the instruction Mefhe is correspondingly changed), so as to lighten the output load of the wind wheel, thereby speeding up the wind wheel. When the rotation speed of the wind wheel is higher than the constant value of the rated rotation speed, the Mew1 instruction is appropriately increased (the instruction Mefhe is correspondingly changed), so as to increase the output load of the wind wheel, thereby reducing the speed of the wind wheel.

An impeller brake and stop process is as follows: when the cut-out wind speed is reached, or other braking instructions are transmitted, the pitch angle of the wind wheel blades is rotated to the "feathering" position, aerodynamic braking is implemented, and mechanical braking of a brake disc arranged at the wind wheel shaft is performed until the wind wheel stops rotating.

(h) Flywheel Energy Storage and Conversion System Including HET

Figure 76:
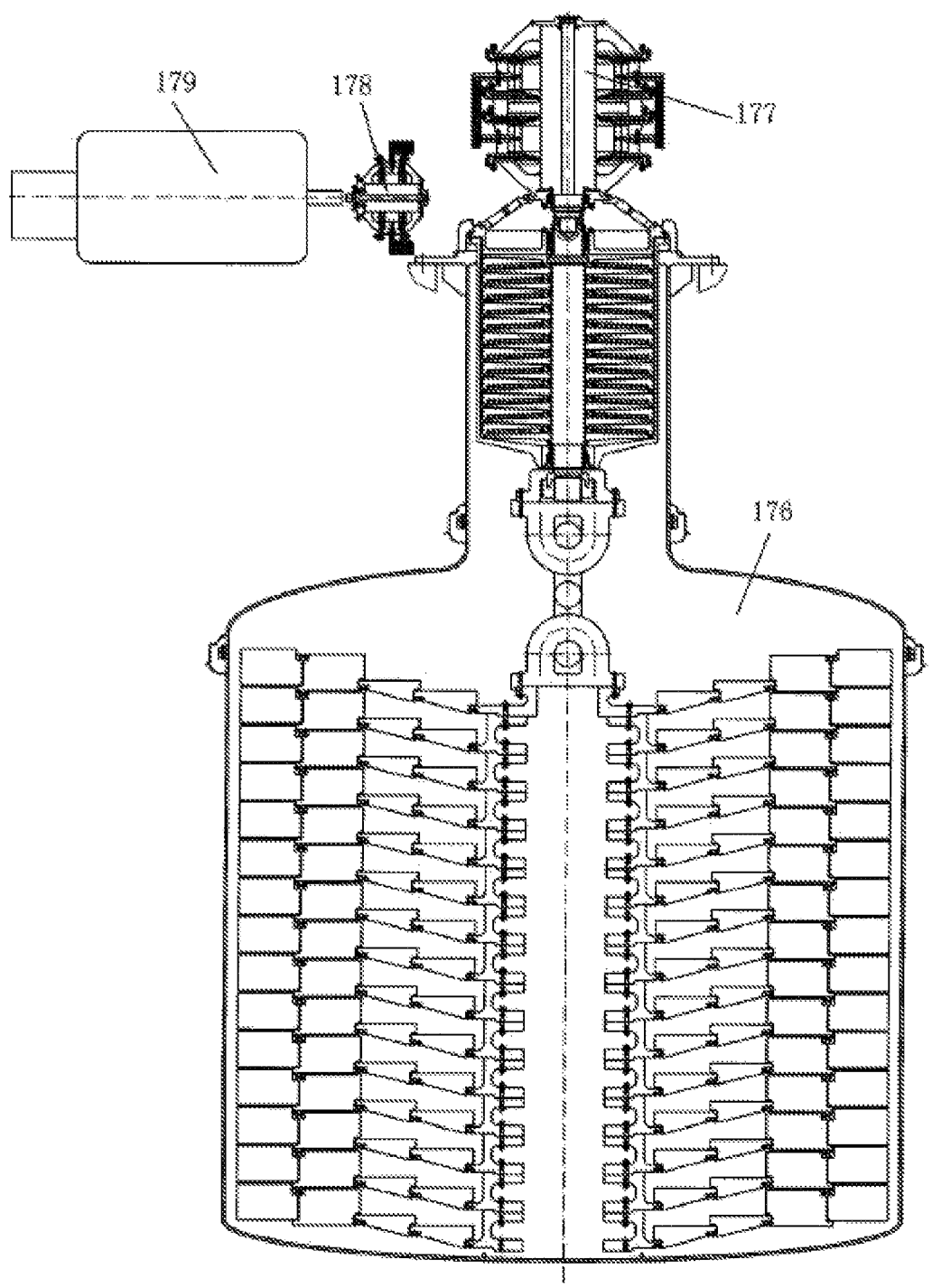
FIG. 76 shows a flywheel energy storage and conversion system including HET.

A specific embodiment of the flywheel energy storage and conversion system (FIG. 76) for peak regulation of the power grid is as follows.

Figure 71:
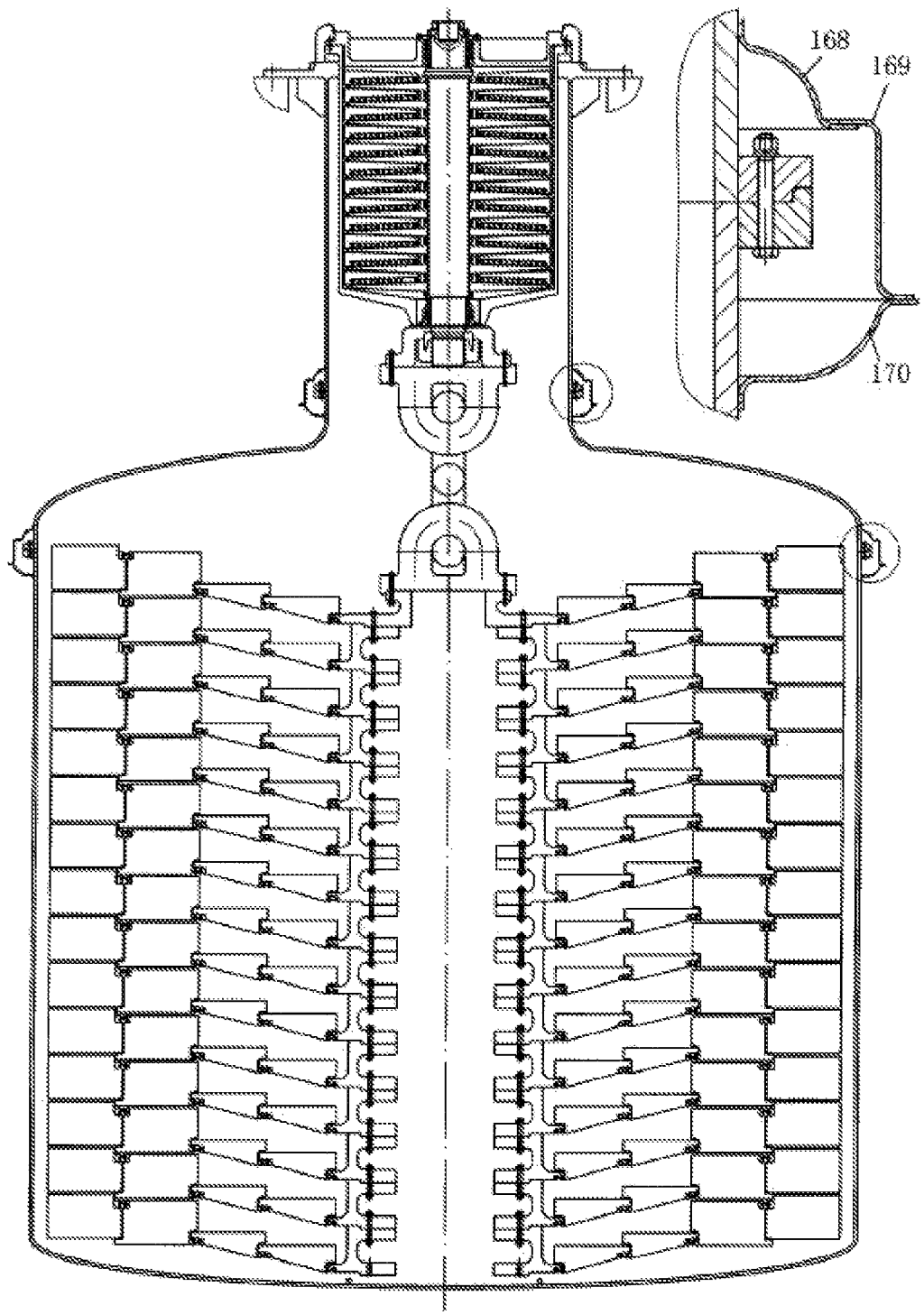
FIG. 71 shows a suspended flexible flywheel device (rated stored energy of 38465 kWh)
Figure 72:
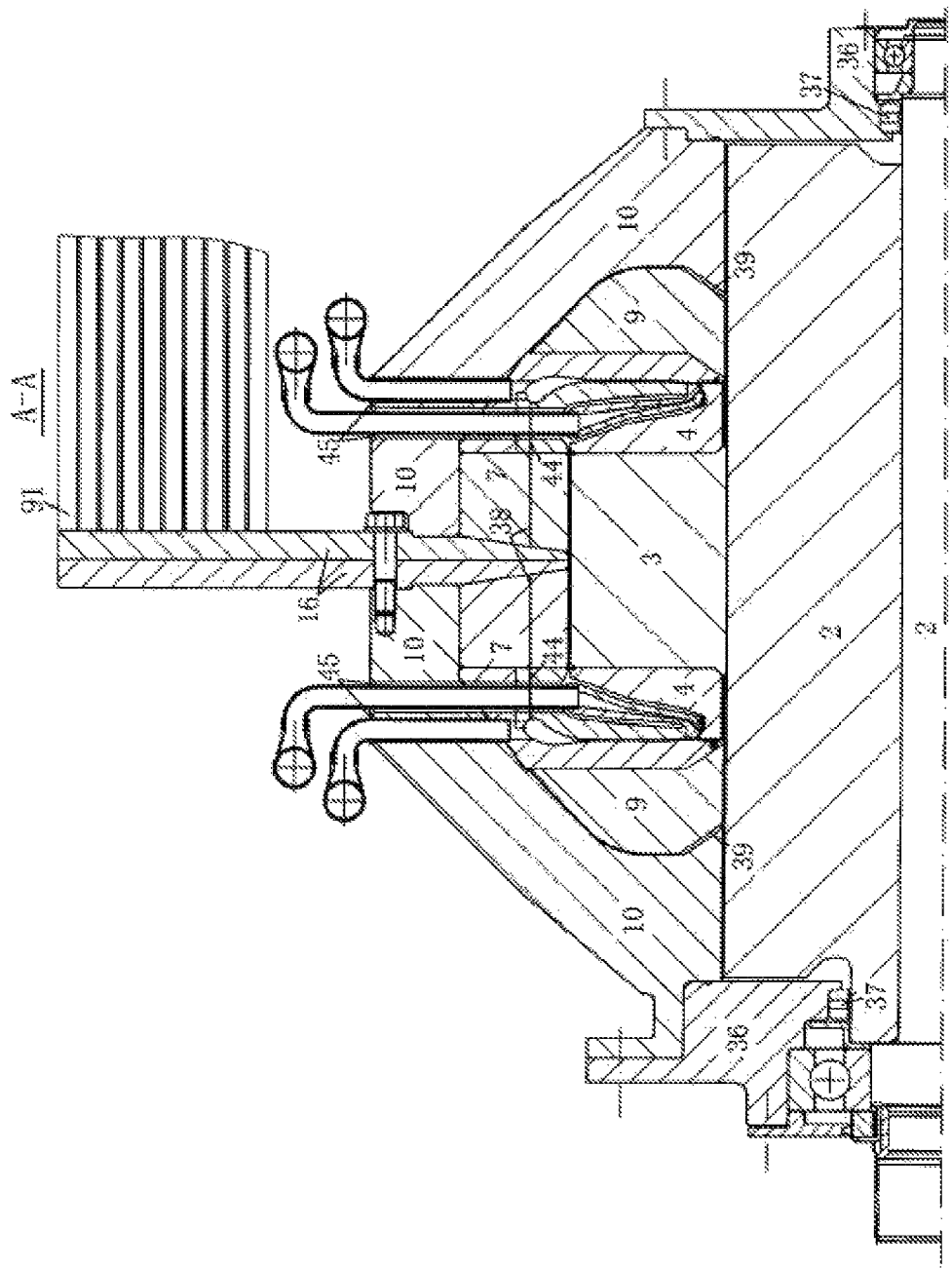
FIG. 72 is a meridian plane diagram of a motor-side horizontal separated HET half-coupled member (section A-A of FIG. 39) (double magnetic flux, near-axis coil, solid shaft, axial plane type, single-stage)
Figure 73:
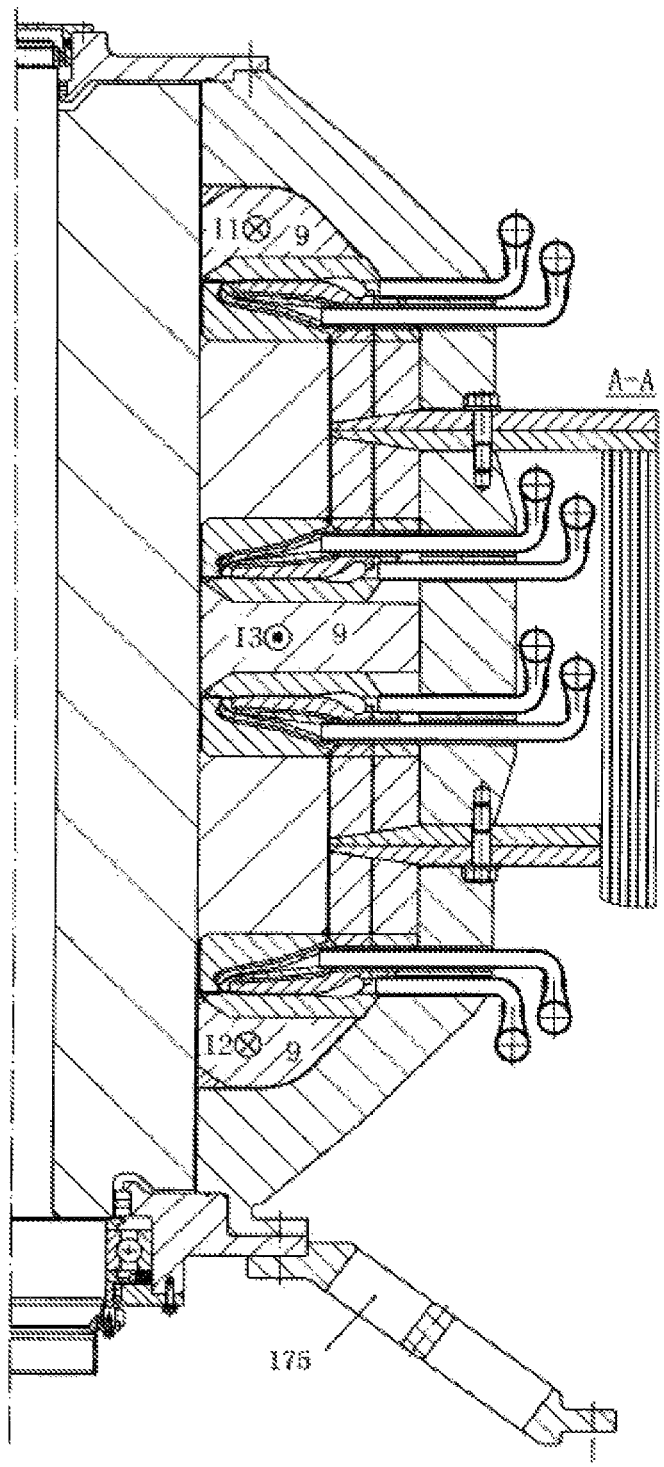
FIG. 73 is a meridian plane diagram of a flywheel-side vertical separated HET half-coupled member (section A-A of FIG. 74) (double magnetic flux, near-axis coil, solid shaft, axial plane type, two-stage external series)

The system includes: a suspended flexible flywheel device (176) (FIG. 71), a flywheel-side vertical separated HET half-coupled member (177) (FIG. 73), a motor-side horizontal separated HET half-coupled member (178) (FIG. 72), and a horizontal synchronous motor/generator (179).

The horizontal synchronous motor/generator includes parameters: a rated power generation power of 12 MW, a rotation speed of 3000 r/min, rated capacity of 15 MVA, a rated voltage of 6.3 kV and a total weight of 31.7 tonnages, and adopts an indirect air cooling manner. When the flywheel has energy, a method for driving the motor to the rated rotation speed by the flywheels and HET is preferably adopted for starting the motor.

Main parameters of the suspended flexible flywheel device (FIG. 71) include: a rated rotation speed of 1321.9 r/min, a rated transmission power of 12.8 MW, a maximum transmission torque of 277398 Nm (capable of transmitting the rated power of 12.8 MW under the ⅓ of the rated rotation speed and higher), a maximum flywheel outer diameter of 9648 mm, a maximum device outer diameter of 10697 mm, a total device height of 15894 mm, an overall device weight of 1414587 kg, a total rotor weight of 1181437 kg and rated stored energy of 38465 kWh.

Embodiments of the suspended flexible flywheel device (FIG. 71) are as follows.

Only parts different from the suspended flexible flywheel device (FIG. 64) in the embodiment of "(g) Wind Power Generation System Including HET and Flywheels" are described herein. The same part can be seen in detail above.

Figure 70:
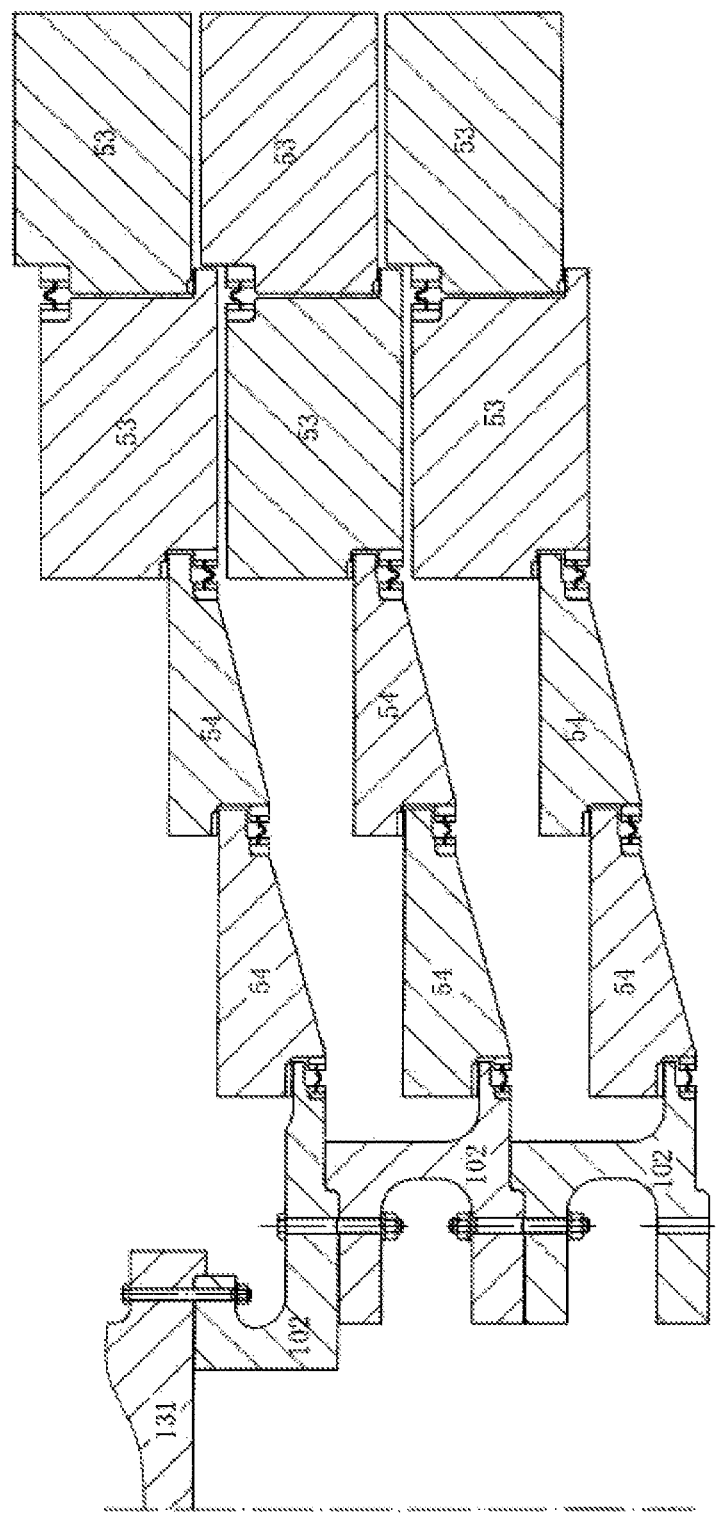
FIG. 70 shows connection between multiple sets of series wheel bodies and a multi-section cylindrical center shaft (II)

Flywheel rotors have 15 sets of upper and lower series wheel bodies. Each set of the wheel bodies has two mass block bodies (53) and two supporting bodies (54) (FIG. 70). Each set of the wheel bodies is connected with a section of cylindrical center shaft (102). Upper and lower adjacent center shafts are connected by virtue of flanges and threaded fasteners. 14 sections of center shafts located on the lower side have the same structure. One section of center shaft on the uppermost side has a flange plate (FIG. 70) connected with the flange plate (131) at the lower end of a circular chain. During installation and assembly, one set of wheel bodies at the bottommost end and the center shaft assembly are supported and installed from the bottom, and the rest wheel bodies and center shaft assemblies are assembled and connected one by one from bottom to top. Fasteners connected with the 14 sections of center shafts with the same structure are double-end studs and nuts. The studs pass through a temporarily-unused through hole space when assembled in place.

Figure 8:
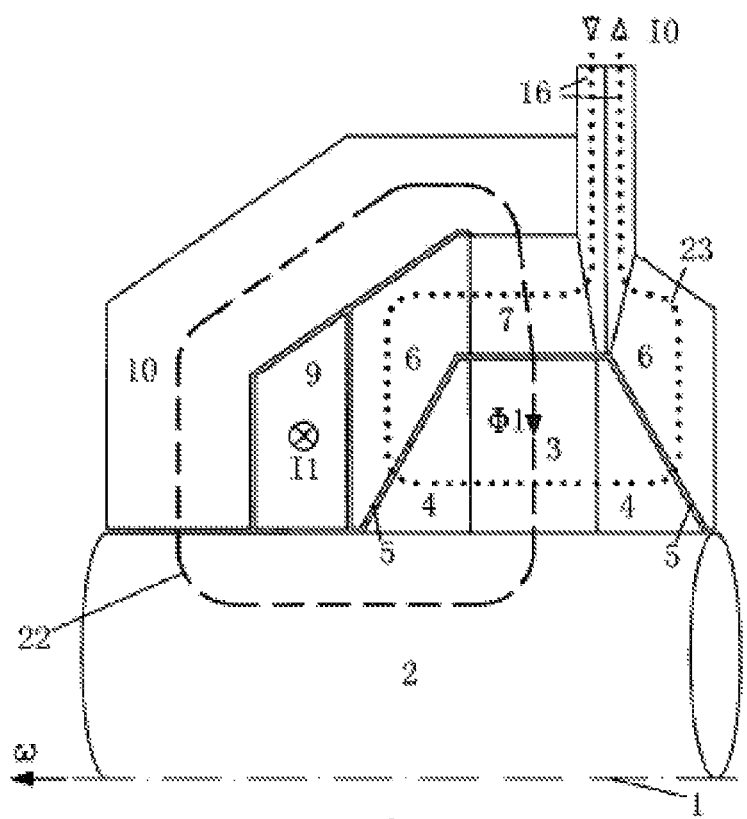
FIG. 8 is a meridian plane schematic diagram of a separated type, single-magnetic flux, near-axis coil, solid shaft, axial plane type, HET half-coupled member.

A pulling torque transfer flexible transmission part between the flywheel rotation shaft (101) and the wheel body center shaft (102) is a circular chain (FIG. 8). Fastened "hole shafts" of the two rings are in close fit, and a radius of the hole is 201 mm and only slightly larger than a radius 200 mm of the shaft, thereby decreasing bearing stress.

Axial supporting permanent magnetic bearings are composed of 12 serial force attraction type axial supporting permanent magnetic bearings. Rotary discs adopt 12 soft magnetic material 45# steel cone discs with the same size structure.

A vacuum container shell which is fixedly installed on the base (134) is in the shape of a bottle (FIG. 71) which is fine in top and thick in bottom. The vacuum container shell is located in a deep pit under the ground.

Main parameters of the motor-side horizontal separated HET half-coupled member (FIG. 72) include: a rated rotation speed of 3000 r/min, a rated power of 12.3 MW, a rated torque of 39097 Nm, rated main current of 429558 A, a rotor outer diameter of 730 mm, a stator body outer diameter of 1117 mm, a maximum outer diameter (external terminal outer diameter) of 1720 mm, an overall length of 1217.6 mm, a rotor weight of 1561 kg and a total weight of 5498 kg (not including aluminum cables). The motor-side horizontal separated HET half-coupled member adopts the double-magnetic flux, near-axis coil, solid-shaft, axial plane type and single-stage structural form.

Main parameters of the flywheel-side vertical separated HET half-coupled member (FIG. 73) include: a rated rotation speed of 1321.9 r/min, a rated power of 12.8 MW, a design power of 3×12.8 MW (capable of reaching the rated power of 12.8 MW at the ⅓ of the rated rotation speed), a maximum torque of 277398 Nm, rated main current of 429558 A, a rotor outer diameter of 1373.7 mm, a stator body outer diameter of 2193.2 mm, a maximum outer diameter (external terminal outer diameter) of 2818.9 mm, an overall length (height) of 3212 mm, a rotor weight of 18245 kg and a total weight of 68199 kg (not including aluminum cables). The flywheel-side vertical separated HET half-coupled member adopts the double-magnetic flux, near-axis coil, solid-shaft, axial plane type and two-stage external series structural form.

Embodiments of the motor-side horizontal separated HET half-coupled member (FIG. 72) are as follows.

Only parts with different characteristics from the embodiments of "(a) Homopolar DC Electromagnetic Transmission (HET)" are described herein. The parts with the same characteristic can be seen in detail above.

Connection of main current circuits with the flywheel-side vertical separated HET half-coupled member (177) adopts solutions of external terminals (16) and mixed flexible cables (FIG. 39). The mixed flexible cables adopt circular flexible wire bundles (91) which are made of red copper wire materials with a wire diameter of a fraction of a millimeter and composed of fine wires. The mixed flexible cables are connected to the external terminals. The wire bundles in the same current direction are arranged in a row. Various rows of the wire bundles in different current directions are alternatively arranged into fan-shaped blocks. Eight fan-shaped blocks are circumferentially and uniformly distributed. Spaces through which other pipelines and leads pass are reserved among the fan-shaped blocks. The wire bundles and red copper external terminals are in brazed connection, or red copper intermediate transition terminals are in brazed connection with the wire bundles and the red copper external terminals.

Embodiments of the flywheel-side vertical separated HET half-coupled member (FIG. 73) are as follows.

The flywheel-side vertical separated HET half-coupled member and the motor-side horizontal separated HET half-coupled member (FIG. 72) have most of the same structural details. The latter is described above. Only main differences are described below.

Figure 32:
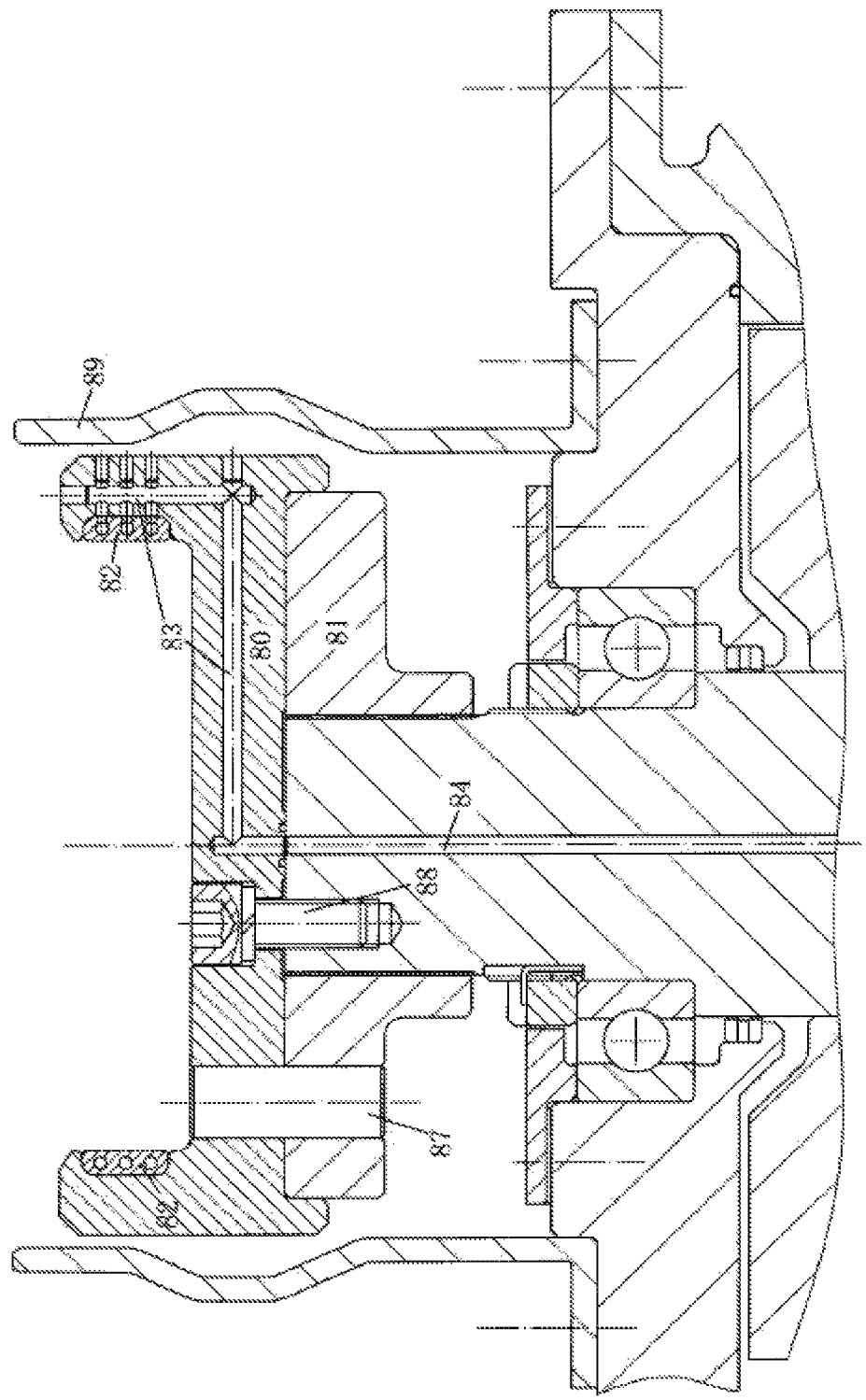
FIG. 32 shows a load joint, an upper-end structure of a load rotation shaft and supporting members (an intersection angle 135° is formed between left half section and right half section)
Figure 34:
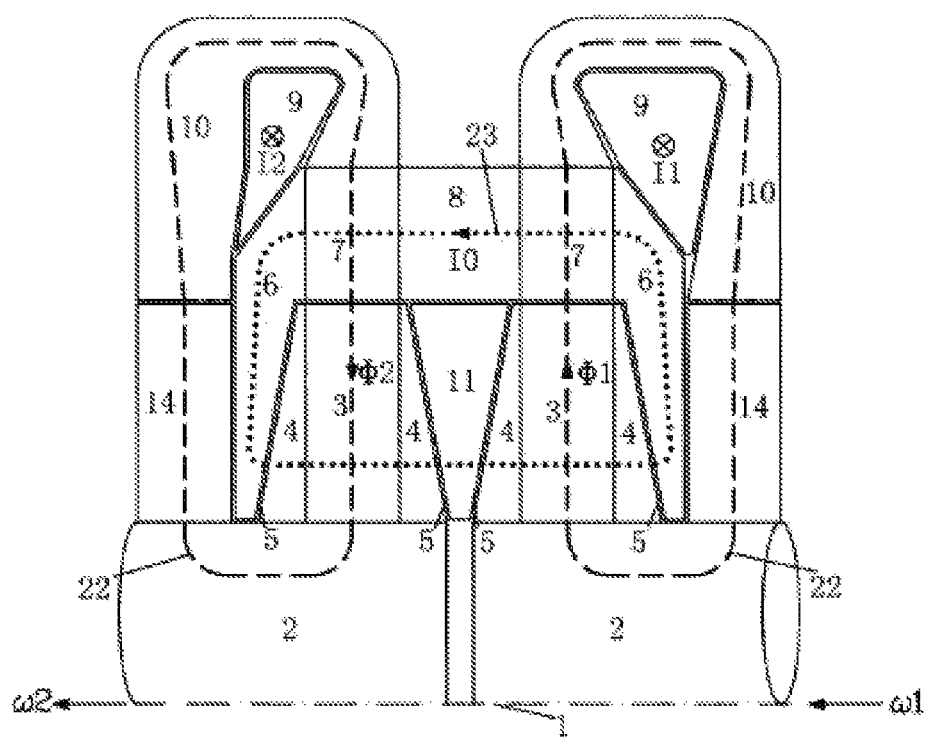
FIG. 34 is a meridian plane schematic diagram of a centralized type, two-axis single magnetic flux (without two-axis sharing), far-axis coil, solid shaft, axial plane type, HET.
Figure 35:
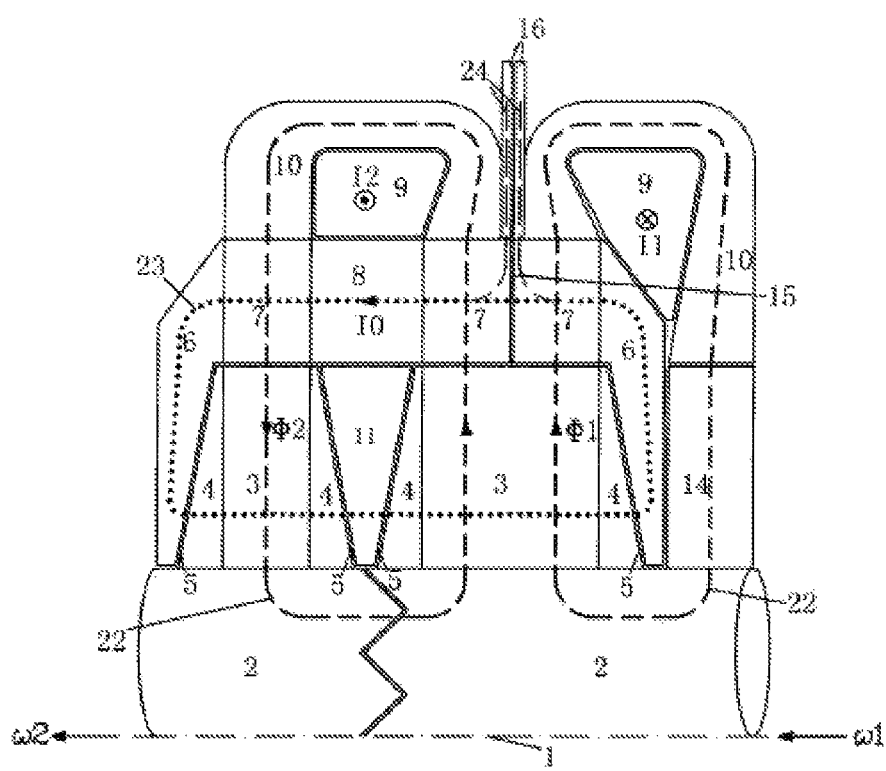
FIG. 35 is a meridian plane schematic diagram of a centralized type, two-axis (one-single one-double magnetic flux) (two-axis sharing), far-axis coil, solid shaft, axial plane type, intermediate external terminal led-out, HET.
Figure 36:
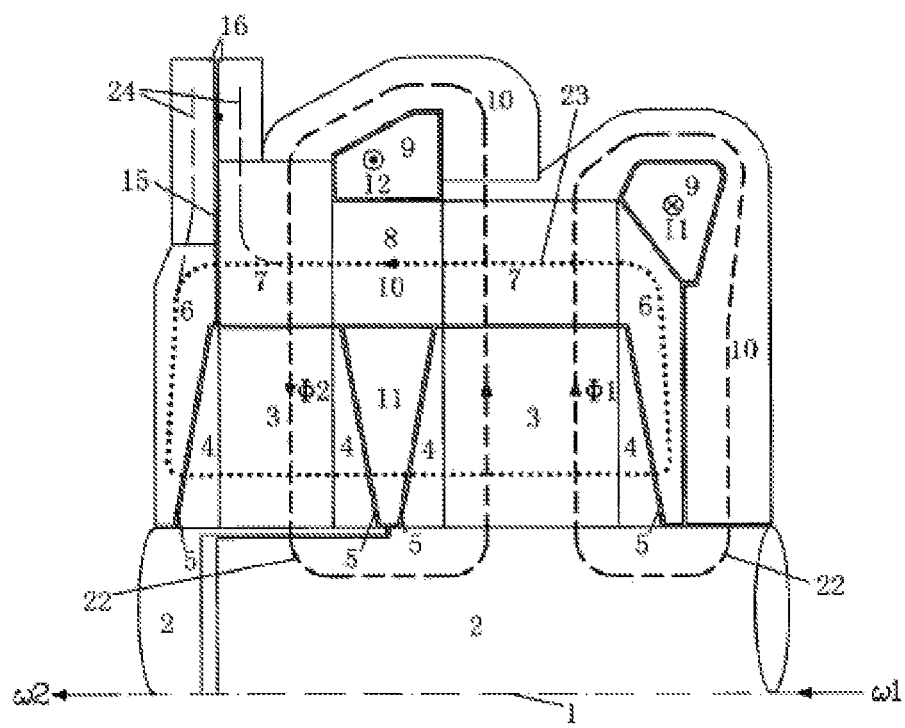
FIG. 36 is a meridian plane schematic diagram of a centralized type, two-axis (one-single one-double magnetic flux) (two-axis sharing), far-axis coil, solid shaft, axial plane type, external terminal led-out on one side, HET.
Figure 37:
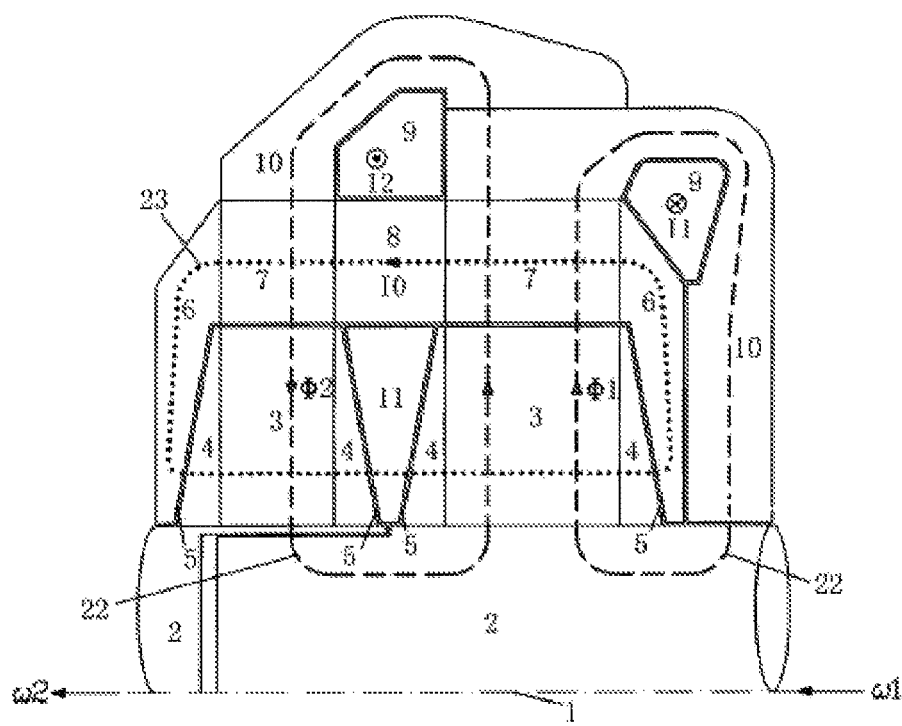
FIG. 37 is a meridian plane schematic diagram of a centralized type, two-axis (one-single one-double magnetic flux) (two-axis shared), far-axis coil, solid shaft, axial plane type, led-out external terminal free, HET.

The flywheel-side vertical separated HET half-coupled member has a series two-stage structure. The series two-stage structure is basically formed in combining single-stage structures shown in FIG. 72 in series. Four magnet exciting coils (9) of the two single-stage structures are reduced to three magnet exciting coils (9) (corresponding to exciting current I1, I2 and I3 in FIG. 32 and FIG. 73), i.e., two coils at intermediate positions of the original four magnet exciting coils with consistent exciting current directions are merged into a coil (13), original two main magnetic circuits are merged into a main magnetic circuit, and original two stator magnetic conductors (10) are canceled. Coils at both ends with exciting current of I1 and I2 have the same structure and number of turns. Since the magnetic circuit structures are symmetrical, magnetic flux passing through rotor magnetic and electric conductors generated when I1 and I2 are equal to each other also has the same size. An intermediate coil with exciting current of the I3 has a large number of turns. The arranged number of turns ensures that magnetic flux generated by the rated value of I3 is the same as magnetic flux generated by rated values of the I1 and I2, that is, an effect of combining the two single-stage structures is achieved. In an actual application, wires of the three magnet exciting coils are connected in series, the I1 and the I2 are always equal to each other and have the same direction, the I3 and the I1 have opposite directions, and a ratio of numerical values of the I3 and the I1 is always equal to a ratio of the number of turns thereof, that is, the three magnet exciting coils have the same exciting winding current Ic2, I1=Z1×Ic2, I2=Z2×Ic2, I3=Z3×Ic2, the numbers of turns Z1 and Z2 are equal to each other, and the total magnetic flux of the rotors ΣΦ2 is equal to Ff2(|I0|, I1, I2, I3)=Ff2(|I0|, Z1×Ic2, Z2×Ic2, Z3×Ic2).

Figure 74:
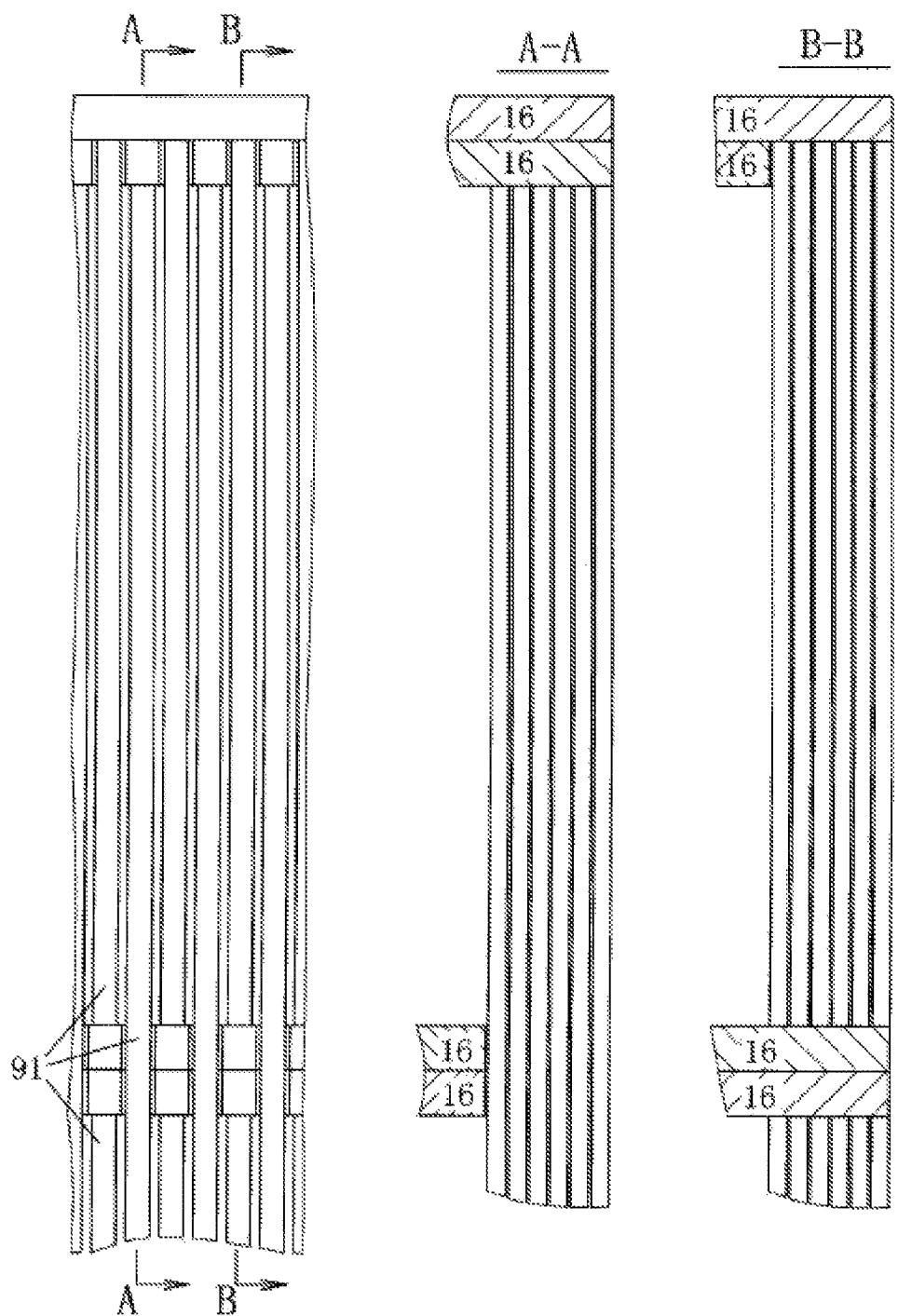
FIG. 74 shows an external terminal and a mixed flexible cable of two-stage external series separated HET half-coupled members (II)

Connection of main current circuits with the motor-side horizontal separated HET half-coupled member (178) and connection of main current circuits between two stages of the half-coupled member adopt solutions of external terminals (16) and mixed flexible cables (FIG. 74). The mixed flexible cables are connected between the two-stage external terminals according to the solution shown in FIG. 74, and lead to the external terminals of the motor-side horizontal separated HET half-coupled member (178). The wire bundles (91) in the same path and the same current direction are arranged in a row. Various rows of the wire bundles (91) in different paths and different current directions are alternatively arranged into fan-shaped blocks. Eight fan-shaped blocks are circumferentially and uniformly distributed. Spaces through which other pipelines and leads pass are reserved among the fan-shaped blocks. The wire bundles (91) and red copper external terminals are in brazed connection, or red copper intermediate transition terminals are in brazed connection with the wire bundles and the red copper external terminals. Numbers of the wire bundles (91) connected with the external terminals of the flywheel-side and motor-side HET half-coupled members are the same, but distribution shapes of the wire bundles are different. The number of the wire bundles (91) in radial distribution connected to the external terminals of the flywheel-side HET half-coupled member is smaller, while the number of the wire bundles (91) in circumferential distribution is larger, thereby adapting to larger outer diameters of the external terminals of the half-coupled member.

Figure 75:
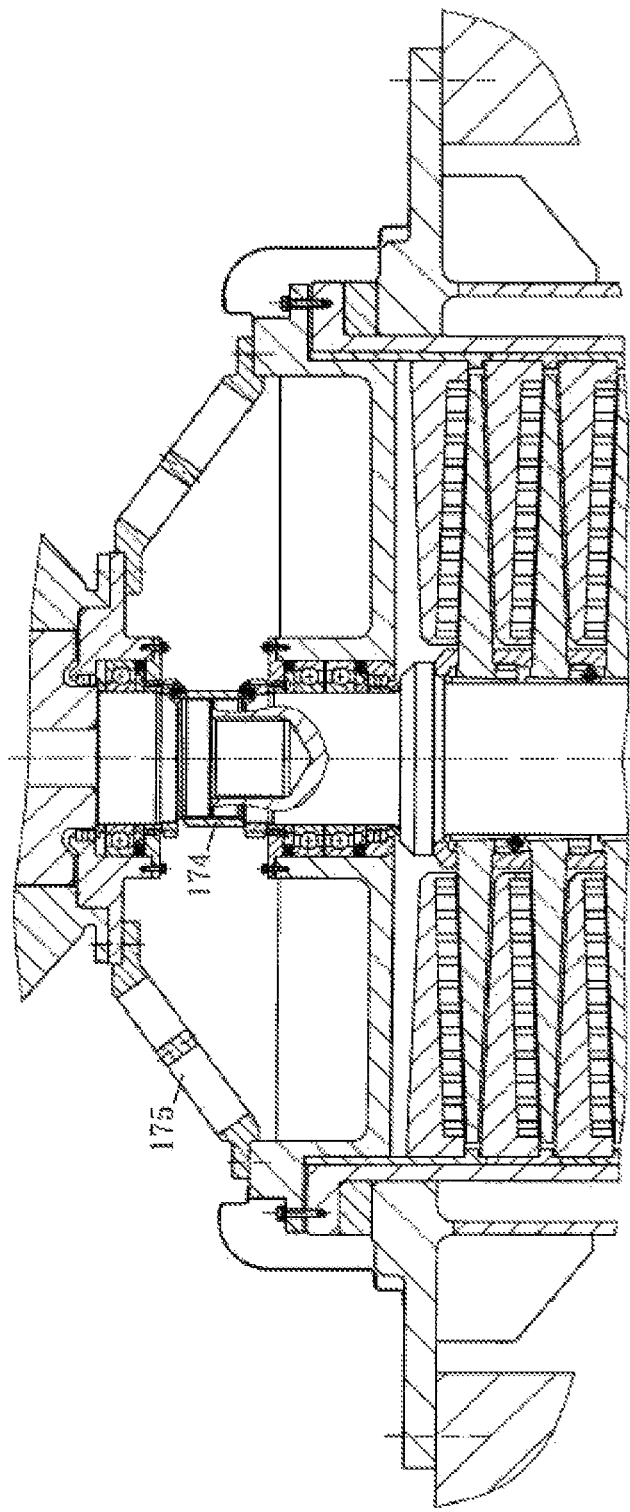
FIG. 75 shows connection between a flywheel-side vertical separated HET half-coupled member and a suspended flexible flywheel.

A stator of the flywheel-side vertical separated HET half-coupled member is connected with the bearing block (153) (FIG. 73, FIG. 75 and FIG. 76) at the upper end of the flywheel rotation shaft by virtue of a bracket (175), that is, a small-diameter seam allowance ring body at the upper end of the bracket (175) is connected and fastened with a seam allowance of a flange plate at the lower end of the stator of the HET half-coupled member, and a large-diameter seam allowance ring body at the lower end of the bracket is connected and fastened with a seam allowance of a boss on an outer edge of the bearing block (153) at the upper end of the flywheel rotation shaft, so that a support of the stator of the HETfhf and the flywheel device are integrated. Due to form and position tolerance machining control of related connecting parts, the rotation shaft of the HET half-coupled member is coincided with the axis of the flywheel rotation shaft. The bracket (175) is composed of the small-diameter seam allowance ring body at the upper end, the large-diameter seam allowance ring body at the lower end, and circumferenally and uniformly distributed rectangular-section radial spokes connecting the both ends, and is cast by nodular cast iron and manufactured by a machining process. The lower end surface of the rotation shaft of the HET half-coupled member is pressed on the upper end surface of the flywheel rotation shaft (FIG. 75). Gravity of the rotor of the HET half-coupled member is transferred onto the flywheel rotation shaft and borne by the axial supporting permanent magnetic bearings of the flywheels in a unified manner, so that the HET half-coupled member is not equipped an axial supporting bearing with an extremely high load, and also not equipped with an axial positioning dead point. External splines with the same specification and size are machined in shaft ends of the two shafts. Torque between the two shafts is transferred by an internal spline sleeve (174) (FIG. 75) assembled at the two shaft ends. A coupling between two devices (one of the devices does not have the axial positioning dead point) may not generate an extra undesired axial load to the only one axial positioning bearing during operation. However, on a general occasion that the two devices have the axial positioning dead point, an elastic coupling between the two devices may generate axial force (caused by the axial displacement, misalignment and other conditions), a rigid fixed coupling between the two devices may generate extremely high thermal expansion axial force, and a toothed coupling between the two devices may generate frictional axial force when an axial displacement between engaging teeth is caused by thermal expansion and shrinkage of the rotation shafts and other parts. The above axial force is action and reaction in a paired manner, and simultaneously transferred to the axial supporting bearings at the axial positioning end of the two devices.

Only one radial rolling bearing (deep groove ball bearing) is respectively arranged at each of both ends of the rotation shaft (the central fine shaft) of the flywheel-side vertical separated HET half-coupled member. Outer rings can generate free axial displacements. Any axial positioning bearing capable of bearing the bidirectional axial load is not arranged. Since the bearings of the vertical rotors do not bear the gravity, in order to retain the minimum load of the bearings, the spiral compression springs acting on end surfaces of the bearing outer rings are added on one side of the bearing block end cover, so as to apply the axial pre-tightening load When operating control of the HET is executed, any one of two adjustment and control methods may be selected as follows:

A first type of adjustment and control method:

The total loss is a sum of main current ohmic heat (I0·I0·R0) and each exciting current ohmic heat (ΣPoi), wherein R0 and Ri are constant values.

A relationship curve changing along with main current I0 and exciting winding current Ic1 and Ic2 is obtained by calculation or test as follows:

$$\Sigma\Phi1 = Ff1(|I0|, Z11 \times Ic1, Z12 \times Ic1) \tag{h1}$$

$$\Sigma\Phi2 = Ff2(|I0|, Z21 \times Ic2, Z22 \times Ic2, Z23 \times Ic2) \tag{h2}$$

wherein the value of I0 ranges from zero to a designed value, the values of Ic1 and Ic2 range from zero to a designed value, Z11 and Z12 are numbers of turns of the two magnet exciting coils of the motor-side HET half-coupled member, and Z21, Z22 and Z23 are numbers of turns of the three magnet exciting coils of the flywheel-side HET half-coupled member.

An application range of an electromagnetic torque of a specified rotation shaft and an application range of rotation speeds of two shafts are given. By utilizing the electromagnetic law formulas (formulas (a1)-(a4), (a5) or (a6), and R0 is a constant value) and the above formulas (h1) and (h2), a matrix of optimum values Ic1opt and Ic2opt of exciting winding current, which fully covers different rotation speed conditions and torque demands and satisfies a total loss minimum target, is calculated, and all the data are stored in the control system.

When regulation is executed, rotation speeds ($\omega 1$ and $\omega 2$) of the two rotors are acquired in real time as input conditions, a torque instruction of the specified rotation shaft is given as an input condition, related stored data is invoked from the control system, and corresponding optimum values Ic1opt and Ic2opt of each exciting winding current are calculated by adopting a spline interpolating function formula to be used in execution.

A second type of adjustment and control method:

The total loss is a sum of main current ohmic heat ($I0 \cdot I0 \cdot R0$), each exciting current ohmic heat ($\Sigma Poi$) and circuit "connecting region clearance" liquid metal friction heat, wherein Ri is a constant value, and R0 is a function of liquid metal state parameters MLS, a variable in the parameters MLS is a NaK liquid capacity parameter, while a liquid center position parameter is fixed as a mean. The parameters MLS may influence the liquid metal friction heat.

A relationship curve that varies along with main current I0 and exciting winding current Ic1 and Ic2 is obtained by calculation or test as follows:

$$\Sigma\Phi 1 = Ff1(|I0|, Z11 \times Ic1, Z12 \times Ic1) \quad (h1)$$

$$\Sigma\Phi 2 = Ff2(|I0|, Z21 \times Ic2, Z22 \times Ic2, Z23 \times Ic2) \quad (h2)$$

wherein the value of I0 ranges from zero to a designed value, the values of Ic1 and Ic2 range from zero to a designed value, Z11 and Z12 are numbers of turns of the two magnet exciting coils of the motor-side HET half-coupled member, and Z21, Z22 and Z23 are numbers of turns of the three magnet exciting coils of the flywheel-side HET half-coupled member.

An application range of a torque of a specified rotation shaft, an application range of rotation speeds of two shafts and an application range of the circuit "connecting region clearance" NaK liquid capacity parameter are given. By utilizing the electromagnetic law formulas (formulas (a1)-(a4), (a5) or (a6), and R0 is a function of the NaK liquid capacity parameter) and the above formulas (h1) and (h2), a matrix of optimum values Ic1opt and Ic2opt of exciting winding current that fully cover different rotation speed conditions and torque demands and satisfies a total loss minimum target, as well as a matrix of optimum values of the NaK liquid capacity parameter are calculated, and all the data are stored in the control system.

When regulation is executed, rotation speeds ($\omega 1$ and $\omega 2$) of the two rotors are acquired in real time as input conditions, a torque instruction of the specified rotation shaft is given as an input condition, related stored data is invoked from the control system, and corresponding optimum values Ic1opt and Ic2opt of each exciting winding current, as well as the optimum value of the NaK liquid capacity parameter are calculated by adopting the spline interpolating function formula for use in the execution link. [amended according to detailed rule 26 22.12.2015]

LIST OF REFERENCE NUMERALS

I0: marked main current, I0_1, I0_2: marked current of a parallel circuit on a main current circuit.
I1, I2, . . . : current of each of DC magnet exciting coils.
Φ: magnetic flux of a main magnetic circuit; Φ1, Φ2, Φ3, etc.: magnetix flux of each of main magnetic circuits.
ω, ω1, ω2 and arrows: angular velocity vectors of HET rotor, HET rotor 1 and HET rotor 2.
1: central axis of HET rotation shaft.
2: HET rotation shaft.
3: rotor magnetic conductor.
4: rotor electric conductor.
5: dynamic/static circuit connecting medium ("connecting region clearance")
6: stator electric conductor (independent), 6a, 6b, 6c, 6d: 4 split bodies of conductors (6) sleeved in sequence.
7: stator magnetic and electric conductors.
8: stator intermediate electric conductor.
9: DC magnet exciting coil.
10: stator magnetic conductor.
11: stator electric conductor (shared).
12: stator magnetic conductor.
13: permanent magnet.
14: rotor magnetic conductor.
15: liquid metal transfer switch (liquid metal filled end-surface gaps).
16: stator outer electric conductor (external terminal).
17: stator magnetic and electric conductor.
18: stator magnetic and electric conductor.
19: rotor electric conductor.
20: stator magnetic conductor.
21: stator magnetic conductor.
22: main magnetic circuit.
23: main current circuit.
25: branch clearance (located in liquid metal outlet channel).
26: second branch clearance (located in liquid metal inlet channel).
27: uniform-delivery buffer region clearance (located in liquid metal outlet channel).
28: round pipe (located in liquid metal outlet channel).
29: uniform-delivery buffer region clearance (located in liquid metal inlet channel).
30: round pipe (located in liquid metal inlet channel).
31: thermal insulating clearance for gas.
32: groove (sealed rubber tube (33) located therein).
33: sealing hose.
34: ventilating pipe (communicated with sealed rubber tube (33)).
35: vent hole.
36: supporting end cover.
37: magnetic fluid sealing element.
38: small hole (transporting metal liquid).
39: elastic taper washer.
40: spindle for coaxial external conductor.
41: pipe wall for coaxial external conductor.
42: sealing ring for coaxial external conductor.
43: sealing ring for coaxial external conductor.
44: small hole (transporting metal liquid).
51: flywheel rotation shaft.
52: flywheel vacuum container shell.
53: mass block for flywheel body.
54: support body for flywheel body.
55: flexible membrane ring for flywheel body (without pre-bending deformation in an installation state).
56: bearing end surface pair for flywheel body.
57: upward displacement-limiting end surface pair for flywheel body (a gap does not exist between two opposite end surfaces).
58: flexible membrane ring for flywheel body (with pre-bending deformation in an installation state).
59: rotary disc for axial permanent magnet attraction bearings for flywheels.
60: stationary disc for axial permanent magnet attraction bearings for flywheels (independent).
61: stationary disc for axial permanent magnet attraction bearings for flywheels (installed on vacuum container shell).

62: support disc for flywheel body.
63: elastic material ring (connecting support disc and supporting body).
64: upward displacement-limiting end surface pair for flywheel body (a gap exists between two opposite end surfaces).
65: rubber end surface thin plate for flywheel end surface pair.
66: rubber end surface thick block for flywheel end surface pair.
67: flange for flywheel vacuum container shell.
68: protective sleeve in flywheel vacuum container.
69: loading disc at lower end of flywheel rotation shaft (used for mechanical direct connection load).
71: vertical axis type flexible flywheel device on vehicle chassis.
72: HET half-coupled member on vehicle chassis.
73: vehicle frame.
74: ear flange for flywheel vacuum container shell.
75: flywheel supporting assembly on vehicle chassis.
76: fuel engine on vehicle chassis.
77: three-stage speed ratio gear reducer on vehicle chassis.
80: hydraulic connecting disc for mechanical load joint of flywheels for vehicle.
81: spline disc for mechanical load joint of flywheels for vehicle.
82: special-shaped rubber ring on hydraulic connecting disc.
83: hydraulic circuit on hydraulic connecting disc.
84: axis through hole on load rotation shaft.
85: annular groove on outer cylindrical surface of loading disc.
86: vent hole on loading disc.
87: cylindrical pin.
88: screw.
89: guide sleeve.
90: guide sleeve ring.
91: flexible wire bundle.
92: support ring plate.
101: flywheel rotation shaft.
102: flywheel body center shaft.
103: intersected cross shaft of universal joints.
104: yoke hole members of intersected cross shaft of universal joints.
105: roller pin for universal joint revolute pair.
106: bearing inner race for universal joint revolute pair.
107: bearing steel bowl for universal joint revolute pair.
108: center top rubber ball for universal joint revolute pair.
109: snap ring for universal joint revolute pair.
110: sealing sleeve for universal joint revolute pair.
111: nut for universal joint revolute pair.
112: spherical outer ring for universal joint revolute pair.
113: spherical inner ring for universal joint revolute pair.
114: rubber ring for universal joint revolute pair.
115: aluminum sheath for universal joint revolute pair.
116: aluminum bowl cover for universal joint revolute pair.
117: tapered rolling bearing for universal joint revolute pair.
118: oblique nut for universal joint revolute pair.
119: horizontal axis for staggered cross shaft for universal joints.
120: vertical axis for staggered cross shaft for universal joints.
121: yoke hole member (whole-circle yoke rings) for staggered cross shaft universal joints.
122: bearing bush for universal joint revolute pair.
123: flat rubber ring for universal joint revolute pair.
124: oblique nut for universal joint revolute pair.
125: shaft washer for universal joint revolute pair.
126: thrust bearing roller needle for universal joint revolute pair.
127: connecting piece at lower shaft end of flywheel rotation shaft.
128: nut with ring groove.
129: external flange plate at upper end of pulling torque transfer flexible transmission part.
130: connecting piece with internal thread at lower shaft end of flywheel rotation shaft.
131: external flange plate at lower end of pulling torque transfer flexible transmission part.
132: external flange plate at upper end of flywheel center shaft.
133: support plate of suspended flexible flywheel device.
134: base for suspended flexible flywheel device (connected with site foundation).
135: installed reference plane for suspended flexible flywheel rotation shaft (contact surface).
136: spherical surface (contact surface) for suspended flexible flywheel device support.
137: spherical cone for suspended flexible flywheel device support.
138: vacuum chamber shell for suspended flexible flywheel device.
139: outer steel bushing accommodating each section of steel bushing of permanent magnetic bearing stationary disc.
140: bearing block at lower end of flywheel rotation shaft.
141: sleeve with outer spherical surface.
142: support disc with inner spherical surface.
143: outer ring support disc.
144: set screw.
145: adjusting washer.
146: nut for fixing permanent magnetic bearing rotary disc.
147: adapter sleeve for fixing permanent magnetic bearing rotary disc.
148: intermediate spacer bush between permanent magnetic bearing rotary discs.
149: soft magnetic material electromagnetic pure iron ring for permanent magnetic bearing stationary disc.
150: permanent magnet material Nd—Fe—B ring for permanent magnetic bearing stationary disc.
151: non-magnetic material aluminium alloy matrix for permanent magnetic bearing stationary disc.
152: spacer bush at uppermost end of permanent magnetic bearing rotary disc.
153: steel bearing block at upper end of flywheel rotation shaft.
154: upper-end steel bushing accommodating permanent magnetic bearing stationary disc.
155: rubber elastic cushion cover.
156: intermediate steel bushing accommodating permanent magnetic bearing stationary disc.
157: lower-end steel bushing accommodating permanent magnetic bearing stationary disc.
158: end cover of bearing block at lower end of flywheel rotation shaft.
159: centrifugal isolating disc for bearing chamber at lower end of flywheel rotation shaft.

160: bearing spacer at lower end of flywheel rotation shaft.
161: bearing spacer at lower end of flywheel rotation shaft.
162: bearing aluminium-alloy end base at upper end of flywheel rotation shaft.
163: bearing spacer at upper end of flywheel rotation shaft.
164: bearing spacer at upper end of flywheel rotation shaft.
165: bearing aluminium-alloy end cover at upper end of flywheel rotation shaft.
166: fan-shaped cushion block for suspended flexible flywheel device support.
167: fan-shaped adjusting base plate (adjusting clearance between permanent magnetic bearing rotary disc and stationary disc).
168: end thin-walled ring unit for brazing ring cavity wall structure of vacuum container shell.
169: intermediate thin-walled ring unit for brazing ring cavity wall structure of vacuum container shell.
170: end thin-walled ring unit for brazing ring cavity wall structure of vacuum container shell.
171: end thin-walled ring unit for brazing ring cavity wall structure between support plate and upper bearing block.
172: intermediate thin-walled ring unit for brazing ring cavity wall structure between support plate and upper bearing block.
173: end thin-walled ring unit for brazing ring cavity wall structure between support plate and upper bearing block.
174: internal spline sleeve connecting HET rotation shaft and flywheel rotation shaft.
175: bracket connecting HET stator and flywheel bearing block.
176: suspended flexible flywheel device.
177: flywheel-side vertical separated HET half-coupled member.
178: motor-side horizontal separated HET half-coupled member.
179: horizontal synchronous motor/generator.
180: end shaft of HET hollow rotation shaft.
181: lantern ring of HET hollow rotation shaft.
182: end shaft of HET hollow rotation shaft.

What is claimed is:

1. A homopolar DC electromagnetic transmission, comprising:
two rotors,
a stator,
an external auxiliary system, and
a regulation and control system, wherein:
the two rotors are respectively connected to a first shaft and a second shaft, wherein the first shaft is independent to the second shaft, both the first and the second shafts extend along an axial direction, each rotor at least has one axisymmetric rotor magnetic and electric conductor (3), and two sides of each rotor magnetic and electric conductor (3) are respectively connected to one rotor electric conductor (4) in the axial direction;
the stator at least has one DC magnet exciting coil (9) wound around the axial direction, and the stator comprises two stator magnetic and electric conductors (7) and two stator electric conductors (6), each of the stator magnetic and electric conductors (7) surrounds one of the rotor magnetic and electric conductors (3) in a radial direction perpendicular to the axial direction, and each of the stator electric conductors (6) surrounds one of the rotor electric conductors (4) in the radial direction;
a main magnetic circuit (22) is guided to be a closed loop by axisymmetric magnetic conduction structural members on the rotor and the stator; at least two main magnetic circuits (22) pass through rotor magnetic and electric conductors (3) and stator magnetic and electric conductors (7); and the first shaft and the second shaft guide magnetic flux of the two main magnetic circuits (22) to be connected to magnetic flux passing through the rotor magnetic and electric conductors (3);
a closed main current (I0) circuit (23) is constructed on the two rotors and a stator and is connected in series with all the rotor magnetic and electric conductors (3), rotor electric conductors (4), rotor and stator circuit connecting media (5), stator electric conductors (6, 11) and stator magnetic and electric conductors (7); and the main current direction of each rotor magnetic and electric conductor (3) is mutually perpendicular to a direction of the magnetic flux ($\Phi$) in a meridian plane.

2. The homopolar DC electromagnetic transmission according to claim 1, wherein the homopolar DC electromagnetic transmission is applied to a fuel engine power system for vehicles; and the system comprises an engine for burning fuel to output shaft power, a transmission system which transmits engine power to a drive bridge main reducer, and a corresponding control system, wherein the transmission system comprises the homopolar DC electromagnetic transmission.

3. The homopolar DC electromagnetic transmission according to claim 1, wherein the homopolar DC electromagnetic transmission is applied to a flywheel power system for vehicles; and the system comprises an energy storage flywheel device, a transmission system from a flywheel device to the drive bridge main reducer and a corresponding control system, wherein the transmission system includes the homopolar DC electromagnetic transmission.

4. The homopolar DC electromagnetic transmission according to claim 1, wherein the homopolar DC electromagnetic transmission is applied to a fuel engine and flywheel hybrid power system; and the system comprises an engine used for burning fuel to output shaft work, an energy storage flywheel device, a transmission system which is connected with the engine, the flywheel device and a drive bridge main reducer and a corresponding control system, wherein the transmission system includes the homopolar DC electromagnetic transmission.

5. The homopolar DC electromagnetic transmission according to claim 1, wherein the homopolar DC electromagnetic transmission is applied to a mechanical connection and load charging system for energy storage flywheel of vehicles; and the system comprises a loading joint and a rotation shaft which are in mechanical connection with a loading disc at the lower end of the flywheel rotation shaft during operation, a motor or a DC power supply connected with an AC power grid and a transmission system for transfering the output energy of the motor or the DC power supply to the loading joint, wherein the transmission system includes the homopolar DC electromagnetic transmission.

6. The homopolar DC electromagnetic transmission according to claim 1, wherein the homopolar DC electromagnetic transmission is applied to a wind power generation system; and the system comprises a wind wheel, a generator, a transmission system which is connected with the wind wheel and the generator and a corresponding control system, wherein the transmission system includes the homopolar DC electromagnetic transmission.

7. The homopolar DC electromagnetic transmission according to claim 1, wherein the homopolar DC electromagnetic transmission is applied to a wind power generation system with the energy storage flywheel; and the system comprises a wind wheel, a generator, an energy storage flywheel device, an energy transfer system and a corresponding control system, wherein the energy transfer system includes the homopolar DC electromagnetic transmission.

8. The homopolar DC electromagnetic transmission according to claim 1, wherein the homopolar DC electromagnetic transmission is applied to an energy storage and conversion system; and the system comprises an energy storage flywheel device, a moto, a transmission device between a flywheel and the motor and a corresponding control system, wherein the transmission device adopts the homopolar DC electromagnetic transmission.

* * * * *